(12) United States Patent
McCabe et al.

(10) Patent No.: US 8,277,059 B2
(45) Date of Patent: Oct. 2, 2012

(54) VEHICULAR ELECTROCHROMIC INTERIOR REARVIEW MIRROR ASSEMBLY

(75) Inventors: Ian A. McCabe, Holland, MI (US); Hamid Habibi, Holland, MI (US); Niall R. Lynam, Holland, MI (US); Donald L. Bareman, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 202 days.

(21) Appl. No.: 12/900,063

(22) Filed: Oct. 7, 2010

(65) Prior Publication Data

US 2011/0019260 A1    Jan. 27, 2011

Related U.S. Application Data

(60) Continuation of application No. 12/476,309, filed on Jun. 2, 2009, now Pat. No. 7,826,123, which is a continuation of application No. 12/124,365, filed on May 21, 2008, now Pat. No. 7,542,193, which is a division of application No. 11/837,865, filed on Aug. 13, 2007, now Pat. No. 7,391,563, which is a continuation of application No. 11/021,065, filed on Dec. 23, 2004, now Pat. No. 7,255,451, and a continuation-in-part of application No. PCT/US03/35381, filed on Nov. 5, 2003, said application No. 11/021,065 is a continuation-in-part of application No. PCT/US03/29776, filed on Sep. 19, 2003.

(60) Provisional application No. 60/531,838, filed on Dec. 23, 2003, provisional application No. 60/553,842, filed on Mar. 17, 2004, provisional application No. 60/563,342, filed on Apr. 19, 2004, provisional application No. 60/629,926, filed on Nov. 22, 2004, provisional application No. 60/490,111, filed on Jul. 25, 2003, provisional application No. 60/423,903, filed on Nov. 5, 2002, provisional application No. 60/412,275, filed on Sep. 20, 2002, provisional application No. 60/424,116, filed on Nov. 5, 2002, provisional application No. 60/489,816, filed on Jul. 24, 2003.

(51) Int. Cl.
*G02B 5/08* (2006.01)

(52) U.S. Cl. ........................................ 359/603; 359/267

(58) Field of Classification Search .................. None
See application file for complete search history.

(56) References Cited

U.S. PATENT DOCUMENTS 1,096,452 A    5/1914 Perrin
(Continued)

FOREIGN PATENT DOCUMENTS

AU    A-40317/95    2/1995
(Continued)

OTHER PUBLICATIONS

Supplementary European Search Report dated Jun. 6, 2011 which issued in connection with European Patent Application No. 04815561.8.

(Continued)

*Primary Examiner* — Derek S Chapel
(74) *Attorney, Agent, or Firm* — Gardner, Linn, Burkhart & Flory, LLP

(57) ABSTRACT

A vehicular electrochromic interior rearview mirror assembly includes a mirror casing and an electrochromic mirror reflective element. At least a portion of a front substrate of the reflective element extends beyond a corresponding portion of a rear substrate of the reflective element to establish a ledge at least partially along the periphery of the reflective element, with no part of the rear substrate extending beyond any part of the front substrate. Electrical connections are made to conductive coatings or layers at the front and rear substrates. The electrochromic interior rearview mirror reflective element includes a concealing layer disposed along a perimeter border region to conceal the presence of the perimeter seal and the electrical connections from view by a driver of the equipped vehicle. The mirror casing provides a bezel-less mirror casing where no portion of the mirror casing overlaps the first surface of the front substrate.

123 Claims, 50 Drawing Sheets

U.S. PATENT DOCUMENTS

| | | |
|---|---|---|
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| D289,989 S | 5/1987 | Skogler et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,707,570 A | 11/1987 | Ide et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |

| | | | | | |
|---|---|---|---|---|---|
| 4,793,695 A | 12/1988 | Wada et al. | 5,076,674 A | 12/1991 | Lynam |
| 4,794,261 A | 12/1988 | Rosen | 5,078,480 A | 1/1992 | Warszawski |
| D299,491 S | 1/1989 | Masuda | 5,096,287 A | 3/1992 | Kakinami et al. |
| 4,799,768 A | 1/1989 | Gahan | 5,100,095 A | 3/1992 | Haan et al. |
| 4,803,599 A | 2/1989 | Trine et al. | 5,101,139 A | 3/1992 | Lechter |
| 4,807,096 A | 2/1989 | Skogler et al. | 5,105,127 A | 4/1992 | Lavaud et al. |
| 4,820,933 A | 4/1989 | Hong et al. | 5,115,346 A | 5/1992 | Lynam |
| 4,825,232 A | 4/1989 | Howdle | 5,117,346 A | 5/1992 | Gard |
| 4,826,289 A | 5/1989 | Vandenbrink et al. | 5,119,220 A | 6/1992 | Narita et al. |
| 4,827,086 A | 5/1989 | Rockwell | 5,121,200 A | 6/1992 | Choi |
| 4,837,551 A | 6/1989 | Iino | 5,122,619 A | 6/1992 | Dlubak |
| 4,842,378 A | 6/1989 | Flasck et al. | 5,123,077 A | 6/1992 | Endo et al. |
| 4,845,402 A | 7/1989 | Smith | 5,124,845 A | 6/1992 | Shimojo |
| 4,847,772 A | 7/1989 | Michalopoulos et al. | 5,124,890 A | 6/1992 | Choi et al. |
| 4,855,161 A | 8/1989 | Moser et al. | 5,128,799 A | 7/1992 | Byker |
| 4,855,550 A | 8/1989 | Schultz, Jr. | 5,130,898 A | 7/1992 | Akahane |
| 4,859,813 A | 8/1989 | Rockwell | 5,131,154 A | 7/1992 | Schierbeek et al. |
| 4,859,867 A | 8/1989 | Larson et al. | 5,134,507 A | 7/1992 | Ishii |
| 4,860,171 A | 8/1989 | Kojima | 5,134,549 A | 7/1992 | Yokoyama |
| 4,862,594 A | 9/1989 | Schierbeek et al. | 5,135,298 A | 8/1992 | Feltman |
| 4,871,917 A | 10/1989 | O'Farrell et al. | 5,136,483 A | 8/1992 | Schöniger et al. |
| 4,872,051 A | 10/1989 | Dye | 5,140,455 A | 8/1992 | Varaprasad et al. |
| 4,882,466 A | 11/1989 | Friel | 5,140,465 A | 8/1992 | Yasui et al. |
| 4,882,565 A | 11/1989 | Gallmeyer | 5,142,407 A | 8/1992 | Varaprasad et al. |
| 4,883,349 A | 11/1989 | Mittelhäuser | 5,145,609 A | 9/1992 | Varaprasad et al. |
| 4,884,135 A | 11/1989 | Schiffman | 5,148,306 A | 9/1992 | Yamada et al. |
| 4,886,960 A | 12/1989 | Molyneux et al. | 5,150,232 A | 9/1992 | Gunkima et al. |
| 4,889,412 A | 12/1989 | Clerc et al. | 5,151,816 A | 9/1992 | Varaprasad et al. |
| 4,891,828 A | 1/1990 | Kawazoe | 5,151,824 A | 9/1992 | O'Farrell |
| 4,892,345 A | 1/1990 | Rachael, III | 5,153,572 A | 10/1992 | Caldwell et al. |
| 4,902,103 A | 2/1990 | Miyake et al. | 5,154,617 A | 10/1992 | Suman et al. |
| 4,902,108 A | 2/1990 | Byker | 5,158,638 A | 10/1992 | Osanami et al. |
| 4,906,085 A | 3/1990 | Sugihara et al. | 5,160,200 A | 11/1992 | Cheselske |
| 4,909,606 A | 3/1990 | Wada et al. | 5,160,201 A | 11/1992 | Wrobel |
| 4,910,591 A | 3/1990 | Petrossian et al. | 5,166,815 A | 11/1992 | Elderfield |
| 4,916,374 A | 4/1990 | Schierbeek et al. | 5,168,378 A | 12/1992 | Black et al. |
| 4,926,170 A | 5/1990 | Beggs et al. | 5,173,881 A | 12/1992 | Sindle |
| 4,930,742 A | 6/1990 | Schofield et al. | 5,177,031 A | 1/1993 | Buchmann et al. |
| 4,933,814 A | 6/1990 | Sanai | 5,178,448 A | 1/1993 | Adams et al. |
| 4,935,665 A | 6/1990 | Murata | 5,179,471 A | 1/1993 | Caskey et al. |
| 4,936,533 A | 6/1990 | Adams et al. | 5,181,417 A | 1/1993 | Nishida et al. |
| 4,937,796 A | 6/1990 | Tendler | 5,183,099 A | 2/1993 | Bechu |
| 4,937,945 A | 7/1990 | Schofield et al. | 5,184,956 A | 2/1993 | Langlais et al. |
| 4,943,796 A | 7/1990 | Lee | 5,189,537 A | 2/1993 | O'Farrell |
| 4,948,242 A | 8/1990 | Desmond et al. | 5,193,029 A | 3/1993 | Schofield et al. |
| 4,953,305 A | 9/1990 | Van Lente et al. | 5,197,562 A | 3/1993 | Kakinama et al. |
| 4,956,591 A | 9/1990 | Schierbeek et al. | 5,202,950 A | 4/1993 | Arego et al. |
| 4,957,349 A | 9/1990 | Clerc et al. | 5,207,492 A | 5/1993 | Roberts |
| 4,959,247 A | 9/1990 | Moser et al. | 5,210,967 A | 5/1993 | Brown |
| 4,959,865 A | 9/1990 | Stettiner et al. | 5,212,819 A | 5/1993 | Wada |
| 4,970,653 A | 11/1990 | Kenue | 5,214,408 A | 5/1993 | Asayama |
| 4,973,844 A | 11/1990 | O'Farrell et al. | 5,217,794 A | 6/1993 | Schrenk |
| 4,974,122 A | 11/1990 | Shaw | 5,223,814 A | 6/1993 | Suman |
| 4,978,196 A | 12/1990 | Suzuki et al. | 5,223,844 A | 6/1993 | Mansell et al. |
| 4,983,951 A | 1/1991 | Igarashi et al. | 5,229,975 A | 7/1993 | Truesdell et al. |
| 4,985,809 A | 1/1991 | Matsui et al. | 5,230,400 A | 7/1993 | Kakinami et al. |
| 4,987,357 A | 1/1991 | Masaki | 5,233,461 A | 8/1993 | Dornan et al. |
| 4,996,083 A | 2/1991 | Moser et al. | 5,235,316 A | 8/1993 | Qualizza |
| 5,001,386 A | 3/1991 | Sullivan et al. | 5,239,152 A | 8/1993 | Caldwell et al. |
| 5,001,558 A | 3/1991 | Burley et al. | 5,239,405 A | 8/1993 | Varaprasad et al. |
| 5,005,213 A | 4/1991 | Hanson et al. | 5,239,406 A | 8/1993 | Lynam |
| 5,006,971 A | 4/1991 | Jenkins | 5,243,417 A | 9/1993 | Pollard |
| 5,014,167 A | 5/1991 | Roberts | 5,245,422 A | 9/1993 | Borcherts et al. |
| 5,016,988 A | 5/1991 | Iimura | 5,252,354 A | 10/1993 | Cronin et al. |
| 5,016,996 A | 5/1991 | Ueno | 5,253,109 A | 10/1993 | O'Farrell et al. |
| 5,017,903 A | 5/1991 | Krippelz, Sr. | 5,255,442 A | 10/1993 | Schierbeek et al. |
| 5,018,839 A | 5/1991 | Yamamoto et al. | 5,260,626 A | 11/1993 | Takase et al. |
| 5,027,200 A | 6/1991 | Petrossian et al. | 5,277,986 A | 1/1994 | Cronin et al. |
| 5,037,182 A | 8/1991 | Groves et al. | 5,280,555 A | 1/1994 | Ainsburg |
| 5,038,255 A | 8/1991 | Nishihashi et al. | 5,285,060 A | 2/1994 | Larson et al. |
| 5,056,899 A | 10/1991 | Warszawski | 5,289,321 A | 2/1994 | Secor |
| 5,057,974 A | 10/1991 | Mizobe | 5,296,924 A | 3/1994 | de Saint Blancard et al. |
| 5,058,851 A | 10/1991 | Lawlor et al. | 5,303,075 A | 4/1994 | Wada et al. |
| 5,059,015 A | 10/1991 | Tran | 5,303,205 A | 4/1994 | Gauthier et al. |
| 5,066,108 A | 11/1991 | McDonald | 5,304,980 A | 4/1994 | Maekawa |
| 5,066,112 A * | 11/1991 | Lynam et al. ............ 359/267 | 5,305,012 A | 4/1994 | Faris |
| 5,070,323 A | 12/1991 | Iino et al. | 5,307,136 A | 4/1994 | Saneyoshi |
| 5,073,012 A | 12/1991 | Lynam | 5,313,335 A | 5/1994 | Gray et al. |
| 5,076,673 A | 12/1991 | Lynam et al. | 5,325,096 A | 6/1994 | Pakett |

| Patent No. | Date | Name |
|---|---|---|
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Wortham |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,167 A | 9/1997 | Tults |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clarke, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |

| | | | | | |
|---|---|---|---|---|---|
| 5,696,529 A | 12/1997 | Evanicky et al. | 5,867,801 A | 2/1999 | Denny |
| 5,696,567 A | 12/1997 | Wada et al. | 5,871,275 A | 2/1999 | O'Farrell et al. |
| 5,699,044 A | 12/1997 | Van Lente et al. | 5,871,843 A | 2/1999 | Yoneda et al. |
| 5,699,188 A | 12/1997 | Gilbert et al. | 5,877,707 A | 3/1999 | Kowalick |
| 5,703,568 A | 12/1997 | Hegyi | 5,877,897 A | 3/1999 | Schofield et al. |
| 5,708,410 A | 1/1998 | Blank et al. | 5,878,353 A | 3/1999 | ul Azam et al. |
| 5,708,415 A | 1/1998 | Van Lente et al. | 5,878,370 A | 3/1999 | Olson |
| 5,708,804 A | 1/1998 | Goodwin et al. | 5,879,074 A | 3/1999 | Pastrick |
| 5,708,857 A | 1/1998 | Ishibashi | 5,883,605 A | 3/1999 | Knapp |
| 5,715,093 A | 2/1998 | Schierbeek et al. | 5,883,739 A | 3/1999 | Ashihara et al. |
| 5,724,187 A | 3/1998 | Varaprasad et al. | 5,888,431 A | 3/1999 | Tonar et al. |
| 5,724,316 A | 3/1998 | Brunts | 5,894,196 A | 4/1999 | McDermott |
| 5,729,194 A | 3/1998 | Spears et al. | D409,540 S | 5/1999 | Muth |
| 5,737,226 A | 4/1998 | Olson et al. | 5,899,551 A | 5/1999 | Neijzen et al. |
| 5,741,966 A | 4/1998 | Handfield et al. | 5,899,956 A | 5/1999 | Chan |
| 5,744,227 A | 4/1998 | Bright et al. | 5,904,729 A | 5/1999 | Ruzicka |
| 5,745,050 A | 4/1998 | Nakagawa | 5,910,854 A | 6/1999 | Varaprasad et al. |
| 5,745,266 A | 4/1998 | Smith | 5,914,815 A | 6/1999 | Bos |
| 5,748,172 A | 5/1998 | Song et al. | 5,917,664 A | 6/1999 | O'Neill et al. |
| 5,748,287 A | 5/1998 | Takahashi et al. | 5,918,180 A | 6/1999 | Dimino |
| 5,751,211 A | 5/1998 | Shirai et al. | 5,922,176 A | 7/1999 | Caskey |
| 5,751,246 A | 5/1998 | Hertel | 5,923,027 A | 7/1999 | Stam et al. |
| 5,751,390 A | 5/1998 | Crawford et al. | 5,923,457 A | 7/1999 | Byker et al. |
| 5,751,489 A | 5/1998 | Caskey et al. | 5,924,212 A | 7/1999 | Domanski |
| 5,754,099 A | 5/1998 | Nishimura et al. | 5,926,087 A | 7/1999 | Busch et al. |
| D394,833 S | 6/1998 | Muth | 5,927,792 A | 7/1999 | Welling et al. |
| 5,760,828 A | 6/1998 | Cortes | 5,928,572 A | 7/1999 | Tonar et al. |
| 5,760,931 A | 6/1998 | Saburi et al. | 5,929,786 A | 7/1999 | Schofield et al. |
| 5,760,962 A | 6/1998 | Schofield et al. | 5,931,555 A | 8/1999 | Akahane et al. |
| 5,761,094 A | 6/1998 | Olson et al. | 5,935,702 A | 8/1999 | Macquart et al. |
| 5,762,823 A | 6/1998 | Hikmet | 5,936,774 A | 8/1999 | Street |
| 5,764,139 A | 6/1998 | Nojima et al. | 5,938,320 A | 8/1999 | Crandall |
| 5,765,940 A | 6/1998 | Levy et al. | 5,938,321 A | 8/1999 | Bos et al. |
| 5,767,793 A | 6/1998 | Agravante et al. | 5,938,721 A | 8/1999 | Dussell et al. |
| 5,768,020 A | 6/1998 | Nagao | 5,940,011 A | 8/1999 | Agravante et al. |
| 5,775,762 A | 7/1998 | Vitito | 5,940,120 A | 8/1999 | Frankhouse et al. |
| 5,777,779 A | 7/1998 | Hashimoto et al. | 5,940,201 A | 8/1999 | Ash et al. |
| 5,780,160 A | 7/1998 | Allemand et al. | 5,942,895 A | 8/1999 | Popovic et al. |
| 5,786,772 A | 7/1998 | Schofield et al. | 5,947,586 A | 9/1999 | Weber |
| 5,788,357 A | 8/1998 | Muth et al. | 5,949,331 A | 9/1999 | Schofield et al. |
| 5,790,298 A | 8/1998 | Tonar | 5,949,506 A | 9/1999 | Jones et al. |
| 5,790,502 A | 8/1998 | Horinouchi et al. | 5,956,079 A | 9/1999 | Ridgley |
| 5,790,973 A | 8/1998 | Blaker et al. | 5,956,181 A | 9/1999 | Lin |
| 5,793,308 A | 8/1998 | Rosinski et al. | 5,959,367 A | 9/1999 | O'Farrell et al. |
| 5,793,420 A | 8/1998 | Schmidt | 5,959,555 A | 9/1999 | Furuta |
| 5,796,094 A | 8/1998 | Schofield et al. | 5,959,577 A | 9/1999 | Fan et al. |
| 5,796,176 A | 8/1998 | Kramer et al. | 5,963,247 A | 10/1999 | Banitt |
| 5,798,057 A | 8/1998 | Hikmet | 5,963,284 A | 10/1999 | Jones et al. |
| 5,798,575 A | 8/1998 | O'Farrell et al. | 5,965,247 A | 10/1999 | Jonza et al. |
| 5,798,688 A | 8/1998 | Schofield | 5,968,538 A | 10/1999 | Snyder, Jr. |
| 5,800,918 A | 9/1998 | Chartier et al. | 5,971,552 A | 10/1999 | O'Farrell et al. |
| 5,802,727 A | 9/1998 | Blank et al. | 5,973,760 A | 10/1999 | Dehmlow |
| 5,803,579 A | 9/1998 | Turnbull et al. | 5,975,715 A | 11/1999 | Bauder |
| 5,805,330 A | 9/1998 | Byker et al. | 5,984,482 A | 11/1999 | Rumsey et al. |
| 5,805,367 A | 9/1998 | Kanazawa | 5,986,730 A | 11/1999 | Hansen et al. |
| 5,806,879 A | 9/1998 | Hamada et al. | 5,990,469 A | 11/1999 | Bechtel et al. |
| 5,806,965 A | 9/1998 | Deese | 5,990,625 A | 11/1999 | Meissner et al. |
| 5,808,197 A | 9/1998 | Dao | 5,995,180 A | 11/1999 | Moriwaki et al. |
| 5,808,566 A | 9/1998 | Behr et al. | 5,998,617 A | 12/1999 | Srinivasa et al. |
| 5,808,589 A | 9/1998 | Fergason | 5,998,929 A | 12/1999 | Bechtel et al. |
| 5,808,713 A | 9/1998 | Broer et al. | 6,000,823 A | 12/1999 | Desmond et al. |
| 5,808,777 A | 9/1998 | Lynam et al. | 6,001,486 A | 12/1999 | Varaprasad et al. |
| 5,808,778 A | 9/1998 | Bauer et al. | 6,002,511 A | 12/1999 | Varaprasad et al. |
| 5,812,321 A | 9/1998 | Schierbeek et al. | 6,002,544 A | 12/1999 | Yatsu |
| 5,813,745 A | 9/1998 | Fant, Jr. et al. | 6,005,538 A | 12/1999 | Hoekstra |
| 5,818,625 A | 10/1998 | Forgette et al. | 6,005,724 A | 12/1999 | Todd |
| 5,820,097 A | 10/1998 | Spooner | 6,007,222 A | 12/1999 | Thau |
| 5,820,245 A | 10/1998 | Desmond et al. | 6,008,486 A | 12/1999 | Stam et al. |
| 5,822,023 A | 10/1998 | Suman et al. | 6,008,871 A | 12/1999 | Okumura |
| 5,823,654 A | 10/1998 | Pastrick et al. | 6,009,359 A | 12/1999 | El-Hakim et al. |
| 5,825,527 A | 10/1998 | Forgette et al. | 6,016,035 A | 1/2000 | Eberspächer et al. |
| 5,835,166 A | 11/1998 | Hall et al. | 6,016,215 A | 1/2000 | Byker |
| 5,837,994 A | 11/1998 | Stam et al. | 6,019,411 A | 2/2000 | Carter et al. |
| 5,844,505 A | 12/1998 | Van Ryzin | 6,019,475 A | 2/2000 | Lynam et al. |
| 5,848,373 A | 12/1998 | DeLorme et al. | 6,020,987 A | 2/2000 | Baumann et al. |
| 5,850,176 A | 12/1998 | Kinoshita et al. | 6,021,371 A | 2/2000 | Fultz |
| 5,850,205 A | 12/1998 | Blouin | 6,023,229 A | 2/2000 | Bugno et al. |
| 5,863,116 A | 1/1999 | Pastrick et al. | 6,025,872 A | 2/2000 | Ozaki et al. |
| 5,864,419 A | 1/1999 | Lynam | 6,028,537 A | 2/2000 | Suman et al. |

| | | | | | | |
|---|---|---|---|---|---|---|
| 6,037,689 A | 3/2000 | Bingle et al. | | 6,150,014 A | 11/2000 | Chu et al. |
| 6,040,939 A | 3/2000 | Demiryont et al. | | 6,151,065 A | 11/2000 | Steed et al. |
| 6,042,253 A | 3/2000 | Fant, Jr. et al. | | 6,151,539 A | 11/2000 | Bergholz et al. |
| 6,042,934 A | 3/2000 | Guiselin et al. | | 6,152,551 A | 11/2000 | Annas |
| 6,045,243 A | 4/2000 | Muth et al. | | 6,152,590 A | 11/2000 | Fürst et al. |
| 6,045,643 A | 4/2000 | Byker et al. | | 6,154,149 A | 11/2000 | Tyckowski et al. |
| 6,046,766 A | 4/2000 | Sakata | | 6,154,306 A | 11/2000 | Varaprasad et al. |
| 6,046,837 A | 4/2000 | Yamamoto | | 6,157,294 A | 12/2000 | Urai et al. |
| 6,049,171 A | 4/2000 | Stam et al. | | 6,157,418 A | 12/2000 | Rosen |
| D425,466 S | 5/2000 | Todd et al. | | 6,157,424 A | 12/2000 | Eichenlaub |
| 6,060,989 A | 5/2000 | Gehlot | | 6,157,480 A | 12/2000 | Anderson et al. |
| 6,061,002 A | 5/2000 | Weber et al. | | 6,158,655 A | 12/2000 | DeVries, Jr. et al. |
| 6,062,920 A | 5/2000 | Jordan et al. | | 6,161,865 A | 12/2000 | Rose et al. |
| 6,064,508 A | 5/2000 | Forgette et al. | | 6,164,564 A | 12/2000 | Franco et al. |
| 6,065,840 A | 5/2000 | Caskey et al. | | 6,166,625 A | 12/2000 | Teowee et al. |
| 6,066,920 A | 5/2000 | Torihara et al. | | 6,166,629 A | 12/2000 | Hamma et al. |
| 6,067,111 A | 5/2000 | Hahn et al. | | 6,166,834 A | 12/2000 | Taketomi et al. |
| 6,067,500 A | 5/2000 | Morimoto et al. | | 6,166,847 A | 12/2000 | Tench et al. |
| 6,068,380 A | 5/2000 | Lynn et al. | | 6,166,848 A | 12/2000 | Cammenga et al. |
| D426,506 S | 6/2000 | Todd et al. | | 6,167,755 B1 | 1/2001 | Damson et al. |
| D426,507 S | 6/2000 | Todd et al. | | 6,169,955 B1 | 1/2001 | Fultz |
| D427,128 S | 6/2000 | Mathieu | | 6,170,956 B1 | 1/2001 | Rumsey et al. |
| 6,072,391 A | 6/2000 | Suzukie et al. | | 6,172,600 B1 | 1/2001 | Kakinama et al. |
| 6,074,077 A | 6/2000 | Pastrick et al. | | 6,172,601 B1 | 1/2001 | Wada et al. |
| 6,074,777 A | 6/2000 | Reimers et al. | | 6,172,613 B1 | 1/2001 | DeLine et al. |
| 6,076,948 A | 6/2000 | Bukosky et al. | | 6,173,501 B1 | 1/2001 | Blank et al. |
| 6,078,355 A | 6/2000 | Zengel | | 6,175,164 B1 | 1/2001 | O'Farrell et al. |
| 6,078,865 A | 6/2000 | Koyanagi | | 6,175,300 B1 | 1/2001 | Kendrick |
| D428,372 S | 7/2000 | Todd et al. | | 6,176,602 B1 | 1/2001 | Pastrick et al. |
| D428,373 S | 7/2000 | Todd et al. | | 6,178,034 B1 | 1/2001 | Allemand et al. |
| 6,082,881 A | 7/2000 | Hicks | | 6,178,377 B1 | 1/2001 | Ishihara et al. |
| 6,084,700 A | 7/2000 | Knapp et al. | | 6,181,387 B1 | 1/2001 | Rosen |
| 6,086,131 A | 7/2000 | Bingle et al. | | 6,182,006 B1 | 1/2001 | Meek |
| 6,086,229 A | 7/2000 | Pastrick | | 6,183,119 B1 | 2/2001 | Desmond et al. |
| 6,087,012 A | 7/2000 | Varaprasad et al. | | 6,184,679 B1 | 2/2001 | Popovic et al. |
| 6,087,953 A | 7/2000 | DeLine et al. | | 6,184,781 B1 | 2/2001 | Ramakesavan |
| 6,091,343 A | 7/2000 | Dykema et al. | | 6,185,492 B1 | 2/2001 | Kagawa et al. |
| 6,091,376 A | 7/2000 | Takekawa et al. | | 6,185,501 B1 | 2/2001 | Smith et al. |
| 6,093,976 A | 7/2000 | Kramer et al. | | 6,188,505 B1 | 2/2001 | Lomprey et al. |
| 6,094,618 A | 7/2000 | Harada | | 6,191,704 B1 | 2/2001 | Takenaga et al. |
| D428,842 S | 8/2000 | Todd et al. | | 6,193,912 B1 | 2/2001 | Thieste et al. |
| D429,202 S | 8/2000 | Todd et al. | | 6,195,194 B1 | 2/2001 | Roberts et al. |
| D430,088 S | 8/2000 | Todd et al. | | 6,196,688 B1 | 3/2001 | Caskey et al. |
| 6,097,023 A | 8/2000 | Schofield et al. | | 6,198,409 B1 | 3/2001 | Schofield et al. |
| 6,097,316 A | 8/2000 | Liaw et al. | | 6,199,014 B1 | 3/2001 | Walker et al. |
| 6,099,131 A | 8/2000 | Fletcher et al. | | 6,199,810 B1 | 3/2001 | Wu et al. |
| 6,099,155 A | 8/2000 | Pastrick et al. | | 6,200,010 B1 | 3/2001 | Anders |
| 6,102,546 A | 8/2000 | Carter | | 6,201,642 B1 | 3/2001 | Bos |
| 6,102,559 A | 8/2000 | Nold et al. | | 6,206,553 B1 | 3/2001 | Boddy et al. |
| 6,104,552 A | 8/2000 | Thau et al. | | 6,207,083 B1 | 3/2001 | Varaprasad et al. |
| 6,106,121 A | 8/2000 | Buckley et al. | | 6,210,008 B1 | 4/2001 | Hoekstra et al. |
| 6,111,498 A | 8/2000 | Jobes, I et al. | | 6,210,012 B1 | 4/2001 | Broer |
| 6,111,683 A | 8/2000 | Cammenga et al. | | 6,212,470 B1 | 4/2001 | Seymour et al. |
| 6,111,684 A | 8/2000 | Forgette et al. | | 6,217,181 B1 | 4/2001 | Lynam et al. |
| 6,111,685 A | 8/2000 | Tench et al. | | 6,218,934 B1 | 4/2001 | Regan |
| 6,111,696 A | 8/2000 | Allen et al. | | 6,222,447 B1 | 4/2001 | Schofield et al. |
| 6,115,086 A | 9/2000 | Rosen | | 6,222,460 B1 | 4/2001 | DeLine et al. |
| 6,115,651 A | 9/2000 | Cruz | | 6,222,689 B1 | 4/2001 | Higuchi et al. |
| 6,116,743 A | 9/2000 | Hoek | | 6,227,689 B1 | 5/2001 | Miller |
| 6,118,219 A | 9/2000 | Okigami et al. | | 6,232,937 B1 | 5/2001 | Jacobsen et al. |
| 6,122,597 A | 9/2000 | Saneyoshi et al. | | 6,236,514 B1 | 5/2001 | Sato |
| 6,122,921 A | 9/2000 | Brezoczky et al. | | 6,239,851 B1 | 5/2001 | Hatazawa et al. |
| 6,124,647 A | 9/2000 | Marcus et al. | | 6,239,898 B1 | 5/2001 | Byker et al. |
| 6,124,886 A | 9/2000 | DeLine et al. | | 6,239,899 B1 | 5/2001 | DeVries et al. |
| 6,127,919 A | 10/2000 | Wylin | | 6,243,003 B1 | 6/2001 | DeLine et al. |
| 6,127,945 A | 10/2000 | Mura-Smith | | 6,244,716 B1 | 6/2001 | Steenwyk et al. |
| 6,128,576 A | 10/2000 | Nishimoto et al. | | 6,245,262 B1 | 6/2001 | Varaprasad et al. |
| 6,130,421 A | 10/2000 | Bechtel et al. | | 6,247,820 B1 | 6/2001 | Van Order |
| 6,130,448 A | 10/2000 | Bauer et al. | | 6,249,214 B1 | 6/2001 | Kashiwazaki |
| 6,132,072 A | 10/2000 | Turnbull et al. | | 6,249,310 B1 | 6/2001 | Lefkowitz |
| 6,137,620 A | 10/2000 | Guarr et al. | | 6,249,369 B1 | 6/2001 | Theiste et al. |
| 6,139,171 A | 10/2000 | Waldmann | | 6,250,148 B1 | 6/2001 | Lynam |
| 6,139,172 A | 10/2000 | Bos et al. | | 6,250,766 B1 | 6/2001 | Strumolo et al. |
| 6,140,933 A | 10/2000 | Bugno et al. | | 6,250,783 B1 | 6/2001 | Stidham et al. |
| 6,142,656 A | 11/2000 | Kurth | | 6,255,639 B1 | 7/2001 | Stam et al. |
| 6,146,003 A | 11/2000 | Thau | | 6,257,746 B1 | 7/2001 | Todd et al. |
| 6,147,934 A | 11/2000 | Arikawa et al. | | 6,259,412 B1 | 7/2001 | Duroux |
| 6,148,261 A | 11/2000 | Obradovich et al. | | 6,259,475 B1 | 7/2001 | Ramachandran et al. |
| 6,149,287 A | 11/2000 | Pastrick et al. | | 6,260,608 B1 | 7/2001 | Kim |

| | | |
|---|---|---|
| 6,262,831 B1 | 7/2001 | Bauer et al. |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,314,302 B1 | 11/2001 | Haferbeck et al. |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,332,024 B1 | 12/2001 | Inoue et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,497,368 B1 | 12/2002 | Friend et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull |

| | | | | | | |
|---|---|---|---|---|---|---|
| 6,542,085 B1 | 4/2003 | Yang | | 6,678,614 B2 | 1/2004 | McCarthy et al. |
| 6,542,182 B1 | 4/2003 | Chautorash | | 6,679,608 B2 | 1/2004 | Bechtel et al. |
| 6,543,163 B1 | 4/2003 | Ginsberg | | 6,683,539 B2 | 1/2004 | Trajkovic et al. |
| 6,545,598 B1 | 4/2003 | de Villeroche | | 6,683,969 B1 | 1/2004 | Nishigaki et al. |
| 6,549,253 B1 | 4/2003 | Robbie et al. | | 6,685,348 B2 | 2/2004 | Pastrick et al. |
| 6,549,335 B1 | 4/2003 | Trapani et al. | | 6,690,262 B1 | 2/2004 | Winnett |
| 6,550,949 B1 | 4/2003 | Bauer et al. | | 6,690,268 B2 | 2/2004 | Schofield et al. |
| 6,552,326 B2 | 4/2003 | Turnbull | | 6,690,413 B1 | 2/2004 | Moore |
| 6,553,308 B1 | 4/2003 | Uhlmann et al. | | 6,690,438 B2 | 2/2004 | Sekiguchi |
| 6,559,902 B1 | 5/2003 | Kusuda et al. | | 6,693,517 B2 | 2/2004 | McCarthy et al. |
| 6,560,004 B2 | 5/2003 | Theiste et al. | | 6,693,518 B2 | 2/2004 | Kumata et al. |
| 6,560,027 B2 | 5/2003 | Meine | | 6,693,519 B2 | 2/2004 | Keirstead |
| 6,566,821 B2 | 5/2003 | Nakatsuka et al. | | 6,693,524 B1 | 2/2004 | Payne |
| 6,567,060 B1 | 5/2003 | Sekiguchi | | 6,700,692 B2 | 3/2004 | Tonar et al. |
| 6,567,708 B1 | 5/2003 | Bechtel et al. | | 6,709,136 B2 | 3/2004 | Pastrick et al. |
| 6,568,839 B1 | 5/2003 | Pastrick et al. | | 6,713,783 B1 | 3/2004 | Mase et al. |
| 6,572,233 B1 | 6/2003 | Northman et al. | | 6,717,109 B1 | 4/2004 | Macher et al. |
| 6,573,957 B1 | 6/2003 | Suzuki | | 6,717,610 B1 | 4/2004 | Bos et al. |
| 6,573,963 B2 | 6/2003 | Ouderkirk et al. | | 6,717,712 B2 | 4/2004 | Lynam et al. |
| 6,575,582 B2 | 6/2003 | Tenmyo | | 6,719,215 B2 | 4/2004 | Droulliard |
| 6,575,643 B2 | 6/2003 | Takashashi | | 6,724,446 B2 | 4/2004 | Motomura et al. |
| 6,578,989 B2 | 6/2003 | Osumi et al. | | 6,726,337 B2 | 4/2004 | Whitehead et al. |
| 6,580,373 B1 | 6/2003 | Ohashi | | 6,727,807 B2 | 4/2004 | Trajkovic et al. |
| 6,580,479 B1 | 6/2003 | Sekiguchi et al. | | 6,727,808 B1 | 4/2004 | Uselmann et al. |
| 6,580,562 B2 | 6/2003 | Aoki et al. | | 6,727,844 B1 | 4/2004 | Zimmermann et al. |
| 6,581,007 B2 | 6/2003 | Hasegawa et al. | | 6,731,332 B1 | 5/2004 | Yasui et al. |
| 6,583,730 B2 | 6/2003 | Lang et al. | | 6,734,807 B2 | 5/2004 | King |
| 6,591,192 B2 | 7/2003 | Okamura et al. | | 6,736,526 B2 | 5/2004 | Matsuba et al. |
| 6,592,230 B2 | 7/2003 | Dupay | | 6,737,629 B2 | 5/2004 | Nixon et al. |
| 6,593,565 B2 | 7/2003 | Heslin et al. | | 6,737,630 B2 | 5/2004 | Turnbull |
| 6,593,984 B2 | 7/2003 | Arakawa et al. | | 6,737,964 B2 | 5/2004 | Samman et al. |
| 6,594,065 B2 | 7/2003 | Byker et al. | | 6,738,088 B1 | 5/2004 | Uskolovsky et al. |
| 6,594,067 B2 | 7/2003 | Poll et al. | | 6,742,904 B2 | 6/2004 | Bechtel et al. |
| 6,594,090 B2 | 7/2003 | Kruschwitz et al. | | 6,744,353 B2 | 6/2004 | Sjönell |
| 6,594,583 B2 | 7/2003 | Ogura et al. | | 6,746,775 B1 | 6/2004 | Boire et al. |
| 6,594,614 B2 | 7/2003 | Studt et al. | | 6,747,716 B2 | 6/2004 | Kuroiwa et al. |
| 6,595,649 B2 | 7/2003 | Hoekstra et al. | | 6,748,211 B1 | 6/2004 | Isaac et al. |
| 6,597,489 B1 | 7/2003 | Guarr et al. | | 6,749,308 B1 | 6/2004 | Niendorf et al. |
| 6,606,183 B2 | 8/2003 | Ikai et al. | | 6,755,542 B2 | 6/2004 | Bechtel et al. |
| 6,611,202 B2 | 8/2003 | Schofield et al. | | 6,756,912 B2 | 6/2004 | Skiver et al. |
| 6,611,227 B1 | 8/2003 | Nebiyeloul-Kifle et al. | | 6,757,039 B2 | 6/2004 | Ma |
| 6,611,759 B2 | 8/2003 | Brosche | | 6,757,109 B2 | 6/2004 | Bos |
| 6,614,387 B1 | 9/2003 | Deadman | | D493,131 S | 7/2004 | Lawlor et al. |
| 6,614,419 B1 | 9/2003 | May | | D493,394 S | 7/2004 | Lawlor et al. |
| 6,614,579 B2 | 9/2003 | Roberts et al. | | 6,759,113 B1 | 7/2004 | Tang |
| 6,615,438 B1 | 9/2003 | Franco et al. | | 6,759,945 B2 | 7/2004 | Richard |
| 6,616,313 B2 | 9/2003 | Fürst et al. | | 6,760,157 B1 | 7/2004 | Allen et al. |
| 6,616,764 B2 | 9/2003 | Krämer et al. | | 6,773,116 B2 | 8/2004 | De Vaan et al. |
| 6,618,672 B2 | 9/2003 | Sasaki et al. | | 6,774,356 B2 | 8/2004 | Heslin et al. |
| 6,621,616 B1 | 9/2003 | Bauer et al. | | 6,774,810 B2 | 8/2004 | DeLine et al. |
| 6,624,936 B2 | 9/2003 | Kotchick et al. | | 6,778,904 B2 | 8/2004 | Iwami et al. |
| 6,627,918 B2 | 9/2003 | Getz et al. | | 6,779,900 B1 | 8/2004 | Nolan-Brown |
| 6,630,888 B2 | 10/2003 | Lang et al. | | 6,784,129 B2 | 8/2004 | Seto et al. |
| 6,636,190 B2 | 10/2003 | Hirakata et al. | | 6,797,396 B1 | 9/2004 | Liu et al. |
| 6,636,258 B2 | 10/2003 | Strumolo | | 6,800,871 B2 | 10/2004 | Matsuda et al. |
| 6,638,582 B1 | 10/2003 | Uchiyama et al. | | 6,801,283 B2 | 10/2004 | Koyama et al. |
| 6,639,360 B2 | 10/2003 | Roberts et al. | | 6,805,474 B2 | 10/2004 | Walser et al. |
| 6,642,840 B2 | 11/2003 | Lang et al. | | 6,806,452 B2 | 10/2004 | Bos et al. |
| 6,642,851 B2 | 11/2003 | DeLine et al. | | 6,806,922 B2 | 10/2004 | Ishitaka |
| 6,646,697 B1 | 11/2003 | Sekiguchi et al. | | 6,810,323 B1 | 10/2004 | Bullock et al. |
| 6,648,477 B2 | 11/2003 | Hutzel et al. | | 6,812,907 B1 | 11/2004 | Gennetten et al. |
| 6,650,457 B2 | 11/2003 | Busscher et al. | | 6,819,231 B2 | 11/2004 | Berberich et al. |
| 6,657,607 B1 | 12/2003 | Evanicky et al. | | 6,824,281 B2 | 11/2004 | Schofield et al. |
| 6,661,482 B2 | 12/2003 | Hara | | 6,831,268 B2 | 12/2004 | Bechtel et al. |
| 6,661,830 B1 | 12/2003 | Reed et al. | | 6,832,848 B2 | 12/2004 | Pastrick |
| 6,665,592 B2 | 12/2003 | Kodama | | 6,834,969 B2 | 12/2004 | Bade et al. |
| 6,669,109 B2 | 12/2003 | Ivanov et al. | | 6,836,725 B2 | 12/2004 | Millington et al. |
| 6,669,285 B1 | 12/2003 | Park et al. | | 6,842,276 B2 | 1/2005 | Poll et al. |
| 6,670,207 B1 | 12/2003 | Roberts | | 6,845,805 B1 | 1/2005 | Köster |
| 6,670,910 B2 | 12/2003 | Delcheccolo et al. | | 6,846,098 B2 | 1/2005 | Bourdelais et al. |
| 6,670,941 B2 | 12/2003 | Albu et al. | | 6,847,424 B2 | 1/2005 | Gotoh et al. |
| 6,671,080 B2 | 12/2003 | Poll et al. | | 6,847,487 B2 | 1/2005 | Burgner |
| 6,672,731 B2 | 1/2004 | Schnell et al. | | 6,848,817 B2 | 2/2005 | Bos et al. |
| 6,672,734 B2 | 1/2004 | Lammers | | 6,849,165 B2 | 2/2005 | Klöppel et al. |
| 6,672,744 B2 | 1/2004 | DeLine et al. | | 6,853,491 B1 | 2/2005 | Ruhle et al. |
| 6,672,745 B1 | 1/2004 | Bauer et al. | | 6,861,789 B2 | 3/2005 | Wei |
| 6,674,370 B2 | 1/2004 | Rodewald et al. | | 6,870,655 B1 | 3/2005 | Northman et al. |
| 6,675,075 B1 | 1/2004 | Engelsburg et al. | | 6,870,656 B2 | 3/2005 | Tonar et al. |
| 6,678,083 B1 | 1/2004 | Anstee | | 6,871,982 B2 | 3/2005 | Holman et al. |

| Patent | Kind | Date | Inventor |
|---|---|---|---|
| 6,877,888 | B2 | 4/2005 | DeLine et al. |
| 6,882,287 | B2 | 4/2005 | Schofield |
| 6,889,064 | B2 | 5/2005 | Baratono et al. |
| 6,891,563 | B2 | 5/2005 | Schofield et al. |
| 6,891,677 | B2 | 5/2005 | Nilsen et al. |
| 6,902,284 | B2 | 6/2005 | Hutzel et al. |
| 6,904,348 | B2 | 6/2005 | Drummond et al. |
| 6,906,632 | B2 | 6/2005 | DeLine et al. |
| 6,909,486 | B2 | 6/2005 | Wang et al. |
| 6,910,779 | B2 | 6/2005 | Abel et al. |
| 6,912,396 | B2 | 6/2005 | Sziraki et al. |
| 6,916,099 | B2 | 7/2005 | Su et al. |
| 6,922,902 | B2 | 8/2005 | Schierbeek et al. |
| 6,928,180 | B2 | 8/2005 | Stam et al. |
| 6,928,366 | B2 | 8/2005 | Ockerse et al. |
| 6,930,737 | B2 | 8/2005 | Weindorf et al. |
| 6,934,067 | B2 | 8/2005 | Ash et al. |
| 6,946,978 | B2 | 9/2005 | Schofield |
| 6,947,576 | B2 | 9/2005 | Stam et al. |
| 6,947,577 | B2 | 9/2005 | Stam et al. |
| 6,949,772 | B2 | 9/2005 | Shimizu et al. |
| 6,951,410 | B2 | 10/2005 | Parsons |
| 6,951,681 | B2 | 10/2005 | Hartley et al. |
| 6,952,312 | B2 | 10/2005 | Weber et al. |
| 6,958,495 | B2 | 10/2005 | Nishijima et al. |
| 6,958,683 | B2 | 10/2005 | Mills et al. |
| 6,961,178 | B2 | 11/2005 | Sugino et al. |
| 6,963,438 | B2 | 11/2005 | Busscher et al. |
| 6,968,273 | B2 | 11/2005 | Ockerse et al. |
| 6,972,888 | B2 | 12/2005 | Poll et al. |
| 6,974,236 | B2 | 12/2005 | Tenmyo |
| 6,975,215 | B2 | 12/2005 | Schofield et al. |
| 6,977,702 | B2 | 12/2005 | Wu |
| 6,980,092 | B2 | 12/2005 | Turnbull et al. |
| 6,985,291 | B2 | 1/2006 | Watson et al. |
| 6,992,718 | B1 | 1/2006 | Takahara |
| 7,001,058 | B2 | 2/2006 | Inditsky |
| 7,004,592 | B2 | 2/2006 | Varaprasad et al. |
| 7,004,593 | B2 | 2/2006 | Weller et al. |
| 7,006,173 | B1 | 2/2006 | Hiyama et al. |
| 7,009,751 | B2 | 3/2006 | Tonar et al. |
| 7,012,543 | B2 | 3/2006 | DeLine et al. |
| 7,029,156 | B2 | 4/2006 | Suehiro et al. |
| 7,041,965 | B2 | 5/2006 | Heslin et al. |
| 7,042,616 | B2 | 5/2006 | Tonar et al. |
| 7,046,418 | B2 | 5/2006 | Lin et al. |
| 7,046,448 | B2 | 5/2006 | Burgner |
| 7,057,681 | B2 | 6/2006 | Hinata et al. |
| 7,063,893 | B2 | 6/2006 | Hoffman |
| 7,064,882 | B2 | 6/2006 | Tonar et al. |
| 7,074,486 | B2 | 7/2006 | Boire et al. |
| 7,081,810 | B2 | 7/2006 | Henderson et al. |
| 7,092,052 | B2 | 8/2006 | Okamoto et al. |
| 7,106,213 | B2 | 9/2006 | White |
| 7,106,392 | B2 | 9/2006 | You |
| 7,108,409 | B2 | 9/2006 | DeLine et al. |
| 7,114,554 | B2 | 10/2006 | Bergman et al. |
| 7,121,028 | B2 | 10/2006 | Shoen et al. |
| 7,125,131 | B2 | 10/2006 | Olczak |
| 7,130,727 | B2 | 10/2006 | Liu et al. |
| 7,132,064 | B2 | 11/2006 | Li et al. |
| 7,136,091 | B2 | 11/2006 | Ichikawa et al. |
| 7,138,974 | B2 | 11/2006 | Hirakata et al. |
| 7,149,613 | B2 | 12/2006 | Stam et al. |
| 7,151,515 | B2 | 12/2006 | Kim et al. |
| 7,151,997 | B2 | 12/2006 | Uhlmann et al. |
| 7,153,588 | B2 | 12/2006 | McMan et al. |
| 7,154,657 | B2 | 12/2006 | Poll et al. |
| 7,158,881 | B2 | 1/2007 | McCarthy et al. |
| 7,160,017 | B2 | 1/2007 | Lee et al. |
| 7,161,567 | B2 | 1/2007 | Homma et al. |
| 7,167,796 | B2 | 1/2007 | Taylor et al. |
| 7,175,291 | B1 | 2/2007 | Li |
| 7,176,790 | B2 | 2/2007 | Yamazaki |
| 7,184,190 | B2 | 2/2007 | McCabe et al. |
| 7,185,995 | B2 | 3/2007 | Hatanaka et al. |
| 7,187,498 | B2 | 3/2007 | Bengoechea et al. |
| 7,188,963 | B2 | 3/2007 | Schofield et al. |
| 7,193,764 | B2 | 3/2007 | Lin et al. |
| 7,195,381 | B2 | 3/2007 | Lynam et al. |
| 7,199,767 | B2 | 4/2007 | Spero |
| 7,206,697 | B2 | 4/2007 | Olney et al. |
| 7,209,277 | B2 | 4/2007 | Tonar et al. |
| 7,215,238 | B2 | 5/2007 | Buck et al. |
| 7,215,473 | B2 | 5/2007 | Fleming |
| 7,221,363 | B2 | 5/2007 | Roberts et al. |
| 7,224,324 | B2 | 5/2007 | Quist et al. |
| 7,230,523 | B2 | 6/2007 | Harter, Jr. et al. |
| 7,232,231 | B2 | 6/2007 | Shih |
| 7,233,304 | B1 | 6/2007 | Aratani et al. |
| 7,235,918 | B2 | 6/2007 | McCullough et al. |
| 7,241,030 | B2 | 7/2007 | Mok et al. |
| 7,241,037 | B2 | 7/2007 | Mathieu et al. |
| 7,245,207 | B1 | 7/2007 | Dayan et al. |
| 7,245,336 | B2 | 7/2007 | Hiyama et al. |
| 7,248,305 | B2 | 7/2007 | Ootsuta et al. |
| 7,251,079 | B2 | 7/2007 | Capaldo et al. |
| 7,255,451 | B2 | 8/2007 | McCabe et al. |
| 7,255,465 | B2 | 8/2007 | DeLine et al. |
| 7,259,036 | B2 | 8/2007 | Borland et al. |
| 7,262,406 | B2 | 8/2007 | Heslin et al. |
| 7,262,916 | B2 | 8/2007 | Kao et al. |
| 7,265,342 | B2 | 9/2007 | Heslin et al. |
| 7,268,841 | B2 | 9/2007 | Kasajima et al. |
| 7,269,327 | B2 | 9/2007 | Tang |
| 7,269,328 | B2 | 9/2007 | Tang |
| 7,271,951 | B2 | 9/2007 | Weber et al. |
| 7,274,501 | B2 | 9/2007 | McCabe et al. |
| 7,281,491 | B2 | 10/2007 | Iwamaru |
| 7,286,280 | B2 | 10/2007 | Whitehead et al. |
| 7,287,868 | B2 | 10/2007 | Carter et al. |
| 7,289,037 | B2 | 10/2007 | Uken et al. |
| 7,290,919 | B2 | 11/2007 | Pan et al. |
| 7,292,208 | B1 | 11/2007 | Park et al. |
| 7,300,183 | B2 | 11/2007 | Kiyomoto et al. |
| 7,308,341 | B2 | 12/2007 | Schofield et al. |
| 7,310,177 | B2 | 12/2007 | McCabe et al. |
| 7,311,428 | B2 | 12/2007 | DeLine et al. |
| 7,316,485 | B2 | 1/2008 | Roose |
| 7,318,664 | B2 | 1/2008 | Hatanaka et al. |
| 7,323,819 | B2 | 1/2008 | Hong et al. |
| 7,324,172 | B2 | 1/2008 | Yamazaki et al. |
| 7,324,174 | B2 | 1/2008 | Hafuka et al. |
| 7,324,261 | B2 | 1/2008 | Tonar et al. |
| 7,327,225 | B2 | 2/2008 | Nicholas et al. |
| 7,327,226 | B2 | 2/2008 | Turnbull et al. |
| 7,327,855 | B1 | 2/2008 | Chen |
| 7,328,103 | B2 | 2/2008 | McCarthy et al. |
| 7,329,013 | B2 | 2/2008 | Blank et al. |
| 7,329,850 | B2 | 2/2008 | Drummond et al. |
| 7,338,177 | B2 | 3/2008 | Lynam |
| 7,344,284 | B2 | 3/2008 | Lynam et al. |
| 7,349,143 | B2 | 3/2008 | Tonar et al. |
| 7,362,505 | B2 | 4/2008 | Hikmet et al. |
| 7,370,983 | B2 | 5/2008 | DeWind et al. |
| 7,372,611 | B2 | 5/2008 | Tonar et al. |
| 7,375,895 | B2 | 5/2008 | Brynielsson |
| 7,379,224 | B2 | 5/2008 | Tonar et al. |
| 7,379,225 | B2 | 5/2008 | Tonar et al. |
| 7,379,243 | B2 | 5/2008 | Horsten et al. |
| 7,379,814 | B2 | 5/2008 | Ockerse et al. |
| 7,389,171 | B2 | 6/2008 | Rupp |
| 7,396,147 | B2 | 7/2008 | Munro |
| 7,411,732 | B2 | 8/2008 | Kao et al. |
| 7,412,328 | B2 | 8/2008 | Uhlmann et al. |
| 7,417,781 | B2 | 8/2008 | Tonar et al. |
| 7,420,159 | B2 | 9/2008 | Heslin et al. |
| 7,446,462 | B2 | 11/2008 | Lim et al. |
| 7,446,650 | B2 | 11/2008 | Schofield et al. |
| 7,446,924 | B2 | 11/2008 | Schofield et al. |
| 7,448,776 | B2 | 11/2008 | Tang |
| 7,452,090 | B2 | 11/2008 | Weller et al. |
| 7,453,057 | B2 | 11/2008 | Drummond et al. |
| 7,455,412 | B2 | 11/2008 | Rottcher |
| 7,460,007 | B2 | 12/2008 | Schofield et al. |
| 7,467,883 | B2 | 12/2008 | DeLine et al. |
| 7,468,651 | B2 | 12/2008 | DeLine et al. |
| 7,471,438 | B2 | 12/2008 | McCabe et al. |

| | | | |
|---|---|---|---|
| 7,474,963 B2 | 1/2009 | Taylor et al. | |
| 7,477,439 B2 | 1/2009 | Tonar et al. | |
| 7,480,149 B2 | 1/2009 | DeWard et al. | |
| 7,488,080 B2 | 2/2009 | Skiver et al. | |
| 7,489,374 B2 | 2/2009 | Utsumi et al. | |
| 7,490,007 B2 | 2/2009 | Taylor et al. | |
| 7,490,943 B2 | 2/2009 | Kikuchi et al. | |
| 7,490,944 B2 | 2/2009 | Blank et al. | |
| 7,494,231 B2 | 2/2009 | Varaprasad et al. | |
| 7,495,719 B2 | 2/2009 | Adachi et al. | |
| 7,496,439 B2 | 2/2009 | McCormick | |
| 7,502,156 B2 | 3/2009 | Tonar et al. | |
| 7,505,188 B2 | 3/2009 | Niiyama et al. | |
| 7,511,607 B2 | 3/2009 | Hubbard et al. | |
| 7,511,872 B2 | 3/2009 | Tonar et al. | |
| 7,525,715 B2 | 4/2009 | McCabe et al. | |
| 7,526,103 B2 | 4/2009 | Schofield et al. | |
| 7,533,998 B2 | 5/2009 | Schofield et al. | |
| 7,538,316 B2 | 5/2009 | Heslin et al. | |
| 7,540,620 B2 | 6/2009 | Weller et al. | |
| 7,541,570 B2 | 6/2009 | Drummond et al. | |
| 7,542,193 B2 | 6/2009 | McCabe et al. | |
| 7,543,947 B2 | 6/2009 | Varaprasad et al. | |
| 7,547,467 B2 | 6/2009 | Olson et al. | |
| 7,548,291 B2 | 6/2009 | Lee et al. | |
| 7,551,354 B2 | 6/2009 | Horsten et al. | |
| 7,561,181 B2 | 7/2009 | Schofield et al. | |
| 7,562,985 B2 | 7/2009 | Cortenraad et al. | |
| 7,567,291 B2 | 7/2009 | Bechtel et al. | |
| 7,570,413 B2 | 8/2009 | Tonar et al. | |
| 7,571,038 B2 | 8/2009 | Butler et al. | |
| 7,571,042 B2 | 8/2009 | Taylor et al. | |
| 7,572,490 B2 | 8/2009 | Park et al. | |
| 7,579,939 B2 | 8/2009 | Schofield et al. | |
| 7,579,940 B2 | 8/2009 | Schofield et al. | |
| 7,580,795 B2 | 8/2009 | McCarthy et al. | |
| 7,581,859 B2 | 9/2009 | Lynam | |
| 7,581,867 B2 | 9/2009 | Lee et al. | |
| 7,583,184 B2 | 9/2009 | Schofield et al. | |
| 7,586,566 B2 | 9/2009 | Nelson et al. | |
| 7,586,666 B2 | 9/2009 | McCabe et al. | |
| 7,589,893 B2 | 9/2009 | Rottcher | |
| 7,600,878 B2 | 10/2009 | Blank et al. | |
| 7,605,883 B2 | 10/2009 | Yamaki et al. | |
| 7,619,508 B2 | 11/2009 | Lynam et al. | |
| 7,623,202 B2 | 11/2009 | Araki et al. | |
| 7,626,749 B2 | 12/2009 | Baur et al. | |
| 7,633,567 B2 | 12/2009 | Yamada et al. | |
| 7,636,188 B2 | 12/2009 | Baur et al. | |
| 7,636,195 B2 | 12/2009 | Nieuwkerk et al. | |
| 7,636,930 B2 | 12/2009 | Chang | |
| 7,643,200 B2 | 1/2010 | Varaprasad et al. | |
| 7,643,927 B2 | 1/2010 | Hils | |
| 7,651,228 B2 | 1/2010 | Skiver et al. | |
| 7,658,521 B2 | 2/2010 | DeLine et al. | |
| 7,663,798 B2 | 2/2010 | Tonar et al. | |
| 7,667,579 B2 | 2/2010 | DeLine et al. | |
| 7,670,016 B2 | 3/2010 | Weller et al. | |
| 7,688,495 B2 | 3/2010 | Tonar et al. | |
| 7,695,174 B2 | 4/2010 | Takayanagi et al. | |
| 7,696,964 B2 | 4/2010 | Lankhorst et al. | |
| 7,706,046 B2 | 4/2010 | Bauer et al. | |
| 7,710,631 B2 | 5/2010 | McCabe et al. | |
| 7,711,479 B2 | 5/2010 | Taylor et al. | |
| 7,726,822 B2 | 6/2010 | Blank et al. | |
| 7,728,276 B2 | 6/2010 | Drummond et al. | |
| 7,728,721 B2 | 6/2010 | Schofield et al. | |
| 7,728,927 B2 | 6/2010 | Nieuwkerk et al. | |
| 7,734,392 B2 | 6/2010 | Schofield et al. | |
| 7,746,534 B2 | 6/2010 | Tonar et al. | |
| 7,787,077 B2 | 8/2010 | Kondoh et al. | |
| 7,791,694 B2 | 9/2010 | Molsen et al. | |
| 7,795,675 B2 | 9/2010 | Darwish et al. | |
| 7,830,583 B2 | 11/2010 | Neuman et al. | |
| 7,842,154 B2 | 11/2010 | Lynam | |
| 7,864,399 B2 | 1/2011 | McCabe et al. | |
| 8,004,741 B2 | 8/2011 | Tonar et al. | |
| 2001/0019356 A1 | 9/2001 | Takeda et al. | |
| 2001/0022616 A1 | 9/2001 | Rademacher et al. | |
| 2001/0026215 A1 | 10/2001 | Nakaho et al. | |
| 2001/0026316 A1 | 10/2001 | Senatore | |
| 2001/0030857 A1 | 10/2001 | Futhey et al. | |
| 2001/0035853 A1 | 11/2001 | Hoelen et al. | |
| 2001/0045981 A1 | 11/2001 | Gloger et al. | |
| 2002/0036828 A1 | 3/2002 | Wong | |
| 2002/0044065 A1 | 4/2002 | Quist et al. | |
| 2002/0049535 A1 | 4/2002 | Rigo et al. | |
| 2002/0085155 A1 | 7/2002 | Arikawa | |
| 2002/0092958 A1 | 7/2002 | Lusk | |
| 2002/0118321 A1 | 8/2002 | Ge | |
| 2002/0133144 A1 | 9/2002 | Chan et al. | |
| 2002/0149727 A1 | 10/2002 | Wang | |
| 2002/0154007 A1 | 10/2002 | Yang | |
| 2002/0196639 A1 | 12/2002 | Weidel | |
| 2003/0002165 A1 | 1/2003 | Mathias et al. | |
| 2003/0002179 A1 | 1/2003 | Roberts et al. | |
| 2003/0007261 A1 | 1/2003 | Hutzel et al. | |
| 2003/0016287 A1 | 1/2003 | Nakayama et al. | |
| 2003/0016542 A1 | 1/2003 | Pastrick et al. | |
| 2003/0025596 A1 | 2/2003 | Lang et al. | |
| 2003/0030546 A1 | 2/2003 | Tseng | |
| 2003/0030724 A1 | 2/2003 | Okamoto | |
| 2003/0035050 A1 | 2/2003 | Mizusawa et al. | |
| 2003/0043269 A1 | 3/2003 | Park | |
| 2003/0043589 A1 | 3/2003 | Blank | |
| 2003/0048639 A1 | 3/2003 | Boyd et al. | |
| 2003/0052969 A1 | 3/2003 | Satoh et al. | |
| 2003/0058338 A1 | 3/2003 | Kawauchi et al. | |
| 2003/0069690 A1 | 4/2003 | Correia et al. | |
| 2003/0080877 A1 | 5/2003 | Takagi et al. | |
| 2003/0088361 A1 | 5/2003 | Sekiguchi | |
| 2003/0090568 A1 | 5/2003 | Pico | |
| 2003/0090569 A1 | 5/2003 | Poechmueller | |
| 2003/0090570 A1 | 5/2003 | Takagi et al. | |
| 2003/0095331 A1 | 5/2003 | Bengoechea et al. | |
| 2003/0098908 A1 | 5/2003 | Misaiji et al. | |
| 2003/0101749 A1 | 6/2003 | Lingle et al. | |
| 2003/0103142 A1 | 6/2003 | Hitomi et al. | |
| 2003/0117522 A1 | 6/2003 | Okada | |
| 2003/0122929 A1 | 7/2003 | Minaudo et al. | |
| 2003/0133014 A1 | 7/2003 | Mendoza | |
| 2003/0137586 A1 | 7/2003 | Lewellen | |
| 2003/0141965 A1 | 7/2003 | Gunderson et al. | |
| 2003/0146831 A1 | 8/2003 | Berberich et al. | |
| 2003/0156193 A1 | 8/2003 | Nakamura | |
| 2003/0169158 A1 | 9/2003 | Paul, Jr. | |
| 2003/0179293 A1 | 9/2003 | Oizumi | |
| 2003/0189754 A1 | 10/2003 | Sugino et al. | |
| 2003/0202096 A1 | 10/2003 | Kim | |
| 2003/0206256 A1 | 11/2003 | Drain et al. | |
| 2003/0214576 A1 | 11/2003 | Koga | |
| 2003/0214584 A1 | 11/2003 | Ross, Jr. | |
| 2003/0214733 A1 | 11/2003 | Fujikawa et al. | |
| 2003/0222793 A1 | 12/2003 | Tanaka et al. | |
| 2003/0222983 A1 | 12/2003 | Nobori et al. | |
| 2003/0227546 A1 | 12/2003 | Hilborn et al. | |
| 2004/0004541 A1 | 1/2004 | Hong | |
| 2004/0027695 A1 | 2/2004 | Lin | |
| 2004/0032321 A1 | 2/2004 | McMahon et al. | |
| 2004/0032676 A1 | 2/2004 | Drummond et al. | |
| 2004/0036768 A1 | 2/2004 | Green | |
| 2004/0046870 A1 | 3/2004 | Leigh Travis | |
| 2004/0051634 A1 | 3/2004 | Schofield et al. | |
| 2004/0056955 A1 | 3/2004 | Berberich et al. | |
| 2004/0057131 A1 | 3/2004 | Hutzel et al. | |
| 2004/0064241 A1 | 4/2004 | Sekiguchi | |
| 2004/0066285 A1 | 4/2004 | Sekiguchi | |
| 2004/0075603 A1 | 4/2004 | Kodama | |
| 2004/0077359 A1 | 4/2004 | Bernas et al. | |
| 2004/0080404 A1 | 4/2004 | White | |
| 2004/0085196 A1 | 5/2004 | Miller et al. | |
| 2004/0085499 A1 | 5/2004 | Baek | |
| 2004/0090314 A1 | 5/2004 | Iwamoto | |
| 2004/0090317 A1 | 5/2004 | Rothkop | |
| 2004/0096082 A1 | 5/2004 | Nakai et al. | |
| 2004/0098196 A1 | 5/2004 | Sekiguchi | |
| 2004/0105614 A1 | 6/2004 | Kobayashi et al. | |
| 2004/0107030 A1 | 6/2004 | Nishira et al. | |

| | | | | | | |
|---|---|---|---|---|---|---|
| 2004/0109060 A1 | 6/2004 | Ishii | | 2009/0262192 A1 | 10/2009 | Schofield et al. |
| 2004/0114039 A1 | 6/2004 | Ishikura | | 2009/0262422 A1 | 10/2009 | Cross et al. |
| 2004/0170008 A1 | 9/2004 | Tenmyo | | 2009/0290369 A1 | 11/2009 | Schofield et al. |
| 2004/0202001 A1 | 10/2004 | Roberts et al. | | 2009/0296190 A1 | 12/2009 | Anderson et al. |
| 2004/0239243 A1 | 12/2004 | Roberts et al. | | 2010/0033797 A1 | 2/2010 | Schofield et al. |
| 2004/0239849 A1 | 12/2004 | Wang | | 2010/0045790 A1 | 2/2010 | Lynam et al. |
| 2004/0243303 A1 | 12/2004 | Padmanabhan | | 2010/0045899 A1 | 2/2010 | Ockerse |
| 2004/0251804 A1 | 12/2004 | McCullough et al. | | 2010/0046059 A1 | 2/2010 | McCabe et al. |
| 2004/0264011 A1 | 12/2004 | Lynam | | 2010/0053723 A1 | 3/2010 | Varaprasad et al. |
| 2005/0018738 A1 | 1/2005 | Duan et al. | | 2010/0085645 A1 | 4/2010 | Skiver et al. |
| 2005/0024591 A1 | 2/2005 | Lian et al. | | 2010/0091509 A1 | 4/2010 | DeLine et al. |
| 2005/0024729 A1 | 2/2005 | Ockerse et al. | | 2010/0110523 A1 | 5/2010 | Varaprasad et al. |
| 2005/0078389 A1 | 4/2005 | Kulas et al. | | 2010/0110553 A1 | 5/2010 | Anderson et al. |
| 2005/0079326 A1 | 4/2005 | Varaprasad et al. | | 2010/0117815 A1 | 5/2010 | Deline et al. |
| 2005/0099559 A1 | 5/2005 | Lee et al. | | 2010/0126030 A1 | 5/2010 | Weller et al. |
| 2005/0099693 A1 | 5/2005 | Schofield et al. | | 2010/0165437 A1 | 7/2010 | Tonar et al. |
| 2005/0111070 A1 | 5/2005 | Lin et al. | | 2010/0172008 A1 | 7/2010 | McCabe et al. |
| 2005/0117095 A1 | 6/2005 | Ma | | 2010/0174485 A1 | 7/2010 | Taylor et al. |
| 2005/0134983 A1 | 6/2005 | Lynam | | 2010/0194890 A1 | 8/2010 | Weller et al. |
| 2005/0140855 A1 | 6/2005 | Utsumi et al. | | 2010/0195226 A1 | 8/2010 | Heslin et al. |
| 2005/0168995 A1 | 8/2005 | Kittelmann et al. | | 2010/0201896 A1 | 8/2010 | Ostreko et al. |
| 2005/0169003 A1 | 8/2005 | Lindahl et al. | | 2010/0202075 A1 | 8/2010 | Blank et al. |
| 2005/0172504 A1 | 8/2005 | Ohm et al. | | 2010/0207013 A1 | 8/2010 | Drummond et al. |
| 2005/0237440 A1 | 10/2005 | Sugimura et al. | | 2010/0214662 A1 | 8/2010 | Takayanagi et al. |
| 2005/0259326 A1 | 11/2005 | Weber et al. | | 2010/0219985 A1 | 9/2010 | Schofield et al. |
| 2005/0270766 A1 | 12/2005 | Kung et al. | | 2010/0222963 A1 | 9/2010 | Schofield et al. |
| 2006/0001641 A1 | 1/2006 | Degwekar et al. | | 2010/0245701 A1 | 9/2010 | Sato et al. |
| 2006/0050018 A1 | 3/2006 | Hutzel et al. | | 2010/0277786 A1 | 11/2010 | Anderson et al. |
| 2006/0061008 A1 | 3/2006 | Karner et al. | | 2010/0289995 A1 | 11/2010 | Hwang et al. |
| 2006/0076860 A1 | 4/2006 | Hoss | | 2010/0321758 A1 | 12/2010 | Bugno et al. |
| 2006/0139953 A1 | 6/2006 | Chou et al. | | 2011/0109746 A1 | 5/2011 | Schofield et al. |
| 2006/0164230 A1 | 7/2006 | DeWind et al. | | 2011/0141543 A1 | 6/2011 | Uken et al. |
| 2006/0171704 A1 | 8/2006 | Bingle et al. | | 2012/0038964 A1 | 2/2012 | De Wind et al. |
| 2006/0187378 A1 | 8/2006 | Bong et al. | | 2012/0078469 A1* | 3/2012 | Karner et al. .......... 701/36 |
| 2006/0274218 A1 | 12/2006 | Xue | | | | |
| 2006/0279522 A1 | 12/2006 | Kurihara | | FOREIGN PATENT DOCUMENTS | | |
| 2007/0041096 A1 | 2/2007 | Nieuwkerk et al. | | CN | 1189224 | 7/1998 |
| 2007/0058257 A1 | 3/2007 | Lynam | | DE | 941408 | 4/1956 |
| 2007/0064108 A1 | 3/2007 | Haler | | DE | 944531 | 7/1956 |
| 2007/0080585 A1 | 4/2007 | Lyu | | DE | 3248511 A1 | 7/1984 |
| 2007/0118287 A1 | 5/2007 | Taylor et al. | | DE | 3301945 | 7/1984 |
| 2007/0183037 A1 | 8/2007 | De Boer et al. | | DE | 3614882 | 11/1987 |
| 2007/0183066 A1 | 8/2007 | Varaprasad et al. | | DE | 3720848 | 1/1989 |
| 2007/0184284 A1 | 8/2007 | Varaprasad et al. | | DE | 9306989.8 U1 | 7/1993 |
| 2007/0201122 A1 | 8/2007 | Dozeman et al. | | DE | 4329983 | 8/1995 |
| 2007/0262732 A1 | 11/2007 | Shen | | DE | 4444443 A1 | 6/1996 |
| 2008/0002106 A1 | 1/2008 | Van De Witte et al. | | DE | 29703084 U1 | 6/1997 |
| 2008/0030311 A1 | 2/2008 | Dayan et al. | | DE | 29805142 U1 | 5/1998 |
| 2008/0068520 A1 | 3/2008 | Minikey, Jr. et al. | | DE | 19741896 | 4/1999 |
| 2008/0077882 A1 | 3/2008 | Kramer et al. | | DE | 19755008 | 7/1999 |
| 2008/0094685 A1 | 4/2008 | Varaprasad et al. | | DE | 29902344 U1 | 7/1999 |
| 2008/0180529 A1 | 7/2008 | Taylor et al. | | DE | 19934999 | 2/2001 |
| 2008/0180781 A1 | 7/2008 | Varaprasad et al. | | DE | 19943355 | 3/2001 |
| 2008/0212189 A1 | 9/2008 | Baur et al. | | DE | 20118868 | 3/2002 |
| 2008/0225538 A1 | 9/2008 | Lynam et al. | | DE | 10131459 | 1/2003 |
| 2008/0231704 A1 | 9/2008 | Schofield et al. | | EP | 0299509 A2 | 1/1989 |
| 2008/0266389 A1 | 10/2008 | DeWind et al. | | EP | 0513476 A1 | 11/1992 |
| 2008/0291522 A1 | 11/2008 | Varaprasad et al. | | EP | 0524766 | 1/1993 |
| 2008/0308219 A1 | 12/2008 | Lynam | | EP | 0729864 A1 | 12/1995 |
| 2009/0002491 A1 | 1/2009 | Haler | | EP | 0728618 A2 | 8/1996 |
| 2009/0015736 A1 | 1/2009 | Weller et al. | | EP | 0825477 | 2/1998 |
| 2009/0033837 A1 | 2/2009 | Molsen et al. | | EP | 0830985 | 3/1998 |
| 2009/0040465 A1 | 2/2009 | Conner et al. | | EP | 937601 A2 | 8/1999 |
| 2009/0040588 A1 | 2/2009 | Tonar et al. | | EP | 1075986 | 2/2001 |
| 2009/0040778 A1 | 2/2009 | Takayanagi et al. | | EP | 1097848 A | 5/2001 |
| 2009/0052003 A1 | 2/2009 | Schofield et al. | | EP | 1152285 A2 | 11/2001 |
| 2009/0067032 A1 | 3/2009 | Varaprasad et al. | | EP | 1193773 | 3/2002 |
| 2009/0080055 A1 | 3/2009 | Baur et al. | | EP | 1256833 | 11/2002 |
| 2009/0085729 A1 | 4/2009 | Nakamura et al. | | EP | 0899157 | 10/2004 |
| 2009/0096937 A1 | 4/2009 | Bauer et al. | | EP | 1315639 | 2/2006 |
| 2009/0141331 A1 | 6/2009 | Skiver et al. | | FR | 1021987 A | 2/1953 |
| 2009/0174776 A1 | 7/2009 | Taylor et al. | | FR | 1461419 | 12/1966 |
| 2009/0184904 A1 | 7/2009 | S. et al. | | FR | 2585991 | 2/1987 |
| 2009/0201137 A1 | 8/2009 | Weller et al. | | FR | 2672857 A1 | 8/1992 |
| 2009/0219394 A1 | 9/2009 | Heslin et al. | | FR | 2673499 A1 | 9/1992 |
| 2009/0231741 A1 | 9/2009 | Weller et al. | | FR | 2759045 | 8/1998 |
| 2009/0237820 A1 | 9/2009 | McCabe et al. | | GB | 810010 | 3/1959 |
| 2009/0243824 A1 | 10/2009 | Hook et al. | | GB | 934037 | 8/1963 |
| 2009/0244740 A1 | 10/2009 | Takayanagi et al. | | GB | 1008411 | 10/1965 |

| | | |
|---|---|---|
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2292857 | 3/1996 |
| GB | 2297632 | 8/1996 |
| GB | 2351055 A | 12/2000 |
| GB | 2362494 | 11/2001 |
| JP | 52-146988 | 11/1977 |
| JP | 55-039843 | 3/1980 |
| JP | 57-30639 | 2/1982 |
| JP | 57-208530 | 12/1982 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61127186 | 6/1986 |
| JP | 61-260217 | 11/1986 |
| JP | 62-043543 | 2/1987 |
| JP | 62-122487 | 6/1987 |
| JP | 62131232 | 6/1987 |
| JP | 63-02753 | 1/1988 |
| JP | 63085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01130578 | 5/1989 |
| JP | 03-28947 | 3/1991 |
| JP | 03-052097 | 3/1991 |
| JP | 30-061192 | 3/1991 |
| JP | 328947 | 3/1991 |
| JP | 03-110855 | 5/1991 |
| JP | 03198026 | 8/1991 |
| JP | 03-243914 | 10/1991 |
| JP | 04-114587 | 4/1992 |
| JP | 04-245886 | 9/1992 |
| JP | 05080716 | 4/1993 |
| JP | 05183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06318734 | 11/1994 |
| JP | 07146467 | 6/1995 |
| JP | 07-175035 | 7/1995 |
| JP | 07191311 | 7/1995 |
| JP | 07-266928 | 10/1995 |
| JP | 07-277072 | 10/1995 |
| JP | 07-281185 | 10/1995 |
| JP | 07267002 | 10/1995 |
| JP | 07281150 | 10/1995 |
| JP | 08-008083 | 1/1996 |
| JP | 08-083581 | 3/1996 |
| JP | 08-216789 | 8/1996 |
| JP | 08227769 | 9/1996 |
| JP | 09033886 | 2/1997 |
| JP | 09-260074 | 3/1997 |
| JP | 05-077657 | 7/1997 |
| JP | 09-220976 | 8/1997 |
| JP | 09230827 | 9/1997 |
| JP | 09-266078 | 10/1997 |
| JP | 09-288262 | 11/1997 |
| JP | 10-076880 | 3/1998 |
| JP | 10-199480 | 7/1998 |
| JP | 10190960 | 7/1998 |
| JP | 10-206643 | 8/1998 |
| JP | 10221692 | 8/1998 |
| JP | 10239659 | 9/1998 |
| JP | 10276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| JP | 2008083657 | 4/2008 |
| KR | 20060038856 | 5/2006 |
| KR | 100663930 | 1/2007 |
| WO | WO 82/02448 | 7/1982 |
| WO | 8606179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO03078941 | 9/2003 |
| WO | WO 2011/044312 | 4/2011 |
| WO | WO 2012/006422 | 1/2012 |
| WO | WO 2012/051500 | 4/2012 |

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, article, 4 pages Prentice-Hall, Englewood Cliffs, New Jersey, believed to be published more than one year prior to the filing date of the present application.

G. Wang, D. Renshaw, P.B. Denyer and M. Lu, CMOS Video Cameras, article, 1991, 4 pages, University of Edinburgh, UK.

* cited by examiner

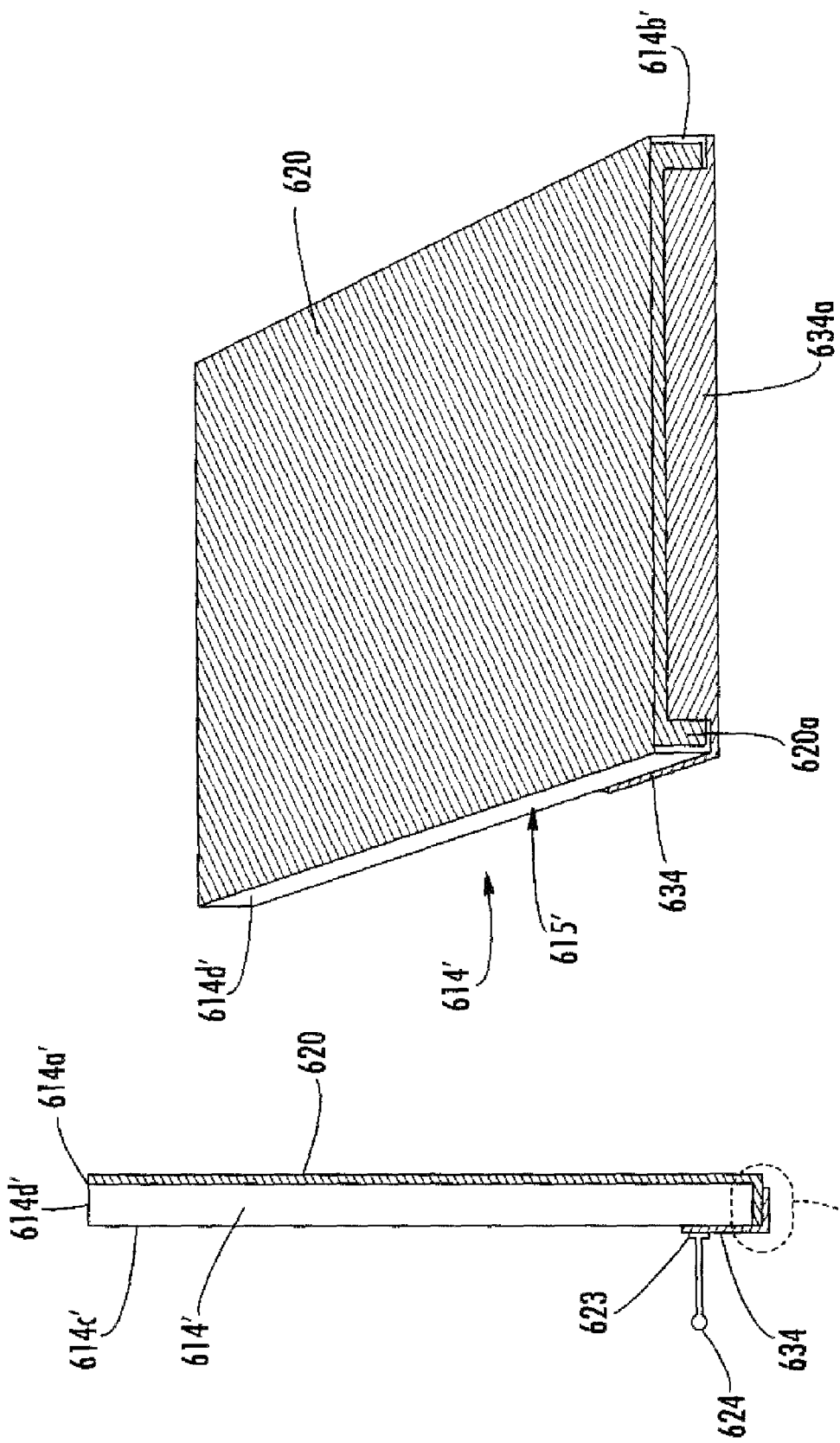

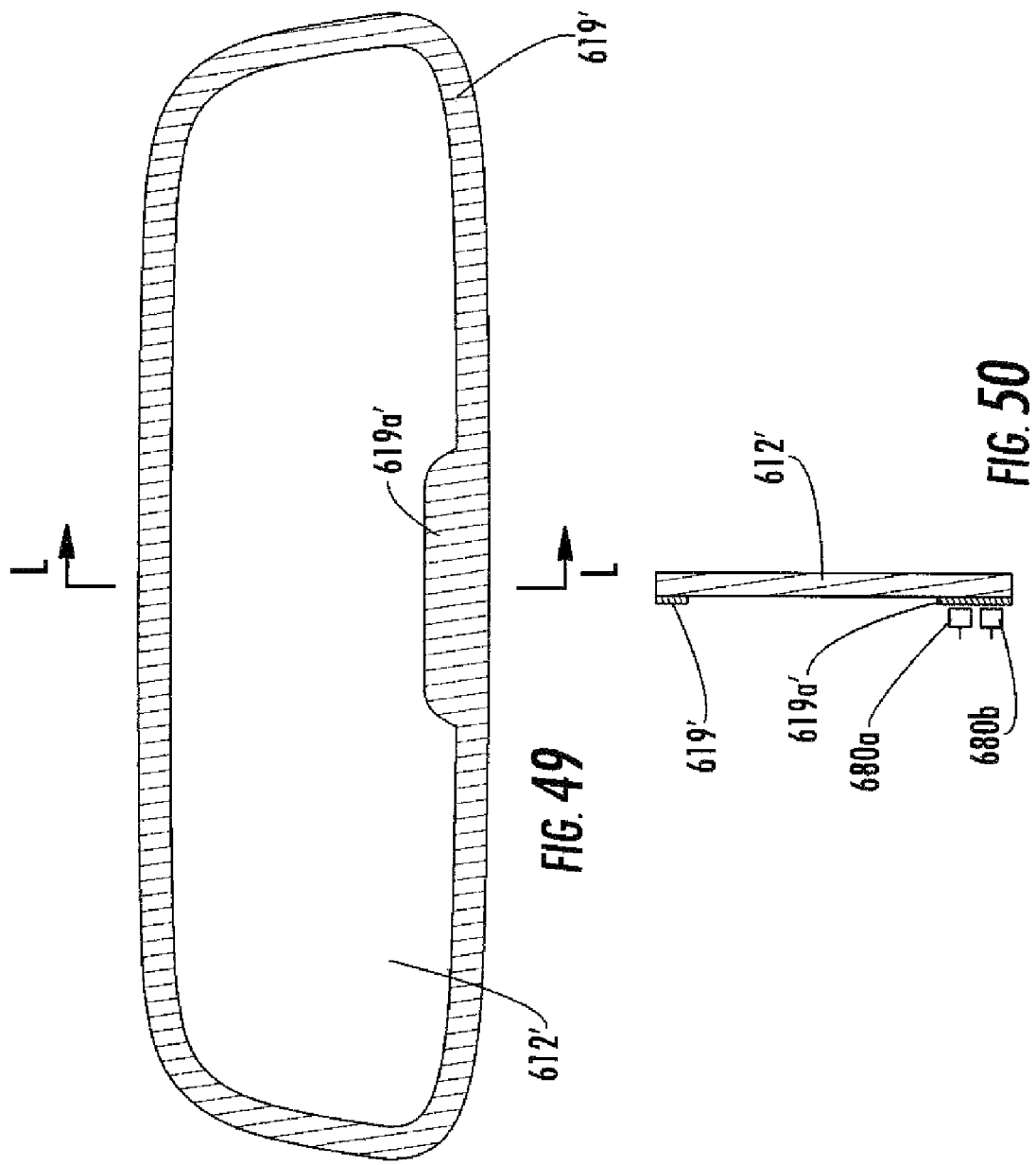

VEHICULAR ELECTROCHROMIC INTERIOR REARVIEW MIRROR ASSEMBLY

CROSS REFERENCE TO RELATED APPLICATIONS

The present application is a continuation of U.S. patent application Ser. No. 12/476,309, filed Jun. 2, 2009, now U.S. Pat. No. 7,826,123, which is a continuation of U.S. patent application Ser. No. 12/124,365, filed May 21, 2008, now U.S. Pat. No. 7,542,193, which is a division of U.S. patent application Ser. No. 11/837,865, filed Aug. 13, 2007, now U.S. Pat. No. 7,391,563, which is a continuation of U.S. patent application Ser. No. 11/021,065, filed Dec. 23, 2004, now U.S. Pat. No. 7,255,451, which claims benefit of U.S. provisional applications, Ser. No. 60/531,838, filed Dec. 23, 2003; Ser. No. 60/553,842, filed Mar. 17, 2004; Ser. No. 60/563,342, filed Apr. 19, 2004; and Ser. No. 60/629,926, filed Nov. 22, 2004; and U.S. patent application Ser. No. 11/021,065 is a continuation-in-part of PCT Application No. PCT/US03/35381, filed Nov. 5, 2003, and published May 21, 2004 as International Publication Number WO 2004/042457, which claims benefit of U.S. provisional applications, Ser. No. 60/490,111, filed Jul. 25, 2003; and Ser. No. 60/423,903, filed Nov. 5, 2002; and U.S. patent application Ser. No. 11/021,065 is a continuation-in-part of PCT Application No. PCT/US03/297776, filed Sep. 19, 2003, and published Apr. 1, 2004 as International Publication Number WO 2004/026633, which claims benefit of U.S. provisional applications, Ser. No. 60/412,275, filed Sep. 20, 2002; Ser. No. 60/424,116, filed Nov. 5, 2002; and Ser. No. 60/489,816, filed Jul. 24, 2003, which are all hereby incorporated herein by reference in their entireties.

FIELD OF THE INVENTION

The present invention relates generally to reflective element assemblies for rearview mirrors of vehicles and, more particularly, to electro-optic or electrochromic reflective element assemblies and a method for manufacturing electro-optic or electrochromic reflective element assemblies.

BACKGROUND OF THE INVENTION

Automotive electrochromic mirror reflective element cell assemblies typically include a front substrate and a rear substrate and an electrochromic medium sandwiched therebetween and contained within an interpane cavity. The substrates are shaped as desired by the automobile manufacturer for a particular mirror design or application. For example, an interior rearview mirror reflective element may have substrates that are generally oval or trapezoidal in shape and are formed to be approximately 20-26 cm long and 5-8 cm tall or wide. Exterior mirror reflective element assemblies are shaped differently and may have sharper radii at the corners and may be flat or convex or aspheric, depending on the particular application. The size of the substrates for the exterior reflective element assemblies may vary from about 7 cm by 7 cm to about 10 cm by 18 cm or larger.

During manufacture and assembly of the reflective cell element assembly, the respective front and rear substrates are often cut or broken out as cut shapes from larger flat or curved lites, typically glass sheets or lites. The individual front and rear cut shapes or substrates are cleaned and then coated with a conductive or semiconductive coating or coatings that are reflective or transparent. After they are coated, an uncured adhesive material, typically an uncured epoxy material (often containing spacer beads, such as glass beads or the like), is applied around the perimeter of one of the cut shapes or substrates, and the other cut shape or substrate is superimposed thereupon and spaced apart from the first cut shape by the applied perimeter material. The uncured adhesive material is then cured, such as by heating, to adhere the shapes or substrates together and to space the substrates apart a desired amount to define an appropriate interpane cavity spacing. The substrates, so adhered together and interspaced apart, form an empty cell with an interpane cavity between the substrates and bounded by the perimeter seal. Next, an electrolyte or monomer composition is filled into the cavity via an aperture (commonly known as a fill port or plug hole) provided in the perimeter material or seal, such as via a vacuum fill process. However, until such time as the interpane cavity is formed by the juxtapositioning and superimposing of the respective front and rear shapes or substrates of the electrochromic cell, dirt or glass chips or dust or skin flakes or other debris or contaminants or the like may fall onto or contact the pristine surface of any one of the substrates (the pristine surfaces are the opposing surfaces of the front and rear substrates that oppose one another when the substrates are held together and that are contacted by the electrolyte or monomer composition or electrochromic medium in the interpane cavity). Such contaminants (whether contacting the surfaces before or after coating) may interfere with the coloration/bleach mechanism and/or the coating durability/adhesion (such that voids may exist in the coating due to glass chips or the like), as well as affect the perimeter seal adhesion, and thus often result in a flawed cell exhibiting cosmetic defects that is often discarded or scrapped.

In order for the completed mirror reflective element assembly or cell to avoid such flaws, the pristine surfaces (that will oppose one another when the substrates are adhered together and that have the semiconductive or conductive layers applied thereto) of the substrates preferably must be kept clean and untouched throughout the coating, conveying, adhering and assembly processes. Difficulties in keeping the surfaces pristine are often encountered because the individual cut shape substrates are often handled and conveyed as they are moved from one process or station to the next. Often, the individual cut shape substrates are cleaned, such as via an ultrasonic cleaner or scrubber to remove any such debris or the like. However, the individual cut shape substrates may be conveyed along a conveyor and held down via rollers during the scrubbing process, where the rollers often encroach and so touch the pristine surface of the substrate that will be the inner surface of the cavity. If any marks or debris are left by the rollers, they may be visible in the finished product and may result in the cell being scrapped.

It is also known to provide display windows in the reflective coating or layer of a reflective element assembly, such that a display device or illumination source may be viewable through the display window. Typically, for fourth surface reflective element assemblies (where the metallic reflective coating or layer is applied to the fourth or rear surface of the reflective element assembly), such display windows may be formed in the reflective coating of the substrate via laser ablating or etching or sand blasting the reflective coating from the window area of the fourth surface (i.e., the rear surface of the rear substrate) after the reflective mirror coating (typically a silver mirror reflector layer overcoated with a copper layer and protected by a paint overcoat) is applied over substantially the entire fourth surface. The reflective coating is removed from the desired window area such that the glass or substrate surface is exposed on the fourth surface in the window area.

However, such an approach does not readily apply to forming windows through the metallic reflective coating of third surface reflective element assemblies (i.e., a reflective element assembly that has the metallic reflective coating on the third surface (the front surface of the rear substrate) of the reflective element assembly). In order to properly darken or color the electrochromic medium disposed between the substrates, the opposed surfaces of the substrates (the front surface of the rear substrate and the rear surface of the front substrate) are coated substantially over their entire surfaces with a conductive coating. Typically, the second surface (the rear surface of the front substrate) is coated with a transparent electrically conductive coating, such as an indium tin oxide (ITO), while the third surface (the front surface of the rear substrate) is coated with a transparent electrically conductive coating, and is further coated with a metallic reflective conductive coating over the transparent coating. When it is desired to form a window in the metallic reflective conductive coating on the third surface, it is desirable that the window on the third surface still have the transparent electrically conductive coating over its surface area, in order to provide for appropriate darkening or coloring of the electrochromic medium at the window area. If the transparent electrically conductive coating is also removed from the third surface in the window area, the electrochromic medium may not darken or color uniformly across the reflective element assembly, particularly in the window area versus the rest of the reflective element assembly. However, it may be difficult to laser ablate or etch only the metallic reflective coating from the third surface while leaving the transparent electrically conductive coating intact on the surface of the substrate at the window area. Such precise control of the depth of the ablation or etching may be difficult to achieve.

Therefore, there is a need in the art for an improved process for manufacturing electro-optic mirror reflective element assemblies, such as electrochromic mirror reflective element assemblies, that overcomes the shortcomings of the prior art.

SUMMARY OF THE INVENTION

The present invention provides a method of making automotive electrochromic reflective cell element assemblies for automotive rearview mirror assemblies by first forming multiple interpane cavities on one or two sheets of glass and, thereafter, after the multiple electrochromic cell cavities have been formed, cutting out individual electrochromic mirror cells that are shaped appropriate for utilization in a complete automotive electrochromic rearview mirror assembly, such as the types described in U.S. Pat. Nos. 6,595,649; 6,648,477; 6,154,306; 5,610,756; 5,406,414; and/or 5,253,109, which are hereby incorporated herein by reference. Typically, the material for the substrates is glass, such as soda-lime glass or the like, but other materials, such as polycarbonate or other polymeric materials may be utilized without affecting the scope of the present invention. The completed mirror cells or reflective element assemblies include a front substrate and a rear substrate. The rear substrate may have a reflective coating on its front surface (toward the front substrate when the substrates are sandwiched together, and typically referred to as the third surface of the mirror reflective element assembly), while the front substrate may have a transparent semiconductive coating, such as a coating of indium tin oxide (ITO) or doped indium tin oxide or the like, on its rear surface (toward the rear substrate when the substrates are sandwiched together, and typically referred to as the second surface of the mirror reflective element assembly).

The method of making or forming the reflective element assemblies includes providing a sheet of clear glass (sized to be greater than at least two intended mirror shapes) that will form the rear or second substrate of the mirror element cell (the rear substrate has the reflective conductive coating on its front surface, which will be the third surface of the reflective element assembly when it is assembled), and cleaning and coating (with a metallic electrically conductive layer or layers, such as silver, silver alloy, aluminum, aluminum alloy, or the like, such as described below) the surface of the sheet. The coating may be selectively removed from the surface of the sheet in the outline shapes of at least two desired mirror substrates, and more preferably multiple, such as four or six or more, substrates. Uncured adhesive material, such as an uncured epoxy material may be applied to the surface of the sheet along the removed outlines to form the desired mirror shapes. The front cut shape or substrate or sheet is superimposed upon the rear sheet and spaced therefrom by the applied uncured material. The uncured adhesive material is then cured, such as by heating, to adhere the shapes or substrates together and to space the glass sheets apart a desired amount to define multiple appropriate interpane cavities or spacings. The sheets, so adhered together and interspaced apart, form multiple empty cells with interpane cavities between the rear sheet and the front sheet or substrates and bounded by the perimeter seal. An electrolyte or monomer composition is then filled into the cavities via a respective aperture provided in the perimeter material or seal, such as via a vacuum fill process. The sheets may then be scribed and cut or broken to separate the individual shapes or cells from the sheets. Alternately, and optionally, the sheets may be scribed and cut or broken to form multiple empty cells prior to the filling process, whereby each individual shape or cell is filled after it is cut or separated from the sheets.

Optionally, a single front sheet (that may eventually form at least two front substrates, and more preferably multiple, such as four or six or more, substrates) may be adhered to the rear sheet. The front sheet may be coated on its opposing surface (the surface that opposes the rear sheet when the sheets are sandwiched together) with a transparent electrically conductive or semiconductive layer or coating, such as an indium tin oxide (ITO) or the like. The front mirror shapes or substrates may be scribed and broken and/or cut from the front sheet to form the cells after the sheets have been adhered together as described above. Optionally, the front substrates (with the transparent semi-conductive layer or coating applied to the surface thereof) may be pre-cut or formed and the individual coated mirror shapes or substrates may be applied to the appropriate locations at the epoxy seals on the rear sheet. The rear sheet may then be scribed and broken and/or cut to form the mirror cells.

The sheet or sheets thus may form at least two reflective element assemblies or cells. Because the sheet is large enough to have two or more mirror shapes defined thereon, the sheet may be handled along its edges by the conveyor and/or operators and, thus, may be handled in an area that is outside of the pristine cell surfaces within the epoxy seals/mirror shapes. The handling or conveying of the sheet thus does not encroach the pristine surfaces and thus does not damage or harm the pristine surfaces during the manufacturing and assembling of the cells. The method of the present invention thus provides an enhanced manufacturing process that limits or substantially precludes touching or harming of the pristine surfaces of the mirror shapes during the cleaning, coating, conveying and adhering processes. Also, because the sheets are larger than the individual substrates, economies in the coating process may be realized, since multiple mirror shapes may be coated during one coating process and without individual fixturing of the mirror shapes.

The present invention also provides a means for masking a substrate during the coating process to provide a window in the metallic reflective coating on a third surface of a reflective element assembly. The mask may be retained in the appropriate position via magnetic attraction to a magnetic element on a substrate holding fixture, or may be held by a bridge or arm attached to and extending from the substrate holding fixture. Optionally, the mask fixture may comprise a bridge that is attached at opposite ends to the substrate holding fixture to provide a robust, substantially stable mask holding device. Optionally, the mask may be biased, such as by a resilient member or spring, to affirmatively engage the surface of the glass substrate that is positioned at the mask, such that the mask is urged into engagement with the surface of the substrate to provide a generally flush engagement of the mask to the substrate at the desired location, and thus to avoid accumulation of any deposited coating at the region of the substrate mask. The mask thus may be retained in the desired location when the substrates are placed in a holding fixture and then placed in a deposition chamber, such as a vacuum deposition chamber, such as for a sputter deposition process or the like, to have the coating applied to or deposited on the surface of the substrate.

The present invention also provides reflective element assembly having a front substrate and a rear substrate and an electro-optic medium disposed therebetween. The front substrate has first and second surfaces, with a transparent electrically conductive coating on its second surface (that opposes the electro-optic medium), while the rear substrate has third and fourth surfaces, with a metallic electrically conductive coating on its third surface (that opposes the electro-optic medium). The third surface electrically conductive coating wraps around or overcoats at least a portion of a perimeter edge of the rear substrate so as to establish electrical continuity between the electrically conductive coating on the third surface and the electrically conductive coating on the perimeter edge portion. A fourth surface electrically conductive coating may be established on the fourth surface of the rear substrate and may wrap around or overcoat the portion of the perimeter edge of the rear substrate so as to establish electrical continuity between the electrical conductive coating on the fourth surface and the perimeter edge portion. The portions of the third and fourth surface electrically conductive coatings that wraparound or overcoat the perimeter edge portion may coincide or overlap one another (such as at an overlap region) to establish electrical continuity between the fourth surface and the third surface electrically conductive coatings. Thus, an electrical connection may be made at the fourth surface of the reflective element assembly to power or energize the third surface electrically conductive coating at the third surface of the reflective element. Such a configuration provides a convenient and robust attachment pad or area for electrical connection (as compared to attachment to the perimeter edge portion, which is thin, such as about 1.6 mm or less and does not provide a lot of space for electrical connection thereto), so that a convenient and secure connection may be made to the secure conductive pad or area (disposed at the fourth surface of the reflective element assembly), such as via a solder attachment and/or a mechanical attachment or the like.

The present invention may also provide an insulating layer or element at the second surface transparent electrically conductive coating at the second surface of the front substrate to electrically insulate or isolate the second surface electrically conductive coating from the wraparound portion and/or overlap electrically conductive coatings at the perimeter edge of the rear substrate. Preferably, the rear substrate has a smaller dimension than the front substrate so that the edge portion of the rear substrate is recessed from a corresponding edge portion of the perimeter edge of the front substrate and so as to define an overhang region along the edge portion of the reflective element assembly, such as where the wraparound or overlap coatings are disposed. Optionally, the second surface of the front substrate may include a perimeter band around its perimeter border. The perimeter band may comprise a metallic reflective band or a non-reflective band, and may be disposed over or under the transparent electrically conductive coating at the second surface of the front substrate.

These and other objects, advantages, purposes and features of the present invention will become apparent upon review of the following specification in conjunction with the drawings.

BRIEF DESCRIPTION OF THE DRAWINGS

FIG. 39 is a sectional view of another reflective element assembly in accordance with the present invention;

FIG. 40 is a sectional view of the reflective element assembly of FIG. 39, with an overcoating on the edges and rear surface of the rear substrate;

FIG. 49 is a front elevation of a reflective element substrate of the present invention;

FIG. 50 is a sectional view of the substrate taken along the line L-L in FIG. 49;

DESCRIPTION OF THE PREFERRED EMBODIMENTS

Figure 1:
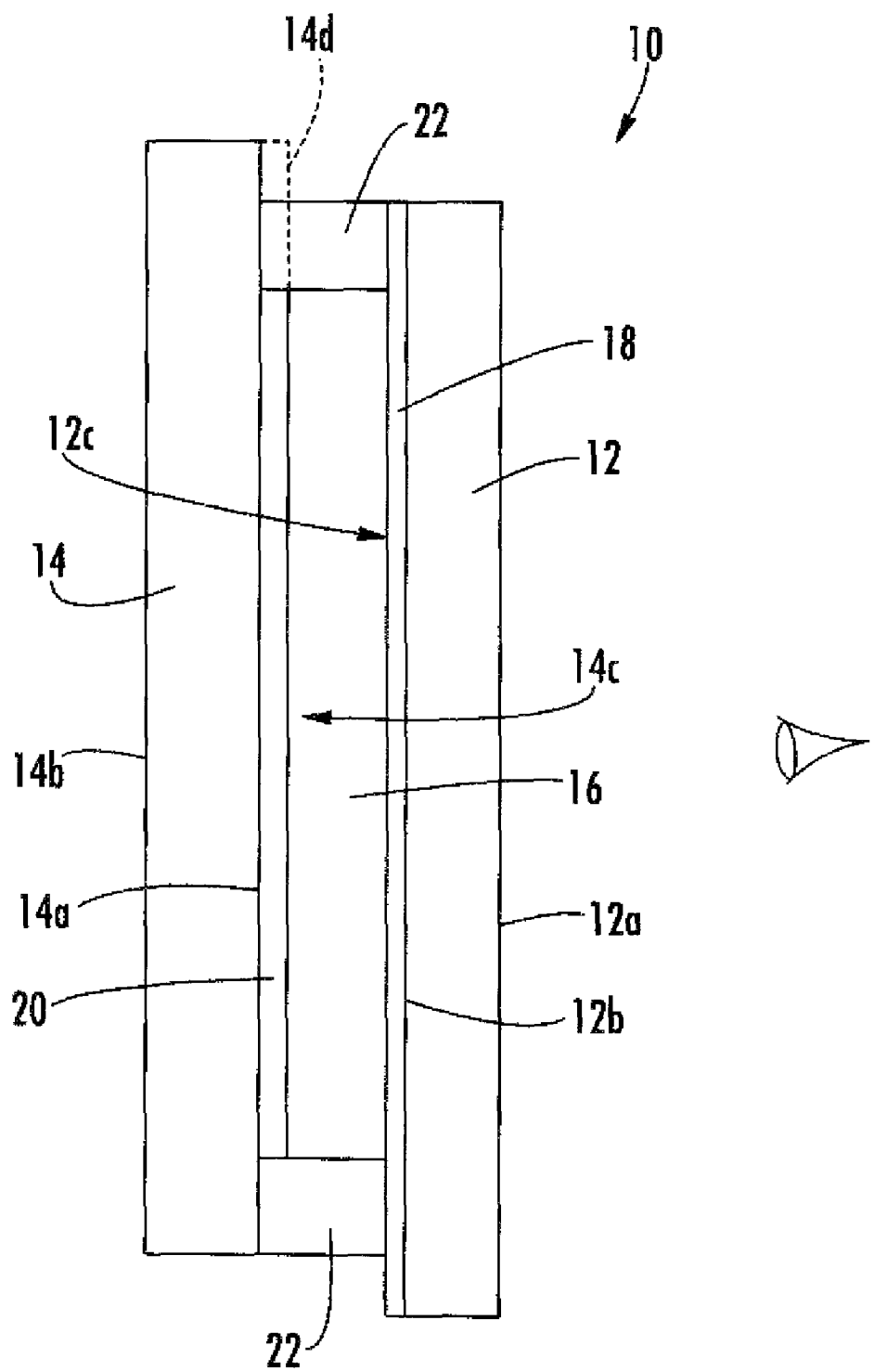
FIG. 1 is a side elevation of a reflective element assembly formed by a process in accordance with the present invention.

Referring now to the drawings and the illustrative embodiments depicted therein, a mirror reflective element assembly or cell 10 for an interior or exterior rearview mirror assembly of a vehicle includes a first or front substrate or glass element 12 and a second or rear substrate or glass element 14 (FIG. 1). The rear reflective element substrate 14 is spaced from front reflective element substrate 12, and the cell includes an electrolyte or monomer composition or electrochromic medium 16 and conductive or semi-conductive layers 18, 20 (described below) sandwiched therebetween. An epoxy seal material 22 or the like, is applied between the substrates to define the cavity for the electrochromic medium and to adhere the substrates together. The substrates may be adhered together while in a sheet form with other substrates or mirror shapes, as discussed below.

The present invention provides a process that adheres the mirror shapes together with the epoxy seal before the front and/or rear substrates or shapes are cut from a sheet of glass. This approach reduces the likelihood of rollers and/or debris or the like contacting and/or damaging the pristine surfaces of the substrates during the cleaning, coating, conveying and assembling processes of the reflective element assemblies. The approach or method of the present invention solves the above problems by reducing or substantially eliminating contact to the pristine or active electrochromic area of the mirror shapes or substrates. At any step in the process where contact is made to the glass surface (such as to hold the glass during cleaning or the like), it is done so by holding the glass along the edges of the glass away from the active EC areas (the areas that will contact the electrochromic medium within the cell or interpane cavity after the reflective element assemblies are assembled together and filled, as discussed below). The present invention thus provides minimum contact to the active EC area and minimum contact to the seal area during manufacturing of the reflective element assemblies. The glass sheet (or other polymeric material or the like as desired and depending on the particular application) is held along the edges (such as during washing) such that the active EC surfaces and primary seal bond-lines of the intended mirror shapes remain clean and untouched. Also, the present invention allows for different mirror sizes, shapes and/or designs to be manufactured on the same assembly line at the same time, as discussed below, because the fixturing/holding of the sheets and the initial assembly processes of the present invention are independent of the mirror size/shape/design.

As discussed above, the rearview mirror reflective element assembly of the present invention comprises an electro-optic or electrochromic reflective element assembly or cell, such as an electrochromic mirror reflective element assembly with coated substrates that are coated utilizing principles disclosed in commonly assigned U.S. Pat. Nos. 6,690,268; 5,140,455; 5,151,816; 6,178,034; 6,154,306; 5,567,360; 5,525,264; 5,610,756; 5,406,414; 5,253,109; 5,076,673; 5,073,012; 5,724,187; 5,668,663; 5,910,854; 5,142,407; and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and/or in PCT application No. PCT/US03/29776, filed Sep. 19, 2003 by Donnelly Corp. et al. for ELECTROCHROMIC MIRROR ASSEMBLY and/or PCT Application No. PCT/US03/35381, filed Nov. 5, 2003 by Donnelly Corp. et al. for ELECTRO-OPTIC REFLECTIVE ELEMENT ASSEMBLY, which are hereby incorporated herein by reference.

As shown in FIG. 1, the completed or assembled mirror reflective element assembly or cell 10 includes front reflective element substrate 12 and rear reflective element substrate 14 with electrochromic medium 16 sandwiched therebetween. The front reflective element substrate 12 has a front surface 12a (the first surface of the electrochromic cell) and a rear surface 12b (the second surface of the electrochromic cell). The rear or second surface 12b may include one or more transparent electrically conductive layers (such as an indium tin oxide (ITO) layer, or a doped indium tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in PCT Application No. PCT/US03/29776, filed Sep. 19, 2003 by Donnelly Corp. et al. for ELECTROCHROMIC MIRROR ASSEMBLY, which is hereby incorporated herein by reference) thereon. The coated rear surface 12b defines the active EC area 12c of the front substrate within the perimeter seal 22.

The rear reflective element substrate 14 includes a front surface 14a (the third surface of the electrochromic cell) and a rear surface 14b (the fourth surface of the electrochromic cell). The front or third surface 14a may include one or more transparent semi-conductive layers (such as an ITO layer or the like), and/or one or more metallic electrically conductive layers (such as a layer of silver, aluminum, chromium or the like or an alloy thereof), and may include multiple layers such as disclosed in PCT Application No. PCT/US03/29776, filed Sep. 19, 2003 by Donnelly Corp. et al. for MIRROR REFLECTIVE ELEMENT ASSEMBLY, which is hereby incorporated herein by reference. The reflective element assembly 10 thus may comprise a third surface transflective element assembly or cell, whereby the reflective layer or surface is disposed at the third surface of the cell or at the front surface of the rear reflective element substrate for viewing by a driver of the vehicle. The third surface 14a defines the active EC area or surface 14c of the rear substrate within the perimeter seal 22. The coated third surface 14a may also be coated to define a tab-out region 14d for providing electrical connection of the conductive layers 20 to an electrical clip of connector or bus-bar, such as the types described in U.S. Pat. Nos. 5,066,112 and 6,449,082, which are hereby incorporated herein by reference. Although shown as having offset edges, the cells manufactured by the process of the present invention may have generally or substantially flush edges, such as of the types of cells described in PCT Application No. PCT/US03/35381, filed Nov. 5, 2003 by Donnelly Corp. et al. for ELECTRO-OPTIC REFLECTIVE ELEMENT ASSEMBLY, which is hereby incorporated herein by reference, or may have other forms or shapes, such as the mirror shapes described in PCT Publication No. WO 03/095269 A2, published on Nov. 20, 2003, and/or shown in U.S. Design pat. applications, Ser. No. 29/176,002, filed Feb. 14, 2003 for ELECTRO-OPTIC CELL FOR REARVIEW MIRROR, now U.S. Pat. No. D493,131; and/or Ser. No. 29/176,026, filed Feb. 14, 2003 for REARVIEW MIRROR AND BEZEL ASSEMBLY, now U.S. Pat. No. D493,394, which are hereby incorporated herein by reference.

The method of the present invention provides an enhanced assembly process for manufacturing an electrochromic mirror reflective element cell assembly, such as the type shown in FIG. 1 and described above. The method or process cleans and coats a large sheet of glass (such as soda lime glass or other material, such as polycarbonate or the like) and adheres coated sheets of glass together (or adheres coated substrates to a sheet of multiple mirror shapes) before the shapes or substrates or cells are scribed and broken out or cut from the sheet or sheets, as discussed in detail below. The method or process may be carried out by the equipment and in a facility of the types shown in FIGS. 12-18, and as also discussed below.

In the illustrated embodiment, the process of the present invention cleans and coats a large sheet of glass that will eventually be cut or broken into the individual rear shapes or substrates of the electrochromic cell. The process may receive a pre-coated sheet for the front substrates and may clean the pre-coated sheet prior to assembling the sheets together. The mirror manufacturer thus may purchase the pre-coated front sheet (which may be coated with a thin layer of indium tin oxide or the like, as discussed below) from a coating facility and may use the pre-coated sheet with the coated rear sheet to form the reflective element assembly. Optionally, the mirror manufacturer may purchase pre-coated and pre-cut front substrates or shapes for use with the large sheet of glass (for the rear shapes or substrates) to form multiple mirror shapes or cells or interpane cavities. In the embodiment discussed below, the glass sheet 30 is the rear sheet, such as for a transflective third surface reflective element assembly, while the front sheet or shapes or substrates may be provided in a pre-coated form. However, aspects of the process of the present invention may be equally suitable for use on a glass sheet to form the front substrates, without affecting the scope of the present invention.

Figure 2:
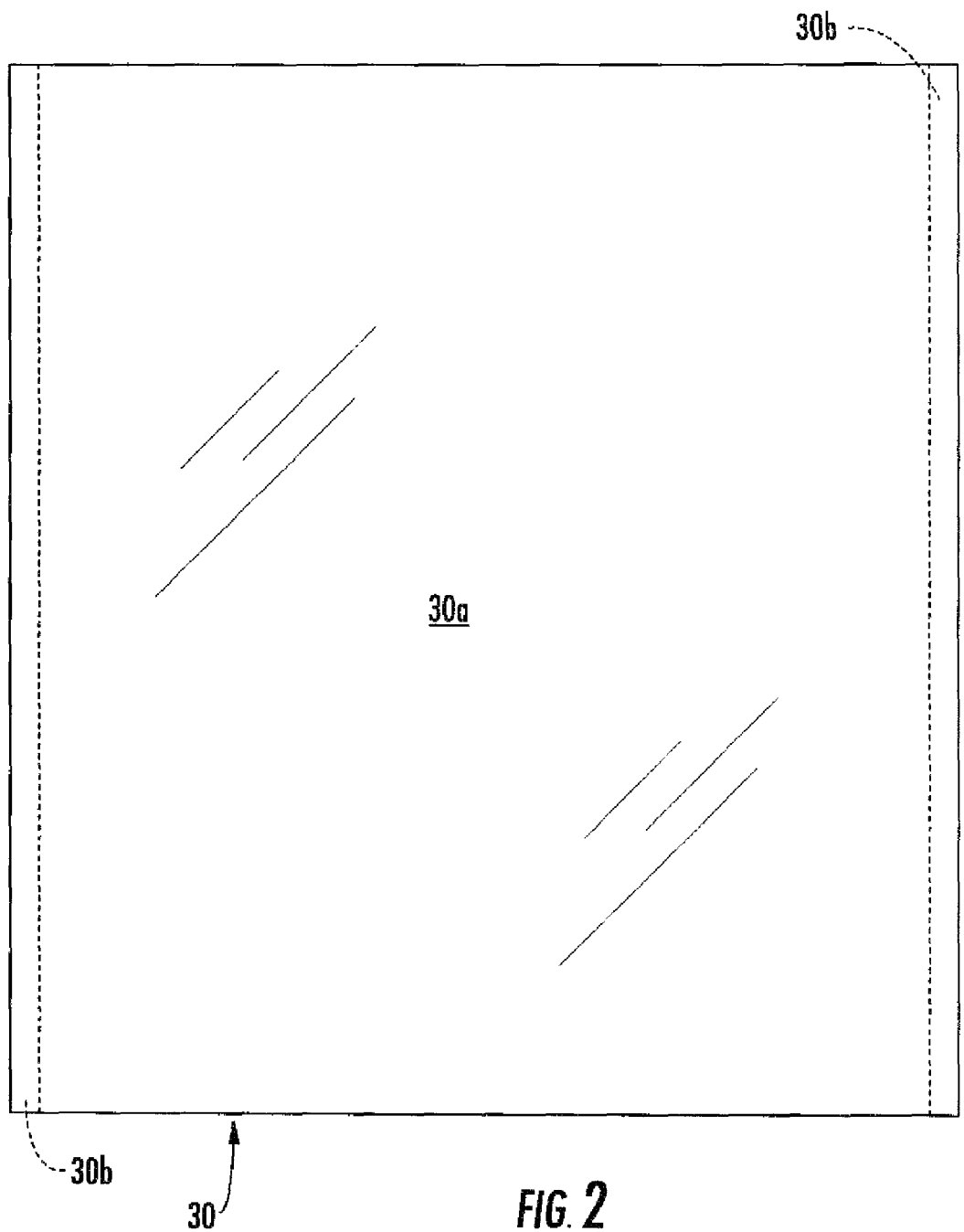
FIG. 2 is a plan view of a sheet of glass suitable for use in the process of the present invention.

Referring now to FIG. 2, a sheet of glass 30 may be provided. The sheet may comprise, for example, approximately a 30 cm by approximately 36 cm sheet (or may have other dimensions as desired for the particular application). The sheet is dimensioned to accommodate a plurality of desired mirror shapes. The material may comprise soda lime glass or other type of glass or other material as desired, such as polycarbonate material or the like, without affecting the scope of the present invention. The glass sheet may be substantially self supporting as it is held at its edges, and preferably has a thickness of at least approximately 1.6 mm, but may comprise a thinner material, such as a sheet having a thickness of approximately 1.3 mm or thereabouts or having other thicknesses as desired and depending on the particular application.

Figure 12:
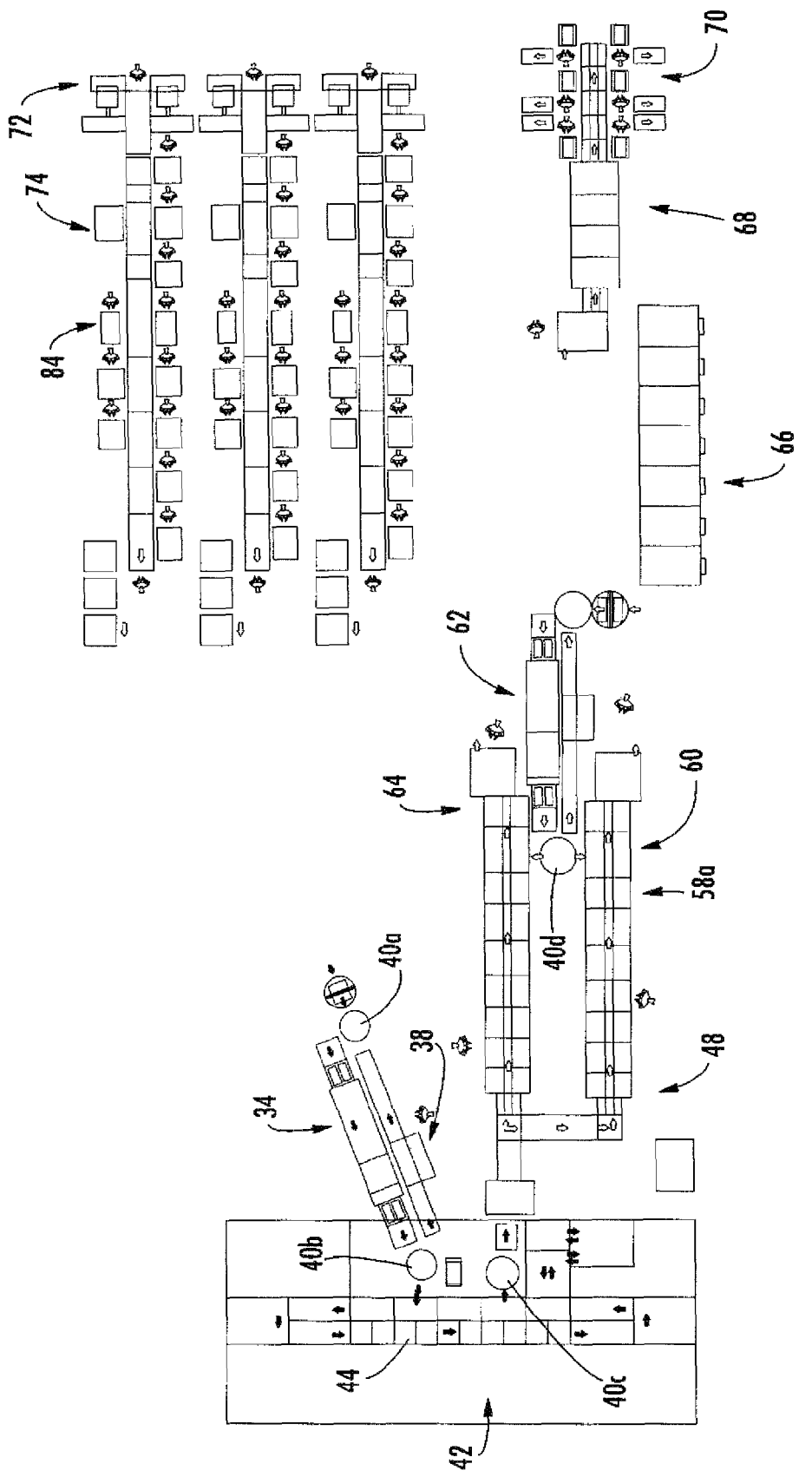
FIG. 12 is a plan view of an assembly line layout suitable for performing the manufacturing process of the present invention.
Figure 13:
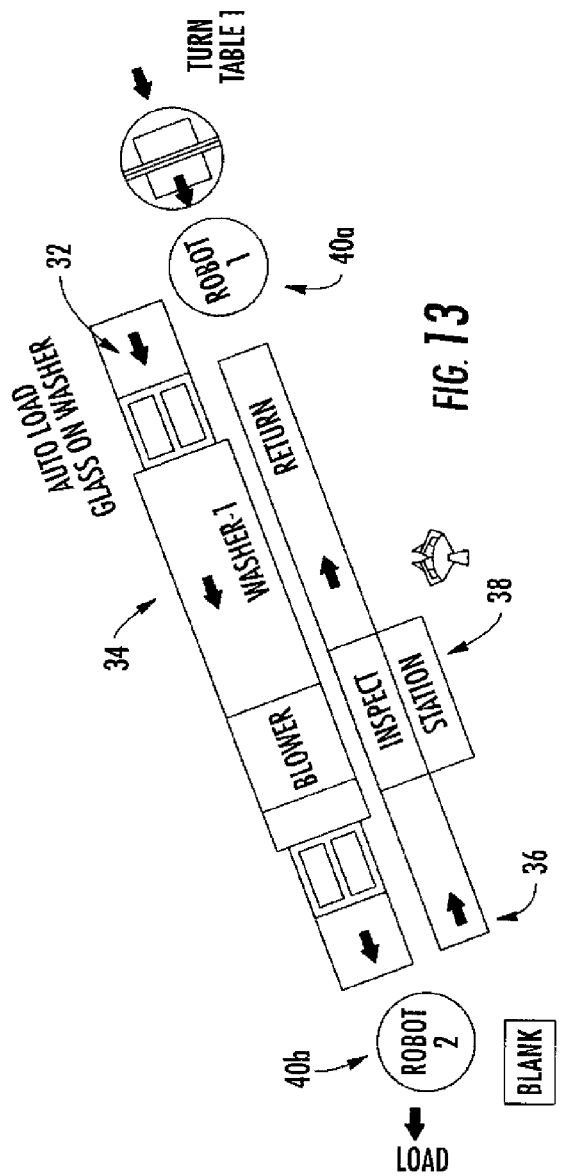
FIG. 13 is a plan view of a washer portion of the assembly line layout of FIG. 12.
Figure 15:
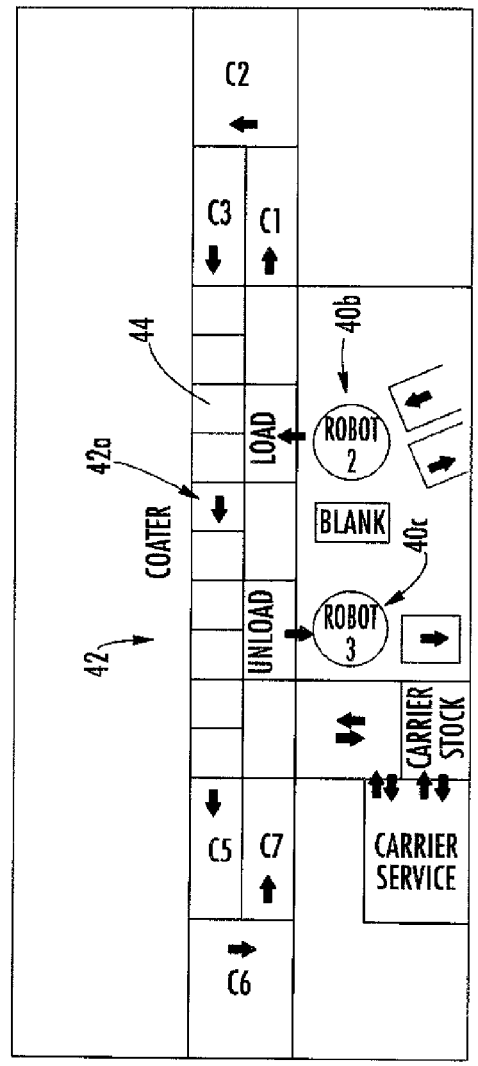
FIG. 15 is a plan view of a coater portion of the assembly line layout of FIG. 12.
Figure 14A:
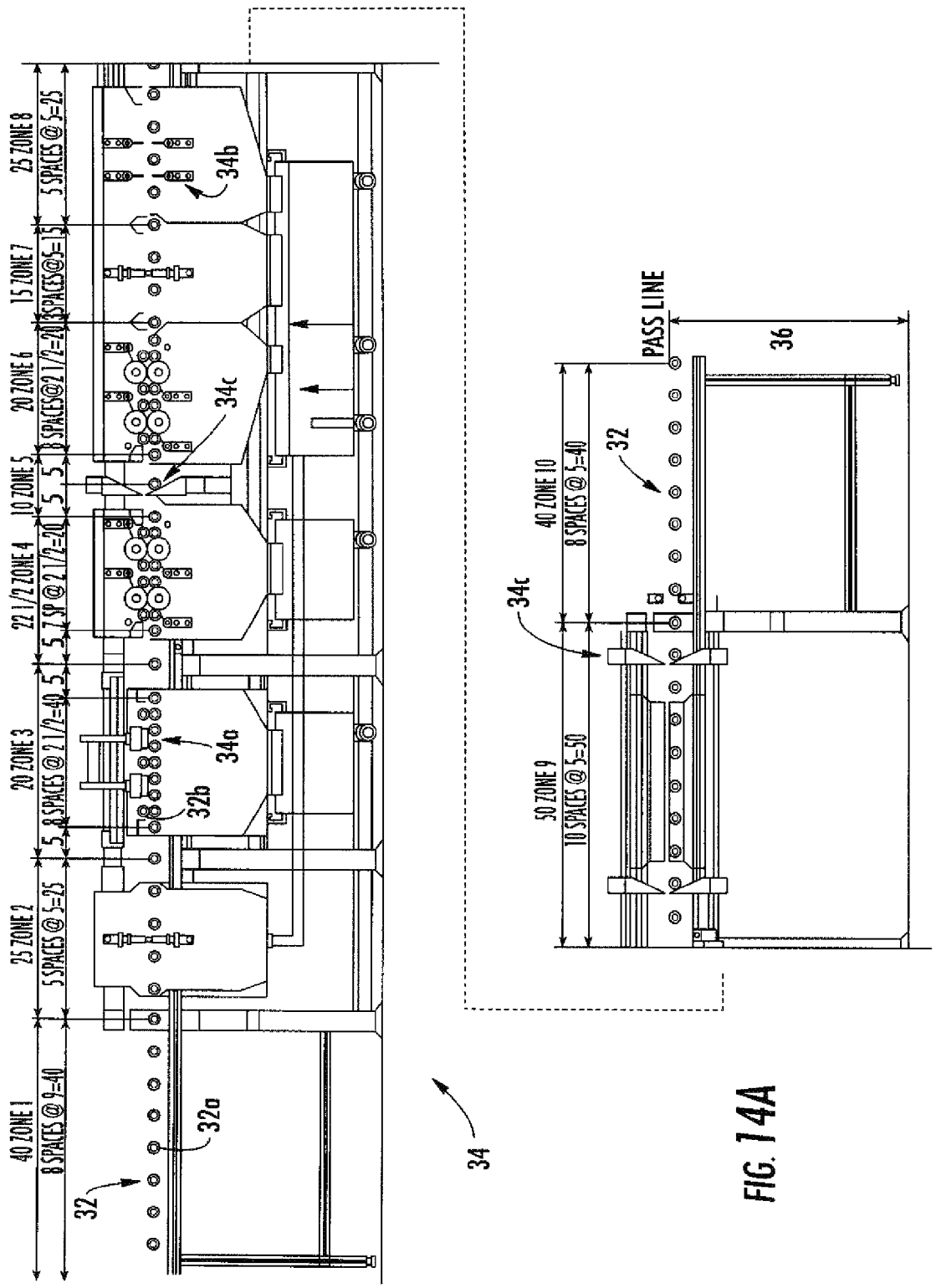
FIG. 14A is a side elevation and sectional view of the washer of FIG. 13.
Figure 16:
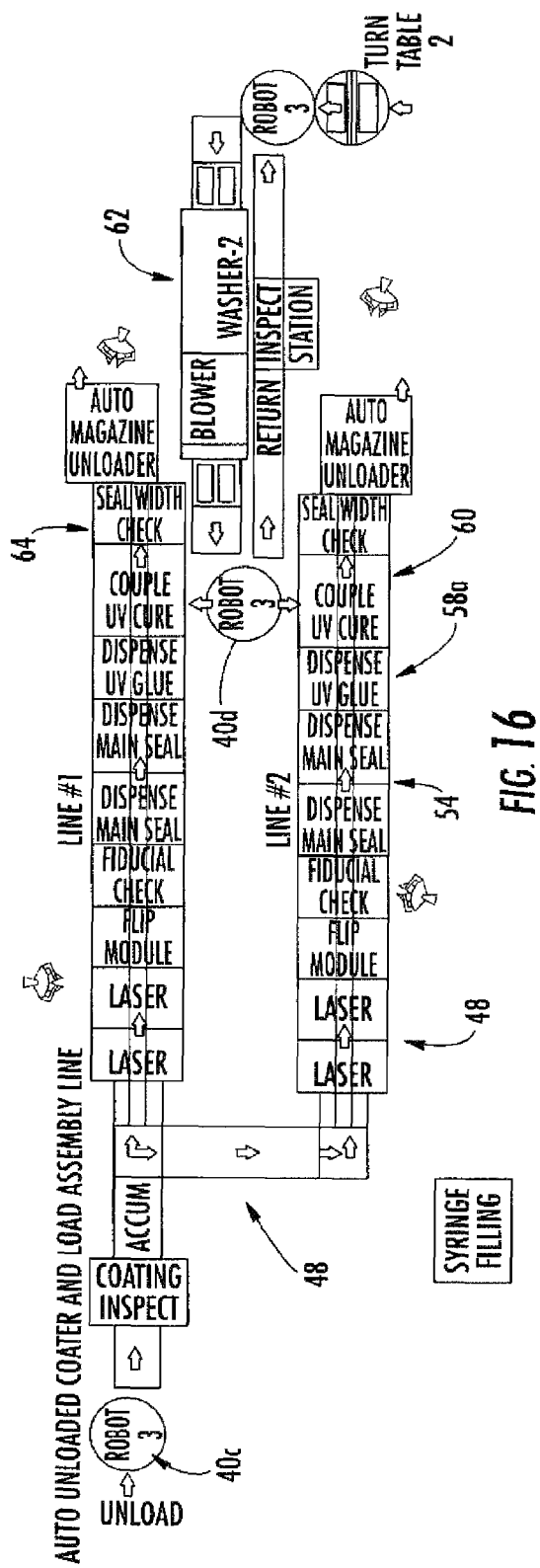
FIG. 16 is a plan view of an assembly portion of the assembly line layout of FIG. 12.
Figure 17:
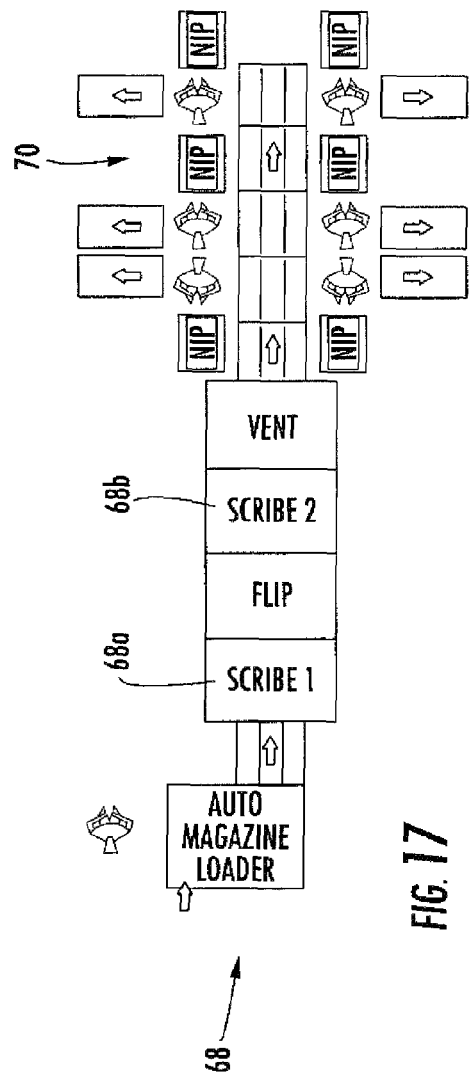
FIG. 17 is a plan view of a breakout line of the assembly line layout of FIG. 12.
Figure 18:
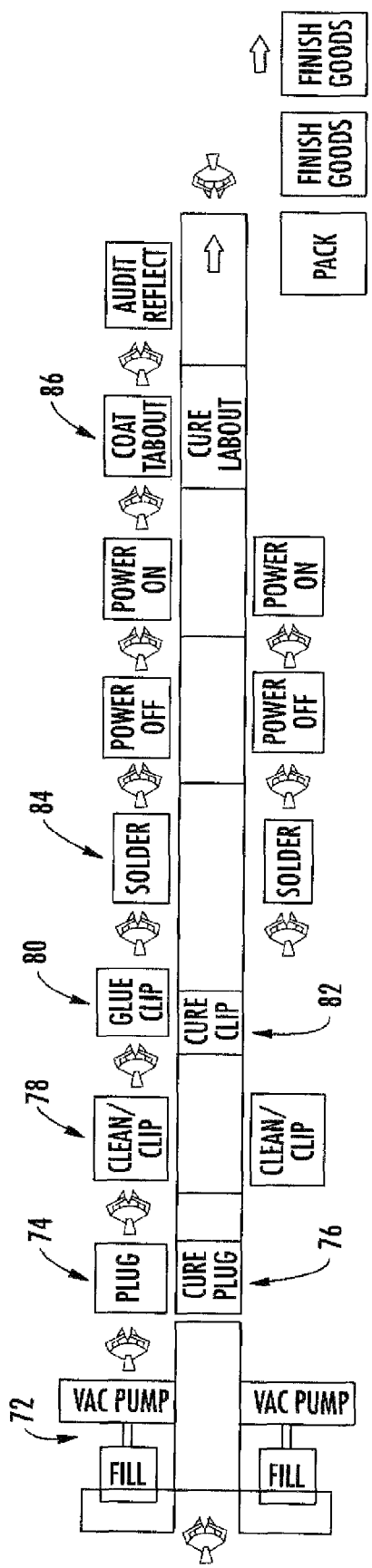
FIG. 18 is a plan view of a final assembly portion of the assembly line layout of FIG. 12.

The sheet of glass may be conveyed along a conveyor 32 (FIGS. 14A and 14B) through a washing device or process 34 (FIGS. 12 and 14A). For example, the glass sheets may be provided at a beginning area or receiving station 36 of the system, such as in a crate or the like, and may be inspected and prepared for use at an inspection station 38. The inspected and approved glass may then be loaded onto the conveyor 32 via an automated robot 40a (or via a manual operation if desired). The conveyor 32 then conveys the glass through the washer 34.

Figure 14B:
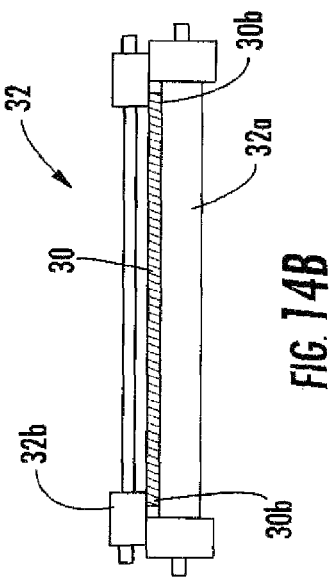
FIG. 14B is an end elevation of a conveyor useful in the process of the present invention.

The conveyor conveys the glass through the washer and pinches the edges of the glass sheet to hold the glass sheet during the washing/scrubbing process. The conveyor may only pinch the glass sheet at the edges, and may support the underside of the glass sheet via a support roller or belt or the like. Optionally, and preferably, there are rollers contacting the under surface of the glass sheets, while the front surface (the surface that has the pristine surfaces) is only contacted at the edges, typically by a pinching action or the like. As shown in FIG. 14B, conveyor 32 may include a plurality of lower support rollers 32a and upper guide rollers 32b for conveying the glass sheet 30 along the conveyor and for holding the glass sheet 30 in place on the support rollers 32a during the washing or scrubbing system or processes 34. As can be seen in FIG. 14B, the lower support rollers 32a may include a narrowed region for receiving the sheet, such that the sheet may be supported within the narrowed region as it is conveyed therealong. The upper guide rollers 32b overlap only the edges 30b of the sheet 30 to pinch and hold the sheet within the narrowed region of the support rollers 32a. The glass sheet 30 is thus held in place on the support rollers as it is conveyed along the conveyor. Optionally, the conveyor may only support the sheet along its edges, whereby the sheet may be self supporting between the edges.

The glass sheet 30 is placed on the conveyor with its pristine surface 30a facing upwards. The term "pristine surface" is used herein to describe the surface of the sheet of glass that will be the coated active EC area of the assembled mirror reflective element or cell after the cell is adhered together and filled. As shown in FIGS. 2 and 14B, the upper guide rollers 32b may engage the outer edges 30b of the sheet 30 as it is conveyed along the conveyor. The amount of engagement or overlap or touching may vary depending on the application. Because the upper guide rollers 32b only overlap the outer edges 30b of the sheet 30, the guide rollers do not encroach the pristine surface 30a of the glass sheet during conveyance of the sheet.

The conveyor 32 is operable to convey the sheets of glass through the washer 34 (FIGS. 12 and 14A), where the upper surface within upper guide rollers is scrubbed and cleaned to clean the pristine surface 30a of the sheet prior to the coating process. The washer scrubs and washes the pristine surface with scrubbers or brushes 34a and blowers 34b. To further minimize contact with the pristine surface, the washer 34 may include air knives 34c to blow excess water or fluid from the pristine surface, rather than using a squeegee or the like as in conventional washing processes.

After the glass exits the washer 34, the glass is unloaded by an automated or computer controlled robot or robotic arm or the like 40b (or manual process if desired) and moved onto a carrier 44 of the coating device or system 42. The carrier 44 may be moved to the coating area 42a, where the pristine surface 30a of the sheet will be coated (and may be coated with more than one layer or coating, as described below). The glass sheet is then coated at the coating area 42a via vacuum deposition of the desired coating or coatings on the surface 30a, such as via sputter coating or the like. Preferably, the glass sheet 30 may be positioned on a carrier 44 that may support the sheet at a negative angle with respect to the coating target (which will be hit with ions during the sputter coating process, as is known in the coating arts), such that the coating target may be positioned at least partially beneath the carrier and sheet. The carrier 44 may support the sheet along the edges 30b, and does not touch the pristine surface 30a. The glass sheet 30 thus may be coated on the surface 30a where the glass sheet was not touched by the conveyor and where it is not touched by the carrier. The sheet 30 may then be unloaded from the coater 42, such as via an automated or computer controlled robot or robotic arm 40c or the like, and moved to the assembly line 46, discussed below.

The coating process of the present invention thus provides for enhanced coating of large sheets, where the large sheets are held on the edges and the large surface to be coated is not touched. The coating process is thus an economical process that is easy for coating systems to accomplish. The mirror reflective element assemblies or electrochromic cells that are formed from the sheets may comprise third surface reflective element assemblies, where the front surface of the rear substrate (commonly referred to as the third surface of the reflective element assembly or cell) has a reflective and conductive metallic coating or layer or layers, such as a silver or aluminum or chromium or rhodium or other metallic materials or alloys thereof, and one or more non-metallic semi-conductive layers, such as an ITO layer or the like. The glass sheet that may form the rear substrates thus may have coatings and/or layers of a metallic electrically conductive layer, such as a thin film or layer of metal, such as silver, aluminum, silver alloys, aluminum alloys (such as 6061 or 1100 aluminum alloys or the like), manganese, chromium or rhodium, or any other metallic material which is sufficiently reflective and/or transmissive at a selected thickness, and may have one or more other layers of non-metallic layers, such as one or more layers of indium tin oxide (ITO), indium tungsten oxide (IWO), indium cerium oxide (ICO), indium oxide (IO) or the like, disposed thereon or applied thereto, such as described in U.S. Pat. Nos. 6,690,268; 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for MIRROR REFLECTIVE ELEMENT ASSEMBLY, which are all hereby incorporated herein by reference.

Optionally, the sheet may be masked prior to coating or may be masked by the carrier to define the regions of the sheet that are not to be coated during the coating process. The maskings define the mirror shapes for the mirror reflective element assemblies that are to be made from the sheet. The mask may also mask and define register marks or locating marks or fiducial marks on the sheet that will not be coated and will serve to provide locating marks to a vision system to provide accurate/precise location of the sheet for later processing, as discussed below.

Alternately, and optionally and desirably, substantially the entire surface 30a of the sheet may be coated (except at the perimeter areas where it may contact and be supported and/or held by the carrier) and, after the sheet is coated, the sheet 30 may be removed from the coating chamber and moved to a processing station 48 that is operable to remove some of the coating, such as by laser etching or ablating, chemical etching, sandblasting or the like, to define the mirror shapes 50 and/or locating marks 52 on the surface of the sheet 30. This process is desirable to allow enhanced changeover from one mirror shape or design to another on different sheets. The different shapes may be programmed into the laser etching machine and different shapes may be defined on the same sheet or different shapes may be defined from one sheet to the next without requiring different fixturing or the like of the sheet and shapes. Optionally, the laser or another laser or removal device may be implemented to remove the coating at desired areas to create windows for displays or the like.

Figure 3:
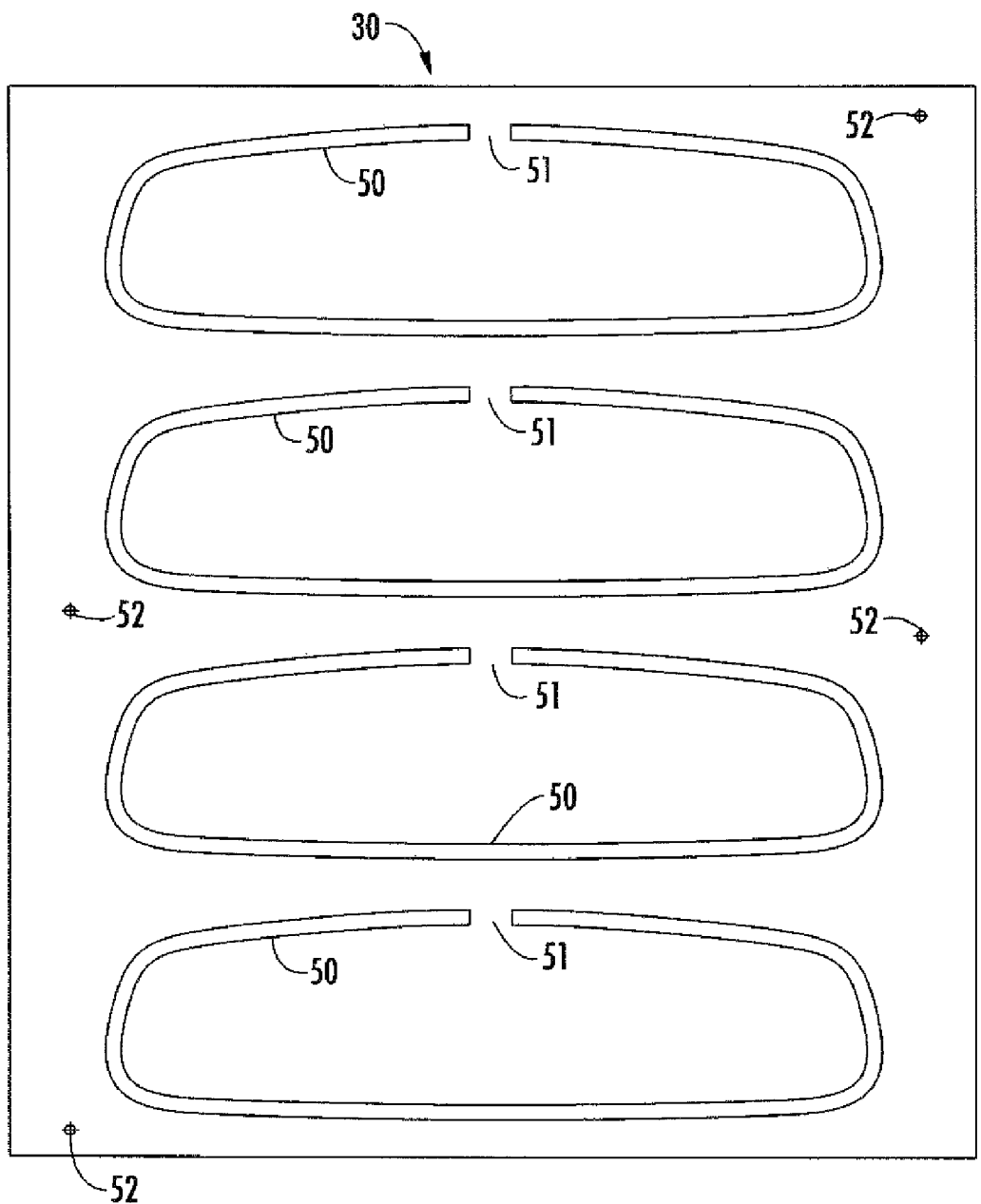
FIG. 3 is a plan view of the sheet of glass of FIG. 2, with the reflective conductive coating removed to define the mirror shapes and locating points.

As shown in FIG. 3, the sheet 30 may be coated on its surface 30a, and may have the coating removed (or masked during the coating process) at desired regions to define the mirror shapes 50 and index markings or locating points or fiducial points 52 (discussed below). As can also be seen in FIG. 3, the masked or removed patterns may provide a tab-out region 51 for one or more of the rear substrates that are to be formed from the sheet 30. Optionally, however, the masked or removed patterns may not provide a tab-out region, and may optionally provide a thin isolating line (rather than the thick shape outline shown in FIG. 3) around or partially around the desired mirror shape and toward an outer edge of the desired mirror shape to isolate a portion or perimeter portion of the conductive material to define a rear mirror shape or substrate of the type described below with respect to FIG. 19. The thin isolating line may be formed by removing the layer of metallic coating or material, while not removing an underlying layer of conductive environmentally stable material (that may be deposited or applied to the surface 30a before the metallic coating or layer) beneath the metallic coating or coatings, as discussed below.

Figure 4:
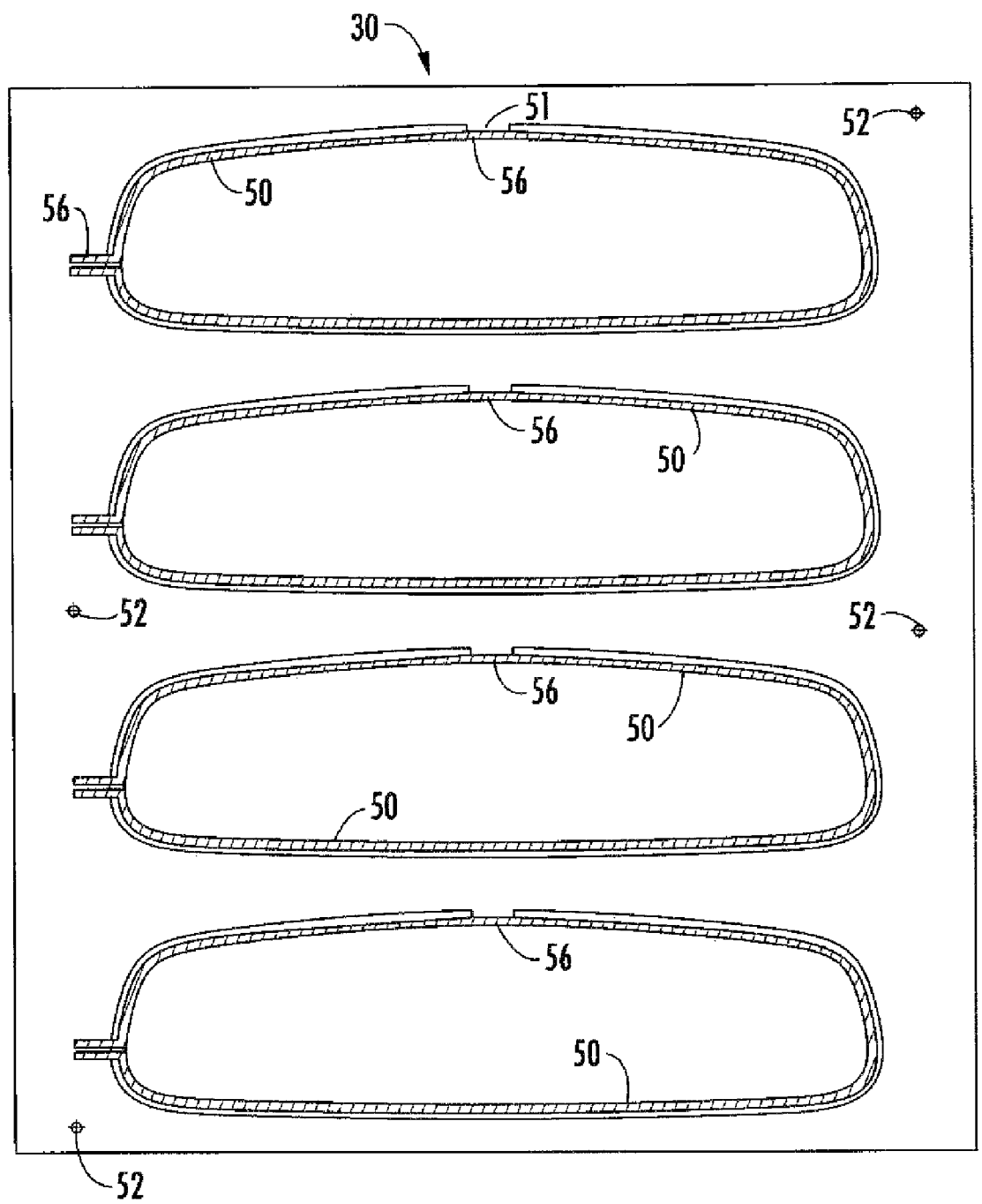
FIG. 4 is a plan view of the sheet of glass of FIG. 3, with uncured seal material applied around the mirror shapes.

After the coating and laser etching (if applicable) processes, the glass sheet 30 is then conveyed or moved to a dispensing process or dispenser 54, where an uncured adhesive material 56, such as an epoxy seal material, may be dispensed onto the pristine coated surface 30a. The sheet may be positioned at an appropriate location in response to a computer aided camera or vision or imaging system detecting the register marks and the conveyor or automated or computer controlled robot or robotic arm or the like positioning the sheet to align the register marks with a predetermined location. The fixturing and dispensing machine may find the register marks and may dispense the uncured seal material 56 in the desired location and shape based on the marks. The uncured seal material (and spacer beads or the like, such as glass beads or the like, as is known in the mirror art) thus may be dispensed onto the sheet to define the desired mirror shapes, as shown in FIG. 4. The seal material 56, when cured, forms the cavity boundary for a plurality of cells or mirror shapes.

The sheet may be selected to be of sufficient size to allow for two or three or four or more mirror shapes to be formed therefrom, depending on the particular application. The seal material may be dispensed onto the surface depending on the masking or laser deletion pattern or shape and may be programmed and changed as desired and in conjunction with the programmed pattern of the masked or laser deleted shapes. The seal material may be dispensed in the desired shape or pattern one shape at a time or two shapes at a time or more, depending on the cycle time of the dispensing machine and on the particular application.

Figure 5:
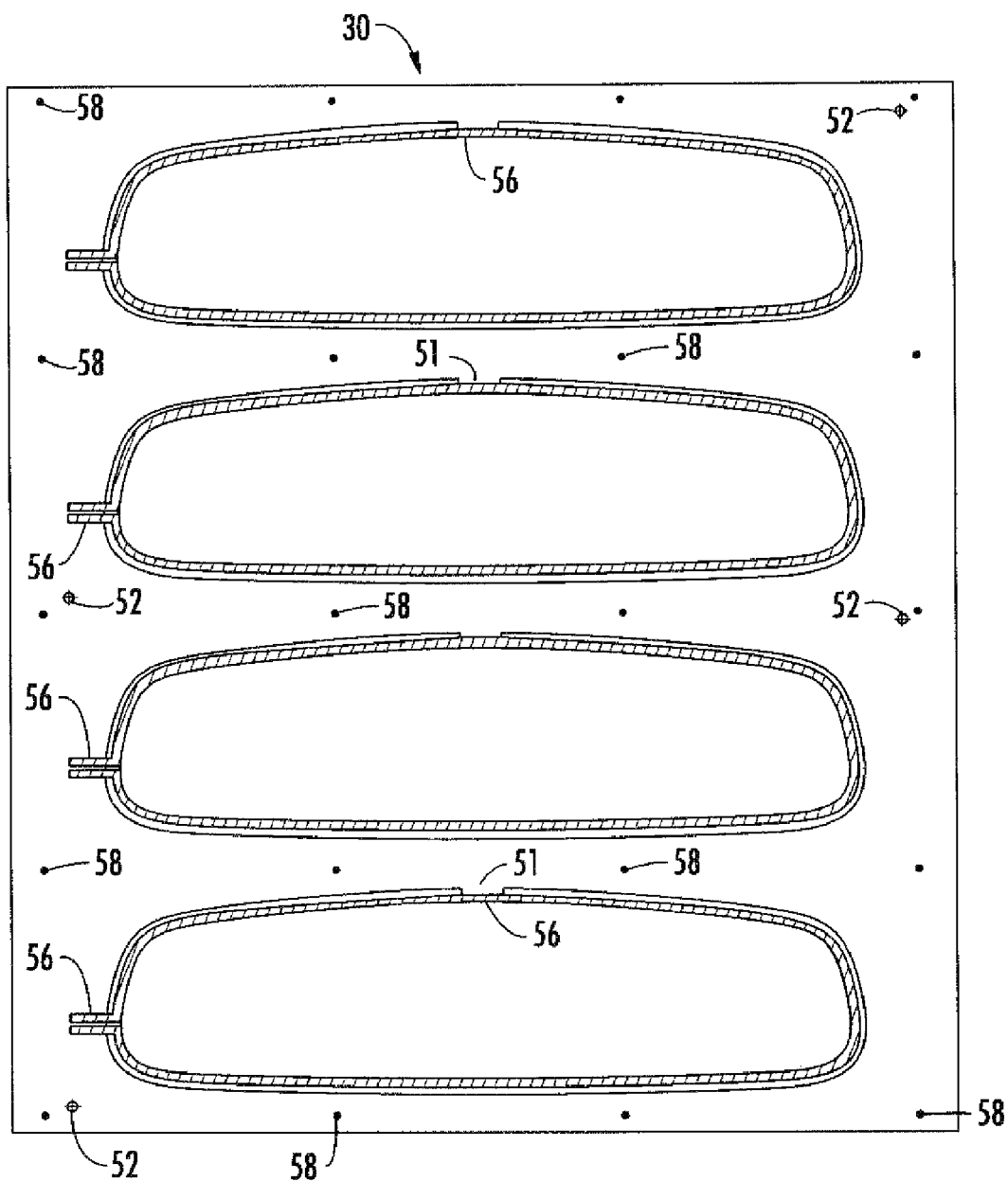
FIG. 5 is a plan view of the sheet of glass of FIG. 4, with adhesive portions applied to the surface of the sheet.

While the seal material mirror shapes are dispensed or after the seal material mirror shapes are dispensed, a plurality of portions of adhesive 58 (FIG. 5), such as drops or spots or segments of a UV curable adhesive or the like, may be applied on the surface of the sheet (such as by an adhesive dispenser 58a (FIG. 16)) at areas outside of the seal material mirror shapes 50. The portions may be dispensed or applied by the same dispensing machine or by another dispenser, without affecting the scope of the present invention. The UV curable adhesive portions may be quickly cured via exposure to UV light or via heat to adhesively secure the sheets together, as described below. The UV curable adhesive may serve to hold the sheets together until the epoxy seals are cured.

After the seal material 56 and adhesive drops 58 are dispensed onto the surface 30a of sheet 30, the sheet is conveyed to a coupling station 60, where the front glass sheet or substrates are positioned at and placed onto the rear sheet 30, such as via an automated or computer controlled robot or robotic arm 40d or the like. The front sheet or substrates may be processed in a similar manner as described above for rear sheet 30, or may be supplied to the mirror manufacturer as pre-coated sheets or pre-coated and pre-cut substrates, without affecting the scope of the present invention. The front sheet or substrates are cleaned and washed (such as at a washer 62 in FIGS. 12 and 16) prior to coupling the sheet or substrates with the rear sheet 30, so that the pristine surface of the front sheet or substrate is clean and free of debris and the like when the cell is assembled.

The rear sheet 30 may be positioned at an appropriate location (such as via the conveyor or an automated or computer controlled robot or robotic arm or the like) in response to identification/recognition (such as by a computer aided camera vision or imaging system) of the register marks 52 formed in the coated surface 30a. The front sheet (with the ITO layer or the like applied to its surface) may be supplied to the coupling station 60 from washer 62, such that the front sheet is cleaned just prior to the coupling of the sheets together. The clean front sheet is then positioned relative to the rear sheet 30 and epoxy seals 56, and may be pressed into engagement with the epoxy seals and UV curable glue dots. The sheets may be positioned relative to one another in response to detection of the register marks on one or both sheets and/or by the detection of the edges or other characteristics or physical attributes of the front sheet, such as by a computer aided camera vision or imaging system or the like. The automated robot 40d may substantially uniformly press the sheets together, whereby the epoxy seal material 56 provides the appropriate spacing between the sheets and defines the cell cavity. The UV curable glue dots may be cured (such as by exposure to UV light and/or heat or other means for curing the quick curing adhesive) while the sheets are pressed and held together at the desired spacing (as provided by the spacer beads or the like in the epoxy seal), such that the sheets are held at the appropriate spacing. The assembled cells may then be conveyed to a checking station 64 to check the seal width and interpane cavity spacing and plug openings of the mirror shapes.

Optionally, the front shapes may be provided as pre-cut shapes that are already coated and cut to the desired shape. The pre-cut and coated shapes may be supplied to the coupling station from the washer, such that the front shapes are cleaned just prior to the coupling of the shapes to the rear sheet. The clean front shapes are then positioned, such as by an automated or computer controlled robot or robot arm or the like, relative to the rear sheet and the respective epoxy seal, and may be pressed into engagement with the respective uncured seal material shape. The front shapes or substrates may be positioned relative to rear sheet in response to detection of the register marks on the rear sheet and the detection of the edges or other characteristics or physical attributes of the front shapes, such as detection of flat portions or edges along the front shapes, such as by a computer aided camera vision or imaging system or the like. The automated robot may substantially uniformly press the front shapes and the rear sheet together, whereby the uncured seal material provides the appropriate spacing between the front shapes and rear sheet and defines the cell interpane cavities.

While the front shapes are pressed against the uncured seal material, a quick curing adhesive, such as UV curable adhesive or the like, may be applied in portions around or partially around or spaced around the perimeter of the shape and between the front shape and the rear sheet (and outside the perimeter seal material), and may be quickly cured (such as by exposure to UV light following the application of the adhesive). The UV curable adhesive may be applied and cured to each shape separately as the shape is juxtaposed and superimposed on the respective seal material of the rear sheet, or may be applied and cured after the multiple shapes are juxtaposed and superimposed on the respective seal material shapes of the rear sheet. For example, the UV curable adhesive may be applied in spots or dots around the perimeter of a substrate, and, a UV curing device may follow the adhesive dispenser or applicator and may emit UV light soon or substantially immediately after the dots are applied to cure the UV curable adhesive and, thus, adhere the respective shape or substrate to the sheet. The sandwiched shapes and sheet may then be conveyed to the checking station to check the seal width and interpane cavity spacing and plug openings as described above.

The sandwich of sheets may then be moved to a curing oven or fixture 66, which cures the epoxy seal material in a known manner, such as heat curing at approximately 150 degrees C. or via other processes. After the seal material is cured, the cured sandwich of sheets is moved to the scribing machine or system 68 (FIGS. 12 and 17), where the mirror shapes are scribed onto the sheets and the substrates/cells are broken out and/or cut from the sheets. More particularly, if the front substrates are provided in sheet form, the sandwich of sheets may be conveyed to a first scriber 68a that may scribe the front sheet in the shapes of the front substrates. The sandwich of sheets may then be flipped over and the rear sheet may be scribed by a scriber 68b. Optionally, the rear scriber may be positioned beneath the conveyor to scribe the rear sheet from below, such that the sandwich need not be flipped during the scribing process. Alternately, if the front shapes are provided in their pre-cut shape or substrate form, then only the rear sheet needs to be scribed and/or cut to cut/break the rear shapes from the rear sheet.

Figure 6:
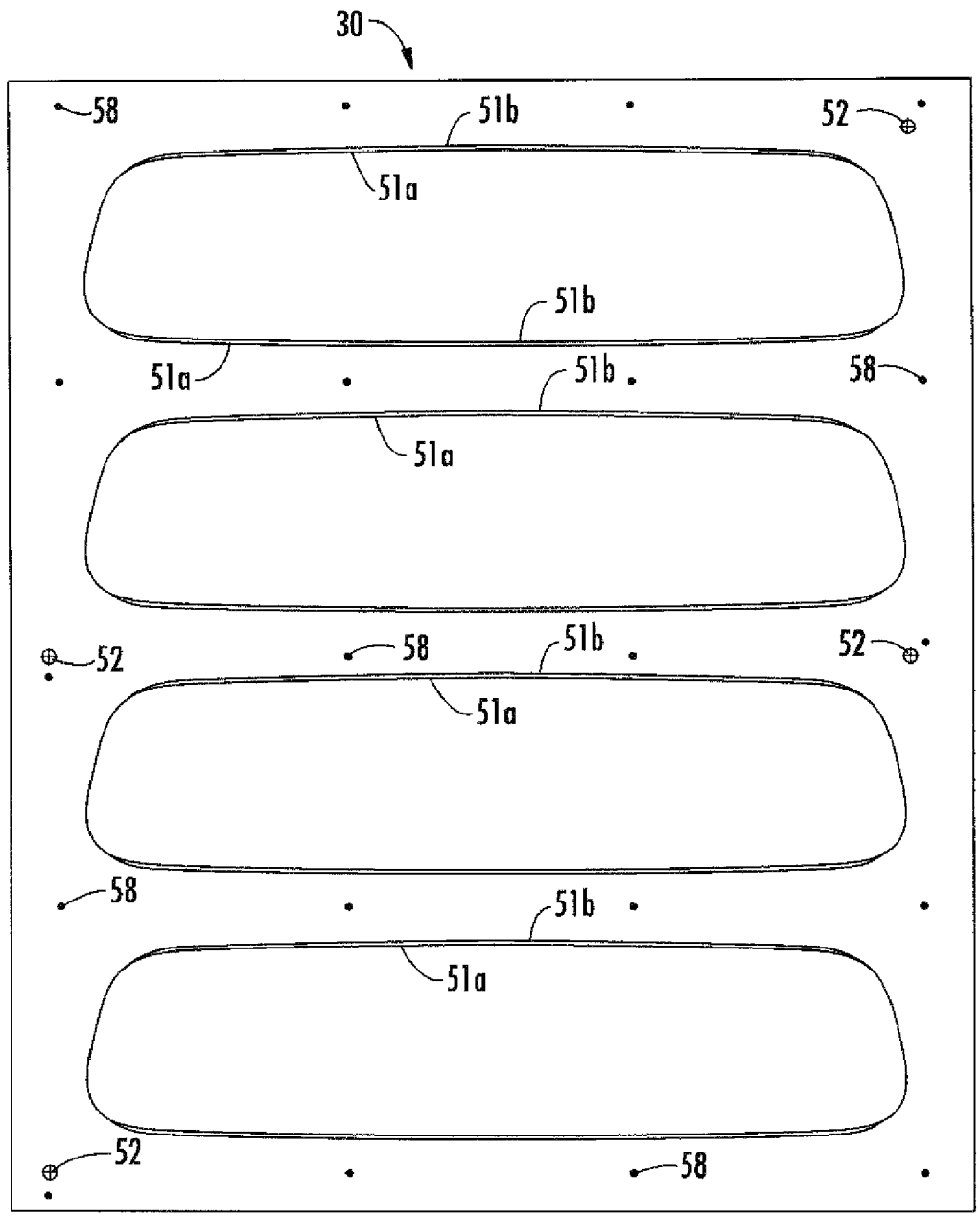
FIG. 6 is a plan view of a sandwich of sheets, with a front sheet of glass adhered to the sheet of glass of FIG. 6 and the mirror shapes for the front and rear mirror substrates scribed on the respective sheets.
Figure 7:
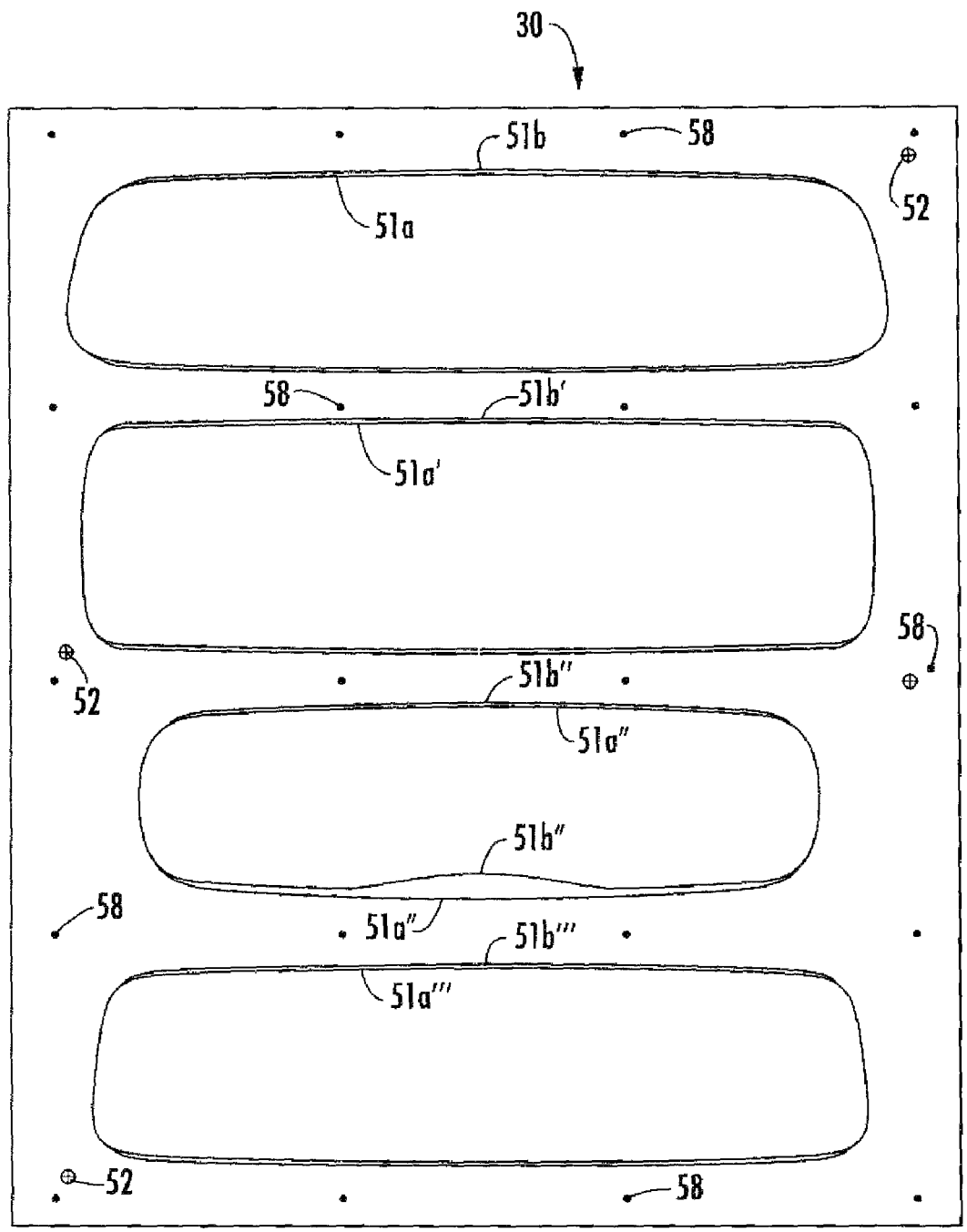
FIG. 7 is a plan view of another sandwich of sheets, showing different mirror shapes scribed thereon.

During the scribing process, the shapes of the front substrates may be scribed in the front sheet and around the seal portions to define the front shapes 51a (as shown in FIG. 6). The rear shapes 51b of the rear substrates may be scribed in the rear sheet 30 and around the seal portions to define the rear substrates (as also shown in FIG. 6). As shown in FIG. 7, the present invention allows for different shaped substrates and cells (shown as different front shapes 51a, 51a', 51a'', 51a''' and different rear shapes 51b, 51b', 51b'', 51b''') to be formed from the same sheet or sandwich of sheets, without requiring different fixturing or processing of the sheets. For example, the shapes of the substrates may be selected depending on the particular design or application, and may be selected to be any desired shape or form, such as the shaped mirror substrates/cells described in PCT Publication No. WO 03/095269 A2, published on Nov. 20, 2003, and/or shown in U.S. Design pat. applications, Ser. No. 29/176,002, filed Feb. 14, 2003 for ELECTRO-OPTIC CELL FOR REARVIEW MIRROR, now U.S. Pat. No. D493,131; and/or Ser. No. 29/176,026, filed Feb. 14, 2003 for REARVIEW MIRROR AND BEZEL ASSEMBLY, now U.S. Pat. No. D493,394, which are hereby incorporated herein by reference. In order to form the different shaped substrates and cells, the masking or laser deletion process or program may be changed to provide the different shapes, and the seal dispensing pattern or program may be changed accordingly. The scribing process is then reprogrammed or reconfigured to match or correspond to the laser and seal patterns. The different shapes thus may be accomplished with little or no changeover of handling equipment and fixturing. The present invention thus provides enhanced flexibility to the mirror manufacturing process.

After the shapes 51a, 51b are scribed in or on the respective sheets, the shapes may then be broken out at a cutting or nipping station 70 (FIGS. 12 and 17) to form the plurality of cells. The empty cells may then be filled, such as with an electrolyte or monomer composition, and plugged at a filling station 72 (such as a vacuum filling station) in a known manner (or the sandwich of shapes or cells may be filled as described below). The mirror cells may be loaded into the vacuum fill chamber and filled (such as via dipping the cells into an electrolyte or monomer composition or electrochromic medium or via depositing or shooting the electrolyte or monomer composition or electrochromic medium onto or at the fill opening of the vacuumed cell), and then removed and conveyed to a plugging station 74, where an operator may remove the mirror cell, clean the end of the cell (that was dipped into the electrolyte or monomer composition or electrochromic medium during the filling process) and plug the fill hole with a plug, such as a UV curable adhesive or glue or the like. After the hole is plugged, the cell is conveyed through a UV curing area 76 which may emit UV light or radiation or energy to cure the UV curable adhesive plug, and is then conveyed to a cleaning station 78, where the cell is cleaned.

The clean cell may then receive an electrode clip, which may be glued to the cell with a UV curable adhesive at a gluing station 80, and then may be conveyed to a UV curing area 82 to cure the UV curable adhesive to adhere the clip to the cell. The cell may then be conveyed to a soldering station 84, where the wire harness may be soldered to the electrode clip at the soldering station 84 in a known manner to complete the cell manufacturing. The tab-out area 51 and the electrode clips of the rear substrate may then be encapsulated via known means at a tab-out coating/curing station 86.

Figure 8:
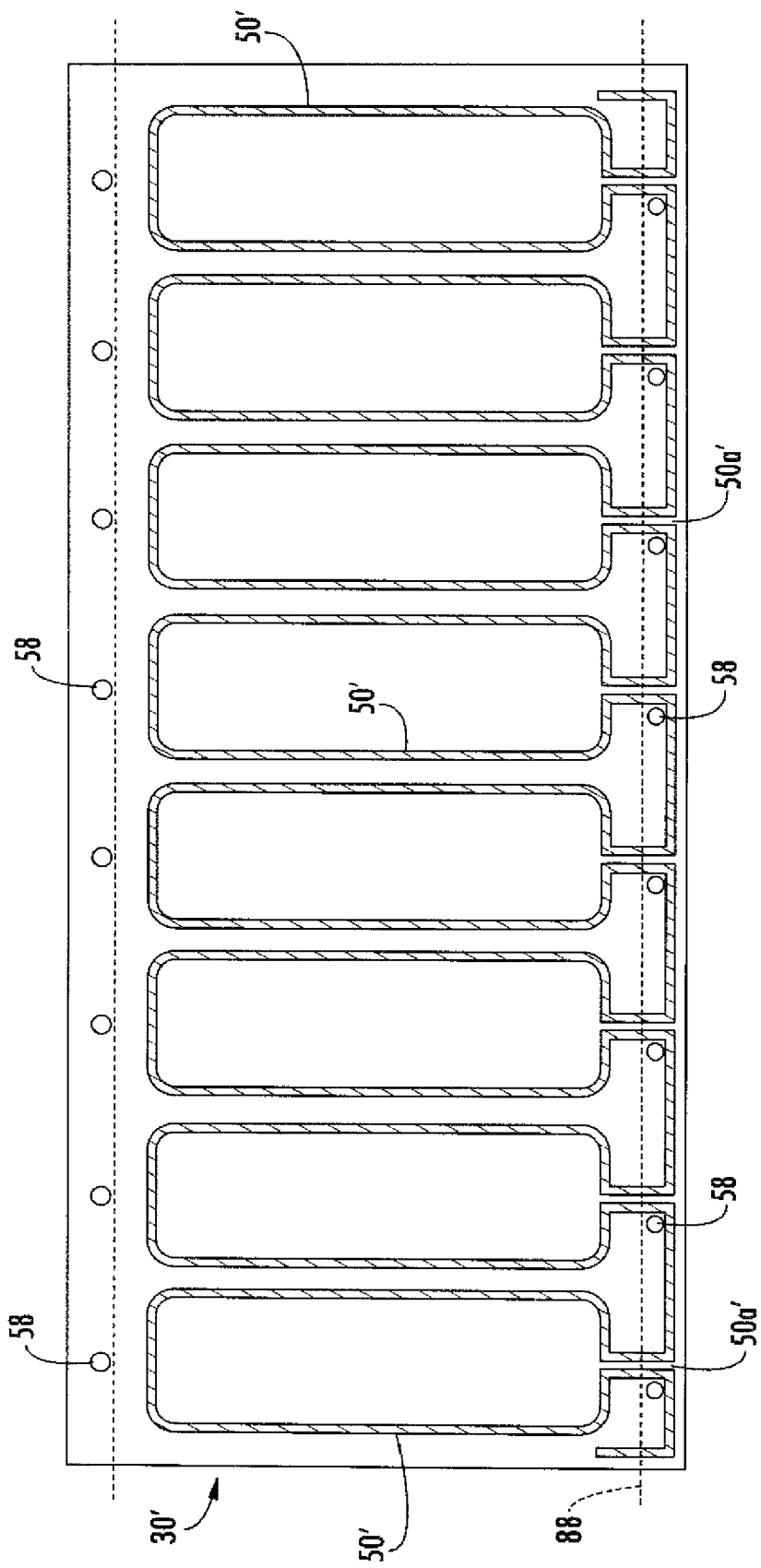
FIG. 8 is a plan view of another sandwich of sheets, showing the fill openings for filling the cells with the electrochromic medium.
Figure 9:
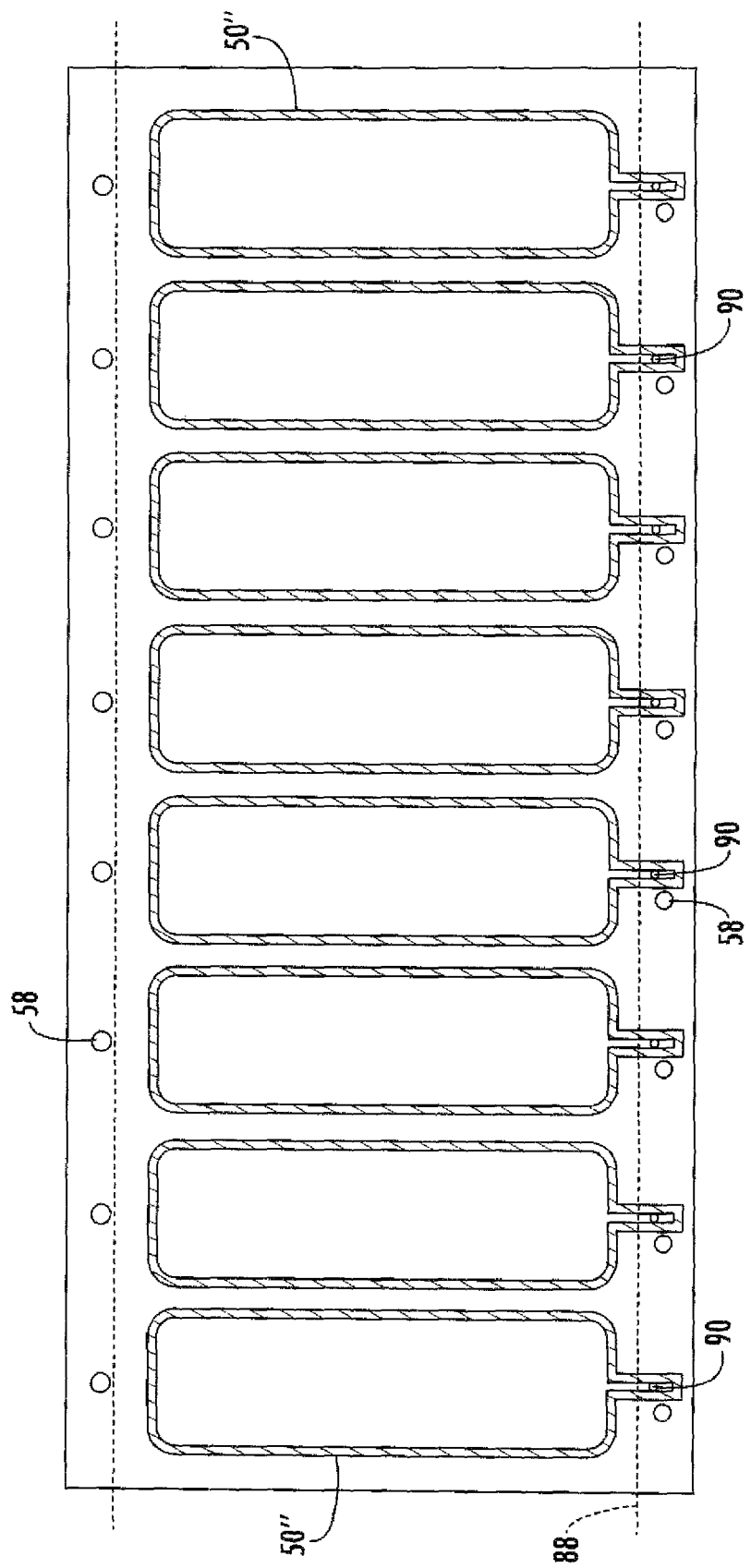
FIG. 9 is a plan view similar to FIG. 8, showing alternate fill openings.
Figure 10:
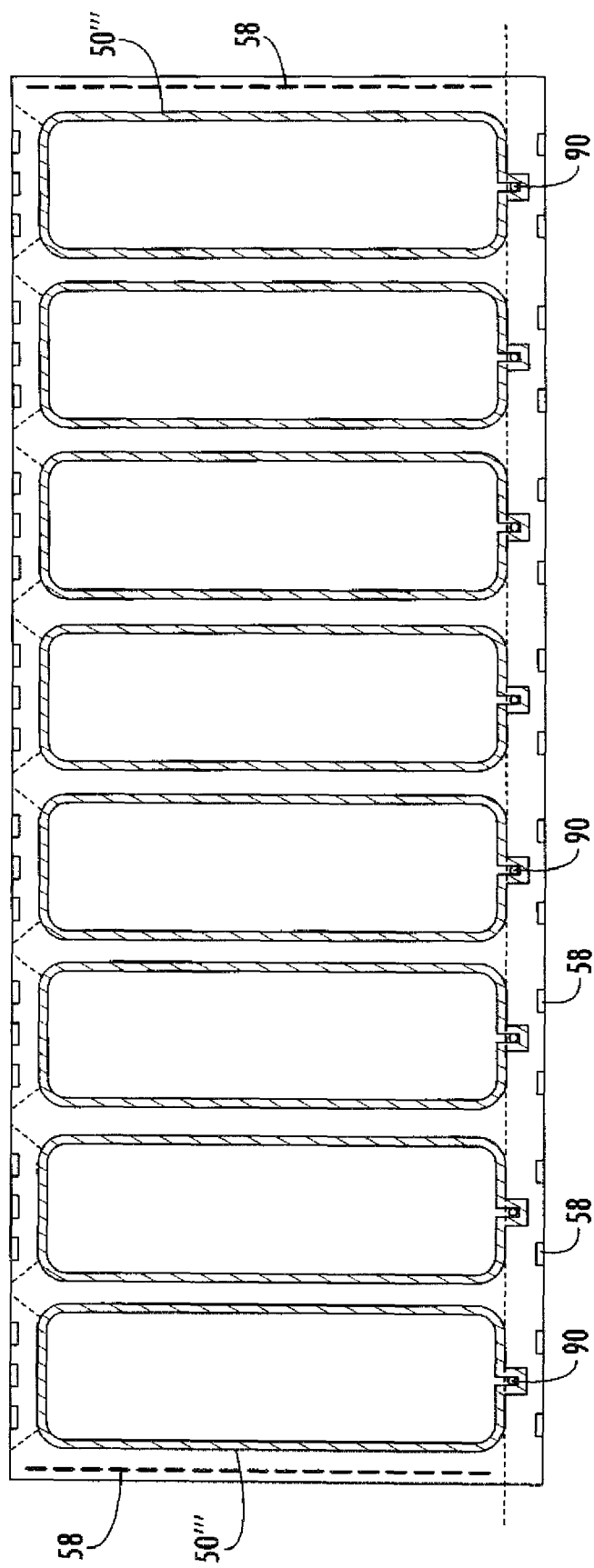
FIG. 10 is a plan view similar to FIG. 8, showing alternate fill openings.
Figure 11:
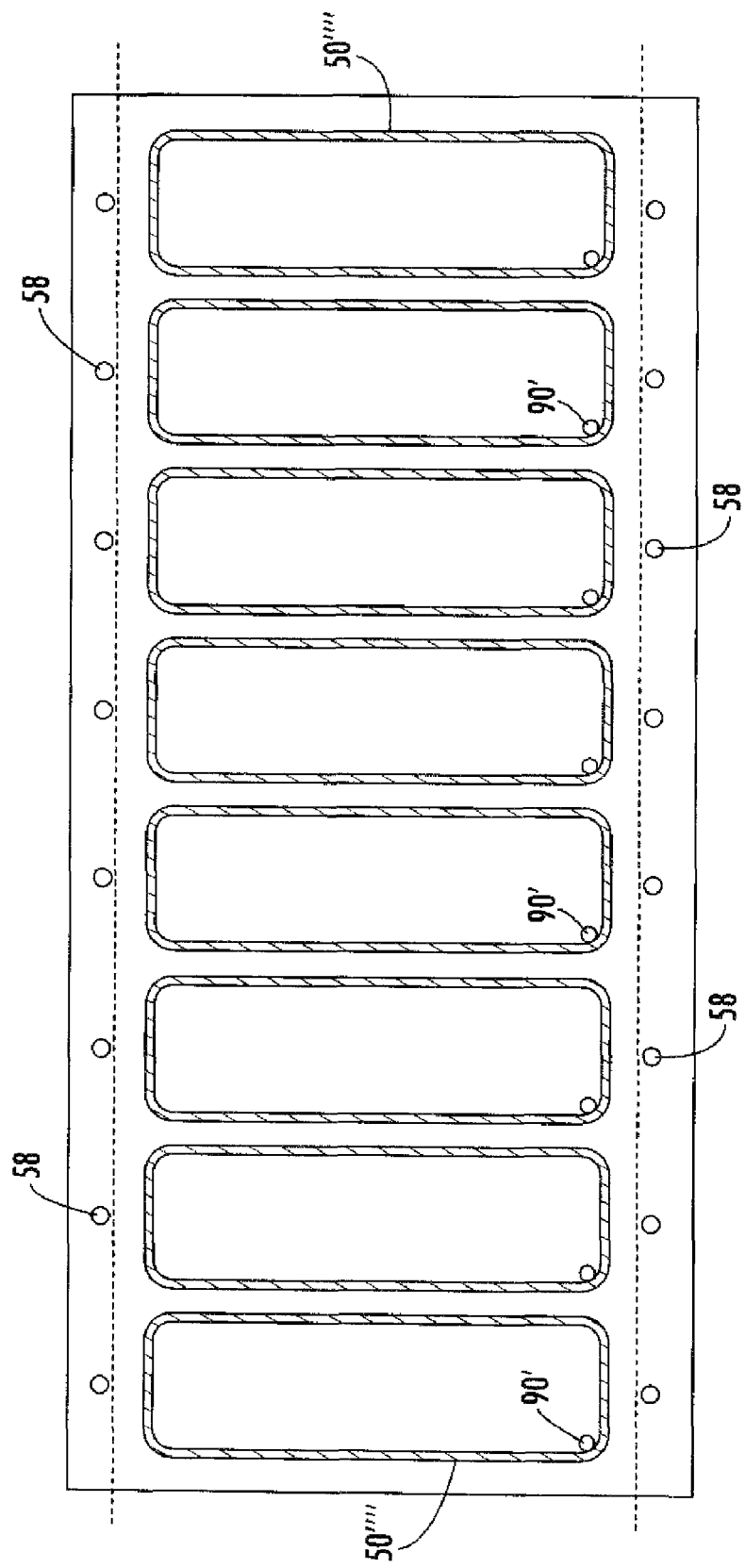
FIG. 11 is a plan view similar to FIG. 8, showing alternate fill openings.

Optionally, and with reference to FIGS. 8-11, the empty cells of the sandwich of mirror shapes may be filled and plugged before the shapes are scribed and broken/cut from the sheets. For example, and as shown in FIG. 8, the seal material shapes 50' (or a continuous seal dispensed to define multiple mirror shapes) may extend toward an edge of the sandwich of sheets, such that the interpane cavities may be vacuumed through the opening 50a' in the seal material shapes and the edge 30c of the sheet sandwich may be dipped into the electrolyte or monomer composition or electrochromic medium up to a particular level (such as shown at 88 in FIG. 8), whereby the interpane cavities or cells draw the electrolyte or monomer composition or electrochromic medium into the cavities to fill the cavities. The sandwich sheet may then be removed from the filling station and the mirror shapes may be scribed and broken/cut from the sheets, such as in the manner described above. As can be seen in FIG. 8, the sandwich of sheets is preferably dipped into the electrolyte or monomer composition or electrochromic medium to a level that is below the mirror shapes, such that when the mirror shapes are broken or cut from the sheets, the dipped portion (that may have residue thereon) is broken from the shapes, such that the cleaning process for cleaning the residue from the cells after filling may be obviated. As shown in FIG. 9, the interpane cavities may be filled in a similar manner, but the seals 50" may be individual seals without openings at an end thereof. Thus, a fill hole 90 may be drilled or otherwise formed through one of the sheets or otherwise provided at each cavity to vacuum and fill the cavities as described above. Similarly, and as shown in FIG. 10, the seals 50''' may provide a small area for the fill hole to be formed at or near the mirror shaped cavities. Optionally, and as shown in FIG. 11, the seals 50'''' may be formed to define the mirror shapes and may not have an inlet portion formed at an end of the mirror shapes. Thus, a fill hole 90' may be provided, such as at a corner of the mirror shapes, to fill the cavities. In such an embodiment, the cells would require cleaning to remove the residue from the mirror shapes.

Although shown and described as sandwiching a front sheet onto the rear sheet, optionally, the front substrates may be precut and coated and provided at the adhering step as separate substrates. The individual substrates may be adhered to the respective epoxy seal material shapes on the sheet of rear substrates, as described above. Such an approach may utilize an automated or computer controlled robot or robotic arm to place the substrates onto the seal material shapes and to provide proper location of the pre-cut front substrates on the rear sheet. The rear sheet may then be scribed and broken/cut after front substrates adhered to the sheet and after the epoxy seal material is cured. The scribing and curing processes may be substantially similar to those described above.

Also, although shown as being applied to reflective element assemblies for interior rearview mirror assemblies, the process of the present invention is equally suited for exterior reflective element assemblies, and for flat substrates or convex or curved substrates or the like. The fixturing and conveying processes are substantially the same for any of these applications and/or for different designs or shapes of interior or exterior applications, while the laser deletion (or masking) and seal dispensing may be reconfigured or adjusted to accommodate the different mirror shapes for the different applications.

Therefore, the present invention provides an enhanced coating and conveying and handling process for use in manufacturing reflective element assemblies or cells. The sheets of mirror shapes are only handled on the edges and without encroaching the pristine surfaces of the mirror shapes, such that the pristine surfaces remain untouched and undamaged through the assembly process. Because the sheets are large enough to allow for handling only at the edges and to provide multiple mirror shapes or cells, the present invention provides for enhanced and economical coating of the sheets. Also, because different shaped cells or substrates may be formed from different sheets or from the same sheet, the present invention provides enhanced flexibility of manufacturing, since the different shapes may be provided with little or no changeover of fixtures or fixturing devices and/or the like. The glass that will form the rear substrates of multiple cells may be processed as a sheet, while the front glass may be provided as a sheet or as pre-cut and pre-coated substrates that is/are adhered to the rear sheet at the appropriate location or locations.

The present invention thus provides a process that has minimum contact to the active EC area of the glass and minimum contact to the seal area. The process holds the glass along the edges during washing, so that the active EC surface and primary seal bond-line remains clean. The process of the present invention may also avoid having a conductive coating on the edge of the mirror shapes. The process also provides for cleaning, coating, and seal dispensing on the sheets, and is independent of the mirror size, shape and/or design. Also, the process may not be as sensitive to variations in the offset between the substrates as they are mated together. The process of the present invention may be implemented to coat substrates for various types of mirror reflective elements, including prismatic mirror elements. The coating process may also be modified or adjusted, and may include masking of the surface areas being coated to configure the mirror reflective element for the particular or desired applications, without affecting the scope of the present invention.

Figure 19:
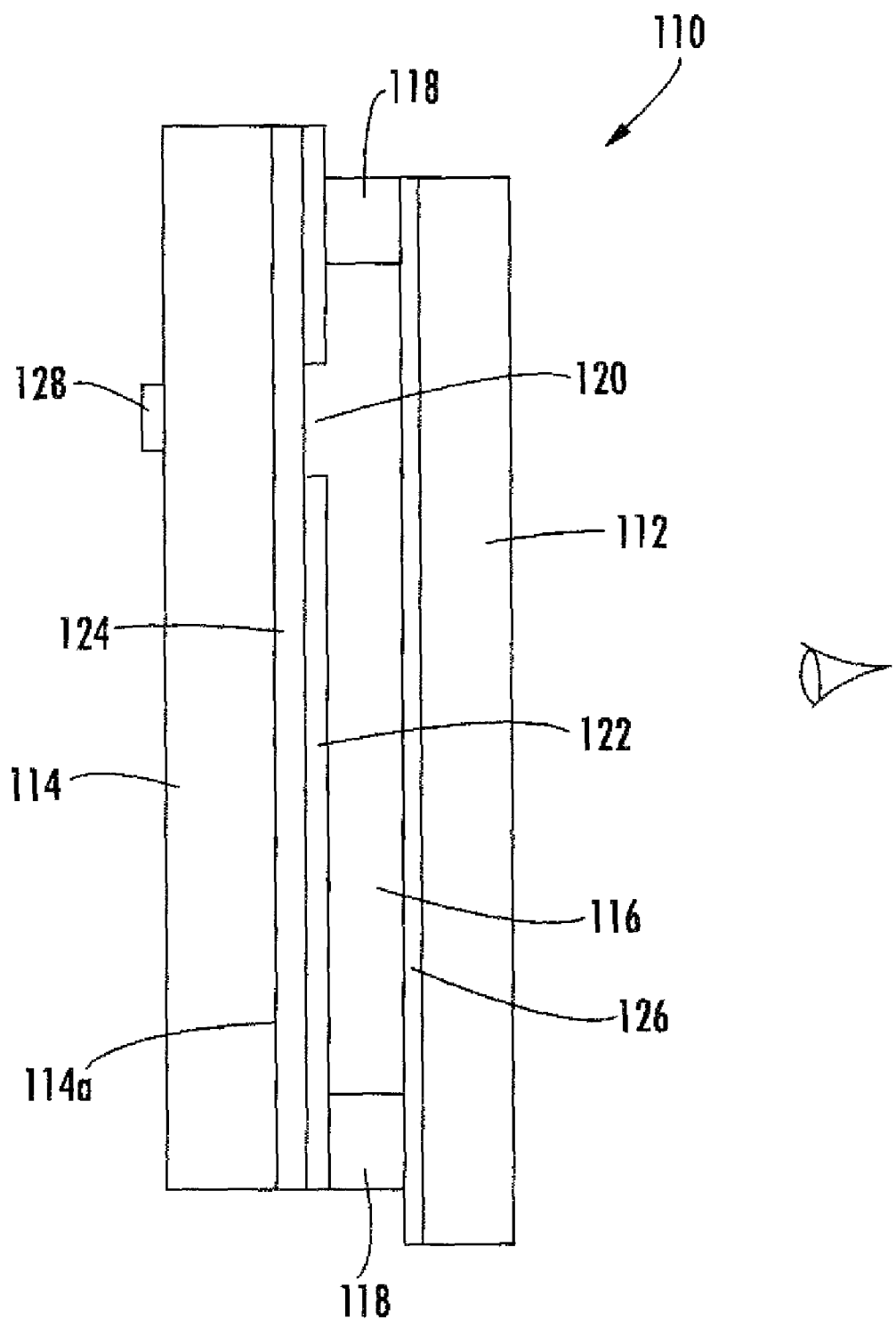
FIG. 19 is a sectional view of a third surface reflective element assembly in accordance with the present invention.

Optionally, and with reference to FIG. 19, a mirror reflective element assembly or cell 110 may include a front substrate 112 and a rear substrate 114. The front substrate 112 may be coated with a transparent semi-conductive coating or layer 126, such as an indium tin oxide (ITO) layer or a fluorine or antimony doped tin oxide (FTO) layer or other layers or coatings as described herein, while the rear substrate 114 (or sheet that will form multiple substrates as described herein) may be coated with a conductive metallic layer or coating 122, which may be coated over a transparent electrically conductive coating or layer 124.

Optionally, the mirror assembly that may receive the reflective element assembly or cell of the present invention may include electronic components and/or circuitry, such as on a printed circuit board at the rear of the reflective element assembly or otherwise positioned within or at the mirror assembly. For example, the electronic components and/or circuitry may include or be associated with display elements, such as described in U.S. Pat. Nos. 6,329,925 and 6,501,387, which are hereby incorporated herein by reference, or such as a display on demand type of display, such as of the types disclosed in commonly assigned U.S. Pat. Nos. 6,690,268; 5,668,663 and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for ELECTROCHROMIC MIRROR ASSEMBLY, and published Apr. 1, 2004 as International Publication Number WO 2004/026633, and U.S. provisional applications, Ser. No. 60/412,275, filed Sep. 20, 2002 by McCabe for ELECTROCHROMIC MIRROR ASSEMBLY; Ser. No. 60/424,116, filed Nov. 5, 2002 by McCabe for ELECTROCHROMIC MIRROR ASSEMBLY; and Ser. No. 60/489,816, filed Jul. 24, 2003 by McCabe for ELECTROCHROMIC MIRROR ASSEMBLY, which are all hereby incorporated herein by reference. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. patent application Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924, and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US03/29776, filed Sep. 19, 2003 by Donnelly Corp. et al. for ELECTROCHROMIC MIRROR ASSEMBLY, and published Apr. 1, 2004 as International Publication Number WO 2004/026633; PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication Number WO 2004/042457, and U.S. provisional applications, Ser. No. 60/490,111, filed Jul. 25, 2003 by McCabe et al. for FLUSH ELECTROCHROMIC CELL; and Ser. No. 60/423,903, filed Nov. 5, 2002 by McCabe for ONE SIDED FLUSH ELECTROCHROMIC CELL; and/or PCT Application No. PCT/US03/40611, filed Dec. 19, 2003 by Donnelly Corp. et al. for ACCESSORY SYSTEM FOR VEHICLE, which are all hereby incorporated herein by reference. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication Number WO 2004/026633, which are all hereby incorporated herein by reference. Such display devices may transmit the display information or illumination through a transflective, third surface reflective element assembly, such as described in U.S. Pat. Nos. 5,668,663; 5,724,187; and 6,690,268, and/or in U.S. patent application Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for ELECTROCHROMIC MIRROR ASSEMBLY, and published Apr. 1, 2004 as International Publication Number WO 2004/026633, which are all hereby incorporated herein by reference.

Although such transflective reflective element assemblies are capable of transmitting the illumination or display information through the assembly, it is sometimes desirable to provide a window in the metallic reflective coating through which the display information or illumination may be transmitted. Typically, such windows in the reflective coating of transflective reflective element assemblies are desirable for a glare sensor (such as a photo sensor or the like, such as a glare sensor and/or an ambient light sensor and electrochromic automatic dimming circuitry described in U.S. Pat. Nos. 4,793,690 and 5,193,029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference) or the like to be positioned at, in order to allow substantial transmission of light from the rear of the mirror assembly or vehicle through the reflective element assembly to the glare sensor positioned within the mirror assembly.

In such applications, and with reference to FIG. 19, a reflective element assembly 110 includes a front substrate 112 and a rear substrate 114, with an electrochromic medium 116 sandwiched between the substrates and a perimeter seal 118 positioned around the perimeter of the electrochromic medium and between the substrates 112, 114. Rear substrate 114 of a reflective element assembly 110 may provide a display window 120 formed in the metallic electrically conductive coating 122. The third surface 114a of the rear substrate 114 has a transparent electrically conductive layer or coating 124, such as an indium tin oxide (ITO) or indium oxide (IO) or the like, which provides a surface resistivity of preferably less than approximately 300 ohms per square, more preferably less than approximately 100 ohms per square and most preferably less than approximately 50 ohms per square. As shown in FIG. 19, the window 120 is formed through the reflective conductive layer 122, but not through the layer or layers of transparent electrically conductive coating 124 (such as indium tin oxide (ITO), indium oxide (IO), or the like) on the third surface 114a of rear substrate 114. As can be seen in FIG. 19, the transparent electrically conductive coating 124 may be applied over substantially the entire substrate surface 114a including the window area 120, in order to provide proper and substantially uniform darkening or coloring of the electrochromic medium 116 over the entire mirror region (including the window area) when the mirror reflective element assembly is energized. A display device 128 may be positioned behind the rear substrate 114 and may be viewable through the window 120 by a driver or occupant of the vehicle. The display device may comprise any type of display device or illumination source or the like, without affecting the scope of the present invention. The front substrate 112 also includes a transparent electrically conductive coating 126 (FIG. 19) deposited thereon.

The window 120 in the metallic coating 122 may be formed by coating the surface of the substrate with the transparent electrically conductive coating and then masking the window area during deposition of the metallic coating over the transparent electrically conductive coating, as discussed below. Optionally, the window in the metallic coating may be formed by coating the surface 114a of the substrate 114 with a transparent electrically conductive coating and then masking the window area, and then removing the transparent electrically conductive coating from the surface of the substrate (such as by ion beaming, laser ablation, etching or the like) except at the masked area, and then depositing the metallic coating over the glass surface except at the masked area, as also discussed below.

Typically, the substrate (or sheet of glass from which substrate shapes will be cut or formed) may be purchased with the transparent electrically conductive coating (such as indium tin oxide (ITO) or the like, such as described above) already deposited on the surface that will be the third surface of the reflective element assembly. The area of the substrate at which the window is to be formed may be masked during the process of depositing the metallic reflective coating on the transparent electrically conductive coating. The masking device may be positioned at a substrate holding fixture, which may hold one or more substrates (or which may hold a sheet from which multiple substrate shapes will be cut or formed as described above) during the coating or deposition process. The metallic coating or layer may then be deposited over the unmasked surface or layers of the substrate, such as via a vacuum deposition process, such as sputter deposition or the like. The masking device of the present invention provides a fine edge definition around the window, as discussed below.

For example, and as shown in FIGS. 20-24, a holding fixture 130 may include a plurality of openings or recesses 130a for receiving a plurality of substrates 114 therein. The substrates 114 may have the transparent electrically conductive coating (such as indium tin oxide (ITO), indium oxide (IO) or the like as described above) deposited on their front surfaces 114a. The substrates 114 may be placed into the recesses 130a of holding fixture 130, such that the perimeter regions 114b of the front surfaces 114a may rest against a tab or lip 130b of holding fixture 130 (as can be seen in FIGS. 21-24). The tab or lip 130b may provide a mask around the perimeter region to limit or substantially preclude deposition of the metallic layer at the perimeter regions 114b (and/or onto the transparent electrically conductive coating 124 applied to the substrate surface 114a).

Holding fixture 130 includes a masking device 132 positioned at or over the respective recesses for applying a mask at the appropriate area of the surface 114a of the substrate 114 (and over the transparent electrically conductive coating already applied to the substrate surface 114a) during the deposition process. More particularly, the masking device 132 may provide a masking plate at a location remote from the perimeter edges of the substrate surface so as to form a window in the metallic coating after the metallic electrically conductive material is deposited on the substrate surface. In the illustrated embodiment of FIG. 20, the holding fixture 130 is shown with different types of masking devices 132 (referenced individually at 134, 136, 138 and discussed in detail below) positioned at or over the respective recesses 130a. However, the holding fixture may typically have the same type of masking device at each recess or may have a single masking fixture over all of the recesses, without affecting the scope of the present invention.

The masking device 132 functions to position a masking plate at a desired area in a manner that is repeatable and that retains the masking plate at the desired area during the coating process. Although shown in FIG. 20 and described below as being positioned at or near each individual substrate of a holding fixture for multiple substrates, it is envisioned that a masking device of the present invention may function to position multiple masking plates or members at or over multiple window locations on a sheet of glass that will be coated and then cut into multiple substrate shapes (such as discussed above), without affecting the scope of the present invention. Optionally, for a curved substrate having a curved surface, it is envisioned that the masking element may be correspondingly curved or may comprise a flexible or pliable material and may flex to conform to the surface being masked when the masking element is positioned against the curved surface, without affecting the scope of the present invention.

Figure 20:
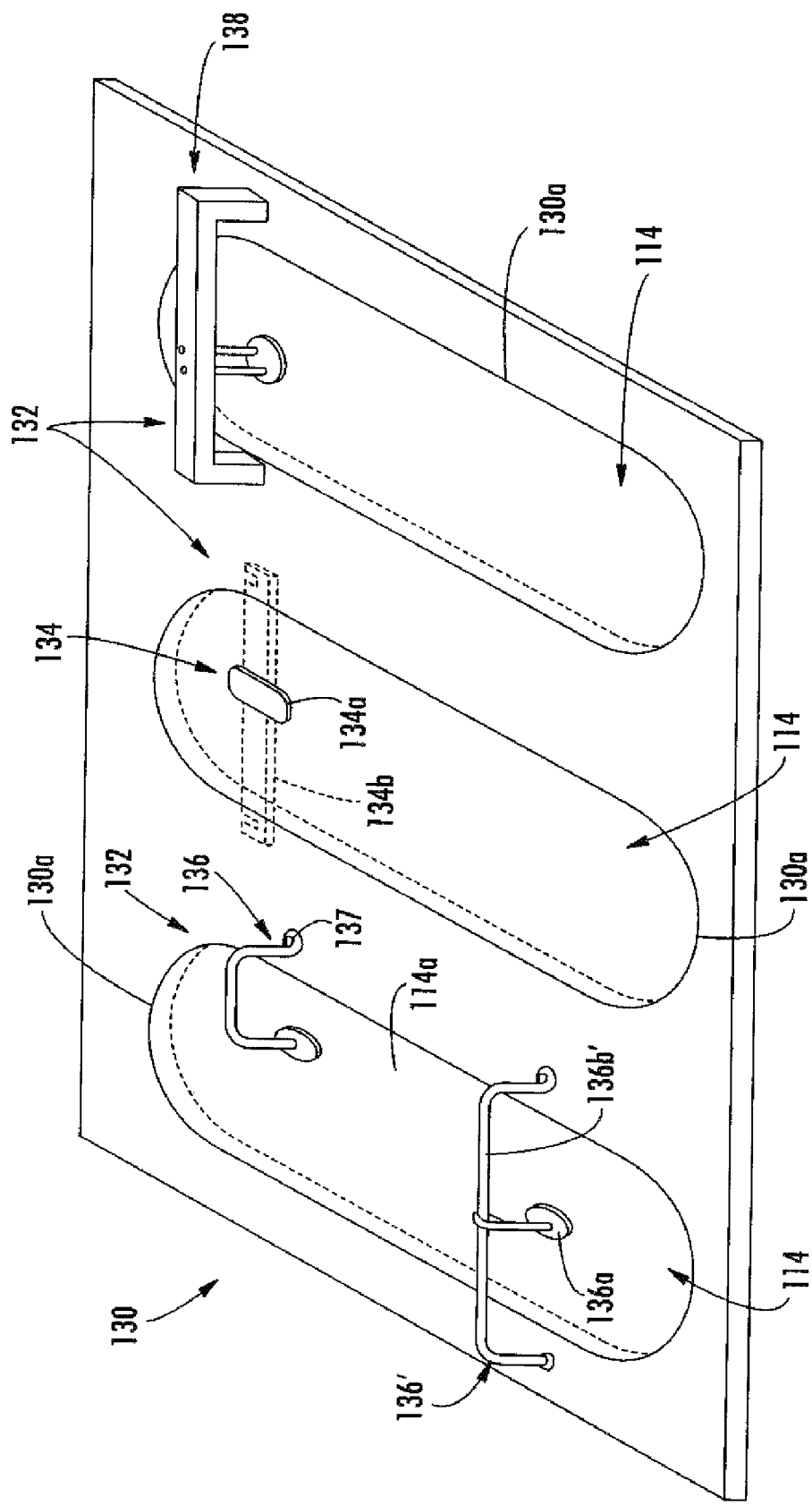
FIG. 20 is a perspective view of a substrate holding fixture for holding one or more substrates during a coating or deposition process, showing various masking devices in accordance with the present invention.
Figure 21:
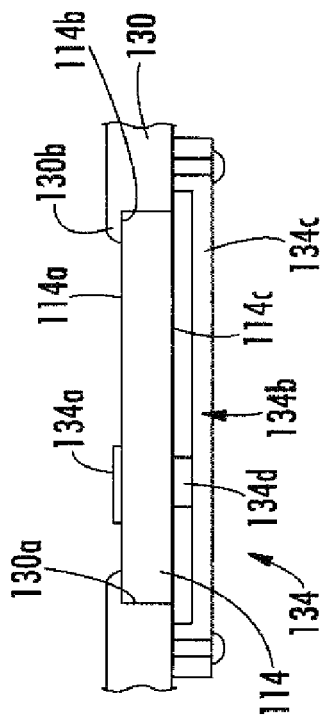
FIG. 21 is a side elevation of a magnetic masking device in accordance with the present invention.

With reference to FIGS. 20 and 21, the masking device 132 may comprise a magnetic masking device 134 having a masking plate 134a, which may comprise a metallic material or a magnetic material, and a positioning device or member 134b. Positioning device 134b may be secured to the fixture 130 and may extend at least partially over the rear surface 114c of the substrate 114 after the substrate 114 is positioned in the recess 130a. Positioning device 134b includes an arm or bar 134c and a magnetic element 134d attached to bar 134c. Positioning device 134b may be releasably secured in place to the fixture 130 after the substrate is placed in the recess. Positioning device 134b may be releasably secured via any fastening or attaching means, such as via fasteners or the like being received in slots on the positioning device or the like, without affecting the scope of the present invention. When positioning device 134b is secured to fixture 130, magnetic element 134d is positioned generally at or against the rear surface 114c of substrate 114 and at a location that corresponds with the desired location for the window that is to be formed on the front surface 114a of the substrate 114 positioned in the respective recess 130a of fixture 130. The masking plate 134a may then be placed at the desired location on the front surface 114a, and may be retained in position via magnetic attraction between the masking plate 134a and the magnetic element 134d.

After the masking plate or element is positioned and retained in the desired location, the holding fixture and substrate (or substrates or sheet of glass) may be placed in a coating chamber, such as a vacuum deposition chamber or the like, preferably a sputter deposition chamber, and the metallic coating may be deposited over the front surface 114a of the substrate (and over the transparent electrically conductive coating or layer on the substrate surface 114a) except in the area that is masked by masking plate or element 134a. Because the positioning device or member is substantially fixedly positioned at or attached to the fixture 130, the magnetic element 134d may be repeatedly positioned at substantially the same location for each substrate that is placed into the respective recess of the holding fixture. The masking plate 134a thus may be placed on the surface 114a of the substrate 114 and may be held in the desired location by the magnetic element. Preferably, the masking plate or element may be placed at the desired location via an automated device or robot or CNC or the like to enhance the repeatability and precision of the placement of the masking plate on the substrate surface. Also, because the masking plate is retained in place against the substrate surface via the magnetic attraction of the elements, the masking plate provides a window with a fine edge definition around the edges of the window. Although shown and described as being a magnetic positioning device and a metallic masking plate, clearly, the masking plate may comprise a metallic element or magnetic element and the positioning device may comprise a metallic element or magnetic element to provide the desired magnetic attraction between the objects, without affecting the scope of the present invention.

Figure 22:
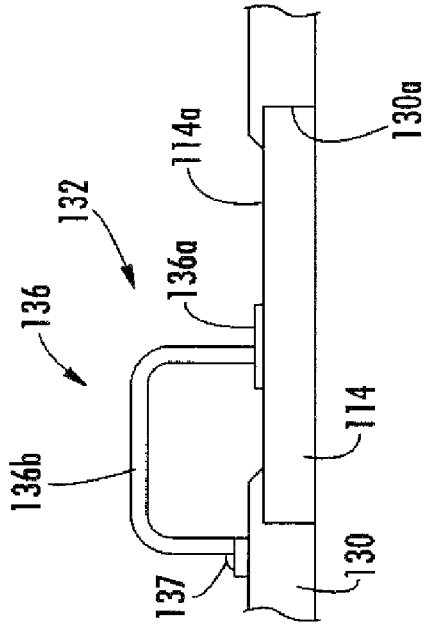
FIG. 22 is a side elevation of another masking device in accordance with the present invention, with the mask attached to an end of a mounting arm.

With reference to FIGS. 20 and 22, the masking device 132 may comprise a masking fixture or device 136 that includes a masking plate 136a attached to an end of a mounting arm or positioning arm 136b. Positioning arm 136b may be secured to the substrate holding fixture 130 (such as via a fastener 137 or the like) and may extend at least partially over the front surface 114a of the substrate 114 when the substrate 114 is positioned in the recess 130a. Positioning arm 136b may be formed or bent to extend upwardly or outwardly from the fixture 130 and to curve over the substrate and down toward the substrate surface 114a. The positioning arm 136b may be bent or curved or formed outward in this manner to position the arm at a desired or appropriate distance away from the surface 114a of substrate 114, such that the arm will not partially mask or shadow the substrate during the deposition process.

When the substrate 114 is positioned in the recess 130a, masking plate 136a is thus positioned at the desired area of surface 114a to mask the window area of the substrate surface 114a. The substrate holding fixture 130 and the substrate or substrates or glass sheet may then be placed in a coating chamber, such as a vacuum deposition chamber or the like, such as a sputter deposition chamber, and the metallic coating may be deposited over the front surface 114a of the substrate except in the area that is masked by masking plate 136a. The positioning arm 136b may be formed of a thin wire or metallic material to minimize the shadowing effect of the arm over the substrate surface between the window area and the edge of the substrate at or near the mounting location of the arm to the substrate fixture. Optionally, and as shown in FIG. 20, a positioning arm 136b' of a masking device 136' may extend across the substrate recess of the fixture and may be secured to the fixture at both ends to form a bridge across the substrate for mounting a masking plate 136a. Optionally, a positioning arm or bridge may function to position two or more masking plates on one or more substrates positioned at the substrate holding fixture, without affecting the scope of the present invention.

Figure 23:
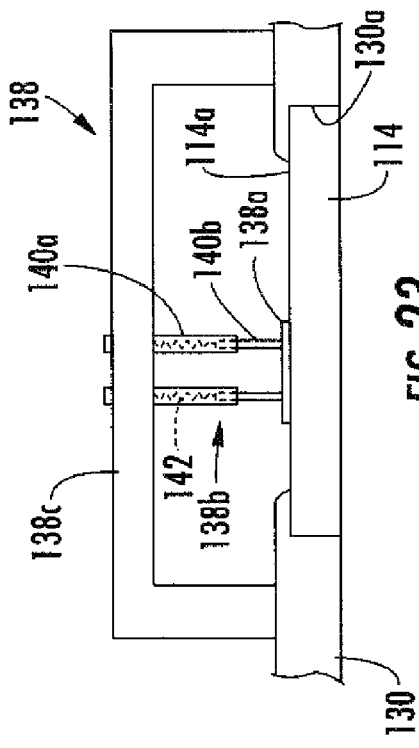
FIG. 23 is a side elevation of another masking device in accordance with the present invention, with the mask supported by a bridge extending over the substrate.
Figure 24:
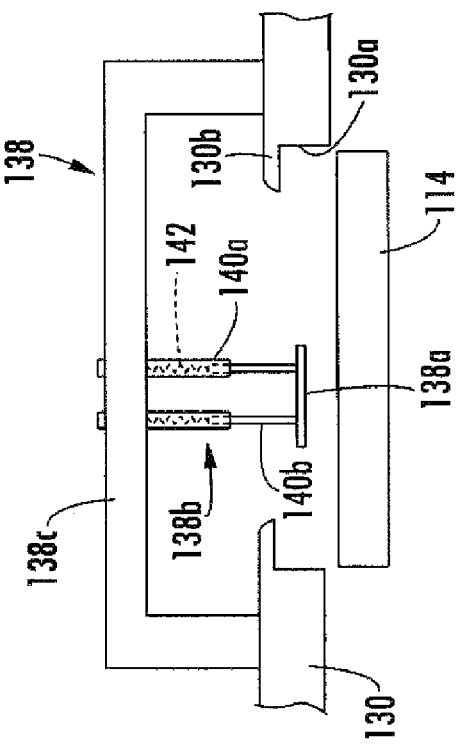
FIG. 24 is a side elevation of the masking device of FIG. 23, showing the masking device in its extended orientation when the substrate is removed from the fixture.

Optionally, and with reference to FIGS. 20, 23 and 24, the masking device 132 may comprise a masking bridge or device 138 that includes a masking plate 138a attached to an arm 138b extending downward (or toward the substrate 114) from a mounting or positioning bridge 138c. Positioning bridge 138c may be secured at opposite ends to the fixture 130 and may extend over the front surface 114a of the substrate 114 (or over two or more substrates) when the substrate or substrates is/are positioned in the recess or recesses 130a. In the illustrated embodiment, the bridge extends generally transverse to the longitudinal axis of the substrate, but could be otherwise positioned or oriented relative to the substrate or glass sheet, without affecting the scope of the present invention.

Positioning bridge 138c may be formed or bent to extend upwardly or outwardly from the substrate holding fixture 130 at opposite sides of the recess 130a and to extend over the substrate 114. The bridge 138c is formed in this manner to position the upper portion of the bridge at a desired or appropriate distance away from the surface 114a of substrate 114, such that the bridge will not partially mask or shadow the substrate during the deposition process. When the substrate 114 is positioned in the recess 130a, masking plate 138a is positioned at the desired area of surface 114a to mask the window area of the substrate surface. The substrate holding fixture and substrates may then be placed in a coating chamber, such as a vacuum deposition chamber or the like, such as a sputter deposition chamber, and the metallic coating may be deposited over the front surface 114a of the substrate except in the area that is masked by masking plate 138a.

Optionally, and with reference to FIGS. 23 and 24, arm 138b may comprise a spring-loaded or biased arm having one arm portion 140a attached to bridge 138c and another arm portion 140b attached to masking plate 138a, whereby arm portion 140b is movably or adjustably connected to or attached to or engaged with arm portion 140a. In the illustrated embodiment, the arm comprises a telescopic arm, with the outer arm portion 140a being fixedly secured to bridge 138c, and the inner arm portion 140b being slidably or telescopingly extendable and retractable relative to outer arm portion 140a. This allows the masking plate 138a to be initially positioned at a level generally below or beyond the surface 114a of substrate 114 (as shown in FIG. 24), such that when substrate 114 is placed in recess 130a, substrate 114 may press upward against masking plate 138a and may urge masking plate 138a upward. Preferably, telescopic arm 138b may be biased or spring-loaded toward its extended position (shown in FIG. 24), such as via a biasing member or spring 142 or the like. Masking plate 138a may thus be biased or urged or pressed downward against surface 114a of substrate 114 to maintain masking plate 138a in substantially tight engagement with the surface of the substrate (as shown in FIG. 23). This provides an enhanced engagement of the masking plate to the substrate surface to limit or substantially preclude seepage of the conductive metallic material under the edges of the masking plate, which, in turn, may result in substantially straight and clean or crisp lines or fine edge definition of the edges of the metallic coating around the masked window area.

The masking plate may have a length and a width and a longitudinal axis extending along its length dimension. Preferably, the arm or bridge of the masking device is positioned to extend upward from the masking plate and may curve to be generally perpendicular to the longitudinal axis of the masking plate. Also, the width or thickness of the arm or bridge may be selected to be less than approximately 1/5 of the length of the masking plate, more preferably less than 1/10 of the length of the masking plate, and the height of the arm may be greater than at least approximately 1/2 inch, preferably greater than approximately one inch and more preferably greater than approximately 1 1/2 inches, in order to minimize any shadowing effect that the arm or bridge may have on the metallic coating applied to the surface of the substrate around the masking plate.

The present invention thus provides a masking device that masks the desired window area of a substrate for a third surface reflective element assembly. The masking device may repeatedly mask the desired areas when the substrate is placed in the holding fixture and may be readily positioned at the appropriate location to enhance the high volume manufacturing of the substrates and reflective element assemblies. The masking plate may be affirmatively urged (by means such as resilient spring-like action or force, or by magnetic forces or other urging means) into substantially intimate contact with the surface being masked (and if the surface is convex or concave, the masking plate may be urged to conform to the shape or curvature of the local area of the substrate being masked). The substrate holding fixture and the masked substrate or substrates may then be placed in a vacuum deposition chamber or the like, such as a sputter deposition chamber, and the metallic electrically conductive layer or coating may be deposited on the surface of the substrate or onto the transparent electrically conductive layer on the substrate surface. After the metallic layer is deposited on the substrate surface, the substrate has a conductive layer or layers over substantially its entire surface including the window area, which is coated by the transparent electrically conductive coating or layer. The window area may have a fine edge definition around the edges of the window (which may be any desired shape, such as a rectangle, circle, oval or the like) because the mask is retained in the desired position during the coating process, such that particles of the coating are not accumulated at the region of the substrate mask.

Although shown and described as masking a window area by placing a masking plate on the transparent electrically conductive layer of the substrate and applying the metallic coating over the transparent electrically conductive layer except in the masked or window area, it is envisioned that the masking device of the present invention may be applied to the transparent electrically conductive layer as described above, and the transparent electrically conductive layer may then be substantially removed from substantially the entire surface of the substrate except at the masked area. The transparent coating may be removed from the substrate surface via ablating or etching the surface, or via ion beam bombardment or milling of the surface, without affecting the scope of the present invention. The metallic electrically conductive layer or coating may then be deposited directly on the glass surface of the substrate except at the masked area, such that the substrate has different but adjacent and preferably contacting conductive layers over substantially the entire substrate surface (e.g. a metallic electrically conductive reflective coating over the surface except at the window area, which is coated with the transparent electrically conductive coating or layer).

For example, the substrate surface may be initially coated with a transparent electrically conductive coating, such as a low cost tin oxide coating or the like, such as the types described in U.S. Pat. Nos. 6,420,036; 6,245,262; 6,154,306; and 5,724,187, which are hereby incorporated herein by reference. For example, a mirror assembly manufacturer may purchase tin oxide-coated glass substrates or sheets, such as sold by the LOF Glass division of Libbey-Owens-Ford Co., Toledo, Ohio under the trade name of "TEC-Glass" products, such as "TEC 10" (10 ohms per square sheet resistance), "TEC 12" (12 ohms per square sheet resistance), "TEC 15" (15 ohms per square sheet resistance) and "TEC 20" (20 ohms per square sheet resistance) tin oxide-coated glass and the like. Moreover, tin oxide coated glass substrates, such as commercially available from Pittsburgh Plate Glass Industries, Pittsburgh, Pa. under the "SUNGATE" trade name, may be advantageously employed herein. Typically, such tin oxide coatings may not be desired for a reflective element having a metallic layer deposited on the low cost transparent coating due to coloration concerns or yellowing when the coatings are combined or layered. However, because the process of the present invention may remove the low cost transparent tin oxide coating or the like from the surface of the substrate except in the window area, and may then apply or deposit the metallic electrically conductive layer over the surface of the substrate except in the window area, there is no overlapping of the metallic electrically conductive layer and the low cost transparent electrically conductive coating, such that the coloration concerns are substantially obviated.

Figure 25:
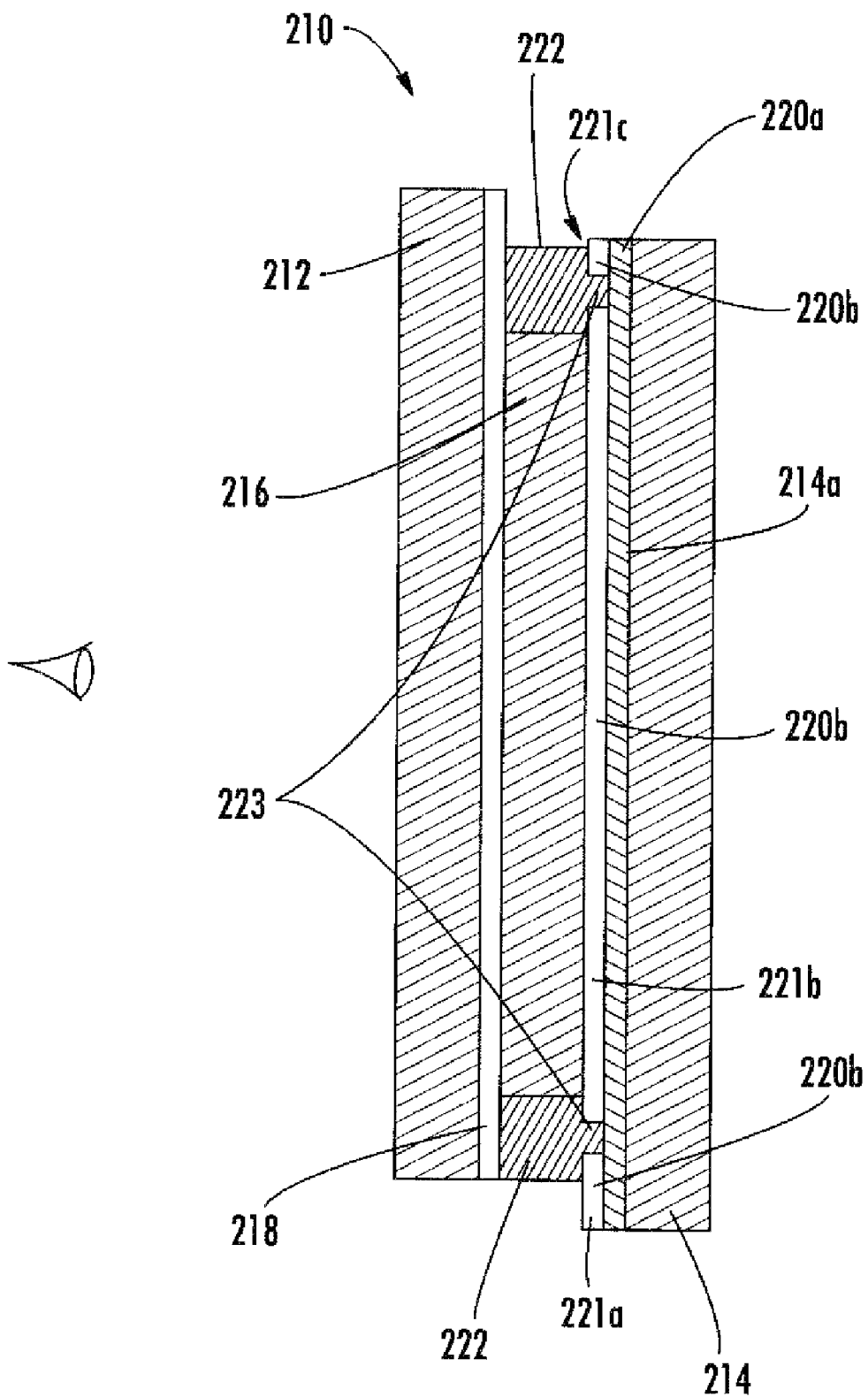
FIG. 25 is a sectional view of another mirror reflective element assembly in accordance with the present invention.

Optionally, and with reference to FIG. 25, a mirror reflective element assembly or cell 210 may include a front substrate 212 and a rear substrate 214. The front substrate 212 may be coated with a transparent semi-conductive coating or layer 218, such as an indium tin oxide (ITO) layer or a fluorine or antimony doped tin oxide (FTO) layer or other layers or coatings as described above, while the rear substrate 214 (or sheet that will form multiple substrates as described above) may be coated with an environmentally stable or substantially non-corrosive conductive layer 220a (such as a layer of chrome or indium tin oxide (ITO) or fluorine or antimony doped tin oxide (FTO) or the like) deposited on the surface 214a of the substrate 214 (which is the third surface of the cell 210) and a conductive metallic layer or coating 220b. The conductive metallic coating 220b (such as silver or other reflective coating(s) or layer(s) as described above with respect to layer/coating 20), may be applied or deposited over the environmentally stable layer 220a, and may be removed, such as by laser deletion or the like (or the sheet or substrate may be masked during the coating process of the conductive silver coating), to provide a separated or isolated region or band 221a around at least a portion of the perimeter of the coating of the particular substrate or mirror shape, such as via laser deletion or ablation or etching or chemical etching or sandblasting or the like, such as described above. The isolated region 221a is thus isolated or physically separated from the main conductive surface or EC active area 221b of the rear substrate 214 by a deletion line or isolating line 223.

As shown in FIG. 25, the isolated perimeter area or areas 221a of the conductive layer (which may be environmentally unstable and thus susceptible to corrosion) may extend outward from the epoxy seal 222 when the cells are assembled. The isolating line or separating line 223 between the outer portion 221a of the conductive layer and the main EC active surface 221b of the third surface 214a provides for corrosion isolation between the portions of the conductive layer, because corrosion that may occur at the outer regions 221a of the metallic or environmentally unstable layer or layers cannot cross over the physical break 223 in the conductive layer or layers 220b.

The environmentally unstable layer 220b (preferably a silver or silver alloy, highly reflective metal layer or the like) may be selectively removed or ablated such that the environmentally stable conductive layer 220a (that is beneath the environmentally unstable layer 220b and between the environmentally unstable layer 220b and the substrate surface 214a) is not removed or ablated from the substrate surface 214a. The laser ablation or laser deletion process thus only cuts or removes a portion of the coatings on the substrate surface. After the environmentally unstable layer 220b is removed along the deletion line 223, the remaining environmentally stable layer is sufficient to conductively bridge the gap between the isolated region 221a and the EC active area 221b of the environmentally unstable coating or layer 220b.

Accordingly, if the outer portion 221a begins to corrode (such as may occur over time), the isolation line 223 limits or substantially precludes spreading of the corrosion to the main surface or EC active surface 221b of the rear substrate 214. The EC active surface 221b thus remains corrosion free. The environmentally stable surface 220a serves to conductively bridge the isolation gap or line 223, such that electrical conductivity from the outer region 221a (such as at a tab-out portion or along a conductive rail or raceway along a perimeter portion of the substrate 214) to the main EC active surface 221b is not broken. Because the environmentally stable layer 220a may not be as highly conductive as the conductive silver layer 220b or the like, the isolation lines 223 are selected to be small enough to avoid a significant loss in conductivity to the EC active surface, yet large enough to isolate the EC active surface layers from corrosion at the outer regions. For example, the gap may be dimensioned to be approximately 0.1 mm to approximately 1 mm wide or thinner or wider as may be desired depending on the particular application, without affecting the scope of the present invention.

The isolating line or gap 223 may extend substantially around the perimeter region of the cell where the non-conductive epoxy seal material 222 may be applied (and which may fill in the isolating line or gap to insulate the outer perimeter region 221a from the main EC active surface 221b, which coincides with the pristine surface). As shown in FIG. 25, the isolation line 223 may be positioned along at least a portion of the substrate and may be filled or partially filled by the seal material 222. Preferably, the isolation line is positioned toward the outer perimeter region or edge of the seal material, but may be positioned at the middle or inner regions of the seal material, without affecting the scope of the present invention.

Optionally, the isolating line or deletion line 223 may not extend fully around perimeter, but may be along a portion of the substrate to define an isolated island or region or regions at and along one or more portions of the substrate. For example, the isolation line 223 may not be provided in some areas or perimeter regions of the substrate, such as at the flush region 221c where the seal 222 is substantially flush with the perimeter edge of the substrate 214, or elsewhere around the perimeter of the substrate where such an isolation line may not be needed or desired, depending on the particular application. As can be seen in FIG. 25, the coatings 220a, 220b may cover the substrate 214 toward its perimeter edge or edges, while the seal material 222 may not extend as far toward the perimeter edge or edges, such that the edge or perimeter portion of the coatings 220a, 220b extends past the seal material, such as shown at 221c in FIG. 25. The seal material thus may not extend to the cut line of the substrate, yet substantially or fully fills the isolation line 223.

The isolating line or gap of the present invention thus limits or substantially precludes the spreading of corrosion into an electrochromic cell by isolating the outer perimeter edges of the conductive metallic layer or coatings from the inner EC active areas of the coatings. The present invention thus obviates the need to mask the perimeter regions of the substrate (which is typically done to limit exposure of the outer edges of the metallic coatings except where may be needed for electrical connection), and further obviates the need to provide a tab-out region at an outer perimeter portion of the substrate and to encapsulate the tab-out or exposed region or edges of the metallic coatings. The conductive layers or coatings thus may be deposited over the entire surface of the substrate, and do not have to be substantially masked (or laser removed or the like) around the perimeter of the substrate or mirror shape. Rather, a thin line or gap may be ablated or removed around or partially around the perimeter of the shape or substrate to isolate the outer perimeter portion or portions of the metal layers or coatings from the main portion of the layers or coatings at the EC active surface of the shape or substrate. The isolation line or gap functions to corrosively isolate the outer portions (which may extend past the seal material and thus may be exposed to the elements) from the EC active area, while the environmentally stable coating or layer provides a conductive but non-corrosive bridge between the regions. The isolation line and coatings of the present invention may be formed on a rear sheet of the types described above, or may be formed on other types of rear substrates and shapes, without affecting the scope of the present invention.

Figure 26:
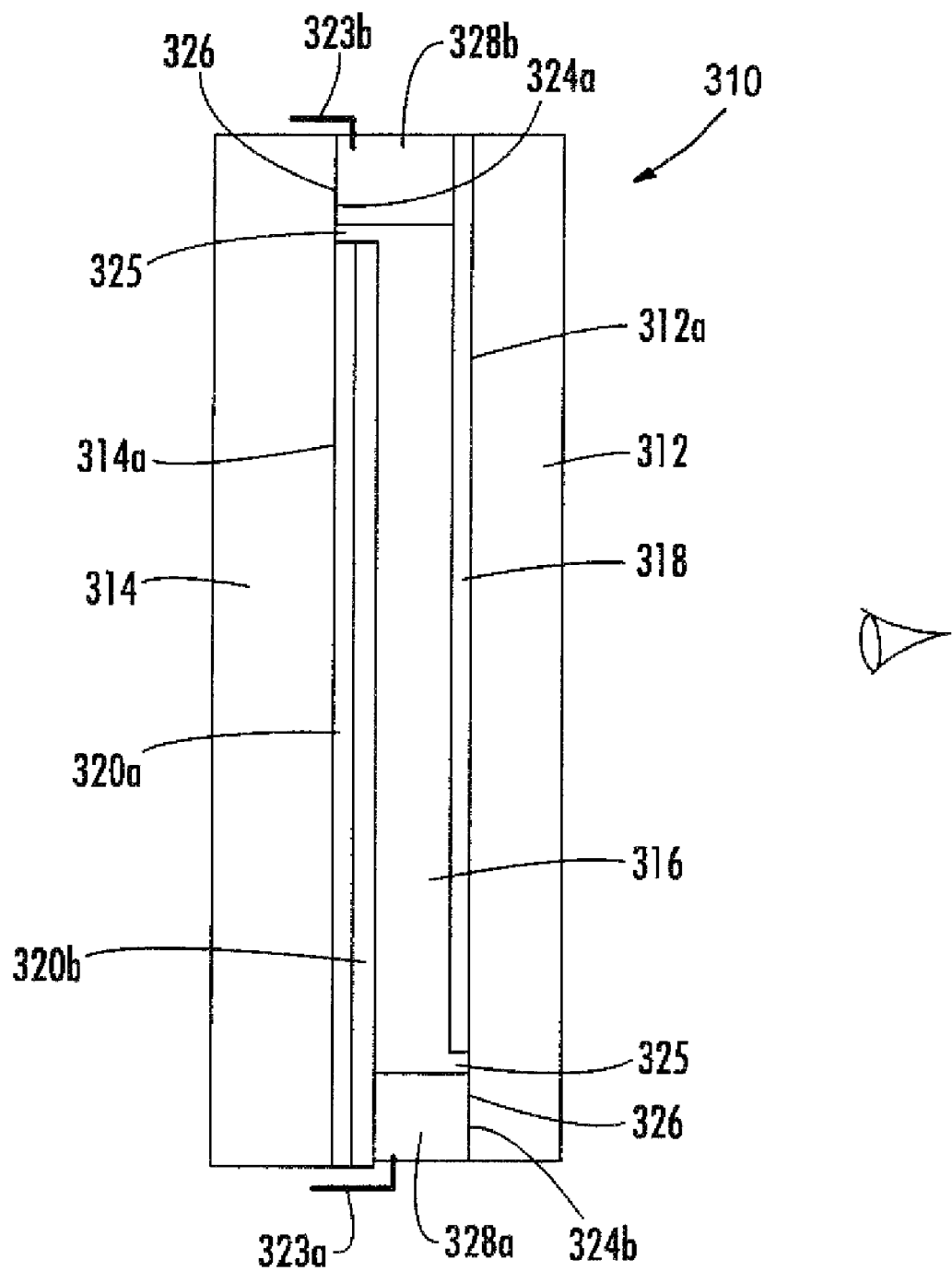
FIG. 26 is a sectional view of another mirror reflective element assembly in accordance with the present invention.
Figure 27:
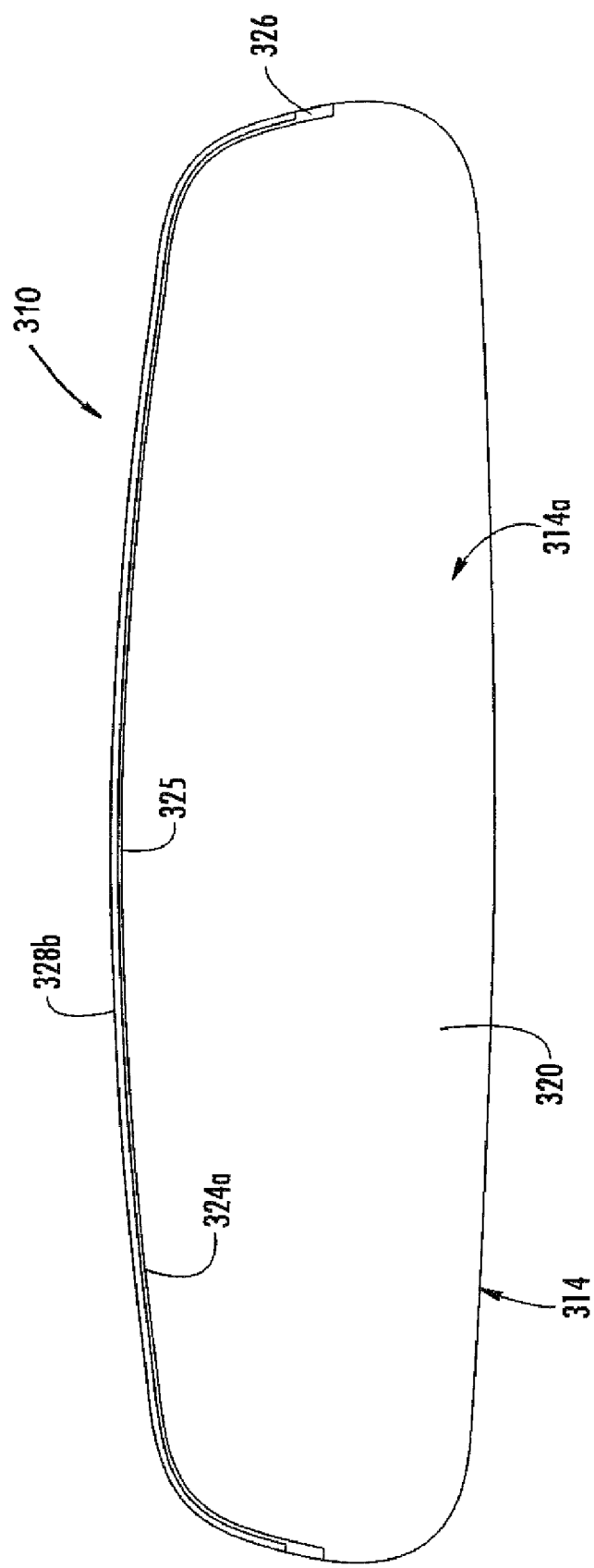
FIG. 27 is a plan view of the rear substrate of the mirror reflective element assembly of FIG. 26.

Optionally, and with reference to FIGS. 26 and 27, a mirror reflective element assembly or cell 310 of the present invention includes a front substrate 312 and a rear substrate 314 with an electrochromic medium 316 sandwiched therebetween. The rear surface 312a of the front substrate 312 (i.e. the second surface of the cell) may be coated with a transparent semi-conductive coating or layer 318, such as an indium tin oxide (ITO) layer or other layers or coatings as described above, while the front surface 314a of the rear substrate 314 may be coated with a transparent electrically conductive coating or layer 320a deposited on the front surface 314a of the substrate 314 (which is the third surface of the cell) and a conductive metallic layer or coating 320b over the transparent electrically conductive coating 320a. As can be seen in FIG. 26, a deletion border or non-conductive track or region or path 324a, 324b may be masked or formed along a perimeter region 326 of the surfaces 312a, 314a of each of the substrates 312, 314, respectively, such that the conductive coatings 318, 320a, 320b are not present at the perimeter regions 326. For example, and as shown in FIG. 27, deletion border 324a may extend along the upper perimeter region 326 of the surface 314a of rear substrate 314 (and the deletion border 324b may likewise extend along the lower perimeter region of the surface 312a of front substrate 312).

The electrochromic medium 316 is contained between the substrates 312, 314 and sealed therein by two or more separated and electrically isolated conductive seal portions 328a, 328b that contact the respective conductive layers 320b, 318. For example, a conductive epoxy seal portion 328a may be disposed around and between the lower perimeter of the substrates and may contact the conductive layer or coating on one of the substrates at the lower portion (such as the coatings 320a and/or 320b along the lower portion of the rear substrate 314) and may contact the non-conductive perimeter region of the other substrate along the same portion (such as the deletion border 324b along the lower portion of the front substrate 312). Likewise, a second and separate and electrically isolated conductive epoxy seal portion 328b may be disposed around and between the upper perimeter of the substrates and may contact the non-conductive perimeter region of the one substrate (such as the deletion border 324a along the upper portion of the rear substrate 314) and may contact the conductive layer or coating on the other substrate along the upper portion (such as the coating 318 along the upper portion of the front substrate 312). As shown in FIG. 27, the conductive seal portion 328b may be disposed along the glass surface or non-conductive region 324a along the upper perimeter portion of the rear substrate 314, while the conductive seal portion 328a is likewise disposed along the glass surface or non-conductive region 324b along the lower perimeter portion of the front substrate 312. The conductive seal portions 328a, 328b may comprise a conductive sealant material, such as an epoxy (such as a sealant material or epoxy of the types described in U.S. Pat. Nos. 6,207,083; 5,724,187; 5,233,461; and 5,142,407, which are hereby incorporated herein by reference) filled or partially filled or mixed with conductive elements, such as metallic elements, such as silver, chromium or the like, or other form of conductive sealant. The conductive seal portions 328a, 328b are disposed along the deletion borders such that a gap 325 exists between the conductive seal portions and the respective conductive layers or coatings on the surface of the respective substrate.

The conductive seal portions 328a, 328b may be separated by gaps (not shown) between the opposing ends of the seal portions, such that the seal portions are not in contact with one another. As can be seen with reference to FIG. 27, the conductive seal portions may be disposed along the respective deletion border and may stop short of the ends of the deletion borders (although the rear substrate is shown in FIG. 27, the front substrate may include a similar deletion border and seal portion, but along the lower perimeter region of the substrate surface), such that the gaps between the opposed ends of the seal portions are generally in areas where the deletion borders of the two substrates may overlap when the substrates are sandwiched together. The gaps may be plugged with a non-conductive seal or plug material, such as a UV curable or heat curable seal or plug material (such as described in U.S. Pat. Nos. 6,207,083; 5,724,187; 5,233,461; and 5,142,407, which are hereby incorporated herein by reference), to substantially seal the cell and limit or substantially preclude electrical connectivity between the two conductive seal portions. For example, one of the gaps may be initially plugged with a non-conductive material or plug, and then the reflective element assembly may be filled with the electrochromic medium through the other gap or opening or port between the conductive seal portions. After the reflective element assembly is filled with electrochromic medium, the other gap or opening (i.e., the fill opening or fill port) may be plugged with a non-conductive material or plug to seal the electrochromic medium within the reflective element assembly or cell.

The mirror reflective element assembly 310 includes electrical contacts or connectors 323a, 323b (FIG. 26) that may contact the respective conductive seal portions 328a, 328b to provide electrical current to the conductive seal portions 328a, 328b. Because the seal portions 328a, 328b comprise a conductive sealant material, such as a conductive epoxy or the like, and because the individual seal portions contact the conductive layer or coating on only one of the substrates, the seal portions communicate the electrical current to the respective conductive layer or layers and act as an electrical raceway along the respective portion of the reflective element assembly. The deletion borders and the nonconductive plugs isolate each conductive seal portion from one another, such that the conductive seal portions energize only the respective conductive layer or layers that they are disposed at and along.

The electrical contacts or connectors 323a, 323b may be inserted partially into the respective conductive seal portion or may otherwise contact an exterior portion of the conductive seal portion to communicate the electrical current to the seal portions, without affecting the scope of the present invention. Because the seal portions are conductive, the electrical contacts may engage or contact or insert into the respective seal portion and do not have to clip onto the respective substrate or otherwise contact the conductive layer on the substrate. Therefore, the reflective element assembly of the present invention may provide a substantially flush or even or unstaggered reflective element assembly (as can be seen in FIG. 26), with the upper and lower portions of both substrates being substantially aligned or flush with one another.

Figure 28:
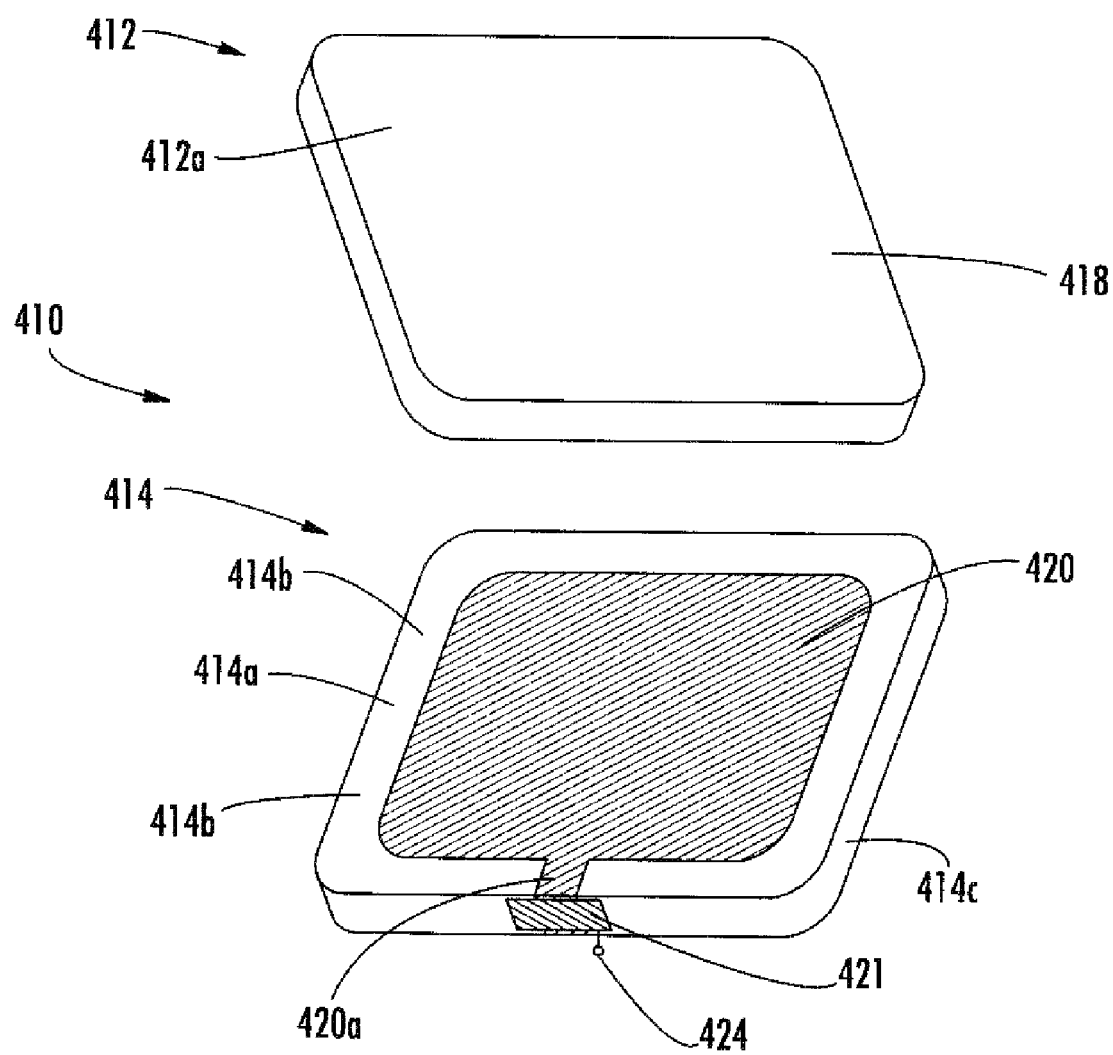
FIG. 28 is a perspective view of the front and rear substrates of another reflective element assembly of the present invention.
Figure 29:
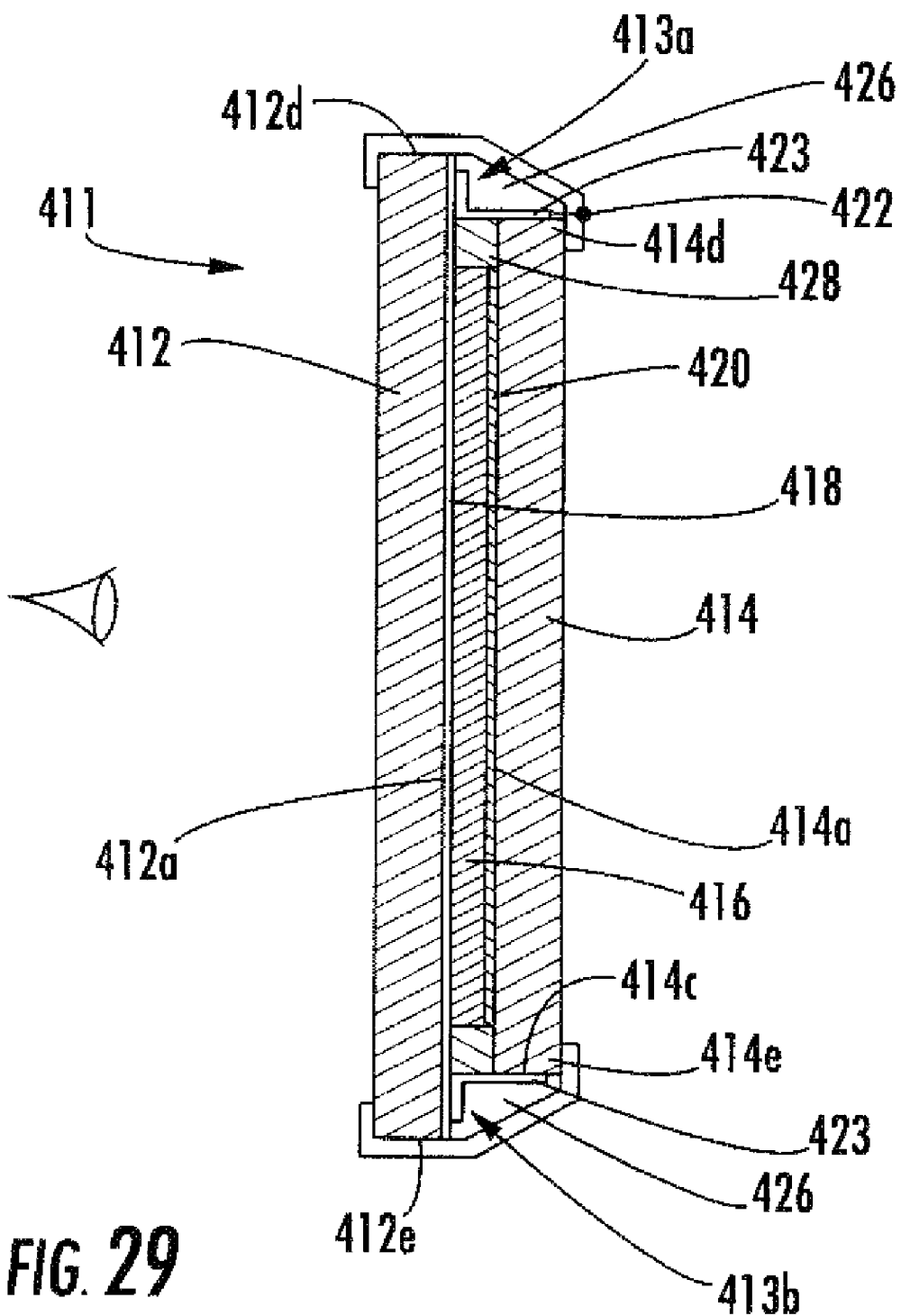
FIG. 29 is a sectional view of a reflective element assembly formed by the substrates of FIG. 28, as shown in an exterior rearview mirror assembly.
Figure 30:
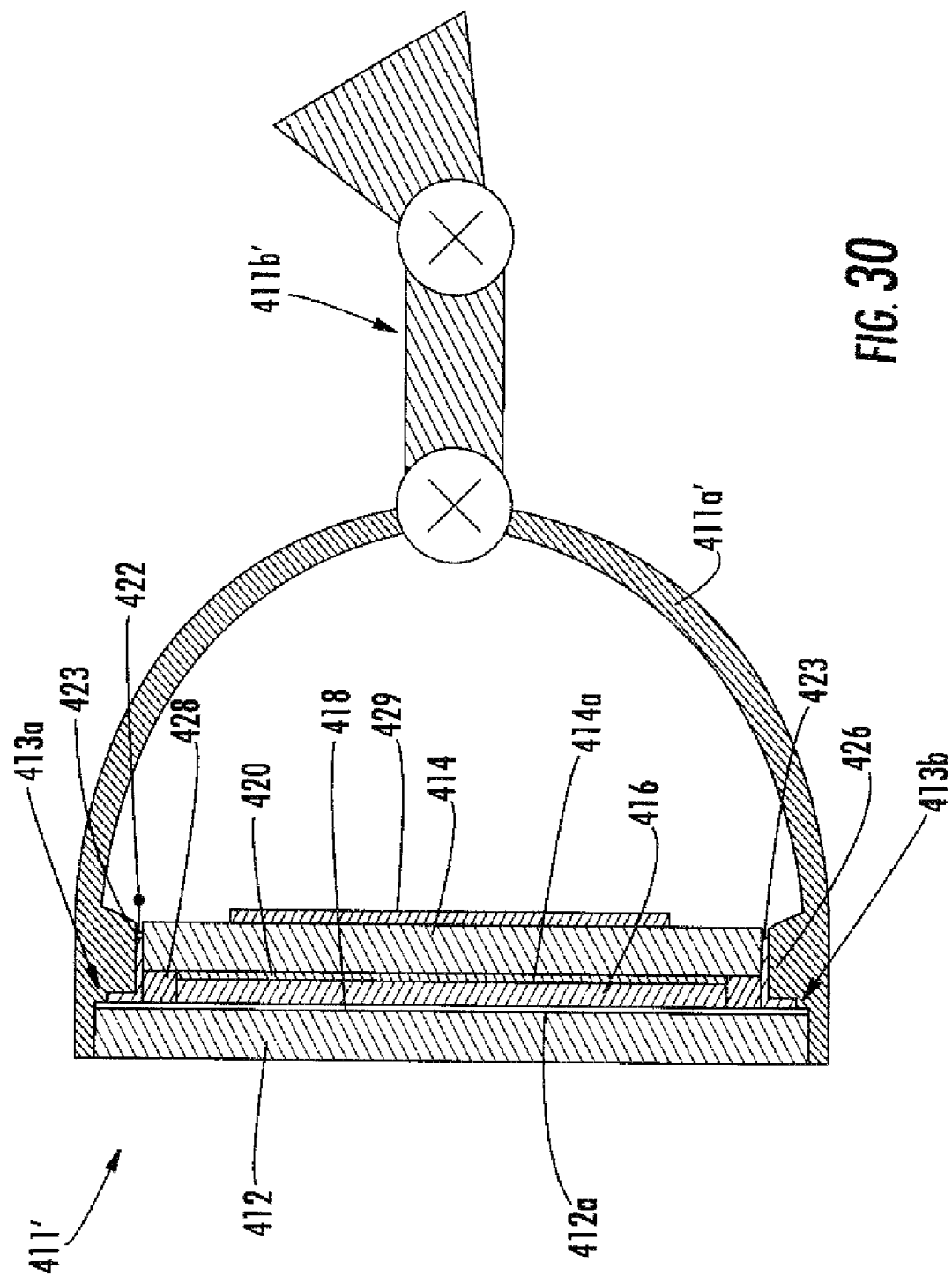
FIG. 30 is a sectional view of the reflective element assembly of FIG. 29, as shown in an interior rearview mirror assembly.

Optionally, and as shown in FIGS. 28-30, an electro-optic or electrochromic cell or reflective element assembly 410, such as for an exterior rearview mirror assembly 411 (FIG. 29) of a vehicle or an interior rearview mirror assembly 411' (FIG. 30), includes a front substrate 412 and a rear substrate 414, with an electro-optic or electrochromic medium 416 (FIGS. 29 and 30) disposed or sandwiched therebetween and contained via a perimeter seal 428. The front substrate 412 may have a transparent electrically conductive layer or coating 418, such as an indium tin oxide (ITO) or the like such as described above, disposed on its rear surface 412a, while the rear substrate 414 includes a metallic or conductive layer or coating 420, preferably a highly reflective metallic layer or coating (such as, for example, chromium, chromium/rhodium, silver, aluminum, silver alloy, aluminum alloy, ITO/silver/ITO stack, ITO/aluminum/ITO stack (such as ITO-silver-ITO stacks and display on demand stacks or infrared transmitting stacks of the types disclosed in PCT application No. PCT/US03/29776, filed Sep. 19, 2003 by Donnelly Corp. et al. for MIRROR REFLECTIVE ELEMENT ASSEMBLY, which is hereby incorporated herein by reference) or layers of the types disclosed in PCT application No. PCT/US03/35381, filed Nov. 5, 2003 by Donnelly Corp. et al. for ELECTRO-OPTIC REFLECTIVE ELEMENT ASSEMBLY, which is hereby incorporated herein by reference, or the like) applied to or deposited on and substantially over the front or third surface 414a of rear substrate 414. The outer perimeter edge area or border region 414b of the third surface 414a of the rear substrate 414 may be masked while the metallic reflective coating or coatings 420 is/are applied, such that the border region 414b of the front surface 414a of substrate 414 provides a non-conductive surface or path or raceway (such as a glass surface or the like) at least partially around the metallic reflector 420 and proximate to the edge 414c of rear substrate 414.

As shown in FIG. 28, a tab-out portion 420a of conductive layer 420 may extend over the border region or raceway 414b to provide an electrical contact point or region or area for the rear substrate 414, as discussed below. The non-conductive raceway 414b thus is substantially devoid of the conductive layer 420 except at the tab portion 420a. Optionally, and preferably, the tab-out portion 420a may wrap at least partially around the edge dimension 414c of the substrate 414 (such as shown in FIG. 28, where the tab-out portion 420a extends along the outer perimeter or border region 414b of third surface 414a of substrate 414 and may further extend at least partially along and over the perimeter edge 414c of substrate 414). Rear substrate 414 may also include a conductive coating or layer or solder 421 applied to or deposited on or positioned at and partially along the perimeter edge 414c of the substrate 414 generally at and over the tab-out portion 420a of conductive layer 420.

Reflective element assembly 410 includes electrical connectors or terminals 422 and 424 for providing electrical connection to the conductive or semi-conductive layers 418, 420, respectively. Particularly, an electrical connection terminal or connector 424 may contact the solder 421 at the edge portion 414c to provide electrical connection between the conductive metallic layer 420 and the appropriate electrical source, circuitry or control or the like at the rear of the reflective element assembly. The electrical connection terminal 424 (FIG. 28) may be soldered or adhered or attached to (such as via electrically conductive adhesive or the like, such as a conductive coating or layer or the like) or may be mechanically contacting at (such as via a spring-action contact or the like) the solder portion 421. The electrical connector 422 (FIGS. 29 and 30) for contacting and connecting to the transparent electrically conductive layer on the front substrate may contact another conductive strip or solder 423 that extends at least partially around the perimeter of the reflective element assembly. The strip or solder 423 may extend at least partially around the perimeter of the rear substrate except in the region of the solder portion 421 at the tab-out region 420a, so that the connectors and solder strips are electrically isolated from one another.

As shown in FIGS. 29 and 30, the front substrate 412 of reflective element assembly 410 has a height dimension that is greater than a corresponding height dimension of the rear substrate, such that the upper perimeter region or edge portion 412d and lower perimeter region or edge portion 412e of front substrate 412 extend beyond the corresponding perimeter regions or edge portions 414d, 414e of rear substrate 414 and define upper and lower overhang regions 413a, 413b. The electrical connector or connectors 422, 424 may connect to the conductive layers at the substrate surfaces at the overhang region or regions 413a, 413b and may not interfere or overlap the perimeter edge of the front substrate. Also, by having the front substrate taller than the rear substrate and defining overhang regions at both the upper and lower regions of the reflective element assembly, the reflective element assembly may be placed or disposed at or in the bezel or casing (or the bezel or casing may be molded directly around the reflective element assembly) without exposing the seal between the substrates to shear stresses, such as may otherwise occur at the seal when the substrates are offset in either direction (such as shown in the embodiment of FIG. 1). Optionally, and as shown in FIG. 30, a printed circuit board (PCB) 429 may be attached to or mounted or positioned at the rear surface of the rear substrate 414.

Also, the overhang regions (defined by the under-sized rear substrate relative to the front substrate) of the reflective element assembly of the present invention provide essentially a circumferential ledge or edge (such as a ledge extending approximately 0.5 mm beyond the edge of the rear substrate) for a soldering device to follow around the reflective element assembly to provide enhanced soldering of the raceway around the conductive coatings. The soldering device may be moved along (such as by a computer numerical control (CNC) or the like) and substantially around the cell at the overhang region (such as by following the edge of the rear substrate) and may apply the solder thereto, and may stop short of the tab-out region, in order to apply the solder line 423 along the perimeter edges of the reflective element assembly. The bead of solder thus contacts the conductive ITO layer (or the like) on the front substrate, but does not come into electrical contact with the conductive coating or layer on the rear substrate. The solder may thus be applied around, but may not touch, the tab-out region (or a solder strip at the tab-out region), so as not to short the reflective element assembly when the electrical connectors are applied thereto. Optionally, the bezel portion of the mirror assembly may be molded around the reflective element assembly (particularly around the front substrate) and may cool and shrink around the reflective element assembly to secure the reflective element assembly to the bezel portion, without shearing the substrates relative to one another. The bezel portion thus may be molded or positioned or formed along the ledge of the overhang regions to provide direct molding or forming of the bezel portion around the reflective element assembly, without the seal or seal portions being exposed to shear stresses typically encountered in other known reflective element assemblies.

Figure 31:
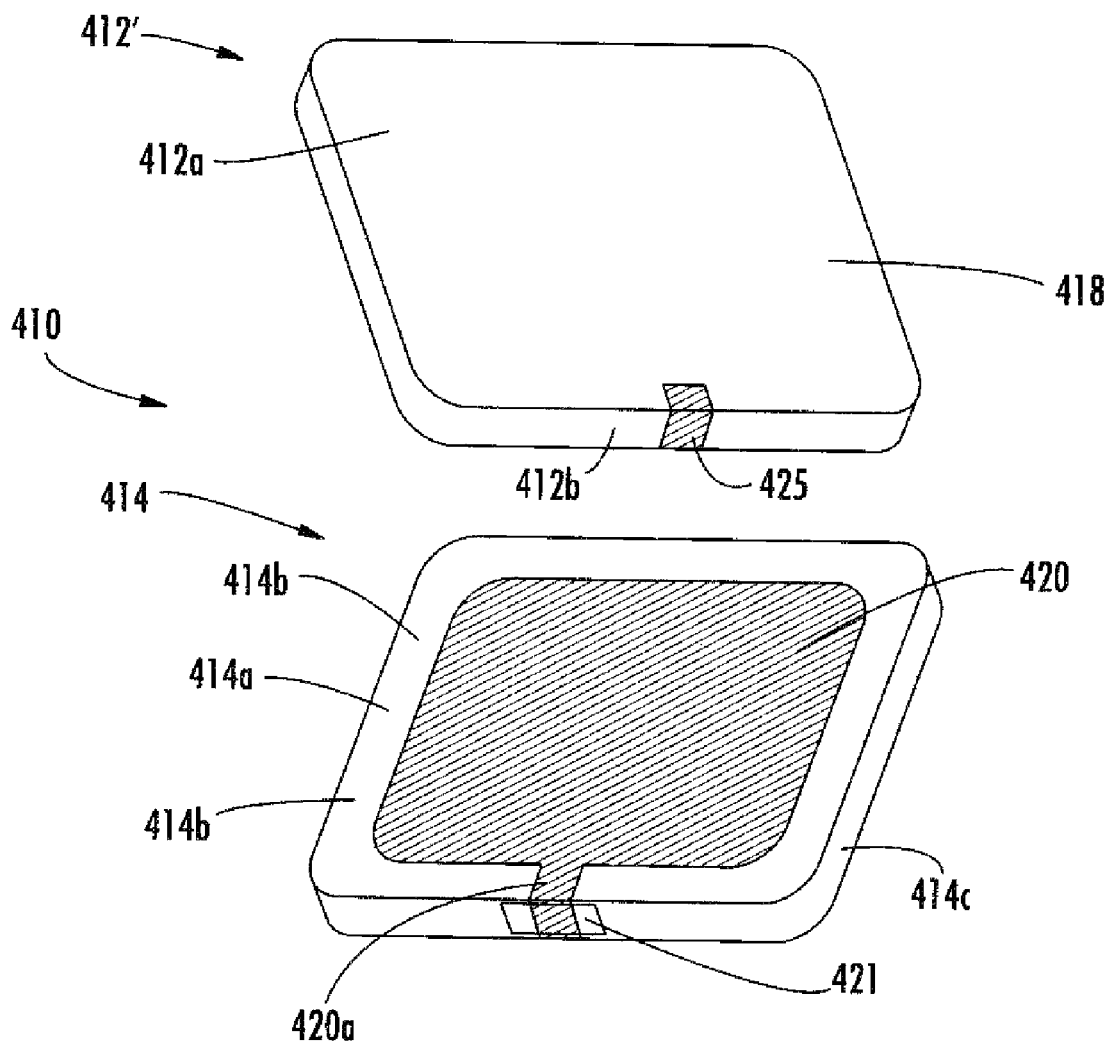
FIG. 31 is a perspective view of the front and rear substrates of another reflective element assembly of the present invention.

Optionally, as shown in FIG. 31, the front substrate 412' may have an insulating layer 425 applied over the transparent electrically conductive coating or layer 418 and at the edge portion 412b that will generally align with the tab-out 420a on the rear substrate 414 when the substrates are juxtaposed and mated together during the assembly of the reflective element assembly. The insulating layer 425 may also be applied over the region of the second surface 412a (such as approximately 1 mm or thereabouts inward from the edge 412b so as to preferably be within the seal region of the reflective element assembly) that generally corresponds or aligns with the tab-out 420a when the reflective element assembly is assembled together.

The insulating layer 425 may comprise a substantially thin layer, such as less than approximately ten microns thick and preferably less than approximately 5 microns thick, and may comprise a clear or colored material, without affecting the scope of the present invention. The insulating layer may be painted or applied or smeared or pad printed or screened or the like at the edge of the front substrate before the front and rear substrates are juxtaposed and mated together to generally cover the desired area that will align with the tab-out on the rear substrate. The insulating layer or coating 425 may be substantially non-conducting and may comprise a thin layer of non-conductive epoxy or urethane or acrylic or acrylate or may comprise an elevated temperature (such as greater than 100 degrees Celsius) resilient sol-gel metal oxide, such as SiO2 or the like, or other type of substantially non-conducting or insulating material, without affecting the scope of the present invention. As discussed below with respect to FIG. 46, the insulating layer may be disposed along the wrap-around and/or overlapping coating portion or portions at a portion of the perimeter edge of the rear substrate that is recessed from the corresponding edge portion of the front substrate so as to define an overhang portion or region in that area. The insulating layer thus may be disposed along the overhang region to substantially electrically insulate or isolate the conductive tab-out region or portion at the edge region or portion of the rear substrate from the transparent electrically conductive coating on the second surface of the front substrate. The selected insulating material may be air dried or UV cured or otherwise dried or cured after it is applied to the front substrate (and optionally may be applied before curing of the conductive layer and may be heated or cured while the conductive ITO layer is cured). Alternately, the edge region and second surface area that corresponds with or aligns with the tab-out of the rear substrate may be laser etched or ablated to remove the transparent electrically conductive coating 418 in the desired area before the substrates are mated together to provide an insulating/isolating region generally at the tab-out region when the substrates are juxtaposed and mated together, without affecting the scope of the present invention. The insulating region or coating or layer thus may further preclude any shorting of the reflective element assembly when the electrical connectors are applied thereto.

As shown in FIGS. 29 and 30, an encapsulant 426 may be provided at the overhang regions to seal and protect the solder and connectors of the reflective element assembly. For example, the encapsulant or potting material 426 (such as, for example, a silicone or urethane elastomer, preferably a conductive at least partially or semi-elastomeric material or the like) may be applied or positioned over the rear surface (and may be applied partially or entirely around the outer perimeter edge of the substrate) to environmentally protect, such as by sealing, the connection of the connector terminals and the conductive layers, such as described in PCT application No. PCT/US03/35381, filed Nov. 5, 2003 by Donnelly Corp. et al. for ELECTRO-OPTIC REFLECTIVE ELEMENT ASSEMBLY, which is hereby incorporated herein by reference. The electrical connection terminals may extend rearward from the reflective element assembly and may protrude from the encapsulant or potting material for electrical connection to a connector associated with the appropriate electrical power, circuitry or control or the like.

The overhang regions of the front substrate relative to the rear substrate thus may allow for the electrical connectors to connect to the respective conductive layers substantially or entirely within the viewable profile of the front substrate by extending along the respective perimeter edges of the rear substrate, such that the connectors do not overlap the perimeter regions of the front substrate and, thus, are not viewable at the front surface of the front substrate. The front substrate may include a hiding layer or concealing layer (such as a dark frit layer or a chromium oxide (often referred to as "black chrome") or other metal or metal oxide or metal compound that is dark, such as black, such as described in PCT application No. PCT/US03/35381, filed Nov. 5, 2003 by Donnelly Corp. et al. for ELECTRO-OPTIC REFLECTIVE ELEMENT ASSEMBLY, which is hereby incorporated herein by reference) at the perimeter regions or overhang regions, such as at the rear surface of the front substrate, to substantially hide or conceal the connectors and the seal or seals of the reflective element assembly. The reflective element assembly thus may be suitable for a bezel-less or minimal bezel (preferably less than approximately 4.5 mm overlap of the front surface of the reflective element assembly, more preferably less than approximately 4 mm and most preferably less than approximately 3.5 mm overlap of the front surface of the reflective element assembly) mirror assembly.

Although shown in FIGS. 28 and 29 as being a reflective element assembly for an exterior rearview mirror assembly of a vehicle, the reflective element assembly may optionally be implemented with an interior rearview mirror assembly 411' (FIG. 30), with a mirror housing or casing 411a' and a mirror mounting arm or support or assembly 411b', without affecting the scope of the present invention. Optionally, the reflective element assembly may be received within a bezel portion or assembly of a rearview mirror assembly, whereby the bezel portion or assembly may attach to a desired or selected rear cap portion or end cap to form or assemble a mirror assembly having the desired accessory or accessories or mirror content, such as is described in PCT Application No. PCT/US2004/

015424, filed May 18, 2004 by Donnelly Corp. et al. for MIRROR ASSEMBLY FOR VEHICLE, which is hereby incorporated herein by reference. In such an application, the mirror mount may attach to the reflective element assembly and the back or cap portion may attach to the rear of the bezel assembly (as described in PCT Application No. PCT/US2004/015424, filed May 18, 2004 by Donnelly Corp. et al. for MIRROR ASSEMBLY FOR VEHICLE, which is hereby incorporated herein by reference).

The reflective element assembly of the present invention thus provides an enhanced assembly that may be readily manufactured and assembled. The overhang regions of the present invention provide for enhanced manufacturing and assembly processes and provide benefits of simplicity in the reflective element design and assembly over prior known approaches, such as the mirror assemblies of the type described in U.S. pat. pub. No. US2004/0032638, published Feb. 19, 2004 by Tonar et al. for ELECTROCHROMIC DEVICES WITH THIN BEZEL-COVERED EDGE, which is hereby incorporated herein by reference.

Optionally, and with reference to FIGS. 32-35, an electro-optic or electrochromic cell or reflective element assembly 510, such as for an interior or exterior rearview mirror assembly of a vehicle, includes a front substrate 512 and a rear substrate 514, with an electro-optic or electrochromic medium 516 disposed or sandwiched therebetween. The front substrate 512 has a transparent electrically conductive layer or coating or coatings 518, such as an indium tin oxide (ITO) or the like such as described above, disposed on its rear surface 512a (forming the second surface of the cell assembly), while the rear substrate 514 includes a metallic reflective and conductive layer or coating 520 (forming the third surface in the cell assembly), preferably at least a substantially reflecting and most preferably a highly reflective metallic layer or coating or coating stack (such as, for example, chromium, chromium/rhodium, silver, aluminum, silver alloy, aluminum alloy, ITO/silver/ITO stack, ITO/aluminum/ITO stack, such as described above) applied to or deposited on and substantially over the front surface 514a of the rear substrate and forming the third surface of the cell assembly.

As can be seen in FIGS. 32-35, the transparent electrically conductive layer of coating 518 substantially covers the second surface 512a of front substrate 512, and desirably wraps around and overcoats a coated edge portion 512b of front substrate 512 along at least one portion of the circumferential edge of the substrate. An opposite perimeter region 512c and corresponding edge portion 512b' is uncoated and/or has the coating removed therefrom to define an uncoated perimeter region of the substrate that is generally opposite to or across from the coated edge portion 512b. The transparent electrically conductive layer 518 defines a circumferential track or raceway or wraparound/overcoated portion 518a around the coated edge portion 512b of the circumference of the front substrate 512. Optionally, the uncoated perimeter region 512c of the surface 512a (and the corresponding uncoated edge portion 512b') of front substrate 512 that is generally opposite/across from the wraparound/overcoated edge portion 512b may be masked during deposition of coating layer(s) 518 so that layer(s) 518 are not deposited on the perimeter region 512c and the unwraparound/unovercoated edge portion 512b' during formation itself of transparent electrically conductive layer(s) 518. Alternately, after the conductive layer(s) 518 has been established, the conductive layer(s) may be removed (such as by chemical etching or laser ablation or mechanical ablation such as via sandblasting) from the perimeter region 512c of the surface 512a (and from edge portion 512b' if the edge portion 512b' is already coated) of front substrate 512, in order to create a non-conductive border region at the perimeter region 512c, without affecting the scope of the present invention.

Likewise, the conductive layers or coatings (or stack of coatings) 520 substantially cover the third surface 514a of rear substrate 514, and desirably wrap around and overcoat a coated edge portion 514b of rear substrate 514 along at least one portion of the circumferential edge of the substrate. An opposite perimeter region 514c and corresponding edge portion 514b' is uncoated and/or has the coating removed therefrom to define an uncoated perimeter region of the substrate that is generally opposite to or across from the coated edge portion 514b. The conductive layer or layers 520 defines a circumferential track or raceway or wraparound/overcoated portion 520a around the coated edge portion 514b of the circumference of the rear substrate 514. Optionally, the uncoated perimeter region 514c of the surface 514a (and the corresponding uncoated edge portion 514b') of rear substrate 514 that is generally opposite/across from the wraparound/overcoated edge portion 514b may be masked during deposition of coating layer(s) 520 so that the layer(s) 520 are not deposited on a perimeter region 514c and the unwraparound/unovercoated edge portion 514b' during formation itself of the metallic electrically conductive layer(s) 520. Alternately, after the conductive layer(s) 520 have been established, the conductive layer(s) may be removed (such as by chemical etching or laser ablation or mechanical ablation such as via sandblasting) from the perimeter region 514c of the surface 514a (and from edge portion 514b' if the edge portion 514b' is already coated) of rear substrate 514, in order to create a non-conductive border region at the perimeter region 514c, without affecting the scope of the present invention.

When the substrates 512, 514 are juxtaposed (with their coated surfaces facing one another as shown in FIGS. 32-35), the uncoated perimeter region 514c and unovercoated edge portion 514b' of rear substrate 514 may be generally aligned with or adjacent to or along the wraparound/overcoated portion 518a and overcoated edge portion 512b of front substrate 512 (and spaced from the coating(s) 518 by the seal 522), while the masked or uncoated perimeter region 512c and unovercoated edge portion 512b' of front substrate 512 may be generally aligned with or adjacent to or along the wraparound portion 520a and overcoated edge portion 514b of rear substrate 514 (and spaced from the coating(s) 520 by the seal 522). The wraparound portions 518a, 520a thus define opposite wraparound portions that are along opposite overcoated edge portions of the substrates when the substrates are juxtaposed and mated together.

The wraparound portions 518a, 520a may cover or span approximately half of the circumference of the respective substrate or may cover or span different portions, without affecting the scope of the present invention. The dimensions of the wraparound portions and uncoated portions are selected so as to avoid any electrical interconnection between the wraparound/overcoated edge portions when the substrates are juxtaposed or mated together, and may be selected to be the desired or appropriate lengths depending on the particular application. For example, the wraparound portion of the transparent electrically conductive coating 518 may be longer or may cover a greater amount of the circumference of the front substrate and, thus, the wraparound portion of the conductive metallic coating 520 may be shorter and may cover a lesser amount of the circumference of the rear substrate so that the wraparound portions will not overlap when the substrates are juxtaposed and/or mated together.

The uncoated regions of the juxtaposed or mated substrates preferably define a gap or safety zone (where the uncoated regions 512c, 514c and the uncoated edge portions 512b', 514b' extend and overlap when the substrates are juxtaposed and mated together) between the respective or opposed ends of the wraparound portions 518a, 520a, so that the conductive wraparound portions are not aligned with or adjacent to or overlapping one another when the substrates are mated together. Accordingly, when the substrates are juxtaposed, a wraparound portion on one of the substrates coincides with an uncoated edge and surface region on the other substrate, and the wraparound portion on the other of the substrates coincides with the uncoated edge and surface region of the one substrate, such that there is no overlapping of the wraparound portions of the substrates. It is envisioned that the substrates may each include two or more overcoated edge portions or raceways, which are spaced apart with non-overcoated regions therebetween. The overcoated edge portions or raceways are spaced apart so that the non-overcoated regions coincide with the overcoated edge portions of the other substrate, such that there is no overlapping of the overcoated edge portions or raceways when the substrates are juxtaposed and mated together.

When the substrates 512, 514 are juxtaposed and mated together, a non-conductive seal or seal portion or portions 522 is disposed around the perimeter region of the reflective element assembly or cell 510 and seals/contains the electrochromic medium 516 within the cell after the electrochromic medium is established therein. The seal 522 encompasses and fills in the masked or uncoated perimeter regions 512c, 514c to electrically isolate/insulate the coatings or layers 518, 520 from the respective uncoated edge portions 512b', 514b' of substrates 512, 514.

Figure 32:
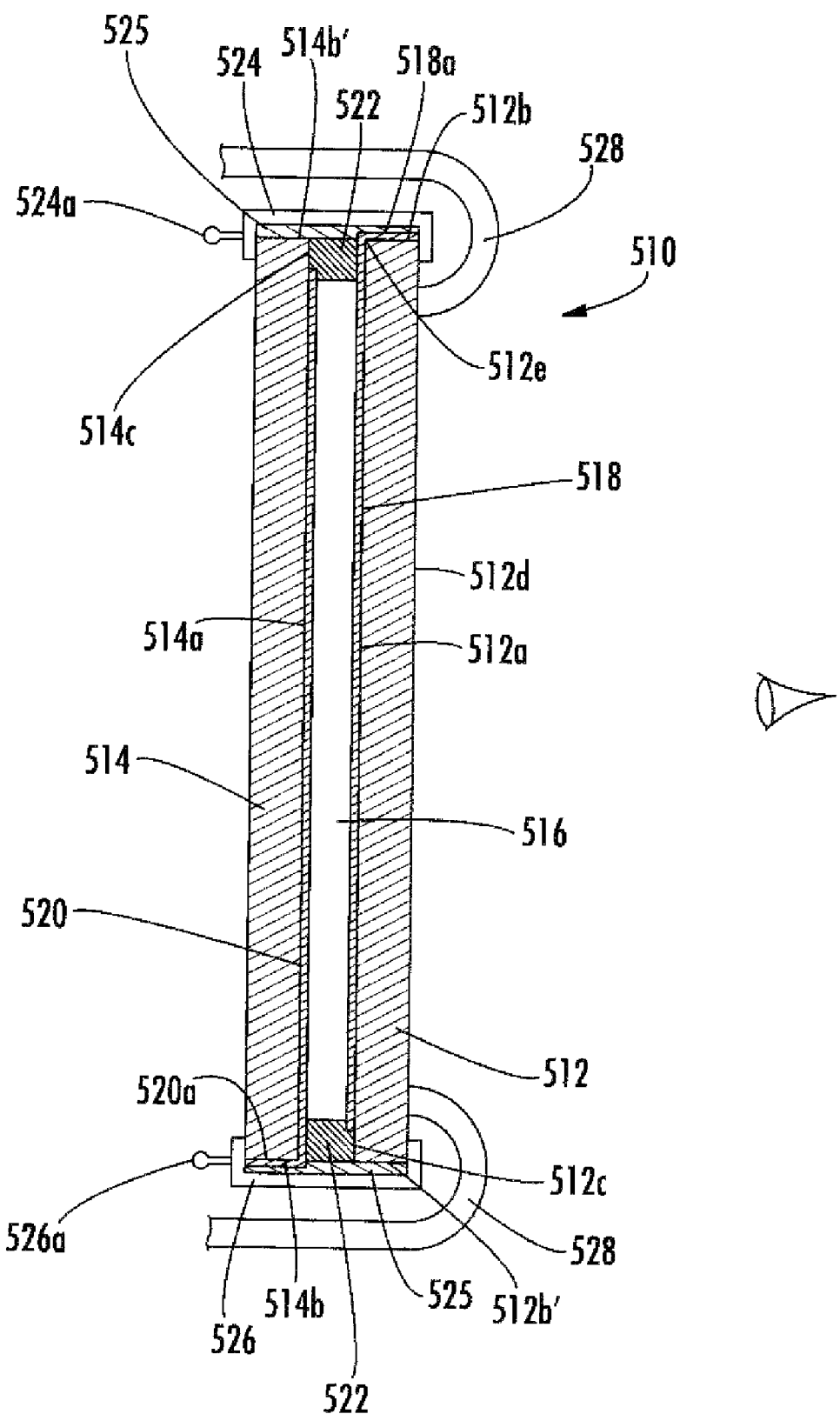
FIG. 32 is a sectional view of another reflective element assembly in accordance with the present invention.

After the substrates are mated together, a pair of opposite electrical connectors or clips or bus-bars 524, 526 (FIG. 32) may be clipped or connected to or established at the assembly to provide electrical current to the conductive coatings 518, 520, respectively. As can be seen in FIG. 32, connector 524 extends along one perimeter region of the cell and contacts overcoated portion 518a to energize conductive layer 518 on surface 512a of front substrate 512, yet extends along the unovercoated or unwraparound edge 514b' of rear substrate 514 and, thus, will not contact conductive layer 520 of rear substrate 514. Likewise, connector 526 extends along another or opposite perimeter region of the cell and contacts wraparound or overcoated portion 520a to energize conductive layer 520 on surface 514a of rear substrate 514, yet extends along the unovercoated or unwraparound edge 512b' of front substrate 512 and, thus, will not contact conductive layer 518 of front substrate 512. The clips or connectors or bus-bars 524, 526 thus will only contact one of the conductive layers 518, 520 and the reflective element assembly or cell thus will not short when the clips are energized to color or darken the electrochromic medium. The clips 524, 526 are connected to a power source or control via electrical leads or connections 524a, 526a, respectively.

The electrical clips or connectors or bus-bars may be mechanically clipped around the substrates or cell and/or may be adhered or otherwise secured to the cell along the respective perimeter regions. In the illustrated embodiment of FIG. 32, the clips or bus-bars are metallic, generally straight clips extending along the respective edges of the cell with end portions extending slightly around the front and rear faces of the cell assembly. However, other forms of clips or bus-bars, such as curved, C-shaped clips 524', 526' (FIG. 33) or substantially straight, flat strips 524", 526" (FIG. 34) or the like, may be implemented without affecting the scope of the present invention. Optionally, the electrical contact between the clips and the respective conductive wraparound or overcoated portions may be enhanced via a conductive medium or material 525, such as a conductive paste, epoxy, solder, silver frit or the like, applied to the cell at the clips, in order to ensure intimate contact between the clips or bus-bars and the respective conductive wraparound portions. In the case of the connectors 524", 526" of FIG. 34, the conductive material may also function to adhere or retain the clips in place along the reflective element assembly or cell assembly. The mirror bezel portion 528 may extend a minimal amount over the front face 512d of the mirror cell assembly to cover the clips and conceal or hide the seal 522 and the like.

Figure 33:
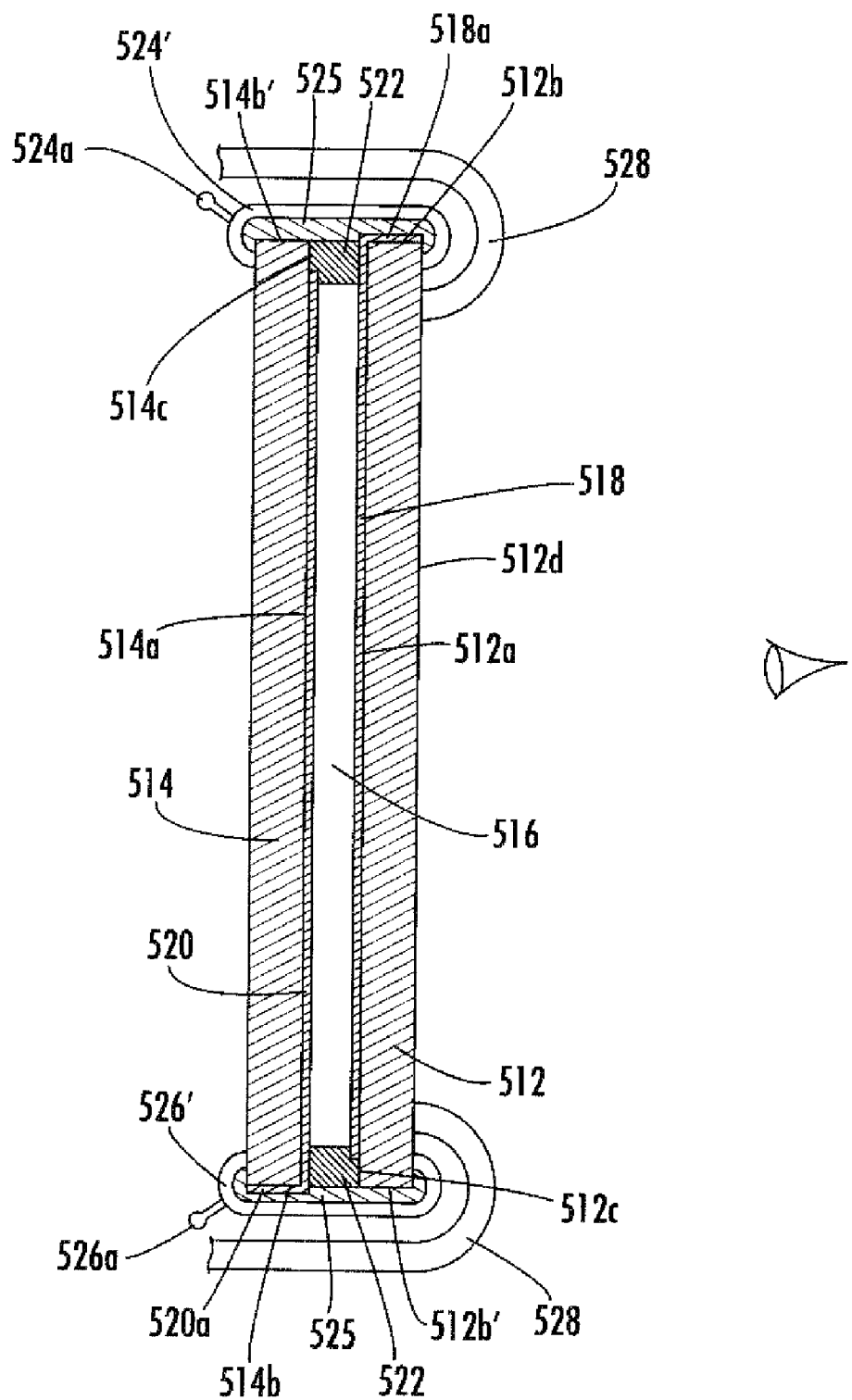
FIG. 33 is a sectional view of another reflective element assembly in accordance with the present invention.
Figure 34:
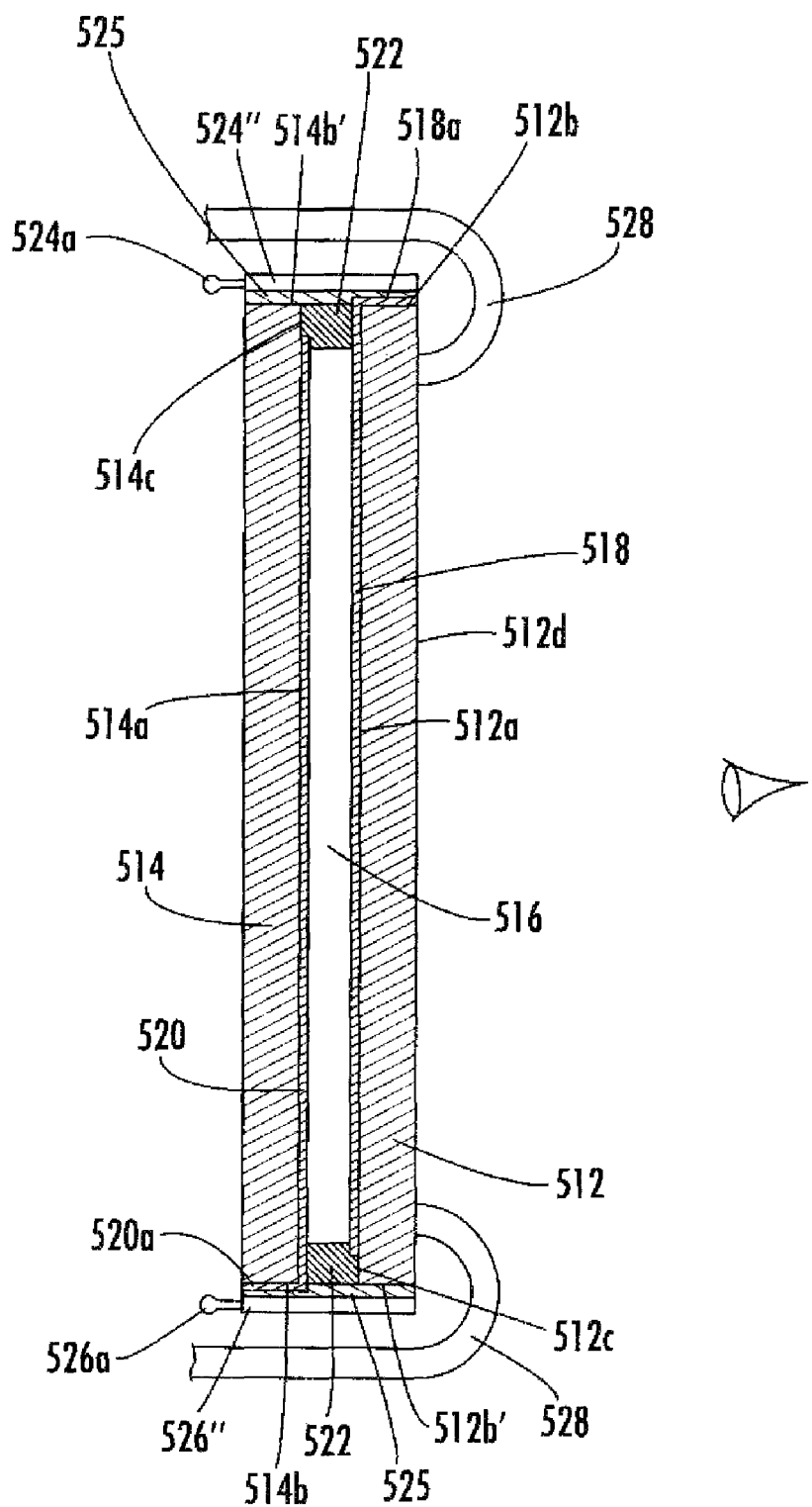
FIG. 34 is a sectional view of another reflective element assembly in accordance with the present invention.

Although shown in FIGS. 32 and 33 as extending around the front substrate and partially over a perimeter region of the front surface 512d of front substrate 512, the electrical clips or connectors (such as clips 524", 526" in FIG. 34) may not extend to or overlap the front face or surface 512d of front substrate 512, such that the reflective element assembly may be highly suitable for a reduced bezel/bezel-less mirror assembly application. Optionally, the electrical contacts may comprise a bead of ultrasonic solder or the like, with no metallic clip, such as for applications where the reflective element may be used in a reduced bezel/bezel-less mirror assembly. In such a configuration, the edge of the cell may have some form of edge encapsulation or a form of backplate/bezel similar to known non-electrochromic or base exterior mirror assemblies.

Figure 35:
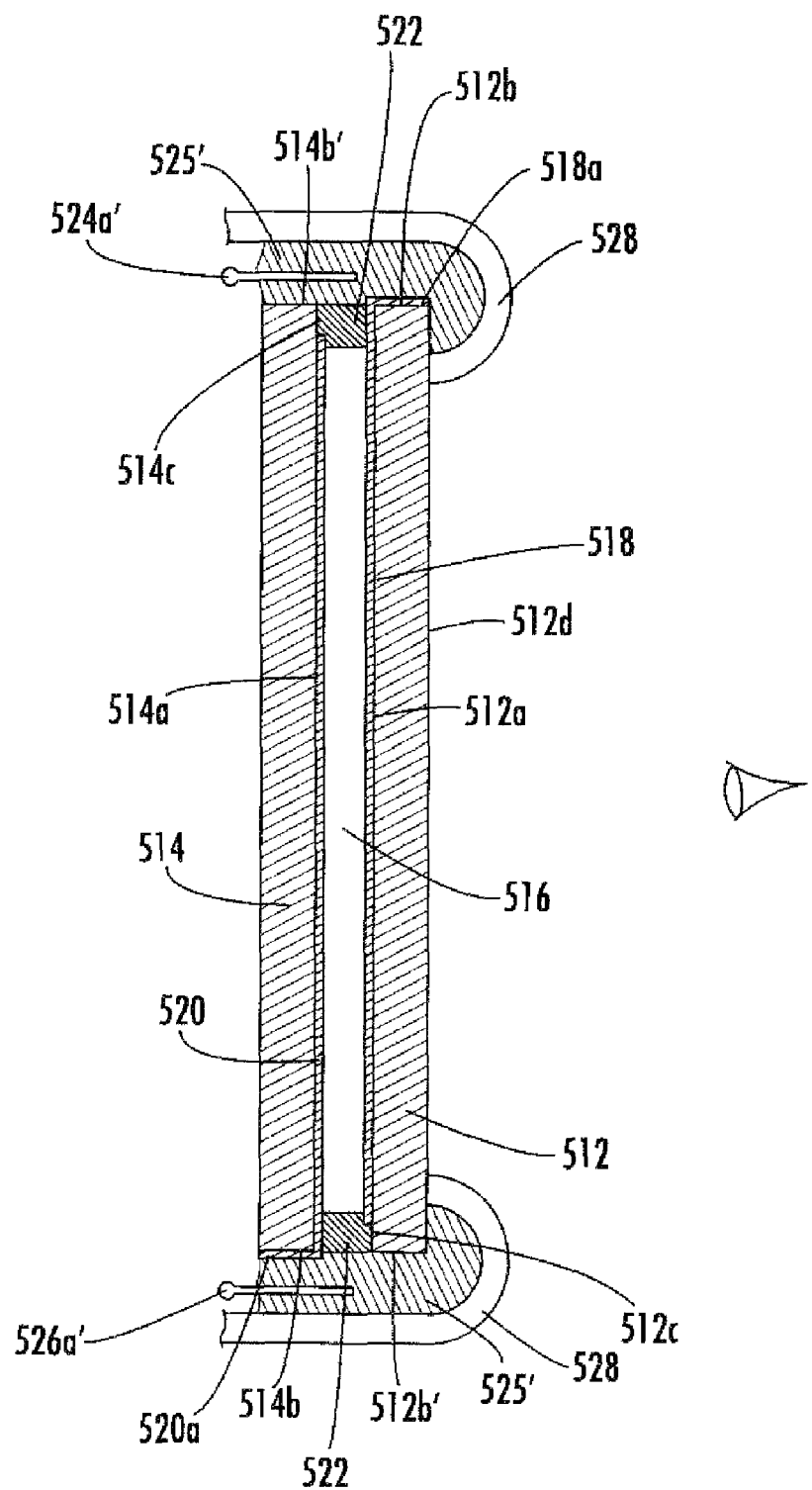
FIG. 35 is a sectional view of another reflective element assembly in accordance with the present invention.

Optionally, and with reference to FIG. 35, the cell assembly may be placed in a plastic or polymeric bezel portion and a conductive epoxy or conductive adhesive or conductive silicone or other conductive potting material 525' may be disposed along each of the wraparound or overcoated edge portions to form or establish a conductive raceway along the respective wraparound/overcoated edge portion. An electrode or wire 524a', 526a' or the like may then be inserted into or plugged into or engaged with the respective conductive potting material 525' to provide electrical current from a power source to the respective wraparound edge portion and associated surface coating. Such a configuration need not require additional clips or bus-bars or the like, since the conductive raceway is defined by the conductive potting material disposed along the respective wraparound portions. The conductive potting material may be sufficiently thick or voluminous to provide sufficient conductivity along the respective wraparound/overcoated portion to sufficiently power the respective surface coating(s). Preferably, the conductive potting material may comprise a highly plasticized to have some resilience and/or and may comprise a conductive elastomer, such as a conductive silicone or similar material, such as a graphite impregnated and/or metal particle impregnated elastomeric material or the like. The embodiment shown in FIG. 35 is otherwise similar to the embodiments of FIGS. 32-34, with similar reference numbers, such that a detailed discussion of the mirror assembly will not be repeated herein.

In order to form the non-conductive regions opposite the wraparound coatings 518a, 520a, the second surface transparent electrically conductive coating 518 and the third surface conductive coating 520 may be removed after deposition or may be masked during deposition only along one perimeter region or side or portion of the respective substrate, without affecting the scope of the present invention. Optionally, the corner 512e, 514e along the overcoated edge portion 512b, 514b may be chamfered or may be made with a radius or may be otherwise formed to have a chamfered or angled or rounded or otherwise non-90 degree corner along the overcoated portions 518a, 520a, in order to provide an enhanced coating and electrical connection between the overcoated portions 518a, 520a and the respective surface coatings 518, 520. However, the corner may comprise a sharp, 90 degree corner as shown in FIGS. 32-35, without affecting the scope of the present invention.

Preferably, the non-overcoated region or side may have the unovercoated edge portion 512b', 514b' plus the narrow uncoated strip or border region 512c, 514c along the substrate surface close to the edge of the substrate (and close to the edge of the seal when the substrates are mated and sealed together). The uncoated strip or region 512c, 514c is desired to ensure that the conductive medium that may be applied at and between the clip and the edge of the substrate or glass does not move into a gap between the edge of the epoxy and the glass (which may occur during manufacturing) and short the two connectors/electrodes together. The reflective element assembly of the present invention thus avoids shorting or bridging of the conductive coatings because the conductive coating on one substrate is removed in the areas of the clip or bus-bar that contacts the conductive coating on the other substrate.

Figure 36:
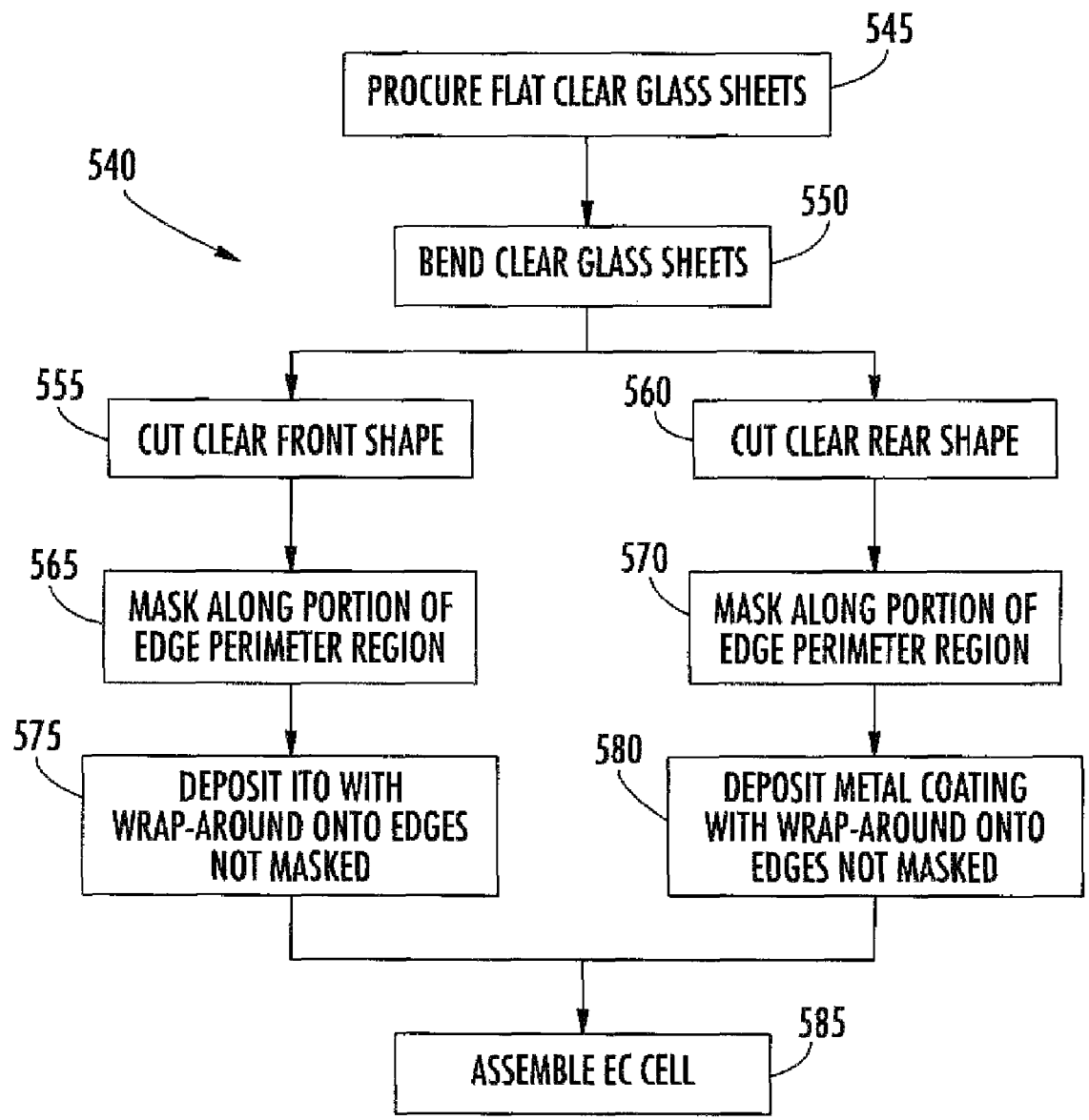
FIG. 36 is a block diagram of a process for manufacturing a reflective element assembly in accordance with the present invention.

Accordingly, and with reference to FIG. 36, a reflective element assembly or cell assembly of the present invention may be manufactured or formed via an assembly process 540 by first procuring generally flat, clear glass sheets at 545. The glass sheets may be bent or curved at 550 to a desired or appropriate curvature for the particular mirror application. The front substrate shape and rear substrate shape may be cut from the sheets at 555 and 560, respectively. The cut substrate shapes may then be masked along a portion of the edge perimeter region (such as described above with respect to uncoated portions 512c, 514c and unovercoated or unwraparound edge portions 512b', 514b') at 565, 570. The transparent electrically conductive layer (such as ITO or the like) may be deposited on the surface of the front substrate shape and onto the unmasked edge portion (such as onto overcoated region 512b, discussed above) at 575, while the metallic coating or coatings may be deposited on the surface of the rear substrate shape and onto the unmasked edge portion (such as onto overcoated region 514b, discussed above) at 580. The coated substrates may then be assembled together with the seal material therebetween at 585, and the electrochromic medium may be established in the cell and cured in any known manner or the like.

Optionally, after the substrates are juxtaposed and mated together, the mated substrates or cell may be placed in a jig or fixture to attach the clips or connectors or bus-bars along the respective overcoated edges. The fixture may have a recess or well formed therein for receiving the cell assembly. The clips/bus-bars (which may be generally L-shaped or may be otherwise formed for engaging the corresponding overcoated edge portion of the cell) may have been pre-placed along respective portions of the recess or well, and a conductive medium (such as a conductive epoxy or conductive adhesive or conductive setting material or the like) may be applied along each clip. The conductive medium may be desirable because the overcoat portions may be relatively fragile relative to normal, secure electrical raceways, whereby the conductive medium may be disposed over and along the overcoated/wraparound portions to ensure intimate electrical contact between the connectors/bus-bars and the overcoated/wraparound portions.

The conductive medium may be applied in at least two portions, with one portion along each of the clips and with the discontinuities between the portions generally coinciding with the safety zones (where the uncoated regions 512c, 514c and unovercoated edge portions 512b', 514b' of the substrates overlap when the substrates are juxtaposed so that there is no overlapping of the overcoated regions 512b, 514b). Also, an electrically insulating block or member or material may be applied or disposed at the safety zones to further insulate or isolate the overcoated edge portions from one another. The cell may then be set into the recess of the fixture (such as with the rear substrate down or against one of the legs of the L-shaped clips and with the other legs of the L-shaped clips being positioned along the perimeter portions or overcoated edge portions of the cell) and the cell may be heated or UV cured to at least temporarily set up the conductive epoxy to adhere the clips/bus-bars to the cell. The clips/bus-bars thus may be attached or secured to the cell along the respective coated edge portions or raceways, and may be adhered to the cell along the edges or rear portion of the cell, such that there is no adhesive and no part of the clips at the front surface of the cell.

Optionally, the fixture may receive the bezel portion, and the clips/bus-bars may be incorporated or set into the bezel (such as a metallic sleeve or member within the bezel portion or such as a metallic or metalicized bezel portion or the like), or the clips/bus-bars may define the bezel portion, without affecting the scope of the present invention. The front substrate may thus be placed into the bezel and the cell assembly may be retained therein in a similar manner as described above.

Although shown in FIGS. 32-35 with the front and rear substrates having substantially the same height/width dimension, it is envisioned that the front substrate may be oversized relative to the rear substrate (such as by about 0.5 mm or thereabouts), such as described above with respect to FIGS. 28-30, without affecting the scope of the present invention. As discussed above, such a configuration limits or reduces or substantially precludes shear stresses being transferred to the seal of the cell assembly when the bezel portion of the mirror assembly is attached to or formed to the cell assembly. Also, the oversized/undersized substrate configuration provides a ledge or shelf or anchor that may function as a guide or cam follower region when a solder bead or the like is applied around the cell assembly, as also discussed above.

The opposite wraparound coatings or overcoated edges of the present invention thus may be coated over opposite edge portions of the respective substrates to provide electrically isolated conductive raceways for the respective substrates when the substrates are juxtaposed. The reflective element assembly of the present invention thus may be suitable for a reduced bezel width mirror design or a bezel-less mirror design. The reflective element assembly may provide a flush mirror with the electrical contacts at the edge coatings for both the third surface as well as the second surface coatings. The bezel width need only be slightly wider than the width of the seal, since the clip (which may be typically about 1 mm or thereabouts) is typically smaller than the width of the seal (about 2 mm or thereabouts). Optionally, the front substrate may have an opaque perimeter coating (such as the types described in PCT application No. PCT/US03/35381, filed Nov. 5, 2003 by Donnelly Corp. et al. for ELECTRO-OPTIC REFLECTIVE ELEMENT ASSEMBLY, which is hereby incorporated herein by reference) on one of its surfaces to mask or conceal the seal, such that the reflective element may be suitable for use in a reduced bezel or bezel-less mirror application. The present invention thus provides a method of manufacturing a cell assembly that has not been previously achieved, such as when front and rear substrate coated shapes are cut from already coated larger sheets or substrates, such as from already ITO coated on the concave surface of large calottes or metallic coated (such as chrome rhodium or the like) on the convex surface of large calottes, which may be either rectangular or circular bent substrates as typically used in the automotive mirror exterior reflector art. The present invention provides an overcoated edge portion on each of the substrates by coating at least the edge portions after the substrate shapes have been cut from the larger sheets or substrates.

Figures 37, 38:
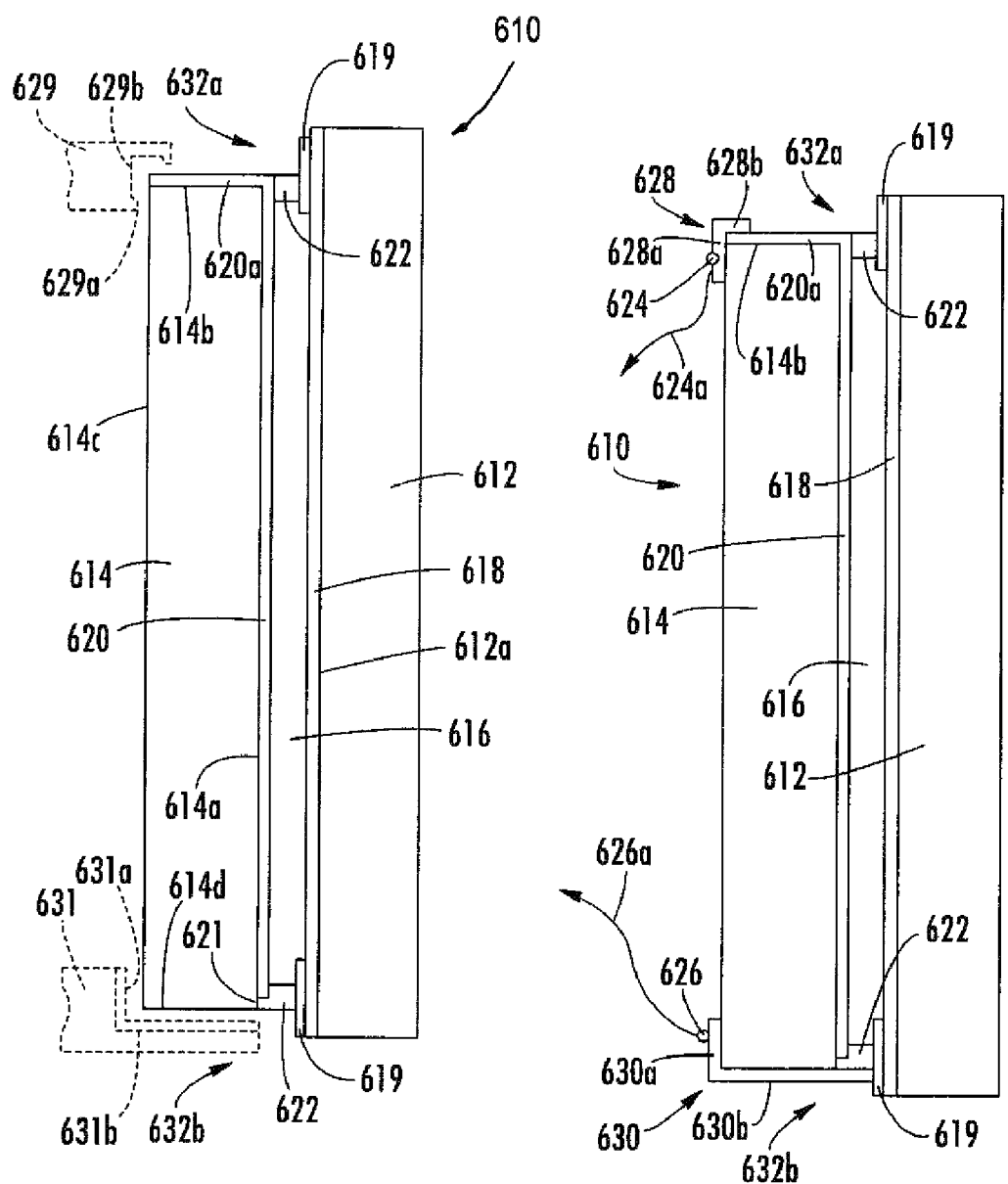
FIG. 37 is a perspective view of a substrate with a wraparound coating along an edge of the substrate in accordance with the present invention.
FIG. 38 is a sectional view of the substrate of FIG. 37.

Optionally, and with reference to FIGS. 37 and 38, a reflective element assembly 610 (such as for a bezelless or frameless mirror assembly, and such as for an interior or a exterior mirror assembly) includes a front substrate 612 and a rear substrate 614 and an electro-optic or electrochromic medium 616 disposed or sandwiched therebetween and contained/protected within an epoxy seal 622. The front substrate 612 includes a transparent electrically conductive coating 618 (such as an ITO coating or the like) on its rear surface 612a (the second surface of the reflective element assembly), and also includes a perimeter metallic coating or strip or layer or band 619 around the perimeter regions of the substrate to form a ring or frame around the perimeter of the substrate that is substantially non-transparent or opaque, as discussed below. The rear substrate 614 includes a conductive metallic layer or coating 620 on its front surface 614a (the third surface of the reflective element assembly). The conductive layer 620 may comprise multiple conductive and metallic layers or the like (such as discussed above), and includes a wraparound edge portion 620a that wraps around and overcoats an edge 614b of rear substrate 614.

As shown in FIG. 38, a conductive raceway 628 includes a rear surface layer or portion 628a disposed along at least a perimeter region of the rear surface 614c of the rear substrate 614 and an edge overlapping layer or portion 628b that extends partially along or over the respective edge 614b. The conductive raceway 628 (such as an ultrasonic solder or conductive epoxy or conductive polymeric material or a metallic strip or the like) thus provides an electrical connection from an electrical connector 624 at the rear surface portion 628a of raceway 628 to the coating 620 on the third surface of the reflective element assembly via the overlapping portion 628a that at least partially overlaps the wraparound edge portion 620a of conductive coating or layer 620.

Likewise, a conductive raceway 630 (which also may comprise an ultrasonic solder or a conductive epoxy or conductive polymer or a metallic strip or the like) includes a rear surface layer or portion 630a disposed along a perimeter region of the rear surface 614c of the substrate 614 and an edge portion 630b disposed along the respective edge 614d of rear substrate 614 and further along the seal 622 and into electrical contact or connection with the metallic coating or strip 619 at the rear surface 612a of front substrate 612. An electrical connector 626 may be provided at the rear surface portion 630a of raceway 630. As can be seen in FIGS. 37 and 38, the conductive coating 620 on the front surface 614a of rear substrate 614 may not be present along the perimeter region of the front surface 614a along the edge 614d, such that a non-electrically conducting or electrically insulating exclusion zone or deletion zone 621 is defined along the perimeter front surface of the rear substrate. The conductive coating 620 thus may be electrically isolated from the raceway portion 630b of raceway 630 (and may be separated and isolated by the non-conductive seal 622).

The main seal 622 of the reflective element assembly is disposed around the perimeter portion of one of the substrates and the substrates are then mated together to form or define the interspacing cavity or cell in which the electro-optic medium (such as an electrochromic medium, such as a solid polymer matrix (SPM) or the like) is established. The seal may include an opening or fill port or hole through which a precursor material may be filled (or, if the electro-optic material is itself a liquid, the electro-optic medium itself may be filled through the fill port), and in which a plug may be disposed to plug the cell after it is filled. The seal may comprise a black or opaque, UV curable epoxy seal, or may comprise other materials, such as a transparent seal material or the like, without affecting the scope of the present invention, and the seal may be established via any known means. For example, a preferably water clear or window like seal material may be established, such as for applications where a propensity may exist for the black seal to extend outward to a point where the black seal may be visible beyond the perimeter edge of perimeter band or front substrate. For example, and as disclosed in U.S. Pat. No. 5,790,298, which is hereby incorporated herein by reference, a transparent perimeter seal can be prepared for a mirror element using Dymax X-195-68-1 UV curable adhesive, an acrylate. The Dymax adhesive, preferably containing about 1.5 wt. percent glass beads spacers, can be UV cured using a Dymax PC-2 light source. Also, and as disclosed in U.S. Pat. Nos. 5,066,112 and 5,864,419, which are hereby incorporated herein by reference, a transparent perimeter seal can be prepared using a water-clear epoxy sealing material such as EPON 828™ from Shell Chemical Company of Houston, Tex., cured such as by polyamide-based curing agents such as V-40™ from Miller Stephenson Co. of Danbury, Conn. Optionally, the seal may be established utilizing principles described in U.S. Pat. Nos. 5,066,112; 5,073,012; and/or 5,790,298, which are hereby incorporated herein by reference.

The exclusion zone 621 may extend substantially around the perimeter of the substrate (except for along the perimeter at the edge 614b) to provide a gap between the outer edges of the substrate and the conductive coating. The exclusion zone also functions to provide a view path for viewing the seal 622 when the reflective element assembly is assembled so that the cell may be inspected to determine that the seal is properly or acceptably or suitably in place around the electrochromic medium. This exclusion zone around the fill port may also allow for curing of plug seal materials (such as materials that may be activated by UV radiation) with UV radiation. Because the coating 620 extends over the front surface 614a of substrate 614 and to the edge 614b, the seal may not be viewable along that perimeter or edge regions. It is thus envisioned that multiple deletion lines or zones or gaps may be formed in the coating 620 at or near the perimeter edge 614b so that some portions of the seal along that perimeter edge may also be viewable or inspectable. Optionally, it is envisioned that the third surface and edge 614b may be initially coated with a transparent electrically conductive coating, and then the metallic reflective coating or coatings may be applied as an island on the third surface and not extending over the perimeter regions of the third surface. The fourth surface may also be partially coated with a transparent electrically conductive coating (and may overlap the conductive coated edge) to provide a conductive trace from the rear surface to the front surface of the rear substrate. The seal may then be viewable all around the perimeter of the reflective element assembly and through the transparent electrically conductive coatings along the conductive perimeter edge region or regions, after the substrates have been mated together.

The electrical leads 624a, 626a may be connected to or attached to the respective electrical connectors 624, 626 at the rear surface portions 628a, 630a of the respective raceways 628, 630, and may be electrically connected to a power source or control or circuitry or wiring harness of the mirror assembly to provide electrical power or current to the conductive layers 620, 618 to energize or darken or activate the electro-optic reflective element assembly or cell. A conductive or non-conductive epoxy may be applied at the connectors at the rear surface portions of the raceways to provide a robust electrical connection that may withstand the assembly process with reduced stress to the solder joint between the leads and the connectors.

As shown in FIGS. 37 and 38, the rear substrate 614 preferably has a smaller dimension than the corresponding dimension of the front substrate 612, such that an overhang region 632a, 632b exists or is defined along the opposite edges of the reflective element assembly (and preferably all the way around the perimeter of the reflective element assembly), such that the rear substrate is recessed from the perimeter of the front substrate around the opposite sides of the substrate or around the entire substrate, except where the fill port is located. Optionally, the rear substrate may be recessed from the perimeter of the front substrate and substantially all around the substrate perimeter, and may include a projection or tab or the like that extends radially outward and generally corresponds to the fill port location (such as by utilizing aspects described in PCT Application No. PCT/US03/35381, filed Nov. 5, 2003 by Donnelly Corp. et al. for ELECTRO-OPTIC REFLECTIVE ELEMENT ASSEMBLY, which is hereby incorporated herein by reference), such that the rear substrate is not recessed in from the perimeter of the front substrate at the fill port location.

The ultrasonic solder raceways 628, 630 comprise various solder types, such as leaded or unleaded ultrasonic solders (and preferably a lead free solder), such as, for example, a Cerasolzer ultrasonic solder distributed by Bellex International Corp. or a Sunbonder USM-IV available from Kuroda Techno of Japan. The solder may be applied by an ultrasonic soldering tip that may be contoured or formed to follow the edge of the substrate, such that the solder may be readily applied along the overhang regions. For example, and as shown in phantom in FIG. 37, a soldering tip 629 may comprise an L-shaped soldering tip that may generally conform to the rear surface and edge 614b of the rear substrate 614 and overcoat 620a, and may be moved along the edge 614b and rear surface to establish the raceway 628a. The soldering tip 629 may include tabs or guides 629a to engage the rear surface and edge of the substrate and guide the tip along the substrate, while the solder is applied via a soldering portion 629b of soldering tip 629. Similarly, a soldering tip 631 may be similar to soldering tip 629, but may extend and span the gap between the substrates and extend to the coating or layer on the rear surface 612a of the front substrate 612, and may be moved along the edge 614d and overhang region 632b to establish the raceway 630. The soldering tip 631 may have a leading edge or profile 631a that engages the edge of the rear substrate to guide the soldering tip along the substrate, while the solder is applied via a soldering portion 631b of soldering tip 631. The tabs and/or leading edge or profile of the soldering tips function to guide the tips along the respective edge regions and to space the soldering portions of the soldering tips an appropriate or desired amount from the substrate. The soldering tip 631 for the raceway 630 may include a third soldering surface for applying the solder along the outer perimeter region of the metallic band 619 along the respective edge of the front substrate. The soldering tip or tips 629, 631 may then be guided and moved along the opposite edges and may apply the ultrasonic solder therealong.

The metallic perimeter coating 619 provides an opaque, reflective strip or ring or band around the perimeter of the front substrate, such that the seal and electrical raceways are not viewable through the front substrate. The metallic perimeter coating may comprise chromium or other metallic electrically conductive coatings, and may be disposed over the perimeter regions of the transparent electrically conductive layer 618. The thickness of the metallic coating 619 and the thickness of the transparent electrically conductive layer 618 (at the perimeter region of the metallic coating) are selected to provide a desired color or appearance, and to provide sufficient conductivity at the rear surface of the front substrate. For example, the metallic coating may comprise a chromium material and the transparent electrically conductive coating may comprise an ITO layer (or other transparent electrically conductive layer, such as a tin oxide or doped tin oxide coating or a zinc oxide coating with various percentages of dopants, or an aluminum oxide coating or the like).

It may be desirable for the perimeter band to have a custom designed or selected spectral appearance in reflection. One benefit of such a custom band can be to give a spectral match/color match or a spectral/color contrast to any surrounding mirror assembly structure (such as a bezel or housing in an exterior mirror assembly). Further, since the perimeter band is not electro-optically active, it may be desirable to select a spectral reflectivity that passively attenuates or relieves the perceived glare from trailing headlights. In this regard, a spectral reflectivity in the blue region of the visible light electromagnetic spectrum may be chosen, or a light gold or copper appearance with a spectral reflectivity more toward the green portion of the visible light electromagnetic spectrum. Importantly, it is desirable that the photopic reflectivity (such as measured via SAE J964a, which is hereby incorporated herein by reference, as known in the automotive mirror art) be at least 40 percent R, more preferably at least 45 percent R and most preferably at least 50 percent R, so that the perimeter band is sufficiently reflecting to satisfy driver and regulatory needs. Optionally, the perimeter band may be constructed to have little to any noticeable spectral character, and thus may appear to an observer to be of the same silvery appearance as the bleached spectral appearance of the central electro-optically active area of the reflective element assembly. Optionally, for exterior mirrors, the spectral band of the perimeter band of a reflective element assembly can match the color or spectral appearance of a non-electro-optic passenger side mirror (such as, for example, if the passenger side mirror has a titanium reflector, then the perimeter band has a titanium metal appearance, or if the passenger side mirror has a chromium reflector, then the perimeter band may have a chromium metal appearance, or if the passenger side mirror has a bluish tint reflector, then the perimeter band has a bluish tint or appearance or the like).

For example, if the ITO layer is approximately 150 nm thick and the chromium layer is approximately 80 nm thick, the appearance of the perimeter band or ring will have more of a gold like tint or color; while if the ITO layer is approximately 98 nm thick and the chromium layer is approximately 80 nm thick, the appearance of the perimeter band or ring will be blue or have a bluish tint or color. Other thicknesses and/or other materials (such as other metallic coatings, such as aluminum, silver, rhodium, and/or alloys thereof and/or other thicknesses of ITO or refractive indices of ITO and/or other transparent conducting oxides, such as zinc oxide doped with aluminum oxide or the like) may be selected to provide different colors or appearances. For example, for a generally silver or neutral appearance of the perimeter band, an ITO layer having a thickness of approximately 120 nm and a chromium band having a thickness of approximately 80 nm may be disposed on the rear surface of the front substrate. For certain color bands, the thinner ITO coatings, such as less than 100 nm, such as, for example, a 98 nm thick ITO coating for a blue perimeter band, may result in an undesirable increase in the sheet resistance across the transparent electrically conductive coating, such as an increase to about 20 ohms per square, whereby it may be desirable to have an additional ITO layer disposed over the perimeter band and initial thinner ITO coating to bring the overall thickness of the ITO layers to around 150 nm, in order to achieve the desired sheet resistance (such as about 10 to 12 ohms per square or thereabouts, or lower) and thus the desired performance (such as the desired speed to color) of the reflective element assembly.

Optionally, if it is desired to avoid the spectral interference effect of the ITO layer between the metallic band and the front substrate, the metallic band may be disposed directly on the perimeter rear surface of the front substrate and the ITO layer (or other transparent electrically conductive layer) may then be disposed over the rear surface of the substrate and over the perimeter metallic band (which may provide a metallic or silver appearance if disposed directly on the rear surface of the front substrate). Likewise, if the selected thickness of the coatings (to achieve the desired color or appearance of the perimeter band) reduces the conductivity at the substrate surface (and thus increases the sheet resistance) to an undesirable level, an additional ITO layer may be disposed over the perimeter band and initial ITO layer to provide the desired thickness of the ITO layer while providing the desired appearance or color of the perimeter band.

Optionally, other interference effects may be implemented to provide the selected or desired color or appearance of the perimeter band without affecting the thickness of the transparent electrically conductive coating (ITO coating or the like). For example, a layer of chromium oxide (or other material having a high refractive index) may be reactively sputtered on the perimeter band region of the rear surface of the front substrate, and the perimeter metallic band (such as chromium, titanium, aluminum and/or the like) may be deposited over the high refractive layer or chromium oxide layer. In such an application, an ITO coating (or other substantially transparent electrically conductive coating) may be deposited over the perimeter metallic band and at least partially over the transparent electrically conductive coating on the rear surface of the substrate, in order to provide a conductive trace or connection between the perimeter band and the central region (the electro-optically active area or region) of the substrate surface, since the chromium oxide layer (disposed between the initial transparent electrically conductive coating and the perimeter band) would function as an insulator between the initial transparent electrically conductive coating and the metallic perimeter band. The thickness of the high refractive layer may be selected to provide the desired color or tint or appearance to the perimeter band (optionally, if the silver or neutral color is desired, the metallic band may be disposed directly on the perimeter region of the rear surface of the substrate). Optionally, multiple layers of conductive oxides or the like may be applied to provide a desired interference affect and thus color or appearance at the perimeter band. For example, a combination or stack of oxides comprising materials having different high and low refractive indices may be stacked upon one another to provide alternating refractive indices to spectrally tune the metallic band to the desired color or tint or appearance (such as utilizing principles described in PCT Application No. PCT/US03/29776, filed Sep. 19, 2003 by Donnelly Corp. et al. for ELECTROCHROMIC MIRROR ASSEMBLY, which is hereby incorporated herein by reference). After the high refractive layer (or layers having alternating high and low or different refractive indices) and metallic layers are disposed around the perimeter of the rear surface of the front substrate, the substrate may be removed from the band coating fixture (such as the fixture discussed below) and the transparent electrically conductive coating (such as an ITO coating having a thickness of about 150 nm or the like) may be deposited over the entire rear surface of the substrate and over the perimeter band.

Such an approach allows for the desired thickness of the transparent electrically conductive coating or layer (and thus the desired sheet resistance across the substrate surface, such as 10 to 12 ohms per square or thereabouts), without affecting the color or appearance of the perimeter band. The thickness of the high refractive layer may be selected to provide the desired appearance of the perimeter band without varying the thickness of the transparent electrically conductive coating and thus without compromising the performance (such as the speed to color or darken) of the reflective element assembly, and without requiring an additional coating of the transparent electrically conductive coating to achieve the desired thickness (such as around 150 nm or thereabouts) and sheet resistance (such as around 10 to 12 ohms per square or thereabouts). The color of the perimeter band thus may no longer be dependent on the thickness of the transparent electrically conductive layer. Such an approach also allows for varying the color of the perimeter band (such as for different applications or options or the like) without varying the performance of the mirror and without requiring an additional coating step or the like. The changeover from one color to another may thus be made by changing the thickness of (or eliminating) the high refractive index perimeter coating around the perimeter of the rear surface of the front substrate.

Thus, in such frameless mirror applications, if the customer desires a "silvery" reflecting border or perimeter band, it may be desirable to deposit the metallic band material directly onto the second surface of the front substrate and then deposit the transparent electrically conductive coating over the metallic band. The perimeter band material may comprise a vacuum deposited metallic coating, such as chromium, which may be a desirable choice for the border layer if deposited between the transparent electrically conductive coating and the second surface of the glass front substrate, since chromium may substantially match the chromium/rhodium central portion of the rear substrate (as viewed through the electro-optic/electrochromic medium) and chromium is durable so that a chromium band/layer may be precoated, washed, coated with a transparent electrically conductive coating, such as ITO or the like, and shipped to the mirror manufacturer. The transparent electrically conductive coating (such as ITO or the like) may be deposited onto the chromium using standard ITO deposition coating processes known in the coating arts, and/or such as described in PCT Application No. PCT/US03/35381, filed Nov. 5, 2003 by Donnelly Corp. et al. for ELECTRO-OPTIC REFLECTIVE ELEMENT ASSEMBLY, which is hereby incorporated herein by reference. The perimeter band may be established either by masking (which provides an in-coater masking during the coating step) or laser ablating (which is a post-deposition step) or a screen/coat/strip process (where a resist pre-deposition is screened or printed onto the substrate, and the perimetal band (such as chromium) is coated onto the substrate and the resist post deposition of the perimetal band material is washed away).

Because there is no need for any edge overcoat on the front substrate by either the transparent electrically conductive coating or the perimeter band, multiple front substrates may be cut (with a perimetal reflecting border layer or band on each cut shape) from a larger, multi-shape sheet or lite or calotte. The fiducial markings may be included in the masking to guide the cutting of the substrate shapes so that the perimetal reflecting border layer is aligned to the cut edges of each shape cut from the larger lite/calotte. Once cut, the border coated and ITO coated shapes can be shipped and brush washed (or otherwise washed) to complete the manufacture of the reflective element assembly or cell.

Figure 58:
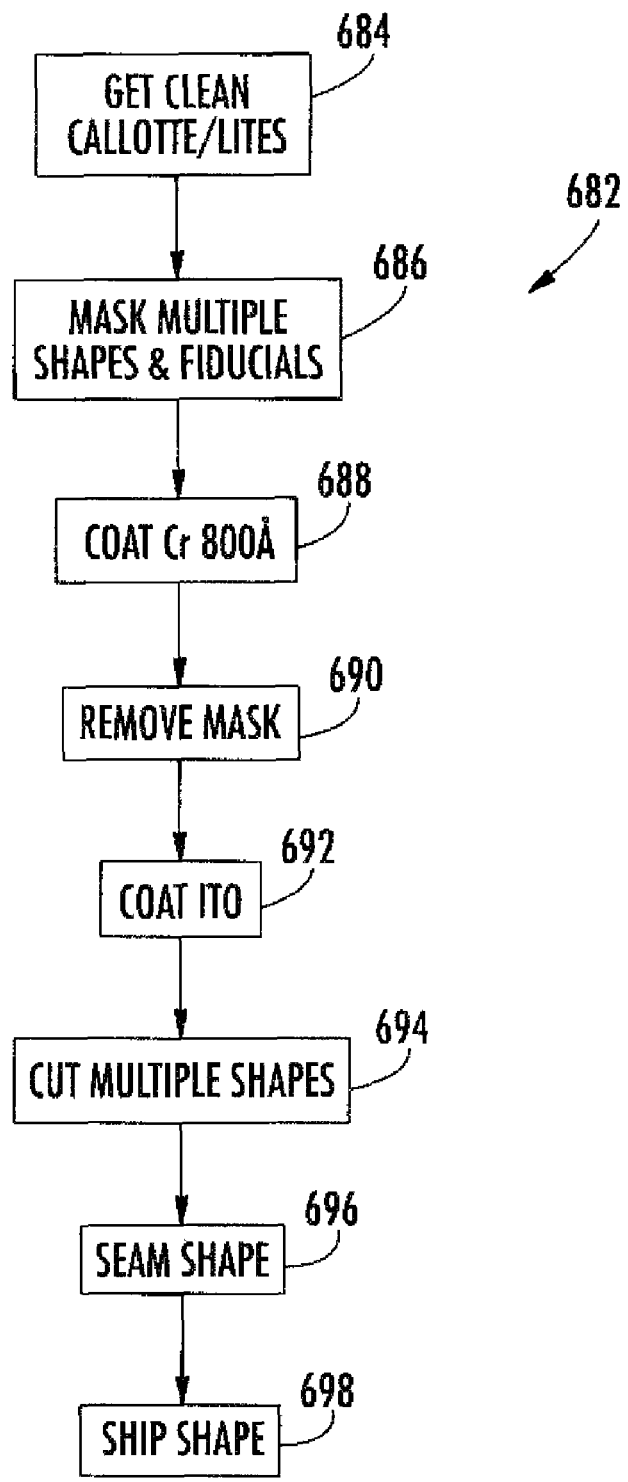
FIG. 58 is a process diagram of a method for coating and cutting front substrate shapes useful with the reflective element assembly of the present invention.

With reference to FIG. 58, the front substrate shapes may be formed from a sheet or calotte or lite via a process 682, where clean calottes or lites or sheets are obtained at 684. The two or more substrate shapes are masked on the respective sheet at 686, and the perimetal band (such as about and 800 Angstrom thick band of chromium or other thicknesses and/or materials as desired) at 688, and the mask is removed at 690. The substrate shapes are then coated with the transparent electrically conductive coating or layer (such as ITO or the like) at 692 (and the surface of the sheet may be substantially coated with the ITO). The multiple front substrate shapes may then be cut from the sheet at 694 and the edges may be seamed or finished at 696. The cut and coated front substrates or substrate shapes may then be shipped to the mirror or reflective element assembly plant or facility or location at 698, where the front substrates will be mated with the respective rear substrates and seal material and the like to form the completed reflective element assemblies or cells.

The perimeter band provides an aesthetic ring or perimeter frame around the perimeter of the reflective element assembly and hides or conceals the seals and electrical connections and/or conductive epoxy or the like that may be positioned at the overhang regions of the reflective element assembly. After the substrates are mated together and the cell is filled, plugged and cured, it may be desirable to finish or seam the edges of the substrates or cell, such as via belt seaming or the like, to buff out any chips, since any edge chips that may be present may be visible or discernible at the reflective perimeter band area of the reflective element assembly. Optionally, the front substrate (either before or after the mating with the rear substrate) may have its perimeter edges seamed or finished (such as pencil seamed or rounded) so that there is a radius and not a sharp edge at the outer perimeter of the reflective element assembly.

Because the perimeter band substantially precludes viewability of the seal and the electrical connectors through the front substrate, the reflective element assembly of the present invention is suitable for a frameless or bezelless mirror assembly, where a backing plate may be adhered to the rear surface of the rear substrate and may not extend around the perimeter edges of the front substrate so that none of the backing plate or other components or elements are viewable at and around the front substrate. The backing plate may include electrical connectors for electrically connecting to the electrical connectors at the rear surface of the rear substrate (which may not have the leads attached thereto, but may instead provide a contact area for the backing plate connectors), such that the electrical connections may be made as the backing plate is engaged with and adhered to the rear surface of the rear substrate. Such an assembly process provides enhanced assembling of the mirror assemblies, since an operator need not make the separate electrical connection before or after the backing plate is attached to the rear substrate. Optionally, however, the electrical leads may be connected to the connectors and may connect to a wiring harness of the backing plate or mirror assembly. The electrical raceways or bus-bars may be included in the heater pad such that they may contact to the fourth surface deposited bus-bars, thereby eliminating the need to dispense a conductive epoxy bus-bar at the rear surface of the rear substrate.

Optionally, the reflective element assembly may comprise curved or bent substrates (such as for exterior rearview mirror assemblies), and may comprise aspheric substrates to provide an enhanced field of view rearward. In such applications, the reflective element assembly may include a demarcation line or means (such as a dashed line or dots or the like) formed in the reflective coating or layers that typically comprise the third surface reflector/conductor in the twin substrate laminate electrochromic cell construction. This demarcation line or means is typically conveniently established by using a laser to etch away the coating at an outboard region of the rear substrate metallic coating so that the demarcation line (for example, dashes or dots) runs generally vertically from the top to the bottom of the electrochromic mirror (and is disposed at or near an outboard portion thereof) when the EC mirror is ultimately mounted on the exterior of its intended vehicle. The demarcation line or means demarcates the outer, more sharply curved, lower radius of curvature aspheric region from the inboard (typically convex curvature) main viewing portion of the electrochromic rearview mirror. Because the perimeter band is at the second surface of the reflective element assembly, it may hide or conceal the upper and lower ends or end portions of the demarcation line established in the reflective coating or coatings on the third surface of the reflective element assembly. Optionally, the perimeter coating or band of the second surface of the front substrate may be etched with similar dots or dashes (or the like) so that this etching matches the demarcation line established on the third surface metallic reflector. This demarcation portion of the perimeter coating on the second surface is established at an upper portion of the band and at a lower portion of the band that will coincide with, and generally run coincident with, the demarcation line established on the third surface metallic reflector when the front and rear substrates are juxtaposed to form the electrochromic reflective element assembly. Accordingly, when the front substrate, with the perimeter band so demarcated, and the rear substrate, with the demarcation line established across its third surface reflective surface, are juxtaposed and mated together, and after the reflective element is mounted on the vehicle, the driver of the vehicle views the demarcation line to continue generally uninterrupted from the central viewing region out (via the demarcated lines/portions of the perimeter band) to the top edge and bottom edge of the electrochromic mirror element as it is mounted on the vehicle.

Therefore, the perimeter band may include a portion of the demarcation line formed thereon. Optionally, the demarcation line or lines or line portions may be formed in the perimeter band and/or in the third surface reflective coating after the substrates are mated together. Dots or dashes, or similar non-continuous demarcation lines or segments or portions, are preferred so that electrical conductivity is preserved between the dots and dashes established, for example, in the metallic perimeter band. For example, the demarcation line may be formed by laser ablating the reflective coatings from the second and third surfaces. Any tiny contaminants that may be present after the laser ablation process may be dispersed via a heating process. The laser ablation may occur before or after the reflective element assembly or cell is filled with the electro-optic medium.

Because the reflective element is suitable for a frameless or bezelless mirror assembly, it is envisioned that the reflective element assembly may attach to a common backplate or mirror holder, which may be common for different reflective element assemblies, such as different sized or shaped reflective element assemblies for different vehicles or selected options or vehicle lines. The reflective element assembly thus may be selected and attached to a universal or common backplate or mirror holder to provide different features or color schemes to the mirror depending on the options selected for a particular application or vehicle, such as utilizing aspects of the mirror assemblies and mirror holders described in PCT Application No. PCT/US2004/015424, filed May 18, 2004 by Donnelly Corp. et al. for MIRROR ASSEMBLY FOR VEHICLE; PCT Application No. PCT/US2003/022196, filed Jul. 17, 2003 by MagnaDonnelly North America, L.L.C., and published on Jan. 29, 2004 as International Publication No. WO 2004/009408 A1, and U.S. provisional application Ser. No. 60/319,408, filed Jul. 19, 2002; and/or PCT Application No. PCT/US2003/021885, filed Jul. 14, 2003 by MagnaDonnelly North America, L.L.C., and published Jan. 29, 2004 as International Publication No. WO 2004/009407 A2, and U.S. provisional application Ser. No. 60/319,407, filed Jul. 19, 2002, which are hereby incorporated herein by reference.

For example, a common back plate or mirror holder may have a standard actuator attachment portion or ring, and may optionally include a common heater pad (or the heater pad may be provided or established on the rear or fourth surface of the reflective element assembly, as discussed below), and may include the electrical connectors integral therewith or molded thereon. The common back plate, because it may be sized to have one or more dimensions that are smaller than the rear substrate and thus recessed away from the perimeter regions of the rear substrate, may be attached to or adhered to different reflective element assemblies (or two or more common backplates may be provided to accommodate smaller and larger mirror sizes). The common backplate or backplates may be sized to provide sufficient surface area for sufficient adherence to the fourth surface of the respective reflective element assembly, and may not extend to the perimeter regions of the rear substrate so as to avoid being viewable at the perimeter regions. The electrical connections between the backplate circuitry or wiring and the connectors or bus-bars or wiring of the reflective element assembly may be made after the common backplate is attached to or adhered to the fourth surface of the reflective element assembly, or as the backplate is attached to or adhered to the reflective element assembly (such as discussed below), and then the reflective element assembly may be finished via a protective coating or the like being applied to the rear surface and electrical connections at the rear of the reflective element assembly or cell. The backplate may also include routings or clips for routing and retaining the wiring along the backplate to reduce or relieve strain on the wires. The common backplate and/or heater pad thus provides a deproliferation of parts at the reflective element assembly manufacturing facility and thus may achieve reduced assembly costs and enhanced assembly processes.

Referring now to FIGS. 39 and 40, a rear substrate 614' for an electro-optic or electrochromic reflective element assembly (such as for an interior or exterior mirror assembly) may have a metallic reflective conductive coating 620 disposed on the front surface 614a' of the substrate (such as the surface that will become the third surface of the reflective element assembly or cell when the cell is assembled), and at least a portion of the third surface conductive coating 620 may continue from the third surface onto a portion 614b' of the perimeter edge 615' (where the perimeter edge or edges or edge portions 615' of the rear substrate are between the third surface and the fourth surface of the rear substrate) so as to wrap around or coat an edge or edge portion 614b' of the substrate 614', such that one of the edges is coated by a portion 620a of the metallic coating (such as chromium and/or rhodium or the like), similar to the substrate 614 discussed above, in order to establish electrical continuity between the third surface and the edge portion 614b'. The other edges 614d' of substrate 614' may not be coated by the coating 620. The rear surface 614c' of the substrate 614' (the fourth surface of the assembled reflective element assembly) may also have a conductive coating 634 (such as chromium or the like) disposed over a portion of the rear surface, and a portion 634a of the fourth surface conductive coating may continue from the fourth surface onto a portion of the perimeter edge so as to wrap around or coat the edge portion or edge region 614b', in order to establish electrical continuity between the fourth surface and the edge portion. The wraparound portion 634a of the fourth surface conductive coating 634 may overlap or overcoat the wraparound coating 620a at an overlap region of the edge 614b' (the fourth surface conductive coating may overlap the third surface conductive coating at the overlap region or the third surface conductive coating may overlap the fourth surface conductive coating or the coatings may otherwise overlap one another or at least partially coincide along at least a portion of the perimeter edge, without affecting the scope of the present invention), in order to establish electrical continuity between the fourth surface conductive coating on the fourth surface and the third surface conductive coating on the third surface of the rear substrate. The rear substrate 614' thus provides a conductive wraparound that provides a conductive connection and electrical continuity from the rear or fourth surface 614c' of the substrate around the edge 614b' and to the front or third surface 614a'. As can be seen in FIG. 39, the coatings or coating portions 634a and 620a of the overlap region may extend substantially (such as, for example, at least 5 mm or more or less) along the respective edge or edge region or portion of the substrate. The coating 620 at the front surface 614a' thus may be energized or powered via an electrical connector 624 (such as an electrical connector soldered or otherwise attached or connected to the rear surface conductive coating 634) at the rear surface 614c' of the substrate. The double coating or overlap 636 along the edge 614b' provides a robust conductive coating along the edge of the substrate. The electrical connector 624 may be secured or connected to the fourth surface coating 634 via a solder joint 623, and may be operable to power the third surface conductive coating via electrical conduction between the fourth surface conductive coating and the third surface conductive coating at the overlap region. Another electrical connector or connection (not shown in FIG. 40) may be provided to power the second surface conductive coating of the reflective element assembly.

The fourth surface coating on the fourth surface of the rear substrate may be large enough for making an electrical connection thereto, but need not extend substantially along or over the fourth surface of the substrate. For example, a distance of about 1 cm to about 5 cm is preferred, with the particular or selected dimension depending on various parameters, such as the material used for the third surface conductive coating (for example, silver is more conductive than chromium or rhodium, such that a smaller connection area/bus bar is required), and/or such as the thickness of the conductive coating or coatings (for example, a thicker coating is more conductive, such that a smaller dimension connection area is required). Other dimensions may be selected depending on the particular application, without affecting the scope of the present invention.

The coating 620 may be deposited on the substrate in a vacuum deposition chamber or the like. After the third surface metallic coating is deposited on the third surface, the substrate 614' may be flipped or turned over and the fourth surface or wraparound coating may be disposed or deposited on the fourth surface and along the already coated edge of the substrate. The fourth surface may be masked such that the coating 634 may only be applied over the perimeter region of the fourth surface and generally along and at least partially over the coated edge portion of the substrate. The third and fourth surface conductive coatings may comprise similar materials (and may be established in a unitary operation) or dissimilar materials (and may be established in separate operations). Optionally, the conductive coating 634 may comprise a different conductive material than the third surface conductive coating 620. For example, the conductive coating 634 may have a higher conductivity characteristic, such that a thinner layer may be applied to the rear surface and edge to achieve the desired conductivity. The fourth surface conductive coating may comprise any suitable conductive layer or coating, such as a vacuum deposited electrically conductive coating (such as a sputtered metallic coating or the like), an electrically conductive polymeric coating (such as a conductive epoxy coating or the like), an electrically conductive solder coating, and/or an electrically conducting frit coating and/or the like.

Figure 41:
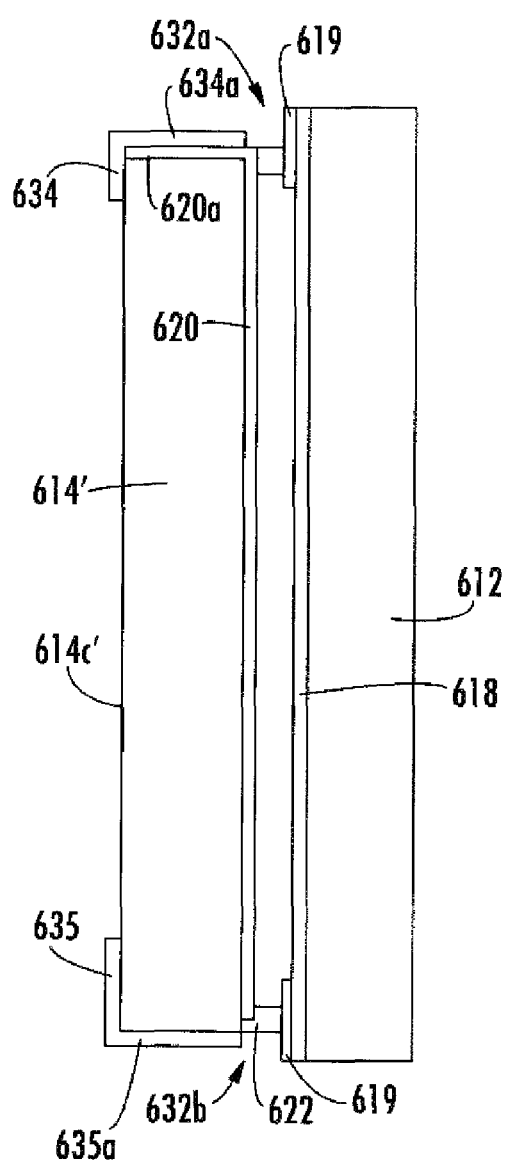
FIG. 41 is a sectional view of another reflective element assembly in accordance with the present invention.
Figure 42:
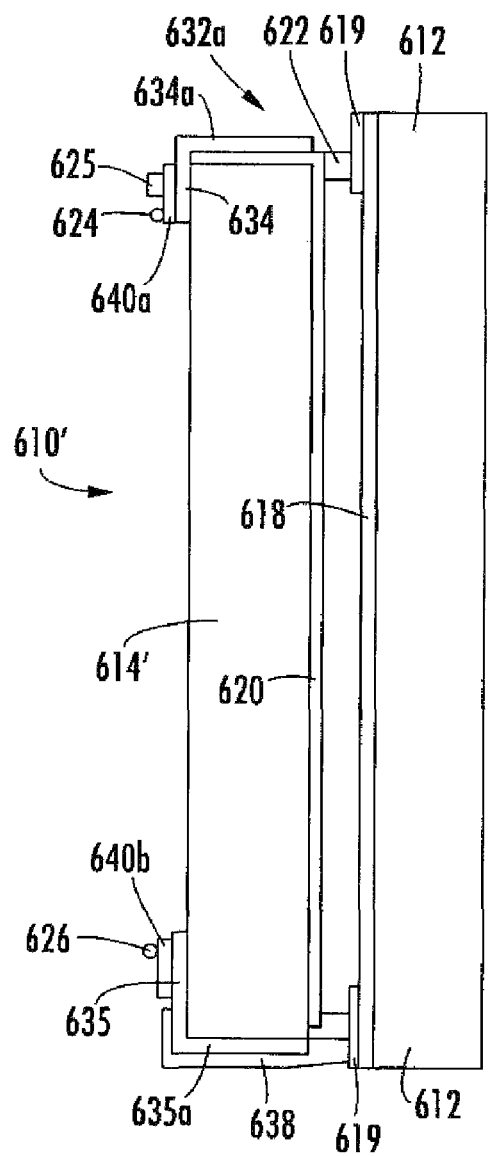
FIG. 42 is a sectional view of the reflective element assembly of FIG. 41, with a conductive epoxy disposed at an overcoated edge.

With reference to FIGS. 41 and 42, a reflective element assembly 610' may include front substrate 612 and rear substrate 614'. An opposite rear surface coating 635 and edge or wraparound coating 635a may be applied over and along the perimeter of the rear surface and over and along the edge 614d' of the rear substrate 614', such that opposite conductive coatings 634, 634a and 635, 635a are disposed along opposite perimeter and edge regions of the substrate 614'. A conductive epoxy 638 (or similar conductive polymeric means or the like) may be disposed at the rear surface coating 635 and edge coating 635a and may extend into contact with the conductive band or layer 619 (or conductive layer 618 if disposed over the band or layer 619, as discussed above), such that the rear surface coating 635 is electrically connected to the conductive layers at the rear surface 612a of the front substrate 612. Optionally, an electrically isolating or insulating material (such as the insulating material 642 discussed below with respect to FIG. 46) may be disposed along the overlap region of the third and fourth surface conductive coatings and within and at least partially along the overhang region of the mirror element (where the perimeter edge of the rear substrate is recessed from a corresponding portion of the perimeter edge of the front substrate), in order to electrically isolate the second surface conductive coating and/or the perimeter band from the third and fourth surface conductive coatings and thus to limit or substantially preclude electrical shorting of the mirror reflective element assembly when powered.

Optionally, a conductive pad or element or foil 640a, 640b (such as a thin metallic pad or foil, such as a thin copper foil or pad or a conductive rubber pad or the like) may be adhered or otherwise secured to the respective rear surface conductive layer 634, 635, and an electrical connector 624, 626 may extend therefrom for electrical connection to a lead or harness or the like. Preferably, the connectors or leads may be soldered or crimped onto the conductive pads or foils before the pads or foils are attached or adhered to the rear surface of the rear substrate, so that the heating and soldering process will not degrade the adhesive or epoxy used to secure or adhere the pads or foils to the rear surface of the substrate. The pads or foils may comprise continuous sheets or strips or may include holes or may be segmented to allow for more of the conductive epoxy to contact the rear surface of the substrate to enhance the adhesion of the pads or foils to the substrate. Optionally, the pads or foils may include a connector, such as a male or female connector to provide a plug/socket type connection at the rear of the reflective element assembly.

Optionally, the conductive pad 640a may comprise a generally L-shaped element, with a substantially flat pad at the rear surface of the substrate and a bent arm or extension that extends partially along the edge coating at the edge 614b of the substrate, while the conductive pad 640b may be similar to the pad 640a, but the arm or extension may extend to contact the conductive coatings on the rear surface of the front substrate and may further include a tab or extension that bends and extends partially along the perimeter surface of the conductive coatings on the rear surface of the front substrate, in order to enhance the electrical connection between the pads and the respective conductive coatings. The tab or foil may be attached to the rear surface of the substrate via adhesion, such as via transfer tape or double sided tape or the like, or via other attachment means.

A conductive or non-conductive epoxy 625 may be disposed at the electrical connector to further retain the connector at the rear surface of the reflective element assembly and to reduce strain on the connector during assembly of the reflective element assembly and mirror assembly. The conductive epoxy or epoxies may be selected to provide a desired resistivity, such as, for example, about 0.005 to about 0.0005 ohm.cm. Examples of suitable conductive epoxies include 3140XL, 3050 and/or 126B materials available from Emmerson & Cumming of Randolph, Mass., and/or H31 materials available from Epoxy Technology of Billerica, Mass., and/or the like. Optionally, the wire or leads or wiring harness may be directly connected to a conductive epoxy applied at the rear surface of the substrate and at least partially over the fourth surface coating.

After the electrical connections are made, a conformal coating may be applied to the rear surface of the reflective element assembly. The conformal coat may be sprayed, jetted, dispensed or brushed onto the reflective element assembly. The conformal coat may comprise a clear coating or an opaque coating, and may be cured via various curing means, such as heat, moisture or UV curing means or the like. The conformal coat protects the bus-bars and the contact points at the rear or back of the reflective element assembly. Optionally, for applications where an opaque or black coating is desired to conceal the bus-bars and the like, the conformal coating may comprise an opaque or black coating, or the conformal coating may comprise a clear coating, and a black coating or paint may be applied over the conformal coating to conceal the bus-bars, contact points and the like. It is desirable to keep the black or opaque coating or paint away from the perimeter edges of the substrates (particularly for pencil seamed edges where the dark or black layer may be viewable), so it may be desirable to apply a grey coating or layer first, and then a black or dark layer or coating or paint over the first layer or coating. The paint may be applied over the protective coating and/or over the edges of the glass substrates.

By utilizing the concepts of the present invention, the use of a bezel to surround the edge of the reflective element assembly may be obviated, so that a viewer looking at the mirror reflective element sees and enjoys the utility of the entire coated surface area. Thus, it is desirable to provide an opaque or dark coating or paint at the visible edge of the reflective element assembly. Optionally, the cut edge of the front substrate (that may be pencil edged or seamed or otherwise finished or seamed) may be coated or covered by a light absorbing material so that the viewability or discernibility of any imperfections in the cut edge is reduced or substantially precluded or eliminated. Thus, the cut edge may be painted with a paint or lacquer, or a ceramic frit may be applied and fused thereon, or a tape or thin polymeric or plastic film may be applied around the edge, in order to cosmetically finish the viewable edge of the reflective element. In this regard, a dark colored paint may be preferably applied around and along the perimeter edge of the front substrate of the reflective element assembly.

Figure 43:
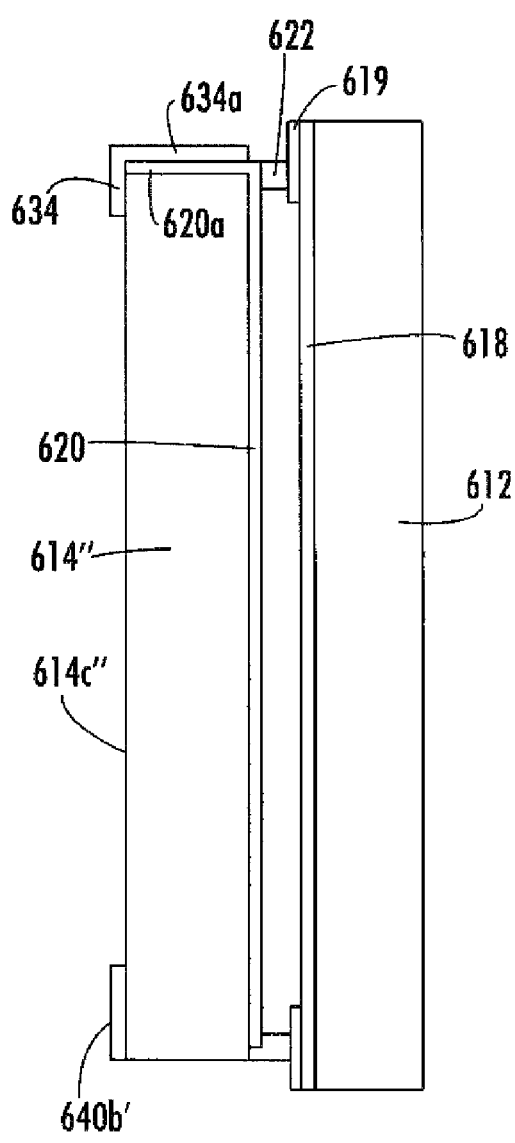
FIG. 43 is a sectional view of another reflective element assembly in accordance with the present invention.
Figure 44:
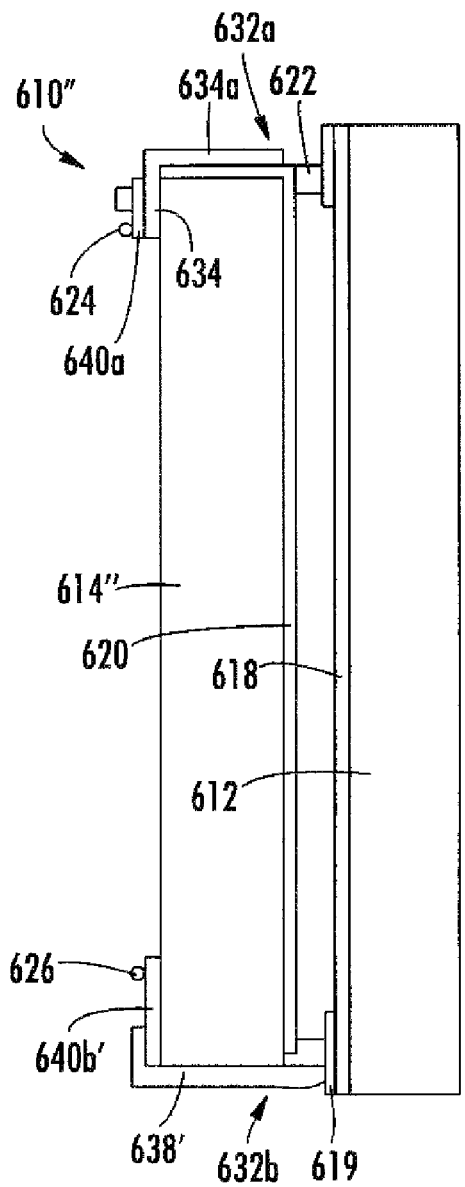
FIG. 44 is a sectional view of the reflective element assembly of FIG. 43, with a conductive epoxy disposed at an uncoated edge.

Optionally, and with reference to FIGS. 43 and 44, the rear substrate 614" of a reflective element assembly 610" may include a conductive pad or element 640b' (such as a metallic pad or element, such as a copper pad or the like) positioned at or adhered to the rear surface 614c''' and generally near or at the perimeter edge 614d'''. The conductive epoxy 638' may be disposed over a portion of the conductive pad 640b' and along the edge 614d''' of the substrate and may span the gap between the substrates and contact the conductive coatings 619, 618 at the rear surface 612a of the front substrate 612. The electrical connector 626 may be connected to the conductive pad and may be electrically connected to the power source or control or circuitry to provide current to the conductive coatings at the rear surface of the front substrate. Similar to rear substrate 614' discussed above, the conductive pad 640a may be secured to the rear surface coating 634 of rear substrate 614", and may be electrically connected to the electrical connector 624, as described above. The wraparound or overlap coatings at the opposite edge 614b" of substrate 614" may also be substantially similar to the coatings on substrate 614', such that a detailed discussion of those coatings will not be repeated herein.

Figure 45:
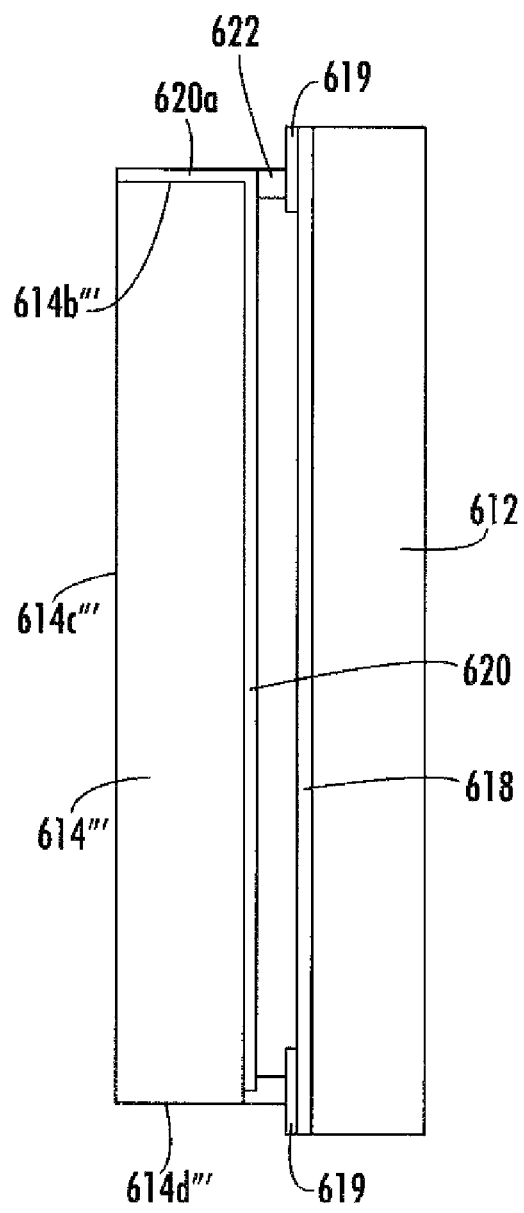
FIG. 45 is a sectional view of another reflective element assembly in accordance with the present invention.
Figure 46:
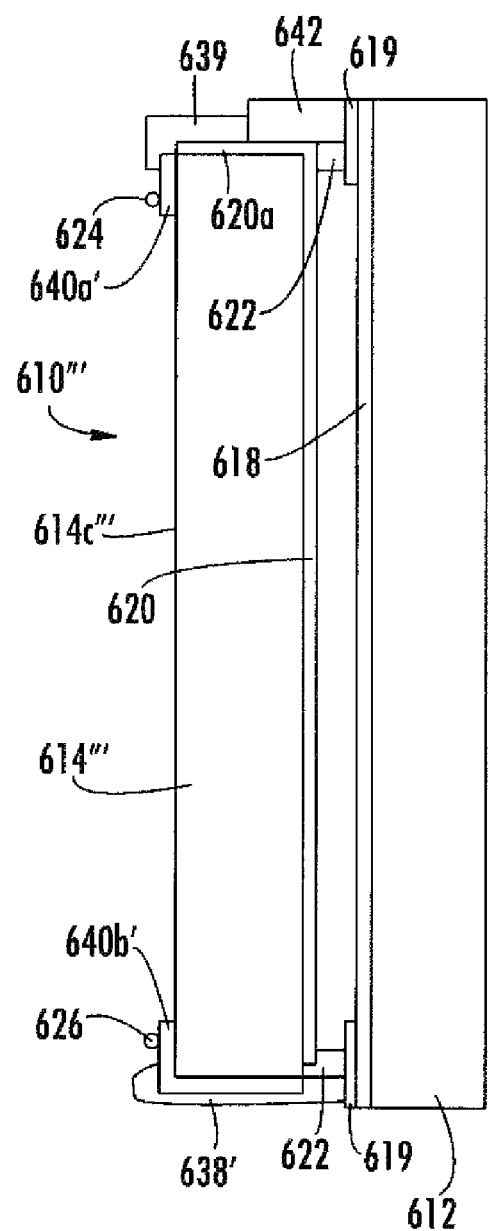
FIG. 46 is a sectional view of the reflective element assembly of FIG. 45, with a conductive epoxy and insulation layer disposed at one or more of the edges of the rear substrate.

Optionally, and with reference to FIGS. 45 and 46, a reflective element assembly 610''' includes front substrate 612 and rear substrate 614'''. Similar to rear substrate 614" discussed above, rear substrate 614''' includes a conductive pad or element 640b' attached to rear surface 614c''' and at or near or generally along the perimeter edge 614d'''. Likewise, rear substrate 614''' includes a conductive pad or element 640a' attached to the rear surface 614c''' and at or near or generally along the perimeter edge 614b''' of substrate 614'''. Conductive epoxy 638' is disposed partially over conductive pad 640b' and along edge 614d''' and contacts the conductive layers 619, 618 at the rear surface of the front substrate 612, in a similar manner as described above. Likewise, a conductive epoxy 639 is disposed partially over conductive pad 640a' and along edge coating 620a to provide electrical connection between the connector 624 at conductive pad 640a' and the third surface coating 620. An electrically insulating layer or member or element 642 is provided at the outer regions of the perimeter band 619 and along the seal 622 to electrically isolate the conductive epoxy 639 from the perimeter band 619 and conductive coating 618 at the rear surface of the front substrate 612.

Figure 47:
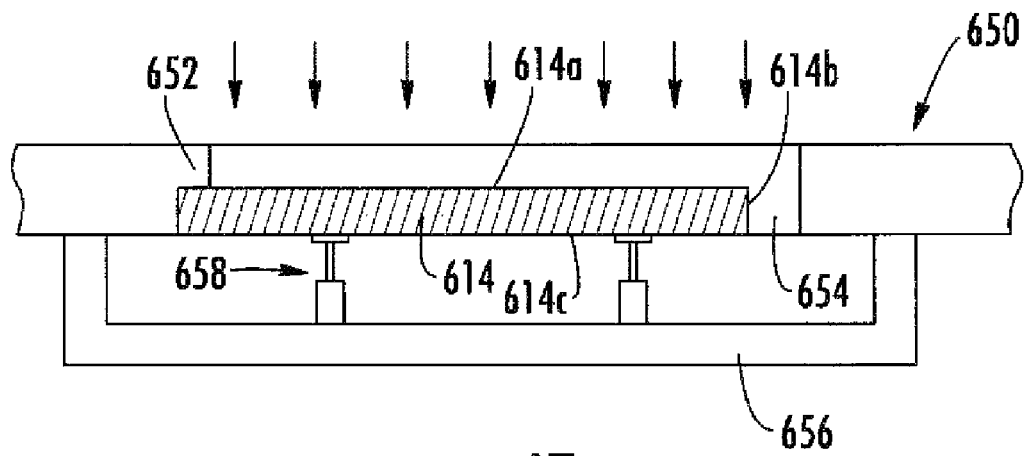
FIG. 47 is a sectional view of a masking fixture for use in coating the third surface and at least part of at least one edge of the rear substrate of a reflective element assembly of the present invention.

Optionally, the front surface 614a of the rear substrate 614 may be coated with the conductive coating in a vacuum deposition chamber or sputter coating chamber or the like. As shown in FIG. 47, the substrate 614 may be placed in a fixture 650 that has an enlarged opening therethrough relative to a dimension of the substrate (such as a height or width of the substrate). The substrate may be placed in the fixture such that a masking and supporting lip 652 of the fixture engages a perimeter region of the front surface along the perimeter of the substrate except along the perimeter at the edge 614b of the substrate. The edge 614b corresponds to an enlarged opening or area of the fixture 650, such that a gap 654 is defined between the edge 614b of the substrate and the fixture 650. The substrate may be retained in position in the fixture 650 via a positioning bridge or retaining bridge 656 and positioning elements or arms 658. The positioning bridge 656 and positioning elements 658 may be substantially similar to the bridge 138 and spring-loaded arms 138b discussed above, such that a detailed discussion of the bridge will not be repeated herein.

When the substrate 614 is positioned in the recess and against the masking lip 652, the supporting arms and bridge are positioned at the substrate to support and retain the substrate. The substrate holding fixture and substrate (or substrates) may then be placed in a coating chamber, such as a vacuum deposition chamber or the like, such as a sputter deposition chamber, and the metallic coating may be deposited over the front surface 614a of the substrate 614 except in the perimeter region that is masked by the masking lip 652. Because of the gap 654 between the edge 614b of substrate 614 and the holding fixture 650, the coating particles/material may be deposited on the edge 614b as well, so as to provide the wraparound coating along the edge 614b of the substrate 614.

If a rear surface coating and/or wraparound coating is desired (such as rear surface and edge coatings 634, 634a discussed above), the holding fixture may be flipped over or turned over for coating the rear surface 614c of the substrate. In such an application, an additional mask or masking plate or the like may be positioned at the rear surface (and may be held in place by the positioning arms) to avoid coating of the rear surface except along the perimeter region at and along the coated edge 614b of the substrate. Optionally, the holding fixture and substrate or substrates may be positioned in a coating chamber where the coatings may be applied from both directions so as to coat both surfaces (or portions thereof) at substantially the same time. Desirably, the coating of both sides occurs via a single unitary vacuum operation or apparatus, such as in a single deposition chamber (where the coating material may be deposited from targets at opposite sides of the holder and substrates) or in sequential chambers where the fixture and substrate/substrates are moved from one chamber to the next as part of a coating process. The present invention thus contemplates the efficient establishment of the front or third surface coating and the rear or fourth surface coating in one chamber or via a unitary coating process, as opposed to multiple coating processes via separate chambers, and thus may achieve reduced capital costs for the coating process.

For example, the holding fixture and substrate or substrates may be moved from one coating chamber to one or more subsequent chambers (such as via a conveyor or the like) and may be coated with a particular coating at each chamber. For example, one chamber may deposit an adhesion layer (such as a chromium layer or the like) on one or both surfaces, and a second or subsequent chamber may deposit a conductive layer (such as aluminum, titanium or the like for the front surface and such as copper for the rear surface), and a third or subsequent chamber may deposit a passivation layer (such as a chromium layer or the like) on one or both surfaces, and a fourth or subsequent chamber may deposit a reflective layer (such as rhodium or the like) to the front surface. Multiple coatings thus may be deposited on one or both surfaces while the substrate is in the holding fixture, such that the coating process reduces the handling of the substrate between applications or coatings.

The multi-stack coatings (such as a conductive layer of aluminum or titanium or copper or silver or the like disposed or sandwiched between layers of chromium) may be deposited on the third and/or fourth surfaces to provide increased conductivity, without having to provide a thick layer of chromium (since chromium itself is not so highly conductive as, for example, copper or silver, and thus may be deposited as a thick coating or layer to achieve the desired conductivity).

The first or bottom thin chromium layer provides the desired adhesion, while the conductive layer increases the conductivity at the band and the top chromium layer provides the desired passivation layer. A top layer of rhodium (or other reflective coating) may then be applied to the second chromium layer or passivation layer at the third surface to provide the desired reflectance. The desired conductivity of the layers thus may be achieved with multiple layers of multiple coatings that have a total physical thickness that is less than a similarly conductive single layer of chromium.

Figure 48:
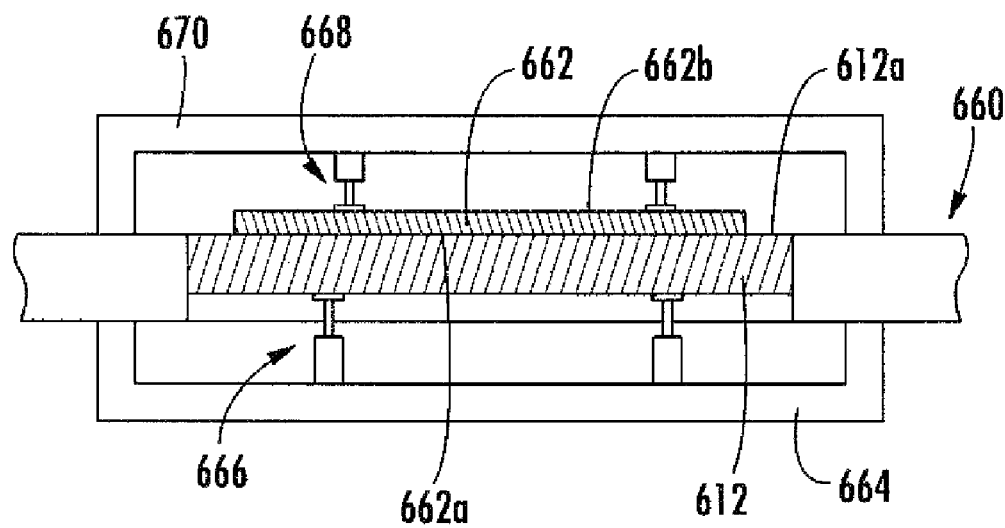
FIG. 48 is a sectional view of a masking fixture for use in coating the second surface of the front substrate of a reflective element assembly of the present invention.

Optionally, and with reference to FIG. 48, a holding and masking fixture 660 may receive and support a front substrate 612 and may position and hold a mask or plate 662 over a central region of the rear surface 612a of the front substrate 612 for coating of the perimeter metallic band 619 around the perimeter regions of the rear surface 612a. Masking fixture 660 includes a recess or aperture for positioning substrate 612 therein. Masking fixture may include multiple tabs or positioning ridges along the sidewall of the aperture to properly locate the substrate 612 within the aperture. A positioning bridge 664 and positioning arms 666 (such as spring-loaded arms as described above) may be positioned at one side of the fixture so that the arms 666 engage and urge the substrate toward and into engagement with the mask 662. As can be seen in FIG. 48, the mask 662 is positioned at and urged against the rear surface 612a of substrate 612 via positioning arms 668 (such as spring-loaded arms as described above) extending from a positioning bridge 670. The substrate 612 is thus retained within the holding fixture with the mask 662 urged into tight engagement with the rear surface 612a of substrate 612.

In the illustrated embodiment, mask 662 comprises a thin glass plate (which may be curved to match the curvature of the rear substrate) that may be attached to the positioning arms 668. Preferably, the perimeter edges of the glass plate mask 662 are chamfered to provide a sharp edge along the substrate surface 612a to reduce or minimize any unevenness of the edges of the coating after the coating is applied to the perimeter region of the substrate surface. The glass mask may be cut via any suitable cutting means, such as water jet cutting or the like, and the edges may be finished to provide the desired sharp edge (to reduce shadow effects), such as via diamond wheel grinding or belt seaming or the like. Preferably, the engaging surface 662a of the glass mask is smooth to allow a tight engagement of the glass mask to the glass substrate surface, while the opposite surface 662b is sand blasted or bead blasted or otherwise roughened so that the coating particles will bond or attach to the surface 662b and thus will reduce flaking or particulates that may otherwise flake off of a smooth surface. Such flaking may cause imperfections in the coating on the substrate surface.

The substrate or substrates may be placed in the appropriate fixture and secured therein via the bridges and spring loaded arms or the like, such that the substrates are held in place and the mask or masks are tightly urged against the glass surface of the substrate to provide a tight mask and thus a sharp edge to the masked area. For example, the substrate or substrates may be placed in the recess or recesses of the holding fixture, and the bridge or bridges (with the appropriate mask and/or holding arms/pads) may be closed or moved (such as lowered or pivoted or the like) over the substrate and secured in place at the fixture, whereby the mask and holding arms provide a spring-loaded contact and urging against the substrate (from one or both sides of the substrate) to substantially hold the substrate in place at the fixture. The spring-loaded/urged contact between the glass surface and the mask provides for an enhanced masking edge, and firmly or securely holds the substrate in the fixture and thus allows the holding fixture and substrates to be picked up or otherwise moved without affecting the location of the mask at the substrate.

The holding fixtures and substrates of the present invention thus may be loaded and moved into a coating chamber (such as via a manual loading and/or moving operation or via automated or robotic loading/moving processes or means) for coating one or more layers or coatings thereon. The coatings applied in one or more coating chambers may comprise the same coating material or different coating materials. The central part of the rear surface of the rear substrate may be contacted or touched, such as by a suction cup or the like, to load and/or unload the substrates in to and/or out from the fixture, since that area may not be coated. The fixture may be placed in a horizontal sputter chamber, where the coating or coatings may be sputtered and deposited from above and/or below the fixture and substrates, or the fixture may be placed in a vertical sputter chamber, where the coating or coatings may be sputtered and deposited from one or both sides of the fixture and substrates, or may be placed in other orientations, without affecting the scope of the present invention.

Therefore, the present invention provides an electro-optic or electrochromic reflective element assembly suitable for use in a bezelless or frameless mirror assembly, such as a frameless exterior rearview mirror assembly. Although shown as substantially flat glass substrates, the substrates may be curved to provide a concave reflective element suitable for an exterior rearview mirror assembly. The reflective element assembly provides electrical connections at the rear surface of the rear substrate, where the connections are not viewable through the reflective element assembly. The perimeter metallic band around the rear surface of the front substrate conceals or hides the seal and electrical connections and provides an electrically conductive raceway, while also providing an aesthetically pleasing appearance for the frameless mirror assembly.

Optionally, and as shown in FIGS. 49 and 50, a front substrate 612' (such as a front substrate for an electro-optic reflective element assembly or such as a substrate for a prismatic reflective element) may include a perimeter or perimetal border coating 619' on its second surface 612b' (opposite to the first surface 612a' that faces the driver of the vehicle when the mirror assembly is installed in the vehicle). The perimetal coating 619' includes an enlarged area or region 619a', such as along a lower region of the reflective element. The seal (which seals the electrochromic medium between the front substrate 612' and the rear substrate) is disposed between the perimeter regions of the substrates and generally along the perimetal coating 619', and is generally concealed or hidden by the coating 619' so that the seal is not readily viewable through the front substrate by an occupant of the vehicle, such as described above and such as described in U.S. provisional applications, Ser. No. 60/624,091, filed Nov. 1, 2004; and Ser. No. 60/638,250, filed Dec. 21, 2004 by Karner et al. for MOUNTING ASSEMBLY FOR MIRROR AND METHOD OF MAKING SAME, which are hereby incorporated herein by reference. The seal thus may follow the shape of the coating, and may follow or be disposed along the bump or enlarged area or region 619a', such that the seal and reflective element may define or provide a region outside of the seal but within the perimeter of the front substrate for positioning one or more accessories or the like. The accessories, such as sensors 680a, 680b, may be disposed or positioned at the coating 619' and outside of the seal, such that the reflective element assembly may include such accessories or sensors or inputs within the perimeter regions of the front substrate, thereby providing a generally flush or frameless reflective element and mirror assembly.

The perimetal coating 619' provides an outer area or region at the back surface of the front substrate and includes the bump or enlarged area or region 619a' outward from the seal (and thus not behind an electro-optically dimmable portion of the mirror reflector) for positioning sensors, such as glare sensors, photo sensors, touch sensors or proximity sensors or the like. The perimetal or border coating or layer may comprise a reflective coating (such as a metallic thin film coating) or a non-reflective coating (such as a dark paint or ink or frit or a non-reflecting or poorly reflecting film), and may be substantially opaque or may be at least partially light transmitting (or there may be a local region within the bump or enlarged area or region 619a' that is at least partially light transmitting so that a photo sensor can be disposed at this local light transmitting region and have a field of view through the perimetal or border coating and so detect, for example, glaring headlights from a rear approaching vehicle when the essentially frameless interior rearview mirror assembly is mounted in the interior cabin of the host vehicle), without affecting the scope of the present invention.

The border or perimetal coating 619', including its portion forming bump or enlarged area or region 619a', is preferably selected so as to at least partially (and more preferably substantially, and most preferably completely) conceal or hide the seal that is disposed around the electrochromic medium and between the substrates. For applications with a glare sensor (where the sensor senses light from the rear of the vehicle and thus receives light through the front substrate), the coating is at least partially light transmitting at least in the region where the glare sensor is positioned. The sensors may be arranged on the enlarged region above and below one another (as shown in FIG. 50), or may be arranged side by side one another or in any other desired or appropriate pattern or arrangement, without affecting the scope of the present invention. The sensors may comprise glare sensors or photo sensors (such as sensors of the types described in U.S. Pat. Nos. 4,793,690 and 5,193,029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference), or touch or proximity sensors (such as the sensors of the types described in PCT Application No. PCT/US03/40611, filed Dec. 19, 2003 by Donnelly Corp. et al. for ACCESSORY SYSTEM FOR VEHICLE; and/or U.S. patent application Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; and/or Ser. No. 10/933,842, filed Sep. 3, 2004, now U.S. Pat. No. 7,249,860, which are all hereby incorporated herein by reference).

The perimeter coating thus provides a coating or portion for the seal to be disposed along, in order to shape the seal so that a region is formed outside of the seal but within the perimeter of the front substrate. The coating may thus provide an outer area for a function, such as touch sensing, proximity sensing, light sensing and/or glare sensing via sensors positioned at the outer area. The coating and substrate of the present invention thus are suitable for use in a frameless mirror assembly, while providing functionality at the reflective element. As discussed above, the front substrate may be offset or larger than the rear substrate so as to provide an overhang region along the upper and/or lower perimeter regions. The accessory or sensor or sensors may be positioned along the overhang region, such as along the lower overhang region.

Thus, in accordance with this aspect of the present invention, an essentially frameless interior mirror assembly (whether an electrochromic mirror assembly or a prismatic mirror assembly) can be formed where a user actuation interface is provided as a human machine interface, without having to create a gondola protrusion or bulge below the overall styling line defined by the interior mirror shape itself (and thus avoids any interference with a driver's forward field of view through the windshield of the vehicle), or without having to create an eyebrow protrusion or bulge above the overall styling line defined by the interior mirror shape itself (and thus avoids any interference with a driver's forward field of view through the windshield of the vehicle). However, should such protrusions or bulges be small/compact (less than about 1.5 cm protrusion from the line of the mirror shape preferred; less than about 1 cm more preferred; and less than about 0.75 cm most preferred), they can optionally be used alone or in combination with the perimetal/border coating (including its portion forming bump or enlarged area or region) of the present invention.

Although shown and described as being a coating around the perimeter of an electrochromic reflective element assembly, the perimetal coating may be disposed around the perimeter edge or region of other reflective elements, such as prismatic reflective elements or the like. When disposed on prismatic reflective elements, the coating may only be disposed at the region at which the sensors are positioned, since the coating around the other portions or regions is not necessary, since there is no seal to hide or conceal on a prismatic reflective element assembly. Also, when a perimetal coating (including its portion forming bump or enlarged area or region) is used with an electro-optic mirror cell (such as an electrochromic mirror cell) that comprises a front substrate and a rear substrate sandwiching an electro-optic medium and spaced apart by a perimetal seal, the sensors, such as a photosensor and one or more proximity sensors, can be disposed behind the rear substrate (i.e. behind the fourth surface of the twin-substrate laminate) or the rear substrate can be notched at a portion that corresponds with and juxtapositions with the bump or enlarged area or region of the coating, so that the sensors can be disposed directly behind the front substrate (the second surface of the twin-substrate laminate).

Figure 51:
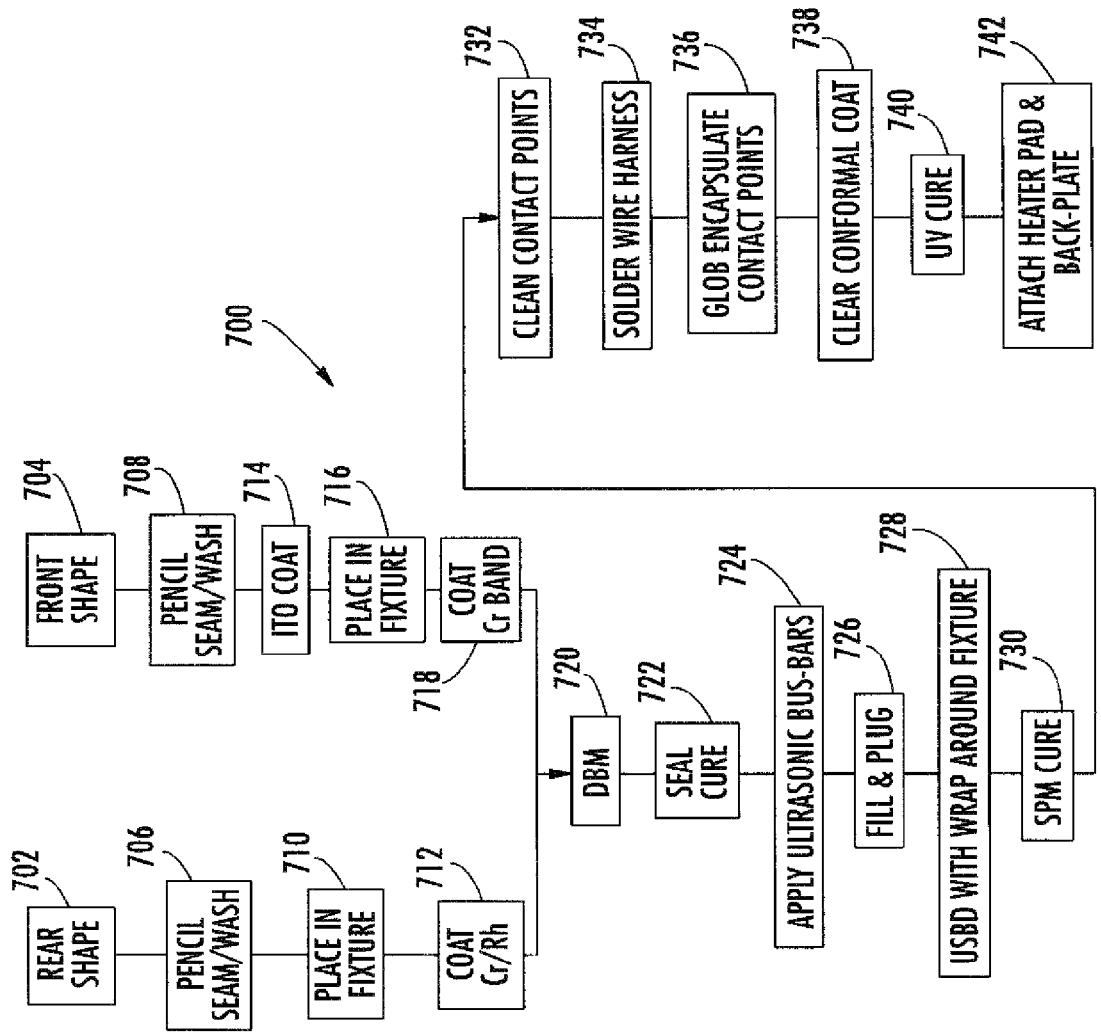
FIG. 51 is a process diagram of a process suitable for manufacturing a reflective element assembly of the present invention.
Figure 52:
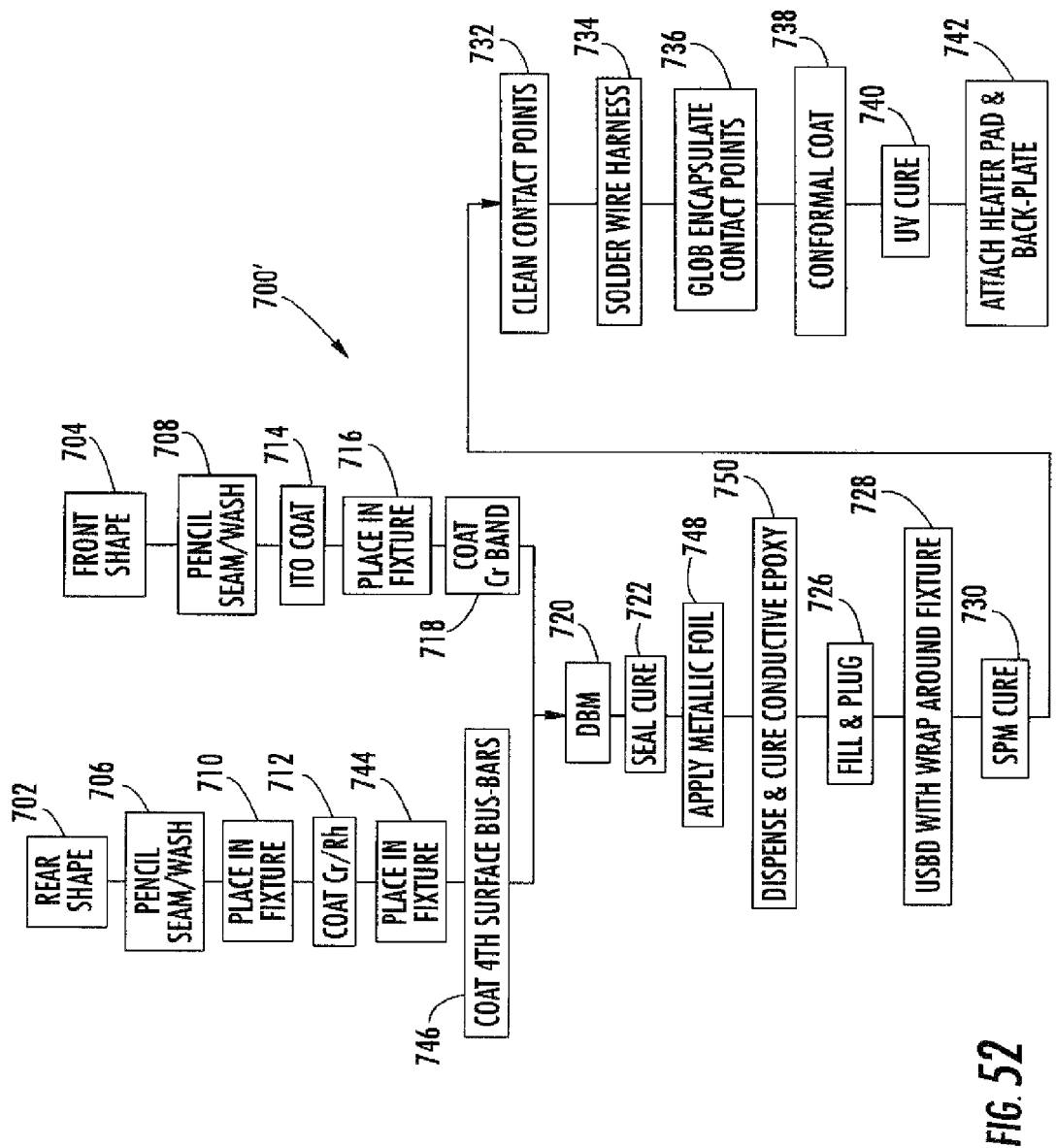
FIG. 52 is a process diagram of a process suitable for manufacturing a reflective element assembly of the present invention.
Figure 53:
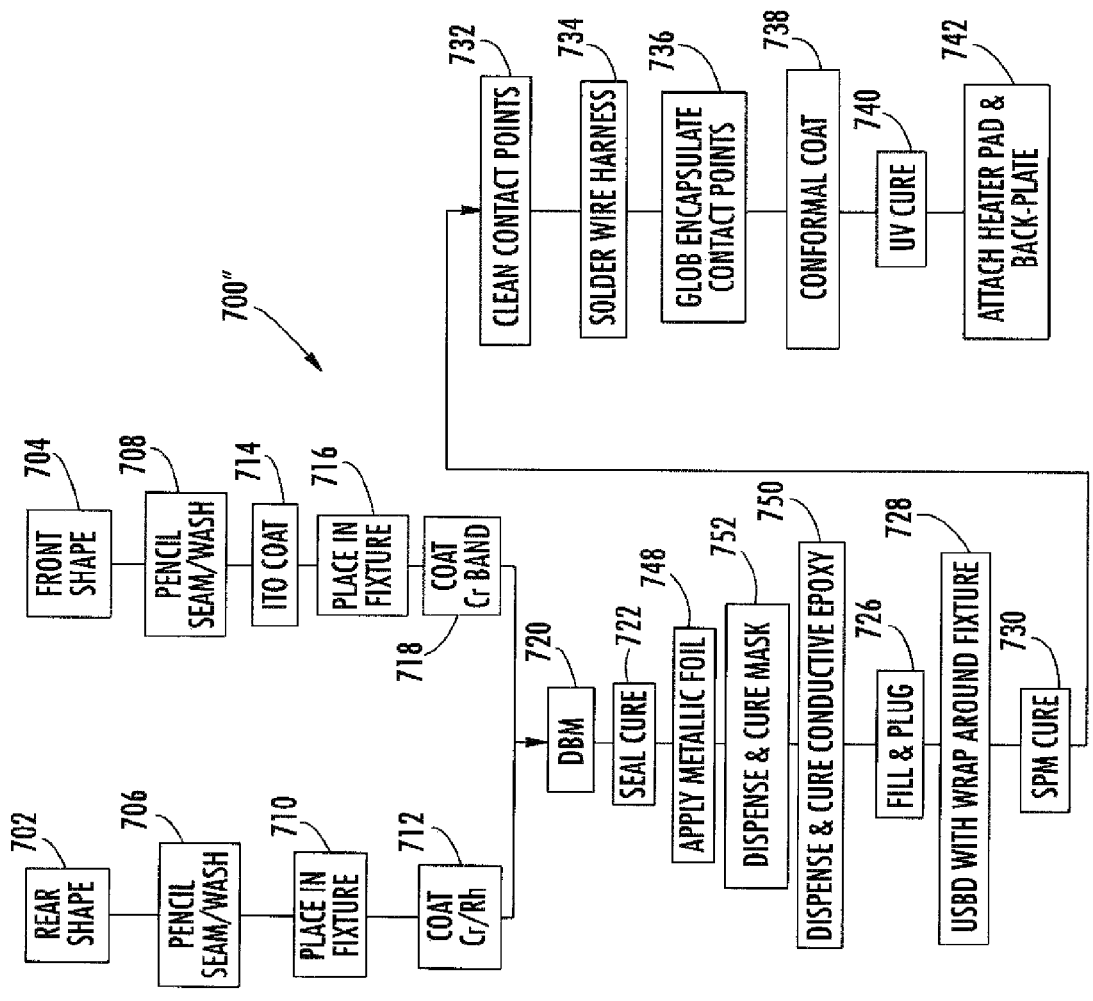
FIG. 53 is a process diagram of a process suitable for manufacturing a reflective element assembly of the present invention.

With reference to FIGS. 51-53, various processes or methods for manufacturing the reflective element assemblies for the frameless mirror assemblies are shown. As shown in FIG. 51, a method 700 for manufacturing the reflective element assembly 610, discussed above, includes procuring and/or cutting the rear shape or substrate at 702 and procuring and/or cutting the front shape or substrate at 704. The rear and front substrates are pencil seamed (or otherwise seamed or ground to provide the desired edge configuration for the substrates) and/or washed at 706, 708, respectively. The rear substrate is placed in a fixture at 710, and the third surface is coated with the desired coatings (such as chromium and/or rhodium) at 712. The rear surface of the front substrate is coated with a transparent electrically conductive coating (such as ITO or the like) at 714, and placed in a fixture (such as fixture 660 discussed above) at 716, and coated with the metallic (such as chromium or the like) band at 718.

After the coating processes, the main seal is dispensed or disposed around the perimeter and the substrates are juxtaposed and mated together to define the interpane cavity at 720. The seal is then cured at 722, and the ultrasonic solder bus-bars are applied along the respective edges of the assembly at 724. The cavity or cell is then filled with the electro-optic or electrochromic medium and plugged at 726. Typically, before the substrates are juxtaposed, a plurality of plastic beads may be dispensed to provide the appropriate interspacing or gap between the cells as they are joined together and as the seal is cured. After the cell is filled and plugged, the cell passes through an ultrasonic bath at 728 that includes a wrap around fixture around the perimeter of the cell to protect the perimeter band. The electro-optic medium or electrochromic medium, such as a solid polymer matrix (SPM) is then cured at 730.

The electrical contacts or contact points or connectors may be cleaned at 732, and the wire harness or leads may be soldered to the connectors at 734. The encapsulate, such as a conductive or non-conductive epoxy or adhesive or other encapsulating material, may be applied to the contact points at 736 to reduce strain on the soldered joint. A conformal coating may be applied at 738 to coat and protect the bus-bars and contact points, and may be cured at 740 via various curing means, such as heat, moisture or UV curing means. The heater pad and back-plate may be attached or adhered to the rear surface of the rear substrate of the reflective element assembly at 742 to complete the assembly processes of the reflective element assembly.

With reference to FIG. 52, the reflective element assembly 610' may be manufactured and assembled in a similar manner as described above with respect to FIG. 51, except for the changes noted herein. The similar steps or processes of the method or process 700' are shown in FIG. 52 with the same reference numbers as in FIG. 51 and as discussed above. After the front surface of the rear substrate is coated at 712, the rear substrate may be placed in a fixture (or the fixture may be flipped or the substrate and fixture may otherwise be arranged) at 744, and the fourth surface bus-bars may be coated at 746. After the main seal is dispensed and the substrates are mated together at 720 and the seal is cured at 722, the metallic foils or elements or pads may be applied at 748, and the conductive epoxy may be dispensed and cured at 750. The reflective element assembly is then filled and plugged at 726 and further processed as discussed above.

With reference to FIG. 53, the reflective element assembly 610''' may be manufactured and assembled in a similar manner as described above with respect to FIG. 51, except for the changes noted herein. The similar steps or processes of the method or process 700" are shown in FIG. 53 with the same reference numbers as in FIG. 51 and as discussed above. After the main seal is dispensed and the substrates are mated together at 720 and after the seal is cured at 722, the metallic foil or elements or pads may be applied at 748. The insulating layer or mask (such as insulating layer or mask 642 discussed above) may then be applied and cured at 752, and the conductive epoxy may be dispensed and cured at 750. The reflective element assembly is then filled and plugged at 726 and further processed as discussed above.

For purposes of examples, the manufacturing and assembly processes for three exemplary reflective element assemblies is set forth below. Although specific coatings and adhesives and encapsulants and the like are provided in the examples, clearly other coatings and adhesives and encapsulants and the like may be implemented without affecting the scope of the present invention.

In a first exemplary reflective element assembly, a front substrate shape and a rear substrate shape (that match the contour of an associated automobile inside or outside rear-view mirror) are cut from uncoated glass lites or sheets (flat or bent). The rear substrate is edge seamed with a standard belt seamer, while the front substrate is pencil seamed using a CNC glass grinder. The front and rear substrates are then washed and dried using a conventional mechanical brush washer or a conventional ultrasonic washer in preparation for the coating step.

The rear substrate is placed in a coating fixture and the inward surface (the third surface of the finally completed reflective element assembly) is coated with approximately 700 Angstroms of chromium and approximately 100 Angstroms of rhodium. The coating fixture as described previously is designed such that the coating is excluded (such as by masking) along the perimetal border of the rear substrate shape in a border strip that is about 1.5 mm wide. This exclusion zone increases to about 3 mm in the vicinity of the fill port region for the to-be-assembled electrochromic cell. This is done so that the UV curable plug seal can be cured via ultraviolet light irradiation in a later step in the process. These exclusion zones can also be achieved by laser ablation or other coating ablation or removal processes in place of masking via the coating fixture, without affecting the scope of the present invention. Narrower or wider exclusion zones may be chosen, and the width may vary around the perimeter of the substrate as may be appropriate for the particular mirror shape being fabricated.

The rear coating fixture is also designed such that along the bottom (or other edge if desired) of the rear substrate, there will be a wrap-around coating of chrome and rhodium along the cut edge of the glass at a tab region, as previously described. The length of this edge coating will define the length of the bus-bar that will be applied later.

The inward surface of the front substrate (the second surface of the finally completed reflective element assembly) is first coated with about 1,200 to about 1,700 Angstroms (such as about 1,500 Angstroms) coating of Indium Tin Oxide (having a sheet resistance preferably in the about 12 ohm/square to about 15 ohm/square range, though for larger substrate sizes, less than 10 ohms per square is preferred). The front substrate is then placed in a coating fixture where it is closely held against a mask (such as glass mask) that is cut about 5 mm smaller all the way around the perimeter of the substrate, and that masks the central portion, as previously described, so that only the perimetal border region is coated with a metallic reflective/electrically conducting coating that forms the perimetal border reflector when viewed through the first surface of the front substrate by the likes of a driver viewing the vehicular mirror assembly of the vehicle. For interior mirror reflectors, overcoating about 1500 Angstroms or thereabouts of ITO coating with a metallic layer of rhodium metal is found to exhibit a generally silvery, generally non-spectrally selective, neutral/non-colored reflective border. Because rhodium is an expensive material, it may be economical to overcoat the rhodium perimeter band metallic coating with a chromium metal coating of about 500 Angstroms to 1000 Angstroms or more to provide the electrical raceway. In this way, and as has been known for use in exterior mirror main reflectors for electrochromic devices, a relatively thin rhodium layer (of the order of about 100 to 400 Angstroms or thereabouts) can be used to establish the silvery reflective look seen by the driver or other viewers, whereas the chromium overcoat (that is hidden by the rhodium layer when viewed from the front of the mirror by a driver of the vehicle) principally provides the desired degree of electrical conductivity. For exterior mirrors, a perimeter band coating of about 700 Angstroms of chromium coated on top of a half-wave ITO coated inward surface of the front substrate is desirable for many applications. Note that the perimeter border coating step for the inward surface of the front substrate typically results in about a 3 mm to 5 mm (or thereabouts) metallic reflecting band all the way around the mirror, preferably without any gaps.

The main perimeter seal is then dispensed on the inward surface of the rear substrate at its perimeter border as an uncured epoxy material. The front substrate is then coupled to the rear substrate. The two mated substrates are then put into a vacuum bag. The bag is sealed, evacuated and heated in an oven to a temperature of about 120 degrees to about 150 degrees Celsius (or thereabouts) for about an hour to cure the perimeter seal. Alternately, the substrate mating and coupling can be achieved via a mechanical fixture.

The empty mirror is filled with an electrochromic monomer composition such as disclosed previously using a conventional vacuum backfilling technique. The fill port is plugged with a UV curable adhesive and cured from the back of the mirror (i.e., via its fourth surface) using a standard UV conveyor system.

The filled mirror is placed in an oven at about 100 degrees to about 120 degrees Celsius (or thereabouts) to complete transformation of the electrochromic monomer composition into a solid polymer matrix electrochromic medium. The mirror is now ready for application of the bus-bars. Note that other electro-optic or electrochromic media, which may be liquid or solid, can be used, without affecting the scope of the present invention.

A solder, preferably a ceramic solder, such as a Cerasolzer T7 Ultrasonic solder, and most preferably that is a lead free solder, is applied as a bus-bar using the previously described process. A wire harness or other electrical connecting element is then soldered and/or mechanically attached (such as by spring load) to the ultrasonic solder bus bar. The contact point between the ultrasonic solder and the wire harness is secured/environmentally protected with a suitable polymeric protectorant, such as an epoxy, silicone, urethane, acrylic or similar resinous material; for example, a UV curable adhesive, such as Wellomer UV2113. The Ultrasonic solder bus-bar is protected with a conformal coating, such as a suitable polymeric protectorant, such as an epoxy, silicone, urethane, acrylic or similar resinous material; for example, a UV curable Dymax 984LVUF. This coating can be sprayed and cured (or may be applied by a dip process or a wipe process or a paint or printing process or an ink jet process) using conventional conformal coating/curing systems.

In a second exemplary reflective element assembly, the substrates may be cut and coated in a similar manner as described above with respect to the first example. The assembled cell may have a conductive epoxy bus-bar disposed along the edge of the mirror. More particularly, an insulating layer of a suitable polymeric protectorant, such as an epoxy, silicone, urethane, acrylic or similar resinous material; for example, a UV curable adhesive, such as Dymax 984LVUF, may first be dispensed onto the second surface transparent electrically conductive coating of the front substrate at the tab-out region of the rear substrate. This insulating layer prevents any electrical contact to, and hence electrical shorting to, the second surface transparent electrically conductive coating when electrical contact is made to the wraparound portion of the third surface metallic coating at the edge of the rear substrate at that tab-out/wraparound region. Prior to dispensing the conductive epoxy, two L-shaped metallic tabs made with a tin plated 0.005" thick copper-beryllium alloy with a pressure sensitive adhesive, such as 3M 9500PC, are attached in the top right and bottom right corners on the back of the mirror cell. A conductive epoxy, such as Emerson & Cuming XCE-3050, is dispensed along the top and bottom of the mirror to form the bus-bars. The conductive epoxy is bridged over the tabs and the epoxy is cured in an oven for about an hour at 130 degrees Celsius. The wire harness can then be soldered to these metallic tabs. A coating or bead of encapsulant, such as a glob top encapsulation, such as Wellomer UV2113, is applied over the metallic tab, and the bus-bars are protected with a conformal coating, such as Dymax 984LVUF, and cured using a UV conveyor system, so as to provide environmental/mechanical protection.

A third exemplary reflective element assembly or mirror cell is formed via the following processes. The glass is first cut into shapes. Particularly, a front substrate shape and a rear substrate shape (that match the contour of an associated automobile inside or outside rearview mirror) are cut from uncoated glass lites or sheets (flat or bent). The rear substrate is edge seamed with a standard belt seamer, while the front substrate is pencil seamed using a CNC glass grinder. The front and rear substrates are then washed and dried using a standard mechanical washer (alternatively, an ultrasonic wash process may be used) in preparation for the coating step.

The rear substrate is placed in a coating fixture and the inward surface is coated with approximately 700 Angstroms of chromium and approximately 300 Angstroms of rhodium. The coating fixture as described previously is designed such that the coating is excluded along the top of the mirror in a strip that is about 1.5 mm wide. This exclusion zone increases to about 3 mm in the vicinity of the fill port. This is done so that the UV curable plug seal can be cured in a later step in the process. These exclusion zones can also be achieved by laser ablation in place of the coating fixture.

The rear coating fixture is also designed such that along the bottom (or other edge or region if desired) of the rear substrate, there will be a wrap around coating of chrome and rhodium along the edge of the glass. The length of this edge coating will define the length of the bus-bar that will be applied later.

The rear substrate is again placed in a coating fixture in order to deposit a fourth surface bus-bar along the bottom (or other edge or region if desired and generally along the wrap around coating along the edge of the glass) of the rear surface. This fourth surface bus-bar will extend at least about 5 mm inward of the edge of the glass. The bus-bar will be a coating of chromium that is about 2,000 Angstroms thick, and will electrically contact the third surface wraparound coating to provide electrical continuity between the fourth surface bus-bar and the third surface conductive coating.

The inward surface of the front substrate is first coated with about 1,200 to about 1,700 Angstroms (such as about 1,500 Angstroms) coating of Indium Tin Oxide (having a sheet resistance preferably in the about 12 ohm/square to about 15 ohm/square range, though for larger substrate sizes, less than 10 ohms per square is preferred). The front substrate is then placed in a coating fixture where it is closely held against a mask (such as glass mask) that is cut about 5 mm smaller all the way around the perimeter of the substrate, and that masks the central portion, as previously described, so that only the perimetal border region is coated with a chromium metallic reflective/electrical conducting coating. For exterior mirrors, a perimeter band coating of about 700 Angstroms of chromium coated on top of a half-wave ITO coated inward surface of the front substrate is desirable for many applications. Note that the perimeter border coating step for the inward surface of the front substrate typically results in about a 3 mm to 5 mm (or thereabouts) metallic reflecting band all the way around the mirror, preferably without any gaps.

The main perimeter seal is then dispensed on the inward surface of the rear substrate at its perimeter border as an uncured epoxy material. The front substrate is then coupled to the rear substrate. The two mated substrates are then put into a vacuum bag. The bag is sealed, evacuated and heated in an oven to a temperature of about 150 degrees Celsius for about an hour to cure the perimeter seal. Alternately, the substrate mating and coupling can be achieved via a mechanical fixture. As described above, an insulating layer of a suitable polymeric protectorant, such as an epoxy, silicone, urethane, acrylic or similar resinous material; for example, a UV curable adhesive, such as Dymax 984LVUF, may first be dispensed onto the second surface transparent electrically conductive coating of the front substrate at the tab-out region of the rear substrate. This insulating layer prevents any electrical contact to, and hence electrical shorting to, the second surface transparent electrically conductive coating when electrical contact is made to the wraparound portion of the third surface metallic coating at the edge of the rear substrate at that tab-out/wraparound region.

The empty mirror is filled with the with an electrochromic monomer composition such as disclosed previously using a conventional vacuum backfilling technique. The fill port is plugged with a UV curable adhesive and cured from the back of the mirror (i.e., via its fourth surface) using a standard UV conveyor system. The filled mirror is placed in an oven at about 120 degrees Celsius to complete transformation of the electrochromic monomer composition into a solid polymer matrix electrochromic medium. The mirror is now ready for application of the bus-bars. Note that other electro-optic or electrochromic media, which may be liquid or solid, can be used, without affecting the scope of the present invention.

Prior to dispensing the conductive epoxy, two L-shaped metallic tabs made with a tin plated 0.005" thick copper-beryllium alloy with a pressure sensitive adhesive, such as 3M 9500PC, are attached in the top right and bottom right corners (or other regions as desired) on the back of the mirror. A conductive epoxy, such as Emerson & Cuming XCE-3050, is dispensed along the top and bottom of the mirror to form the bus-bars. The conductive epoxy is bridged over the tabs. This epoxy is cured in an oven for about an hour at about 130 degrees Celsius.

The wire harness can now be soldered to these metallic tabs. A coating or bead of encapsulant, such as a glob top encapsulation, such as Wellomer UV2113, is applied over the metallic tab, and the bus-bars are protected with a conformal coating, such as Dymax 984LVUF, and cured using a UV conveyor system, so as to provide environmental/mechanical protection.

Figure 54:
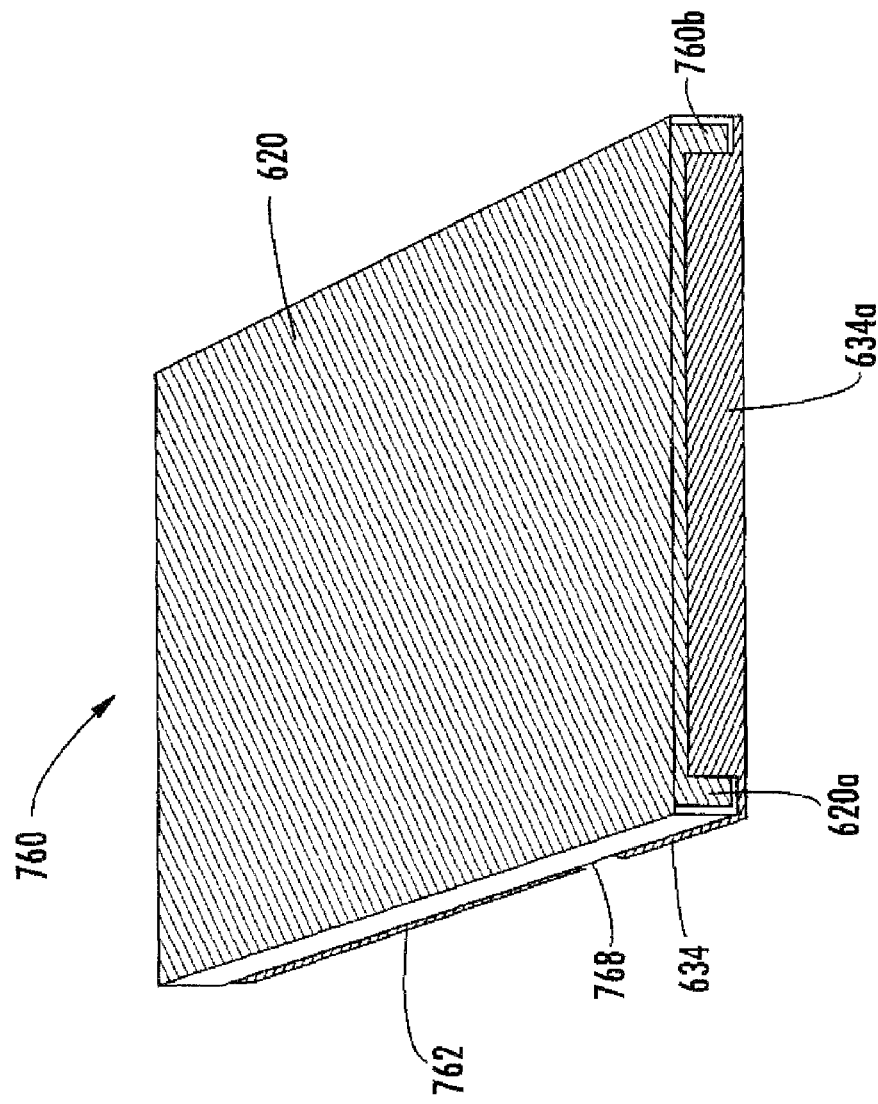
FIG. 54 is a perspective view of a substrate with a fourth surface coating in accordance with the present invention.
Figure 55:
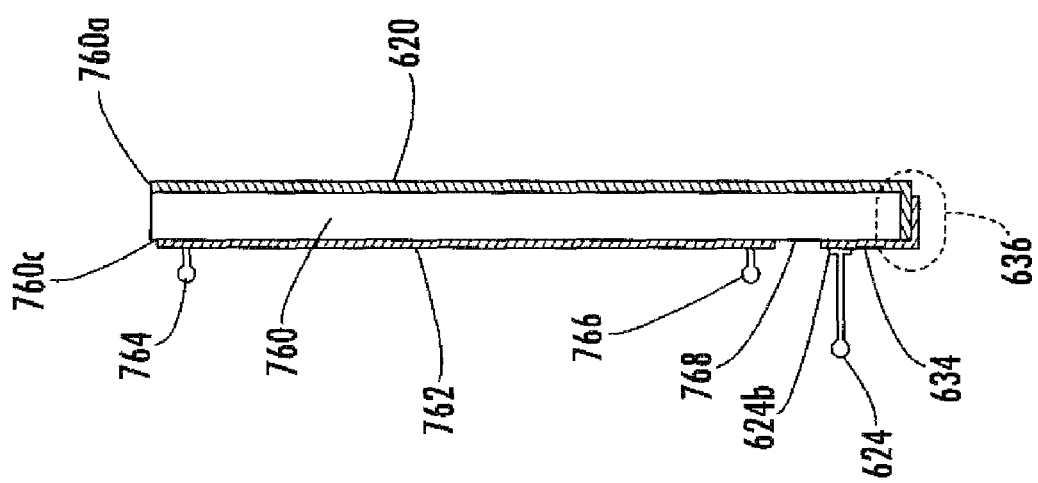
FIG. 55 is a sectional view of the substrate of FIG. 54.

Optionally, and with reference to FIGS. 54 and 55, a substrate 760 may include a fourth surface conductive coating 762 that provides an integral heater pad for the rear surface 760c of the substrate 760. The heater pad or coating may be applied utilizing aspects of the mirrors described in U.S. Pat. Nos. 5,808,777; 5,610,756; 5,446,576; and 5,151,824, which are hereby incorporated herein by reference. The substrate 760 may be otherwise substantially similar to substrate 614', discussed above, and may include the third surface reflective and conductive coating or coatings 620 on the front surface 760a and with the wraparound coating 620a on the edge 760b of substrate 760, along with the fourth surface coating 634 and wraparound or overcoat edge coating 634a that overlaps the edge coating 620a at an overlap region 636. The electrical connector 624 may be soldered (such as at a solder joint 624b) to or otherwise electrically connected to the fourth surface coating 634 to provide electrical power or current to the third surface reflector coating via the wraparound coatings or overlapping coatings 636.

When the fourth surface coating 634 is disposed or deposited along the perimeter portion of the rear surface of the substrate that is generally along the edge 760b of substrate 760, the fourth surface heater coating 762 may also be applied to the rear surface 760c of substrate 760. The heater coating 762 may be applied at the same time and in the same process as the coating 634 (and thus may comprise the same material) or may be applied during a different or separate coating process (and thus may comprise a different material).

The heater coating 762 may comprise any electrically conducting coating that dissipates heat when electrically powered, due to its resistance to electrical conduction. For example, the heater coating may comprise a vacuum-deposited metal thin-film or thin-film stack, or a thick film of graphite or a conductive polymer, such as with graphite or silver flakes or the like. Suitable conductive metallic coatings to utilize for the fourth surface heater means and for the separate perimetal fourth surface layer (with edge wraparound) include those disclosed in U.S. Pat. Nos. 5,808,777; 5,610,756 and 5,446,576, which are hereby incorporated herein by reference. For example, the heater coating may comprise a vacuum-deposited (such as by sputtering) thin-film of titanium, inconel, chromium, stainless steel, hastelloy, nickel, nichrome or the like, or such as other conductive or resistive coatings discussed herein, and electrical connectors 764, 766 may be soldered or otherwise electrically connected to the heater coating 762, such as at opposite ends or portions of the heater coating. The heater or resistance layer may comprise any suitable material and may have a specific resistivity of approximately $1 \times 10^{-5}$ ohm.cm to $1 \times 10^{-4}$ ohm.cm or thereabouts, and may be deposited to a thickness to provide a sheet resistance of approximately 0.2 to 20 ohms per square or thereabouts. For example, in order to achieve the desired sheet resistance, the particular heater coating may be deposited to a thickness of between 500 and 5000 angstrom units. The particular sheet resistance value may be selected as a function of the power dissipation required, the mirror reflector surface area, the voltage to be applied, the aspect ratio geometry of the reflective element, the material of the coating, whether there is any patterning of the heater layer (so as to create a more electrically resistive inter-bus-bar pathway, such as may be established by masking during deposition or ablation after deposition or other demarcations or patterns or the like) and the bus-bar layout. Preferably, the heater layer on the fourth surface is configured in order to dissipate power of at least about 0.75 watts per square inch of active electrochromic reflective area when the vehicle ignition voltage (nominal 12 Volts) is applied; more preferably at least about 1 watt per square inch of active electrochromic reflective area; and most preferably at least about 1.25 watts per square inch of active electrochromic reflective area. The electrodes or connectors at the heater coating may comprise point contacts or strip contacts, such as conductive solder strips or beads or the like.

The heater coating 762 may be dispensed as a continuous coating over a region of the rear surface 760c, or the heater coating may be dispensed in a pattern, such as a coil or spiral pattern or wave pattern or serpentine pattern or any other strip or pattern. The pattern may be selected to provide the desired thickness and conductivity and sheet resistance to the heater coating, such that the heater coating will draw the desired current when powered or energized. The heater coating may be electrically isolated from the rear surface coating 634 (such as via defining an exclusion zone or isolation zone or electrically non-conducting or insulating region 768 around the heater coating, such as via masking the rear surface during the coating process or such as via deleting the coating in desired areas after the coating process or the like).

Optionally, the integrated heater pad may include openings or exposed glass between portions of the heater pad to provide additional attachment areas for the adhesive for adhering the backing plate to the rear of the reflective element assembly to contact the glass. Optionally, the back-plate design can take advantage of the offset between the front and rear glass substrates as an additional anchoring point (such as via tabs or clips or the like that may extend from the back plate and at least partially over or around at least a portion of the perimeter edge of the rear substrate) to provide a more secure attachment option. Such an arrangement may limit or substantially preclude the possibility of the mirror reflective element assembly sliding off the back-plate. Such an application may be applicable to mirror assemblies with or without the integrated heater. Optionally, the backing plate or the rear substrate may have a thermistor (or other suitable temperature sensing device) thereon to detect the temperature at the reflective element assembly, so that the heating pad may be activated and/or deactivated in response to an output signal from the thermistor.

Optionally, the electrical connections to the heater pad and/or to the raceways or conductive pads or foils may comprise connectors at the heater pad and/or raceways and corresponding connectors on the backing plate, such that the electrical connections may be made between the wiring at the backing plate and the connectors on the rear surface of the rear substrate as the backing plate is engaged with and adhered to the rear surface of the rear substrate. The backing plate connections thus may be made as the backing plate is attached to the rear substrate (such as via a plug/socket connection or other engagement of the conductive elements or terminals at the backing plate and fourth surface) and the additional wire connections or solder connections may be obviated. Optionally, the backing plate may include tabs around its perimeter to engage the perimeter edge of the rear substrate to further attach the backing plate to the reflective element assembly. Optionally, the backing plate may extend over the perimeter edges of the rear substrate and at least partially over the perimeter edges of the front substrate (and may terminate near or at the first surface of the reflective element assembly) so as to form a pocket or recess for receiving the reflective element assembly within the pocket of the backing plate. Such configurations may enhance the securement of the reflective element assembly to the backing plate.

Optionally, the reflective element assembly may be assembled or formed by first establishing two or more front substrate portions on a sheet of substrate material, such as glass, and mating the individual rear substrates or shapes (which may be smaller in size than the front substrates) to the respective substrate portions of the sheet, such as discussed above. For example, four (or more or less) front substrate portions may be established or defined on a sheet of glass (such as by a perimeter band and/or seal material disposed on the sheet or by markings or indicia on the sheet) that is already coated with a transparent electrically conductive coating (with the coated surface being the second surface for the not yet established front substrates). The raceway or perimeter band may be established around the perimeter of each of the substrate portions, if desired for the particular application of the completed reflective element assemblies. Optionally, the rear shapes may be provided as pre-cut shapes that are already coated and cut to the desired shape. The pre-cut and coated rear shapes may be supplied to a coupling station from a washer, such that the rear shapes are cleaned just prior to the coupling of the rear shapes to the sheet on which the front substrate portions are established. The clean rear shapes are then positioned, such as by an automated or computer controlled robot or robot arm or the like, relative to the sheet and the respective epoxy seals, and may be pressed into engagement with the respective uncured seal material shape. The rear shapes or substrates may be positioned relative to sheet in response to detection of the register marks on the sheet and the detection of the edges or other characteristics or physical attributes of the rear shapes, such as detection of flat portions or edges along the rear shapes, such as by a computer aided camera vision or imaging system or the like. The automated robot may substantially uniformly press the rear shapes and the sheet together, whereby the uncured seal material provides the appropriate spacing between the rear shapes and sheet and defines the cell interpane cavities. The sheet is dimensioned so as to be larger than at least two side-by-side rear substrates that are cut to the shape of the vehicular mirror, such that at least two separate mirror elements (the mated front and rear substrates, that may or may not be filled with the electro-optic medium) are formed by separation of at least two front substrate portions and the respective mated rear substrate shapes from the sheet of substrate material. The interpane cavities may be filled and the seal may be cured and the front substrate portions may be separated from (such as by cutting or breaking) the sheet to form the individual and separate reflective element assemblies. The mirror elements or cells may be filled while still joined by the sheet or the cells may be separated from the sheet prior to filling and curing, without affecting the scope of the present invention.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; and 4,793,690, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are hereby incorporated herein by reference) at the rear or fourth surface of the reflective element assembly, such that the photo sensor detects light passing through the reflective element assembly. Examples of such configurations are described in U.S. Pat. Nos. 4,793,690; 5,550,677 and 5,193, 029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference. The reflective element assembly thus may have a window or transmissive port or portion at the photo sensor or, and preferably, may comprise a transflective display on demand (DOD) type reflective element assembly or cell, such as, for example, the types described in U.S. Pat. Nos. 5,668, 663; 5,724,187; and 6,690,268, and/or in U.S. patent application Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for ELECTROCHROMIC MIRROR ASSEMBLY, and/or PCT Application No. PCT/US03/35381, filed Nov. 5, 2003 by Donnelly Corp. et al. for ELECTRO-OPTIC REFLECTIVE ELEMENT ASSEMBLY, which are all hereby incorporated herein by reference. The transflective reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Figure 56:
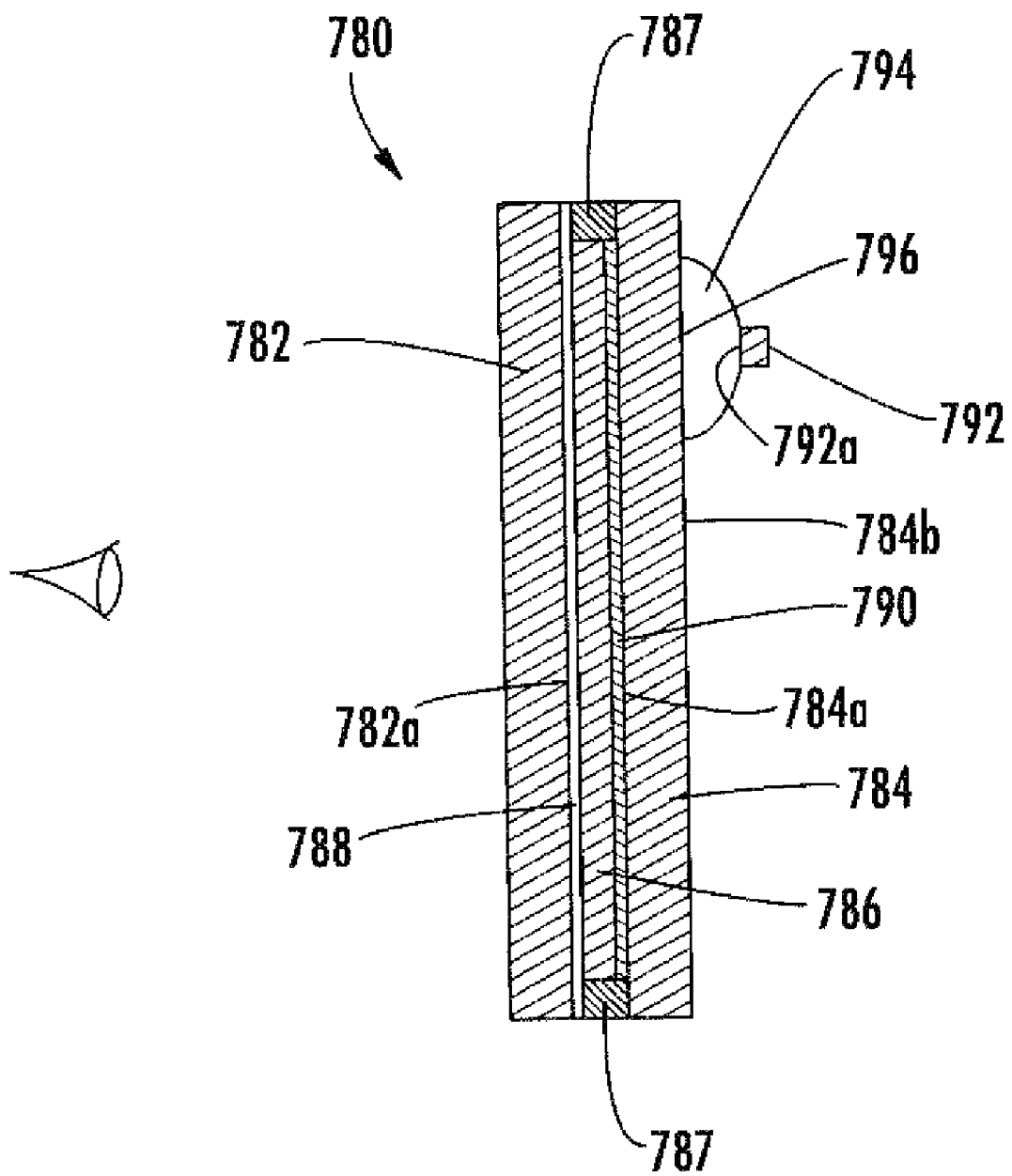
FIG. 56 is a sectional view of another reflective element assembly in accordance with the present invention.

For example, and with reference to FIG. 56, a reflective element assembly 780 may include a front substrate 782 and a rear substrate 784 with an electro-optic or electrochromic medium 786 disposed or sandwiched therebetween and contained or surrounded or encompassed by a seal 787 around the perimeter of the electro-optic medium. The front substrate 782 includes a transparent electrically conductive layer or coating 788 on its rear or second surface 782a, while the rear substrate 784 includes a metallic electrically conductive and reflective layer 790 on its front or third surface 784a. The reflective element assembly comprises a transflective display on demand reflective element assembly, such that the reflective element is substantially reflective of light incident thereon, while also being at least partially transmissive of light therethrough. A photo sensor 792 is positioned at or behind the rear or fourth surface 784b of the rear substrate 784 for detecting light passing through the reflective element assembly, such as for detecting glare from the headlights of a rearward approaching vehicle. In the illustrated embodiment, the reflective element assembly includes a light directing or light focusing or light concentrating device 794 at the rear surface 784b of the rear substrate 784, such that the light concentrating device 794 directs or concentrates light onto the sensing surface 792a of the photo sensor 792.

The light concentrating device 794 functions to receive light passing through a portion or area or region 796 of the reflective element assembly and concentrate the received light onto the smaller sensing surface 792a of the photo sensor 792. For example, the light concentrating device may concentrate light received from a larger region (such as a region having about a 5 mm to about a 10 mm or larger diameter) onto the smaller sensing area (such as a sensing area having about a 1 mm to about a 3 mm or smaller diameter), and thus may concentrate about 25 times more light, or more or less, onto the photo sensor. The light concentrating device thus provides a greater amount of light to the photo sensor such that the photo sensor may function to detect lower levels of light at the reflective element assembly. The light concentrating device may comprise a lens or combination of lenses or other optical elements, a light channel, a compound parabolic collector, and/or a light pipe or other light concentrator, without affecting the scope of the present invention, and is configured to provide a field of view rearward of the vehicle that substantially replicates the field of view that is typical or conventional for glare sensing photo sensors in automatic dimming rearview mirror assemblies. For instance, a larger diameter lens may be disposed proximate to the rear surface (fourth surface) of the electrochromic cell and another typically smaller diameter (and having a shorter focal length) lens may be set behind the first or larger lens to concentrate the light received by the larger diameter lens so that the light is concentrated and incident on the photo sensitive surface of the photo sensor. Preferably, in order to reduce cost and weight, such lenses and/or other optical elements used in the light concentrator, are fabricated from plastic, such as from an optical polymer, such as acrylic or polycarbonate or polystyrene or CR39 or COC olefin or the like. Preferably, the optic and/or light concentrating element is chosen such that it has reduced or minimal intrusiveness into the interior of the mirror head/housing so as to not crowd other features or items desired to be located or packaged therein.

For example, a funnel-shaped light concentrator, such as formed of a polymeric optical material, such as acrylic or polycarbonate or polystyrene or CR39 or COC olefin or the like, may be used that optically couples (such as via an optical adhesive) at its widest dimension/side to the rearmost surface of the electrochromic cell or reflective element, and that preferably optically couples at its narrow dimension/neck to the photo sensing surface of the photo sensor disposed at the narrow dimension/neck of the light concentrator. Optionally, the outer surfaces may be reflector coated so as to maximize light collection, and particularly off-axis light collection emanating from light sources, such as headlamps approaching from the rear of the vehicle. Such reflector coating may be a white diffuse reflective coating or a diffuser light reflector, such as a white paint or Argent paint or the like, or it may be a substantially specularly reflecting coating or layer, such as a metal thin film or layer, such as an aluminum or chromium metal reflecting thin layer or coating. Optionally, a hollowed cylinder or funnel can be used (such as a seashell-shaped funnel) that collects light over a broad area and that, having highly reflecting walls (such as can be achieved via vacuum metallization), reflects light backwards and forwards and channels the collected light to exit at its narrower neck so as to be incident at the photo detector disposed at the neck of the funnel. Optionally, and desirably, a near infrared filter (that attenuates/reduces infrared radiation) may be disposed along the optical path to the photo sensing surface of the photo sensor, such as behind the fourth surface of the mirror reflective element and in front of the photo sensing surface of the photo sensor, such as proximate to or immediately in front of the photo sensing surface of the photo sensor.

Therefore, the present invention provides a frameless or bezelless mirror assembly, such as for an exterior rearview mirror assembly (although aspects of the present invention are suitable for interior rearview mirror applications as well). The reflective coating or coatings may include windows or the like formed therethrough or the reflective coatings may provide a transflective reflective element assembly, so that a display or indicator may be positioned behind the rear substrate (such as at the backing plate or at a circuit board at the backing plate or the like) and may be viewable through the substrates when activated. Optionally the reflective coating may include a window for a photo sensor or glare sensor, particularly for independently operable electro-optic reflective element assemblies. The reflective coatings may comprise one or more conductive metallic coatings and/or other conductive reflective and/or transparent coatings to provide the desired appearance and/or tint (for example, the reflective element assembly or cell may provide a passively anti-glare tint or characteristic, such as a blue tint or the like) and/or performance, such as via utilizing principles described in U.S. Pat. Nos. 5,668,663; 5,724,187; and 6,690,268, and/or in PCT Application No. PCT/US03/29776, filed Sep. 19, 2003 by Donnelly Corp. et al. for ELECTROCHROMIC MIRROR ASSEMBLY, and/or in PCT Application No. PCT/US03/35381, filed Nov. 5, 2003 by Donnelly Corp. et al. for ELECTRO-OPTIC REFLECTIVE ELEMENT ASSEMBLY, which are all hereby incorporated herein by reference.

Optionally, in applications for an interior or exterior rearview mirror assembly that comprises a bezel assembly with a rear or cap portion attached to the bezel assembly to provide the desired content to the mirror assembly (such as described in PCT Application No. PCT/US2004/015424, filed May 18, 2004 by Donnelly Corp. et al. for MIRROR ASSEMBLY FOR VEHICLE, which is hereby incorporated herein by reference), it is envisioned that the bezel portion or cap portion may be selected to provide a desired aesthetic appearance or decorative appearance to the interior or exterior rearview mirror assembly. For example, the cap portion may have a different color or texture (such as a chrome colored surface or the like) than the mirror holder and/or bezel portion to provide a two-tone configuration to the interior or exterior mirror assembly. Optionally, the cap portion and/or the mirror holder may have a decorative finish, and may be painted or plated, such as electroplated or the like, or may have a film or an in mold film or coating thereon to provide the desired surface to the cap portion and/or the mirror holder. For example, the cap portion (or the mirror holder) may provide a contrast or accent color or may be chrome plated or may provide an angle variant color (where the perceived color may change depending on the viewing angle) or may provide various colors or patterns or textures or the like as may be desired by a consumer (for example, certain colors or patterns or textures may be provided to target different demographics, such as for targeting teenagers or other age groups or genders or the like). Optionally, the cap portion and/or the mirror holder may have a soft touch surface, such as a soft touch surface and material similar to the type described in U.S. Pat. No. 6,318,870, which is hereby incorporated herein by reference. For example, either the mirror holder or the cap portion may have such a soft touch surface independent of the other, or both may have such a soft touch surface or neither may have a soft touch surface.

It is further envisioned that the cap portion or bezel of the interior or exterior mirror assembly may include a logo or text or pattern or other indicia thereon as desired by the consumer to provide highly personalized and unique mirror assemblies for the particular consumer that purchases the vehicle or the mirror assembly. For example, the cap portion may include a school logo and colors, such as, for example, the letters "MSU" in green and white print/background, to provide a desirable appearance to the personalized mirror assembly for a particular consumer, such as, for example, a student or graduate of Michigan State University. Optionally, the cap portion may include other text or logos or brand names or other types of identifying indicia, such as, for example, "FORD" to identify the vehicle manufacturer or "TOMMY HILFIGER" to identify the vehicle owner's clothing preference or the like, or other text or messages or images or trademarks or colors or patterns or indicia or the like to provide a desired appearance or identification or message or statement or advertisement or logo or sponsorship identification or style or brand identification on the interior or exterior mirror assembly. The mirror assemblies may thus be assembled to have the desired or personalized cap portion with the desired or personalized logo or color or message or indicia thereon to provide the desired or personalized finish or appearance of the interior or exterior mirror assembly.

In an aftermarket application, various cap portions as described above may be provided as aftermarket interior or exterior mirror cap portions, and a consumer may purchase a desired cap portion, which may have desired content or features (such as described in PCT Application No. PCT/US2004/015424, filed May 18, 2004 by Donnelly Corp. et al. for MIRROR ASSEMBLY FOR VEHICLE, which is hereby incorporated herein by reference) or may have a desired color or texture or appearance or the like. The consumer may readily remove the existing cap portion from the interior or exterior mirror assembly of their vehicle and replace it with the new cap portion. For example, the cap portion and/or the mirror holder (such as the mirror support arm for an interior rearview mirror assembly or a mirror mount for an exterior rearview mirror assembly) may have snaps or clasps that may retain the cap portion and mirror holder/mount/bezel together, but that may release or detach such that the cap portion may be detachable from the mirror assembly by a user. The cap portion may be pulled or detached from the mirror assembly and a new cap portion (with the desired or personalized text or indicia or colors or the like thereon) may be pressed or snapped into place on the mirror assembly to provide the vehicle owner with the new cap portion having the desired content or functions or features and/or the desired or personalized appearance or the like.

The mirror assembly may be mounted at or attached to an interior portion of the vehicle (such as to a mounting button or the like at an interior surface of the vehicle windshield or the like) via any mounting means, such as a single ball or single pivot mounting arrangement, or a double ball or double pivot mirror mounting arrangement. Examples of double pivot or double ball mounting arrangements are described in commonly assigned U.S. Pat. Nos. 4,646,210 and 6,331,066, which are hereby incorporated herein by reference. The mirror mounting components may provide a breakaway type connection or mount, such as the types disclosed in U.S. Pat. Nos. 6,774,810; 6,642,851; 6,483,438; 6,366,213; 6,326,900; 6,222,460; 6,172,613; 6,087,953; 5,820,097; 5,377,949; and/or 5,330,149, which are hereby incorporated herein by reference. Optionally, the mirror assembly may incorporate a mounting arrangement of the types described in PCT Application No. PCT/US2003/022196, filed Jul. 17, 2003, published Jan. 29, 2004 as PCT Publication No. WO 2004/009408 A1, and/or PCT Application No. PCT/US2003/021885, filed Jul. 14, 2003, published Jan. 29, 2004 as PCT Publication No. WO 2004/009407 A3, and/or U.S. provisional applications, Ser. No. 60/609,642, filed Sep. 14, 2004; Ser. No. 60/624,091, filed Nov. 1, 2004; and Ser. No. 60/638,250, filed Dec. 21, 2004 by Karner et al. for MOUNTING ASSEMBLY FOR MIRROR AND METHOD OF MAKING SAME; and/or PCT Application No. PCT/US04/015424, filed May 18, 2004 by Donnelly Corp. et al. for MIRROR ASSEMBLY FOR VEHICLE; and U.S. patent application Ser. No. 10/933,842, filed Sep. 3, 2004, now U.S. Pat. No. 7,249,860, which are hereby incorporated by reference herein.

Note that electrochromic mirror cells or reflective element assemblies made such as by any of the processes of the present invention can be included in complete mirror assemblies that include a variety of added-features, such as lighting, telematics functionality and electronics, such as are disclosed in U.S. Pat. Nos. 6,690,268; 6,477,464; 6,472,979; 6,445,287; 6,420,975; 6,294,989; 6,278,377; 6,243,003; 6,042,253; 5,938,321; 5,924,212; 5,813,745; 5,820,245; 5,669,698; 5,673,994; 5,671,996; 5,649,756; 5,632,092; 5,255,442; 5,178,448; 5,131,154; 4,937,945; 4,862,594; 4,807,096; 4,733,336; and/or 4,646,210, and/or U.S. patent application Ser. No. 10/054,633, filed Jan. 22, 2002 by Lynam et al. for VEHICULAR LIGHTING SYSTEM, now U.S. Pat. No. 7,195,381; Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and/or Ser. No. 10/964,512, filed Oct. 13, 2004 by Schofield et al. for VEHICLE COMMUNICATION SYSTEM, now U.S. Pat. No. 7,308,341; and/or PCT Application No. PCT/US03/30877, filed Oct. 1, 2003, and U.S. provisional applications, Ser. No. 60/415,233, filed Oct. 1, 2002 by DeBoer et al. for INTERIOR REARVIEW MIRROR ASSEMBLY WITH ACCESSORY; and Ser. No. 60/429,360, filed Nov. 26, 2002 by Weller for MICROPHONE SYSTEM FOR VEHICLE, which are all hereby incorporated herein by reference.

Optionally, the mirror assembly of the present invention may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, an imaging system or blind spot or object detection system, such as imaging or detection systems of the types disclosed in U.S. Pat. Nos. 5,929,786 and/or 5,786,772, and/or U.S. patent application Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, or a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003 by McMahon et al. for VEHICLE IMAGING SYSTEM, now U.S. Pat. No. 7,005,974, a high/low headlamp controller, such as disclosed in U.S. Pat. Nos. 5,796,094 and/or 5,715,093; and/or U.S. provisional applications, Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE, a rain sensor, such as the types described in U.S. Pat. Nos. 6,250,148 and 6,341,523, or other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, and/or PCT Application No. PCT/US2003/036177 filed Nov. 14, 2003, published Jun. 3, 2004 as PCT Publication No. WO 2004/047421 A3, and U.S. provisional applications, Ser. No. 60/426,239, filed Nov. 14, 2002 by Bingle for CAMERA MODULE FOR VEHICLE; Ser. No. 60/477,416, filed Jun. 10, 2003 by Camilleri for IMAGING SYSTEM FOR VEHICLE; and Ser. No. 60/492,544, filed Aug. 5, 2003 by Whitehead et al. for CAMERA HOUSING FOR VEHICLE IMAGING SYSTEM, or transmitters and/or receivers, such as a garage door opener or the like, a digital network, such as described in U.S. Pat. No. 5,798,575, a memory mirror system, such as disclosed in U.S. Pat. No. 5,796,176, a hands-free phone attachment, a video device for internal cabin surveillance and/or video telephone function, such as a baby viewing or rear seat viewing camera or device or system or the like, such as described in U.S. Pat. Nos. 5,760,962; 5,877,897 and/or 6,690,268, and/or PCT Application No. PCT/US03/40611, filed Dec. 19, 2003 by Donnelly Corp. et al. for ACCESSORY SYSTEM FOR VEHICLE, and/or U.S. provisional applications, Ser. No. 60/435,554, filed Dec. 20, 2002; Ser. No. 60/439,626, filed Jan. 13, 2003; Ser. No. 60/489,812, filed Jul. 24, 2003; Ser. No. 60/492,225, filed Aug. 1, 2003; and Ser. No. 60/630,061, filed Nov. 22, 2004 by Lynam et al. for MIRROR ASSEMBLY WITH VIDEO DISPLAY, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,243,003; 6,278,377; and/or 6,420,975; and/or PCT Application No. PCT/US03/30877, filed Oct. 1, 2003, speakers, a compass, such as disclosed in U.S. Pat. Nos. 5,924,212; 4,862,594; 4,937,945; 5,131,154; 5,255,442; and/or 5,632,092, a tire pressure monitoring system, such as the types disclosed in U.S. Pat. Nos. 6,294,989; 6,445,287; and/or 6,472,979, and/or U.S. provisional application Ser. No. 60/611,796, filed Sep. 21, 2004 by O'Brien for TIRE PRESSURE ALERT SYSTEM, a navigation system, such as described in U.S. Pat. No. 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corp. et al. for ACCESSORY SYSTEM FOR VEHICLE, a seat occupancy detector, a vehicle occupancy detector, such as the type described in U.S. provisional application Ser. No. 60/630,364, filed Nov. 22, 2004 by Wåhlström for OCCUPANT DETECTION SYSTEM FOR VEHICLE, a trip computer, an ONSTAR® system and/or the like (with all of the above-referenced patents and patent applications and PCT applications and provisional applications being commonly assigned to Donnelly Corp., and with the disclosures of the referenced patents and patent applications and PCT applications and provisional applications being hereby incorporated herein by reference in their entireties). The accessory or accessories may be positioned at or within the mirror casing and may be included on or integrated in a printed circuit board or a flexible circuit member, such as a flexible circuit membrane, positioned within the mirror casing, such as along a rear surface of the reflective element or elsewhere within a cavity defined by the casing, without affecting the scope of the present invention.

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP*, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, without affecting the scope of the present invention.

Optionally, the mirror assembly may include a compass system and compass circuitry, such as a compass system utilizing aspects of the compass systems described in U.S. patent application Ser. No. 10/933,842, filed Sep. 3, 2004 by Kulas et al. for INTERIOR REARVIEW MIRROR ASSEMBLY, now U.S. Pat. No. 7,249,860; Ser. No. 10/456,599, filed Jun. 6, 2003 by Weller et al. for INTERIOR REARVIEW MIRROR SYSTEM WITH COMPASS, now U.S. Pat. No. 7,004,593; and/or Ser. No. 09/999,429, filed Nov. 15, 2001 by DeLine et al. for INTERIOR REARVIEW MIRROR SYSTEM INCORPORATING A DIRECTIONAL INFORMATION DISPLAY, now U.S. Pat. No. 6,642,851, and/or U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,513,252, and/or PCT Application No. PCT/US2004/015424, filed May 18, 2004 by Donnelly Corp. et al. for MIRROR ASSEMBLY FOR VEHICLE, and U.S. provisional applications, Ser. No. 60/471,546, filed May 19, 2003; Ser. No. 60/525,537, filed Nov. 26, 2003; and Ser. No. 60/556,259, filed Mar. 25, 2004, and/or European patent application, published Oct. 11, 2000 under Publication No. EP 0 1043566, and/or U.S. provisional applications, Ser. No. 60/624,091, filed Nov. 1, 2004 by Karner et al. for MOUNTING ASSEMBLY FOR MIRROR AND METHOD OF MAKING SAME; and/or Ser. No. 60/636,931, filed Dec. 17, 2004 by Blank et al. for INTERIOR REARVIEW MIRROR SYSTEM WITH COMPASS, which are all hereby incorporated herein by reference. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference), or a magneto-inductive sensor, such as described in U.S. Pat. No. 5,878,370 (which is hereby incorporated herein by reference), or a magneto-impedance sensor, such as the types described in PCT Publication No. WO 2004/076971 A2, published Sep. 10, 2004 (which is hereby incorporated herein by reference), or a Hall-effect sensor, such as the types described in U.S. Pat. Nos. 6,278,271; 5,942,895 and 6,184,679 (which are hereby incorporated herein by reference). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, and/or PCT Application No. PCT/US2004/015424, filed May 18, 2004 by Donnelly Corp. et al. for MIRROR ASSEMBLY FOR VEHICLE, which are all hereby incorporated herein by reference.

Optionally, the compass system may comprise an integrated automotive "compass-on-a-chip", which may comprise at least two magneto-responsive sensor elements, associated A/D and D/A converters, associated microprocessor(s) and memory, associated signal processing and filtering, associated display driver and associated LIN/CAN BUS interface and the like, all (or a sub-set thereof) created or disposed onto a silicon substrate (such as using CMOS technology) and constituting an ASIC chip, which is small (preferably less than approximately a two square centimeter area, more preferably less than approximately a 1.5 square centimeter area, and most preferably less than approximately a one square centimeter area or thereabouts) and readily packagable into the cavity. Optionally, and preferably, such a compass-on-a-chip ASIC may also include the hardware and software required to receive an output from a temperature sensor (such as a thermocouple or thermostat that is located external the vehicle cabin in order to sense and monitor the temperature external to the vehicle) and to convert this signal to a reading in degrees Fahrenheit or Celsius, and to provide this reading via an on-chip temperature display driver and/or via a BUS protocol, such as a CAN BUS or a LIN BUS, or via an on-chip wireless transmitter or the like to a digital or other type of temperature display so that the driver and/or occupants of the vehicle can view the temperature being measured (such as the temperature external the vehicle and/or the temperature within the vehicle cabin). Thus, for example, a monolithic compass/temp-on-a-chip ASIC may be disposed in the likes of a mirror mount or within the mirror head/housing of an interior rearview mirror assembly, and it may provide both the external temperature readout and a compass direction heading readout to an information display at the mirror head/housing (or elsewhere in the vehicle, such as the instrument panel/cluster or at an overhead console or accessory module or the like).

Figure 57:
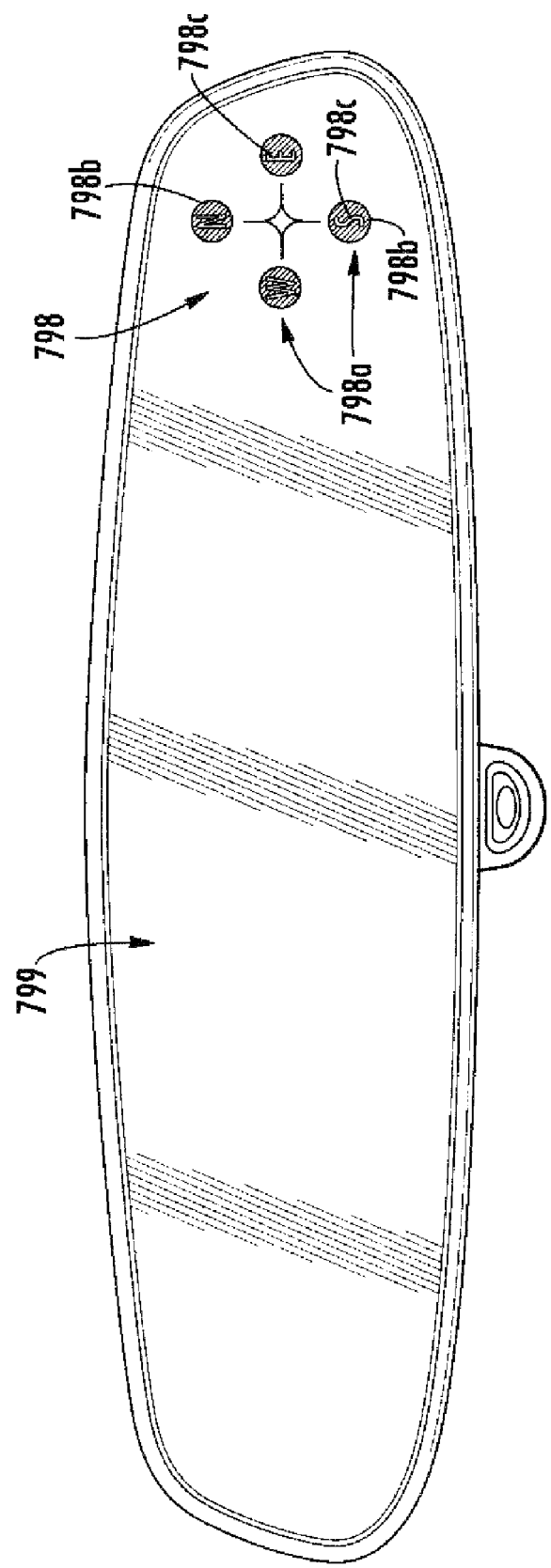
FIG. 57 is a front elevation of another reflective element of the present invention, with a compass display formed thereon.

Optionally, the compass system may include a display at the reflective element of the mirror assembly to display the sensed directional heading of the vehicle to the driver of the vehicle. The display may include ports or windows or characters etched or otherwise formed in the reflective coating of the reflective element, such as described in U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, and/or PCT Application No. PCT/US2004/015424, filed May 18, 2004 by Donnelly Corp. et al. for MIRROR ASSEMBLY FOR VEHICLE, which are hereby incorporated herein by reference. Optionally, and as shown in FIG. 57, and in order to reduce or limit the potential of viewing a double image of the directional heading (due to the reflection off a first outer surface and/or intermediary second or third surfaces of the illumination at the character-shaped port), a compass display 798 for a reflective element 799 includes four display ports 798a (such as one display port for each of the four cardinal directional heading points N, E, S, W, or optionally eight display ports for the eight cardinal and intercardinal directional heading points N, NE, E, SE, S, SW, W, NW) for displaying the sensed directional heading of the vehicle to the driver of the vehicle. The display ports may be formed as a plurality of generally circular (or rectangular or other shape as desired) ports, such as about 5 mm diameter ports. The ports may be etched or otherwise formed in the reflective coating of a prismatic reflective element (as shown in FIG. 57) or may be formed in the third or fourth surface reflective coating of an electro-optic reflective element assembly, without affecting the scope of the present invention.

For example, the circular or other shaped ports may be etched or otherwise formed in circles or other shapes, such as by utilizing techniques such as disclosed in commonly assigned U.S. Pat. No. 4,882,565, issued to Gallmeyer on Nov. 21, 1989, which is hereby incorporated herein by reference. The glass surface of the ports then may be sandblasted in the circular region 798b and through a mask (such as in the shape of the appropriate character (such as N, E, S, W)) that is applied or positioned at the port, with the mask having a cutout in the form of, for example, a capital "N" (and other characters/letters/icons at other ports of the display). Thus, using a sandblaster (or a laser or the like), and taking for example, a prismatic mirror element, the second surface silver/copper/paint mirror reflector typically formed thereon is ablated away in the port regions, and the port regions may then be roughened (such as via sandblasting and such as to provide a diffuse region) other than where the characters 798c (such as "N" or other character or icon) are established with the mask or masks. Thus, the reflective coating is locally removed and in its place is established a light transmitting, typically non-diffuse, window or opening in the shape of the character or icon 798c (as can be seen in FIG. 57) and locally surrounded by a diffuse local surface that reduces local specular reflection and hence reduces/eliminates double imaging. Thus, when the icon (such as "N") is illuminated (such as by a rear mounted LED or the like), the illuminated N is surrounded by a non-specularly reflecting, preferably diffuse surface. Thus, the port provides a non-diffuse window in the shape of the character and a diffuse surrounding region of the port. The diffuse or roughened or sandblasted area around the character or icon reduces the reflectance of the illuminated ports to substantially reduce double images when the character or icon is illuminated or backlit. Optionally, the diffuse portion may be painted or coated with a dark paint or coating or ink (such as via pad printing or the like) and may provide a dark background around the character or icon of the respective port when it is illuminated, and thus functions as a diffuser coating that diffuses the light incident thereon so that the driver or user of the mirror does not readily view the reflections of the illuminated ports or characters. In applications where the display is established on a third surface electro-optic or electrochromic reflective element assembly or cell, the ports, including the diffuse regions and the character/icon regions, are preferably electrically conductive. Thus, the display of the present invention provides windows (in the form of the directional heading character or icons) that are each surrounded by a light absorbing or light diffusing region or window and locally devoid of the reflective coating or coatings, and thus reduces or substantially limits double images of the illuminated ports and thus provides an enhanced display for the compass system. The display may be formed or established, and optionally inked or painted, on the front or rear surface of the substrate, without affecting the scope of the present invention.

For applications where a rosette type compass display is used on an electro-optic or electrochromic reflective element assembly, the reflective element assembly may comprise a display on demand transflective reflective element assembly, such that the ports need not be etched in the reflective coating or coatings. Also, for prismatic transflective reflectors, such as the types described in PCT application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; U.S. patent application Ser. No. 10/993,302, filed Nov. 19, 2004 by Lynam for MIRROR REFLECTIVE ELEMENT FOR A VEHICLE, now U.S. Pat. No. 7,338,177, which are hereby incorporated herein by reference, such etching of ports is not necessary and may not be desired.

A prismatic mirror element (when oriented as it would be viewed by a driver in the interior cabin of a vehicle) is typically about 25 cm across or long and about 6 to 7 cm wide or tall. The front or first surface (the surface facing the driver of the vehicle when the mirror is in the vehicle) is ground to be at an angle relative to the rear or second (and typically silvered) surface of typically about 4½ V degrees or thereabouts. Because of the angled first surface, the prismatic mirror element is generally wedge-shaped with varying thickness from top to bottom. For example, typically the thicker portion/cross section has a cross sectional thickness of about 6 mm or thereabouts, while the thinner portion/cross section of the prismatic mirror element has a cross sectional thickness of about 2 to 4 mm (typically about 3 mm). When such a prismatic mirror element comprises a transflective display on demand prismatic reflective element (such as, for example, the types described in PCT application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; U.S. patent application Ser. No. 10/993,302, filed Nov. 19, 2004 by Lynam for MIRROR REFLECTIVE ELEMENT FOR A VEHICLE, now U.S. Pat. No. 7,338,177, which are hereby incorporated herein by reference), such as where the reflector may comprise a silicon coating, such as described herein and/or in U.S. Pat. Nos. 6,286,965; 6,196,688; 6,065,840; 5,751,489; and 5,535,056; and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are hereby incorporated herein by reference, it may be desirable to position the display behind the thinner portion/cross section of the prismatic mirror element. Such placement of the display at the smaller physical cross sectional thickness of the prismatic mirror element may reduce any effect of double imaging that may be viewable when the display is powered or illuminated. Often, the thinner cross sectional region of the prismatic mirror element is below the thicker cross sectional region of the mirror element when the mirror element is mounted in the housing/casing of its prismatic mirror assembly in the vehicle and as viewed and used by the driver. However, if it is desired to position the display element at an upper portion of the prismatic mirror assembly, then the prismatic mirror element may be configured and adapted so that its thinner region/cross section is disposed at the upper portion of the prismatic mirror assembly and the thicker portion/cross section is at the lower portion of the prismatic mirror assembly. By so doing, the information display element or the like is viewable by the driver at an upper portion of the reflective element housed in the complete interior rearview mirror assembly in the vehicle, but because the display element is behind the thinner rather than the thicker portion/cross section of the prism used, double imaging of the display in a transflective display on demand prismatic mirror element may be reduced. The prismatic mirror element thus may be formed with a thinner cross sectional upper region and a thicker cross sectional lower region (whereby the flipping between the daytime and nighttime orientations may be reversed from conventional prismatic mirrors), in order to provide the desired display characteristics for the mirror element.

Optionally, the mirror assembly may include or incorporate a video display or display screen or panel or the like, such as a video slide out module or display screen of the types described in PCT Application No. PCT/US03/40611, filed Dec. 19, 2003 by Donnelly Corp. et al. for ACCESSORY SYSTEM FOR VEHICLE, and/or U.S. provisional application Ser. No. 60/630,061, filed Nov. 22, 2004 by Lynam et al. for MIRROR ASSEMBLY WITH VIDEO DISPLAY, which are hereby incorporated herein by reference. In such mirror applications that include or incorporate a video display screen and a compass system at or in the video display module and/or the mirror assembly, it is desirable that the arm or support that moves the video display screen and its auxiliary drive train and/or structure be fabricated substantially or entirely from non-magnetic materials, such as polymeric materials, so as to minimize/reduce/eliminate any magnetic field disturbance/anomalies/stray fields that might perturb/disturb/effect the detection and display of the vehicle heading by a compass sensor that may be proximate to or part of the video display and/or rearview mirror assembly.

Optionally, such accessories or features may be included in interior mirror assemblies that include user-interfaces, such as buttons, such as are described in U.S. Pat. No. 6,501,387, which is hereby incorporated herein by reference, or that include touch/proximity sensors such as are disclosed in U.S. Pat. Nos. 6,001,486; 6,310,611; 6,320,282; and 6,627,918, and U.S. pat. application Ser. No. 09/817,874, filed Mar. 26, 2001 by Quist et al. for INTERACTIVE AUTOMOTIVE REARVISION SYSTEM, now U.S. Pat. No. 7,224,324, and PCT Application No. PCT/US03/40611, filed Dec. 19, 2003, which are hereby incorporated herein by reference, or that include other types of buttons or switches, such as those described in U.S. provisional applications, Ser. No. 60/553,517, filed Mar. 16, 2004; and Ser. No. 60/535,559, filed Jan. 9, 2004, which are hereby incorporated herein by reference, or that include fabric-made position detectors, such as are disclosed in U.S. Pat. Nos. 6,504,531; 6,501,465; 6,492,980; 6,452,479; 6,437,258; and 6,369,804, which are hereby incorporated herein by reference.

For example, fabric-made position detectors can be included as user-actuatable switches at the bezel portion or elsewhere on the casing of an interior mirror assembly. Suitable fabric-made position detectors are available under the trade name ElekTex from Eleksen Limited of Hertfordshire, Great Britain. ElekTex comprises a laminate of textiles comprising two conductive outer layers separated by a partially conductive central layer. The outer layers each have two conductive-fabric electrode strips arranged so that the upper conductive layer has tracks which make contact across its opposing top and bottom edges and the lower conductive layer has conductive tracks up its left and right sides. The partially conductive central layer acts as an insulator in the resting state which, when touched, allows electrical current to flow between the top and bottom layer. Pressure applied to the ElekTex fabric causes two effects. First, the conducting fibers in the central layer are locally compressed allowing contact between neighboring conducting fibers to form a conductive channel through the central layer. Second, the applied pressure brings the two outer layers into contact with the conductive channel running through the central layer allowing a local circuit to be established between the upper and lower layers.

The conductive outer layers are constructed using moderately resistive components so that when a voltage is applied across the sheet, via the electrodes, there is a distinct voltage drop across the conductive sheet. When the voltage is measured at points across the lower sheet, it acts like the track of a potentiometer allowing the x-position to be calculated from the voltage which can be measured, when the sensor is pressed, via the top sheet. The position is made by applying a voltage to the top sheet and measuring on the lower sheet. These measurements can be made up to 1000 times a second providing, in effect, continuous X, Y positional data. When pressure is applied to an ElekTex sensor, for example when it is touched, a conductive channel is formed. If the pressure is light, the conductive fibers in the central layer will only just make sufficient contact to open up a continuous channel and the resistance of the channel will be high. Conversely, when a high force is applied to an ElekTex sensor, many more of the conductive fibers in the central layer will be brought into close proximity and thus the resistance in the channel will be relatively low. The variable resistance in the channel is, therefore, dependant on the pressure applied. To determine the z-axis force, the electronic controller supplies a current to the upper and lower conductive layers which in the resting state presents an open circuit and no current flows between the outer layers. When the sensor is touched and the pressure increases, a conductive channel of decreasing resistance forms the circuit whereupon the resulting current flow is high and related to the pressure applied. Because of their construction and ability to sense in X, Y and Z-directions, ElekTex user-actuatable interfaces are particularly suitable for menu selection/scrolling interface actuations associated with interior mirror assemblies and with windshield electronics modules. Note also that printing and/or backlighting can be utilized in conjunction with mirror-located ElekTex sensing to highlight/differentiate a particular functionality.

The present invention can be utilized in a variety of interior and exterior mirror assemblies such as described above. Also, the metallic and conductive mirror reflector on the inward facing surface (third surface) of an electrochromic (EC) mirror cell of the present invention may be a transflective "display on demand" layer or stack of coatings that is both reflecting of and transmitting to incident light, such as is disclosed in U.S. Pat. No. 5,668,663, which is hereby incorporated herein by reference. Also, and as disclosed in the '663 patent incorporated above, a turn signal indicator such as an LED indicator may be mounted behind an interior or an exterior mirror reflector of the present invention that utilizes a transflective mirror reflector, so that the presence of the turn signal indicator behind the mirror cell element is largely unseen until the turn signal is powered to illuminate and indicate a turn event. In this regard, when a transflective "display on demand" exterior electrochromic mirror (such as is disclosed in the '663 patent incorporated above) is used as a driver-side exterior rearview mirror on a vehicle, it can be advantageous to utilize a non-electrochromic, non-electrically-dimming transflective mirror on the corresponding passenger-side with a through-the-reflector turn signal indicia also. In this regard, use of an elemental semiconductor mirror, such as a silicon metal mirror, such as disclosed in U.S. Pat. Nos. 5,535,056; 5,751,489; and 6,065,840, which are hereby incorporated herein by reference, can be advantageous because such elemental semiconductor mirrors (such as can be formed by depositing a thin film of silicon) can be greater than 50% reflecting in the photopic (SAE J964a measured), while being also substantially transmitting of light (up to 20% or even more). Such silicon mirrors also have the advantage of being able to be deposited onto a flat glass substrate and to be bent into a curved (such as a convex or aspheric) curvature, which is also advantageous since many passenger-side mirrors are bent or curved.

Figure 59:
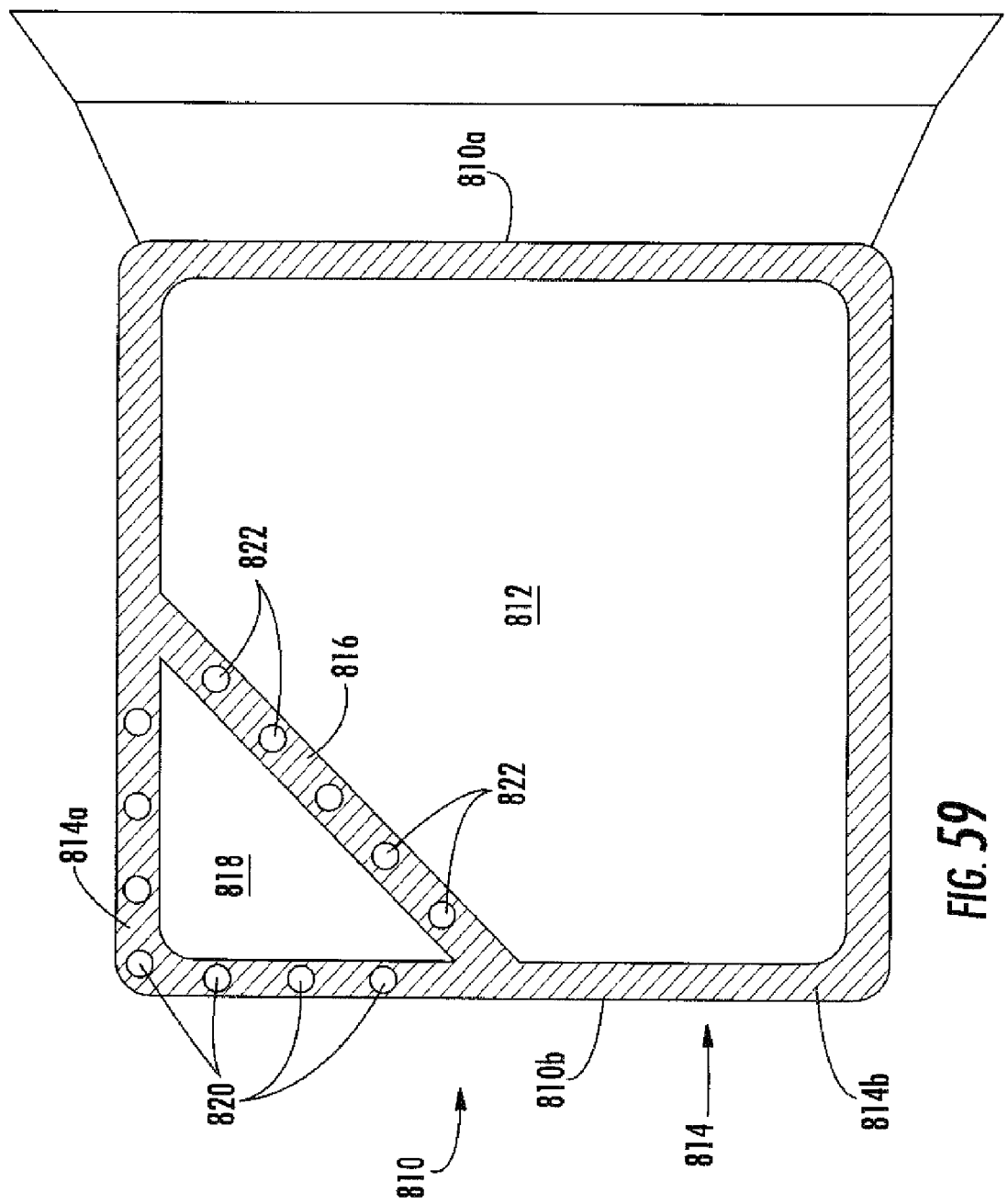
FIG. 59 is a forward facing elevation of an exterior rearview mirror assembly in accordance with the present invention.

Optionally, and with reference to FIG. 59, an exterior rearview mirror assembly 810 may comprise a main or primary reflective element assembly 812 positioned at a bezel portion 814, with an inboard side 810a of the mirror assembly being generally toward the respective side of the vehicle and an outboard side 810b of the mirror assembly being generally outward and away from the respective side of the vehicle. The bezel portion 814 may include a cross bar 816 (such as described in PCT publication No. WO 02/062623, published Aug. 15, 2002 for IMPROVED VEHICULAR LIGHTING SYSTEM, and/or in U.S. Pat. Nos. 6,522,451 and 6,717,712, and/or in U.S. patent application Ser. No. 10/054,633, filed Jan. 22, 2002 by Lynam et al. for IMPROVED VEHICULAR LIGHTING SYSTEM, now U.S. Pat. No. 7,195,381, and/or Ser. No. 10/817,645, filed Apr. 2, 2004 by Lynam et al. for AUTOMOBILE EXTERIOR SIDEVIEW MIRROR SYSTEM, now U.S. Pat. No. 7,167,294, which are hereby incorporated herein by reference), which separates the generally planar primary reflective element 812 from an auxiliary or curved or more curved reflective element 818 (which may be curved with a smaller radius of curvature than that of the main reflective element 812).

Curved reflective element 818 (that may however, and optionally, be a flat element) may be an electro-optically active reflective element (such as an electrochromic reflective element) or it may be a non-electro-optic, reflectivity-invariant reflective element, such as a chromium or other metal reflector coated glass or plastic substrate. For example, a plastic molding can be made (from an optically transmitting material such as acrylic or polycarbonate or CR-39 or COC olefin or the like). The polymeric surface may be activated (such as via a plasma treatment or via ion bombardment or the like) in order to enhance the adhesion of coatings deposited thereon, and a thin metal film may be coated thereon to function as a mirror reflector coating (and/or the polymeric surface may be primed/treated chemically to enhance metal coating adhesion thereto). For example, a thin film of chromium (or an alloy of chromium such as a chrome/nickel alloy) or another metal or alloy of a metal, such as of Inconel or titanium, or a steel or Hastelloy or nickel or the like, can be deposited onto the activated polymer substrate surface (such as via sputtering in a vacuum chamber). Thereafter, the now deposited metal reflector coating may be itself activated/primed, and then an optically transmitting layer or layers (such as of a metal oxide, such as silicon dioxide or titanium dioxide or of a silicone or other chemical coating) can be overcoated over the metal reflector layer (or layers) to serve as a mechanical protectorant and/or as an environmental protectorant (such an overcoat(s) may impart a tinting or hydrophilic property). Should the mirror element be a first surface mirror as such is known in the automotive mirror art, then there is no need to have the substrate be optically transmitting to visible light, and so this widens the latitude of choice for the polymer resin material from which to mold or cast the plastic substrate [and thus allow use of low transmitting/opaque resins (such as filled engineering plastics such as a filled nylon or an ABS resin or the like) that are harder/more wear resistant than typical optical plastics]. Note that, optionally, an adhesion promoting undercoat can be deposited between the mirror reflector layer(s) and the substrate surface. Also, the mirror reflector layer and any adhesion-promoting underlayers can be a single layer or may comprise multilayers. Besides being applicable to the auxiliary spotter mirror as described above, these concepts can be applied to the main mirror reflective element also.

Figure 60:
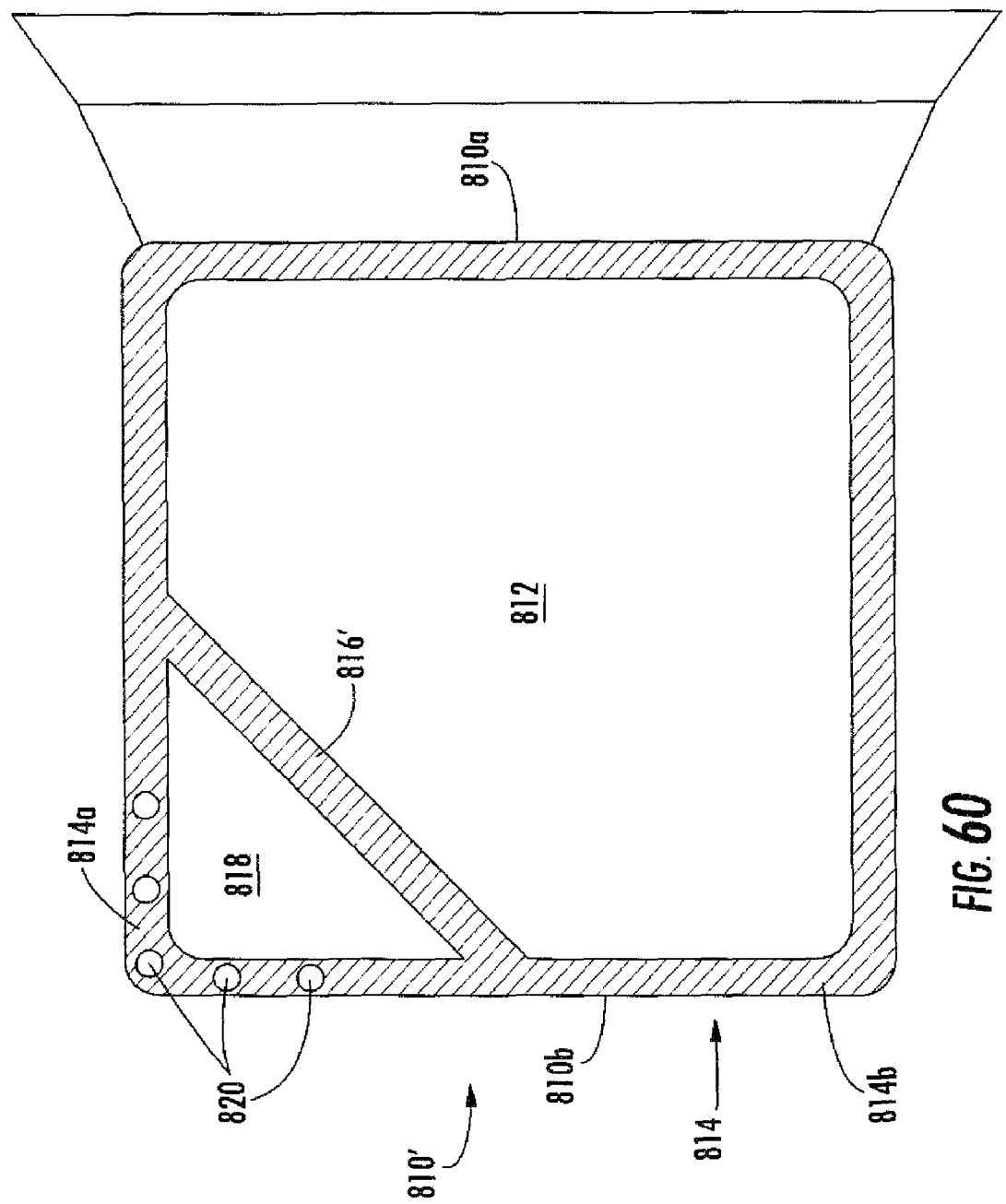
FIG. 60 is a forward facing elevation of another exterior rearview mirror assembly in accordance with the present invention.
Figure 61:
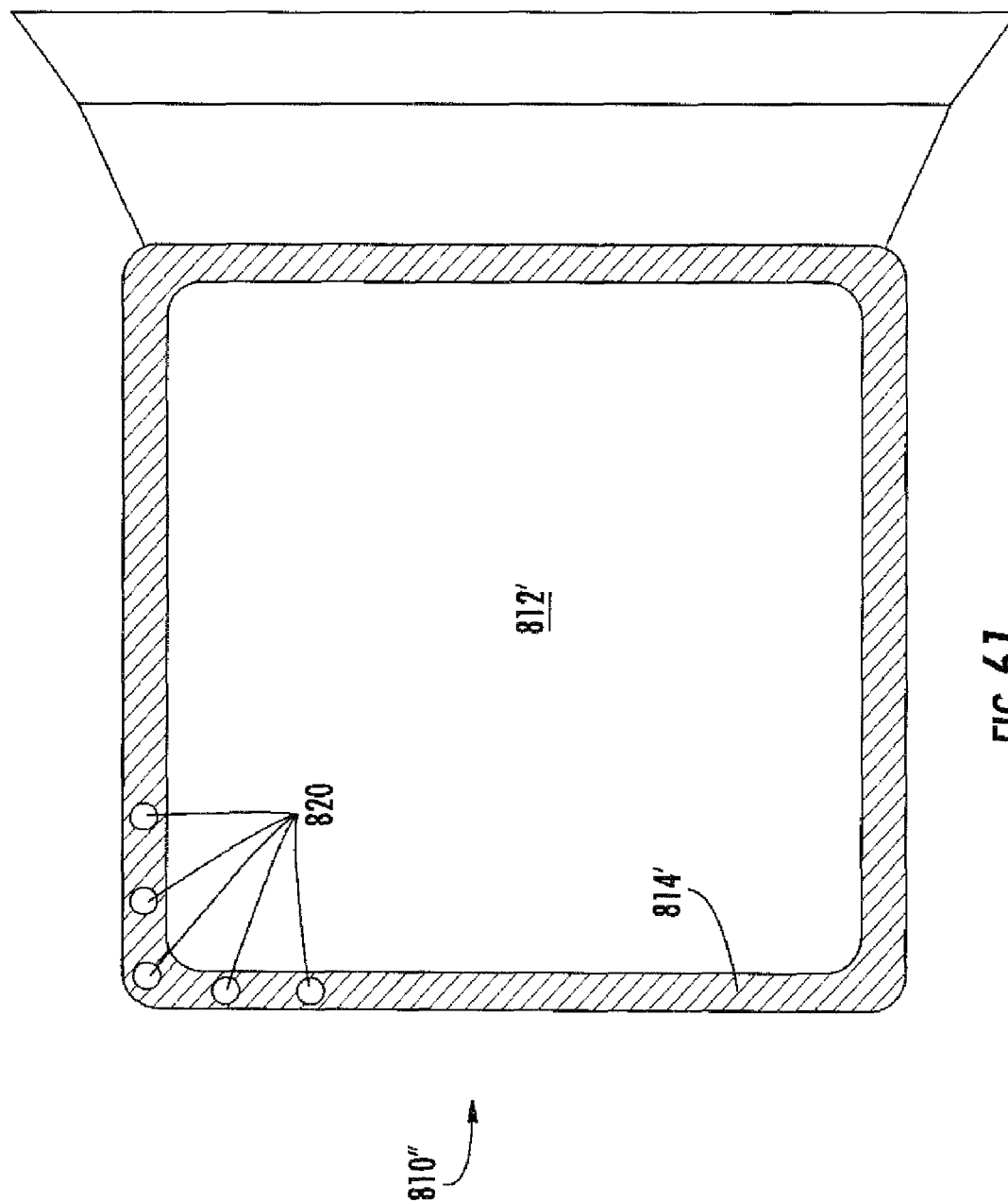
FIG. 61 is a forward facing elevation of another exterior rearview mirror assembly in accordance with the present invention.
Figure 62:
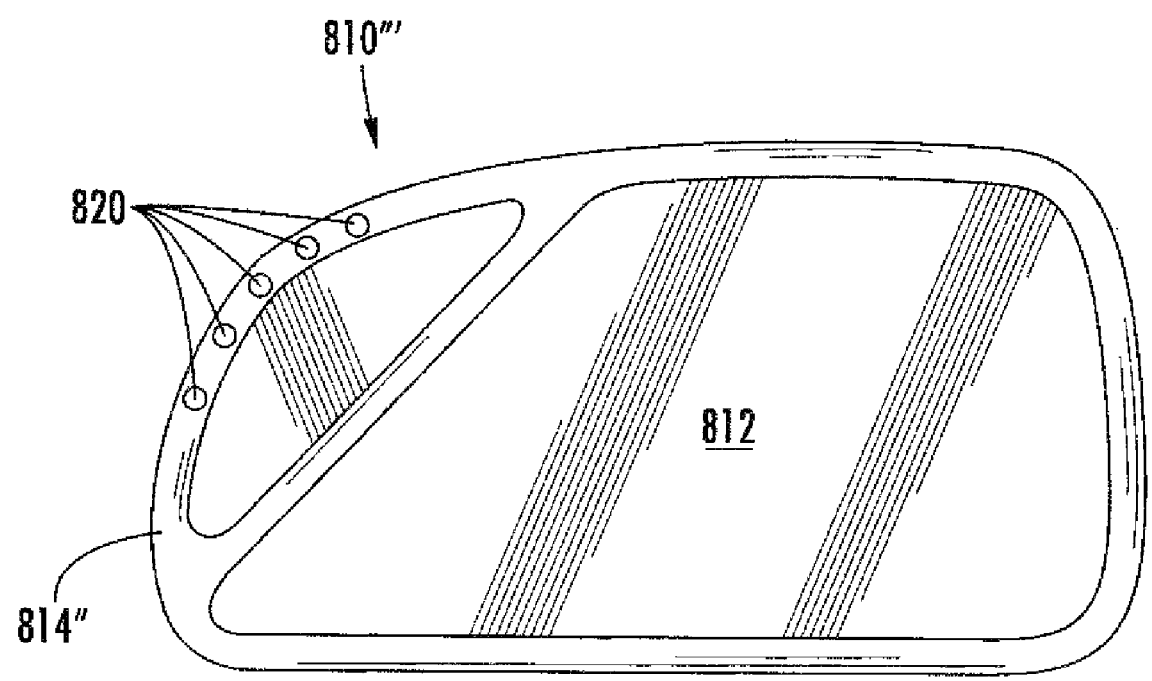
FIG. 62 is a forward facing elevation of another exterior rearview mirror assembly in accordance with the present invention.

The bezel portion 814 may include a plurality of illumination sources 820, such as light emitting diodes (LEDs) or the like, such as described in PCT Publication No. WO 02/062623, published Aug. 15, 2002 for IMPROVED VEHICULAR LIGHTING SYSTEM, and U.S. patent application Ser. No. 10/054,633, filed Jan. 22, 2002 by Lynam et al. for IMPROVED VEHICULAR LIGHTING SYSTEM, now U.S. Pat. No. 7,195,381, which are hereby incorporated herein by reference. As shown in FIGS. 59 and 60, the LEDs 820 may be arranged at an outboard apex or corner 814a of bezel 814, such that activation of or illumination of LEDs 820 may be suggestive of a turn indicator or arrow when the vehicle is signaling that it will be turning left or right. The LEDs 820 may be arranged along and around the apex or upper, outboard corner 814a of the bezel 814 to generally form an arrow-shape that points generally outboard and upward with respect to the vehicle). Optionally, however, the LEDs 820 may be positioned or arranged along and around the lower, outboard corner 814b of the bezel to generally form an arrow-shape that points generally outboard and downward with respect to the vehicle, without affecting the scope of the present invention. As shown in FIG. 59, cross bar 816 may extend along the mirror face and between the upper and outboard sides of the bezel, and may include illumination sources 822, such as LEDs or the like. Optionally, and as shown in FIG. 60, the cross bar 816' of mirror assembly 810' may not include any illumination sources or the like. Other types of bezels with or without a cross bar may be implemented, without affecting the scope of the present invention. For example, a mirror assembly 810" (FIG. 61) may have a bezel portion 814' and may not include the cross bar and may have a single reflective element 812', without affecting the scope of the present invention. Also, for example, and with reference to FIG. 62, the exterior rearview mirror assembly 810' may have the illumination sources 820 around a bezel portion 814" that is rounded as shown (or in other shapes).

Preferably, the LEDs of the mirror assemblies of FIGS. 59-62 are recessed into the bezel and more preferably, are angled away from the side of the vehicle so as to be not readily viewable by the driver of the vehicle. Optionally, the bezel may include a small cowling or shield or baffle to partially conceal the lights from the driver so as to provide an affirmative shield so that the lights are partially or substantially or entirely non-viewable by or unnoticeable to the driver of the vehicle, such as described in U.S. Pat. Nos. 5,371,659; 5,863,116; 5,497,306; 5,823,654; and/or 5,669,699, and/or in PCT Publication No. WO 02/062623, published Aug. 15, 2002 for IMPROVED VEHICULAR LIGHTING SYSTEM, and/or in U.S. patent application Ser. No. 10/054,633, filed Jan. 22, 2002 by Lynam et al. for IMPROVED VEHICULAR LIGHTING SYSTEM, now U.S. Pat. No. 7,195,381, which are hereby incorporated herein by reference.

Optionally, the exterior rearview mirror assembly and/or vehicle may include a spraying device at or near the mirror assembly that is operable to spray heated fluid, such as windshield wiper fluid or the like onto the reflective element of the mirror assembly, in order to clean and/or device or clear the reflective element. Preferably, the fluid that is sprayed onto the reflective element is heated, such as by a heating device of the types described in U.S. Pat. Nos. 6,669,109; 6,615,438; 6,164,564; 6,719,215; 6,620,608; 5,509,606; 5,354,965; and/or 5,183,099, which are hereby incorporated herein by reference. For example, the spraying device may comprise a pipe or conduit that is in fluid communication with a heated fluid reservoir intended for the windshield, and may include a separate pump or the like for delivering and spraying the fluid at and on the reflective element of the rearview mirror assembly.

The heated fluid thus may be sprayed onto the reflective element to de-ice the reflective element when the reflective element is iced over. The spraying device may include a pump or the like for pumping the fluid through a nozzle or outlet, and may be activated by a user input or the like, so that a user (such as the driver of the vehicle) may selectively spray or device the reflective element when desired. Optionally, the spraying device may be automatically actuated to spray the reflective element, such as in response to a detection of the temperature (such as via an exterior temperature sensor of the vehicle or of the mirror assembly) being at or below a threshold level (such as, for example, at or below 5 degrees Celsius or other threshold). Optionally, the spraying device may be automatically actuated when the temperature reaches the threshold temperature and/or in response to a user input, such as actuation of a key fob or remote keyless entry device or actuation of a remote ignition starter or actuation of the vehicle ignition or the like. Optionally, the outer surface of the reflective element may be coated with a hydrophobic or hydrophilic coating or property.

Optionally, a transflective reflective element assembly such as the types described above or other types of reflective element assemblies (such as, for example, the types described in U.S. Pat. Nos. 5,668,663; 5,724,187; and 6,690,268, and/or in U.S. patent application Ser. No. 10/054,633, filed Jan. 22, 2002 by Lynam et al. for VEHICULAR LIGHTING SYSTEM, now U.S. Pat. No. 7,195,381, and/or in PCT Application No. PCT/US03/29776, filed Sep. 19, 2003 by Donnelly Corp. et al. for ELECTROCHROMIC MIRROR ASSEMBLY, and/or PCT Application No. PCT/US03/35381, filed Nov. 5, 2003 by Donnelly Corp. et al. for ELECTRO-OPTIC REFLECTIVE ELEMENT ASSEMBLY, which are all hereby incorporated herein by reference) may be utilized in other applications by reversing the orientation of the assembly or cell such that a person or occupant of the vehicle typically views through the assembly from the fourth surface side of the assembly through the assembly to view a scene occurring at the first surface side of the assembly. In such an application, the assembly may function as a window when the electrochromic medium is not energized or darkened, such that the person may readily view a scene through the assembly. This is because the transflective mirror assemblies are substantially transmissive to light transmitting through the mirror assembly in either direction, but are not as transmissive when viewed through the rear of the assembly (i.e. in the opposite direction that one would normally view the assembly when it is implemented in a rearview mirror assembly) when the electrochromic medium is colored or darkened. The cell or assembly thus may function as a window when a scene is viewed through the mirror assembly from the rear or fourth surface side of the mirror assembly. However, when the electrochromic medium is darkened or colored, the transmissivity of the mirror assembly is decreased, which, to the eye of the observer, appears to enhance the reflectivity of the mirror assembly when viewed from the rear of the mirror assembly. The mirror assembly thus may function substantially as a mirror when the electrochromic medium is colored or darkened.

Figure 63:
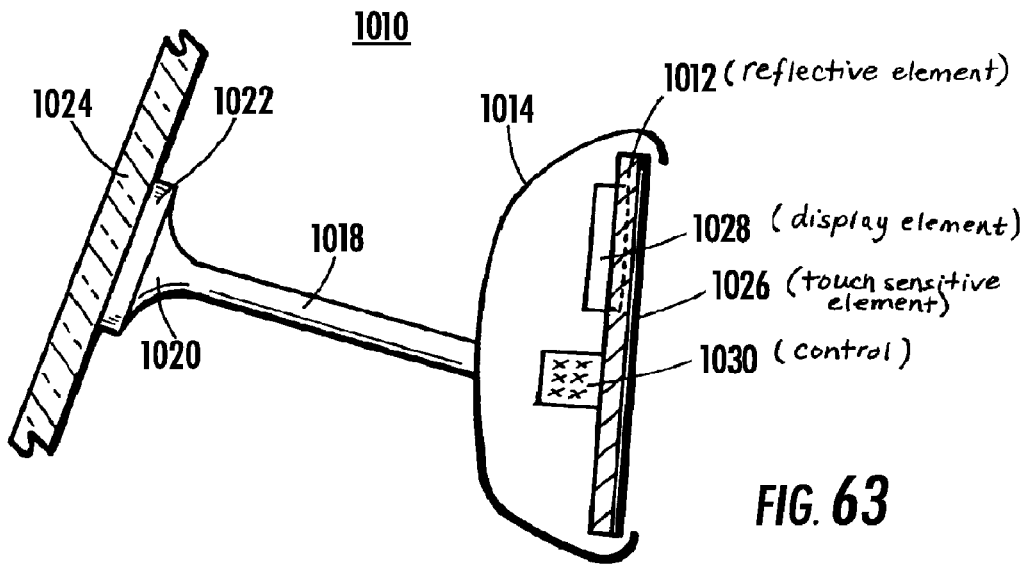
FIG. 63 is a side elevation schematic view of an interactive automotive rear vision system of the present invention.
Figure 64:
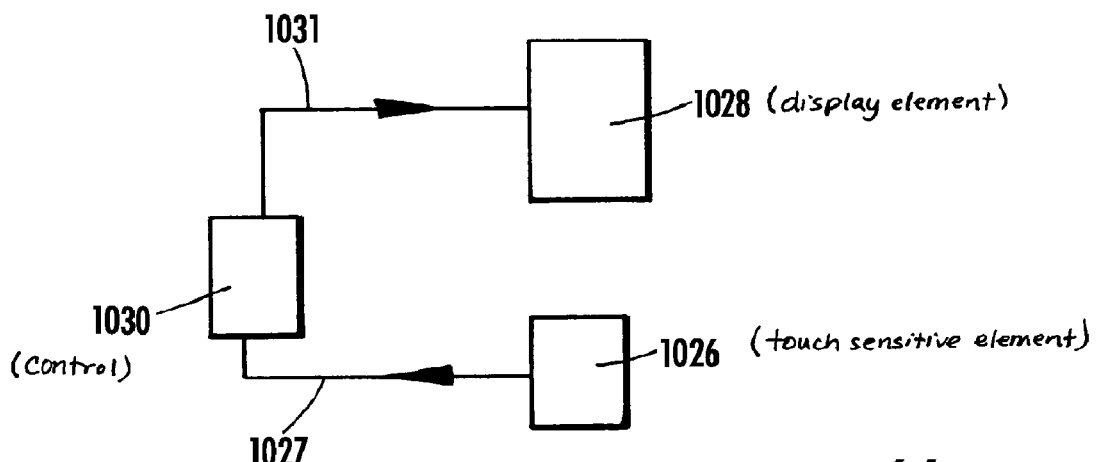
FIG. 64 is a schematic showing user interaction with a touch sensitive element.

Optionally, and as described in U.S. pat. application Ser. No. 09/817,874, filed Mar. 26, 2001 by Quist et al. for INTERACTIVE AUTOMOTIVE REAR VISION SYSTEM, incorporated above, an interior rearview minor assembly may include a touch sensitive element 1026 (FIGS. 63 and 64). A schematic of an interactive rearview mirror system 1010 is shown in FIG. 63. Mirror system 1010 includes an interior mirror assembly 1011, which incorporates a reflective element 1012. Reflective element 1012 is housed in a casing 1014, which is mounted to an interior portion of a vehicle, such as vehicle windshield 1024, by a support arm 1018. Optionally, casing 1014 is pivotably mounted to support arm 1018, which attaches via a mount 1020 to a mounting button 1022 that is adhered to vehicle windshield 1024 (note that alternately, mounting, of the assembly can be to the header region of the vehicle, as known in the mirror arts and/or can be a single pivot/ball joint or a two pivot/ball joint). Examples of suitable mounting arrangements can be found in U.S. Pat. Nos. 5,487,522; 5,671,996; 5,820,097; 5,615,857; 5,330,149; 5,100,095; 4,930,742; 4,936,533 or 5,820,097.

The outermost or front surface of reflective element 1012 comprises a selector element, such as a touch sensitive element 1026. For suitable touch sensitive elements, reference is made to U.S. Pat. Nos. 6,001,486 and 6,087,012, and U.S. patent application Ser. No. 60/213,663, filed Jun. 23, 2000; Ser. No. 60/231,096, filed Sep. 8, 2000; Ser. No. 60/239,788, filed Oct. 12, 2000; Ser. No. 60/234,867, filed Sep. 22, 2000; Ser. No. 60/244,577, filed Oct. 31, 2000.

Optionally, a display element 1028 (and most preferably a reconfigurable display element) is mounted at the rearmost or outermost surface of reflective element 1012 so as to be at least partially (preferably substantially and most preferably fully) viewed through reflective element 1012. However, other locations for display elements are possible, such as mounting to the side of above, or below reflective element 1012, such as is disclosed in U.S. Pat. No. 6,690,268.

Interactive mirror system 1010 includes a control 1030 that most preferably is located within casing 1014. As shown schematically in FIG. 64, user interaction with touch sensitive element 1026 (such as by touching or at least closely approaching with a human finger or, less preferably, by touching with a stylus or at least closely approaching with a stylus), preferably a transparent touch sensitive element, generates an output signal 1027 indicative of user interaction that is input to control 1030. In response, control 1030 provides an output 1031 to display element 1028 to cause display element 1028 to display the vehicle function or information desired by the driver. Display element 1028 may perform a single display function or multiple display functions, such as providing indication of a vehicle function or functions, including a family of functions of a plurality of family of functions, for example a compass mirror display function, a temperature display function, a tire pressure/status display function, a status of inflation of tires display function, a GPS/navigation system function, a telematic function, computer display function, including e-mails and INTERNET access, a passenger air bag disabled display function, an automatic rain sensor operation display function, telephone dial information display function, highway status information display function, blind spot indicator display function, or the like.

Touch sensitive element 1026 can be a capacitive type or a resistive type or an inductive type, such as are known in the touch panel arts, including such as disclosed in U.S. Pat. Nos. 3,798,370; 4,198,539; 4,661,655; 4,731,508; 4,822,957;

5,045,644; U.S. Pat. Nos. 6,001,486; and 6,087,012, and U.S. patent application Ser. No. 60/213,663, filed Jun. 23, 2000; Ser. No. 60/231,096, filed Sep. 8, 2000; Ser. No. 60/239,788, filed Oct. 12, 2000; Ser. No. 60/234,867, filed Sep. 22, 2000; Ser. No. 60/244,577, filed Oct. 31, 2000. Also, the touch inputs of this present invention do not necessarily require physical contact between the driver's finger and touch sensitive element 1026. Close approach of the driver's finger (or a stylus) to the touch sensitive surface may suffice to achieve a touch input. This can thus be by non-contacting input or by contacting input by a variety of means such as thermal or pyro detection, capacitive or inductive detection, resistive sensing, electromagnetic disturbance sensing or the like. Optionally, a reading of the fingerprint of the person touching the mirror reflector can be taken to verify identity of the person and so authorize particular actions in response (such as turning on the vehicle ignition, such as to start the engine, conducting a remote banking transaction, identifying a person for the purpose of setting vehicle accessories such as seat position, mirror position, climate control, audio system controls, ride system, and the like to the particular setting preferred by that individual person such as is common in vehicle memory systems).

Touch sensitive element 1026 can comprise a transparent conductive coating or stack of coatings, such as of indium tin oxide, tin oxide, doped tin oxide, doped zinc oxide, or any other transparent conductor coating or stack known in the touch screen arts, and can be part of a 4-wire system or a 5-wire system as such are known in the touch screen art, or can be a capacitive-type touch screen.

Preferably, touch screen element 1026 and display element 1028 are re-configurable so that each can be associated with more than one function. Dependent on the particular circumstance, an in-vehicle microprocessor can create on touch screen element 1026 and display element 1028 whatever icon, highlight or display is desired presented to the driver. In addition, one of the touch screen elements (1026) may be used to toggle between the various available functions for a given touch screen element 1026.

Note that the display that the driver touches via touch screen element 1026 can be generated by display element 1028 itself or alternately, by a separate display located behind the mirror reflector. In such a configuration where a display element is behind the mirror reflector, the reflective mirror coating of the mirror reflective element can be locally at least partially removed at the location of the display element disposed behind the mirror element. Optionally, where all the reflective mirror coating is removed, a semitransparent but significantly reflecting coating or series of coatings (such as a thin metal film coating or a multilayer of coatings, including a thin metal coating of silver, aluminum, rhodium, (or their alloys), or the like, or a dichroic coating or coating stack, can be used that substantially masks the display element from driver notice until the display element is powered to display information, such as disclosed in U.S. Pat. Nos. 5,668,663 and 5,724,187. Such has been described as "display on demand" in the art. Such display can include a "display on demand" such as disclosed in U.S. Pat. Nos. 5,668,663 and 5,724,187 noted above. In this regard, it is preferable that the display be a light emitting display, such as a fluorescent display, a vacuum fluorescent display, a field emission display, an electroluminescent display, a fluorescent display, a plasma display; or a light emitting diode display, such as an organic or inorganic light emitting diode display. Alternatively, the reflective element may comprise a substantially reflecting, significantly light transmitting reflective element, such as disclosed in U.S. Pat. Nos. 5,668,663 and 5,724,187 noted above. An example, such as a semitransparent reflector would be a third surface reflector coated on the third surface of an electrochromic mirror element, as known in the electrochromic mirror art, consisting of a thin metal coating (such as of silver, silver alloy, aluminum, aluminum alloy) that is significantly reflecting but also significantly transmitting and that, preferably, is overcoated with a transparent conductor such as indium tin oxide when contacting an electrochromic medium (preferably an electrochromic solid polymer film) when serving as a combined third surface reflector/conductor layer in an electrochromic laminate cell construction. For further details of suitable reflective elements with portions of the reflective mirror coating adapted to permit light to transmit through the reflective element or of a highly reflecting/ significantly transflective reflective element, reference is made to U.S. Pat. Nos. 5,668,663 and 5,724,187.

Optionally, an interactive mirror assembly may comprise a touch screen upon which, on its outermost surface, is comprised a touch sensitive element, such as a touch sensitive element comprising a transparent electronic conducting coating of indium tin oxide.

Therefore, the present invention provides a controllable and selectively transmissive window/mirror assembly that may be viewed through when it is not energized, but may selectively function as a mirror when the cell or assembly is energized. The window/mirror assembly of the present invention may be suitable for use in a variety of applications. For example, the window/mirror assembly of the present invention may be implemented in a visor of a vehicle. When the visor is flipped or moved down to partially cover the upper portion of the driver's field of view, the driver may view through the window/mirror assembly when the window/mirror assembly is not energized. As the sun or glare may intensify, the driver may selectively energize the window/mirror assembly (or the window/mirror assembly may automatically energize, such as in response to a light sensor or glare sensor or the like) to darken or color the electrochromic medium and, thus, to change the window/mirror assembly to function substantially as a mirror. Optionally, the window/mirror assembly or cell may be incorporated into the windshield of the vehicle, such as into the upper portion of the windshield, or may be incorporated into other windows of the vehicle, such as sunroof or side or rear windows of the vehicle, without affecting the scope of the present invention.

The present invention thus provides a window/mirror assembly that is selectively or automatically controlled or switched between a window function and a mirror function. It is further envisioned that the window/mirror assembly of the present invention may be achieved via other types of controllable transmitting/blocking devices, such as, for example, a polarizing device or the like. For example, a polarizing device may have two or more polarized elements, which, when oriented in one direction relative to one another, may be substantially transmissive, and which, when oriented in another direction relative to one another, may be substantially attenuating to light, such that a person cannot readily view a scene through the assembly. Other types of selectively controlled window/mirror assemblies or window/screen assemblies or the like may be implemented, without affecting the scope of the present invention.

Changes and modifications in the specifically described embodiments may be carried out without departing from the principles of the present invention, which is intended to be limited only by the scope of the appended claims, as interpreted according to the principles of patent law.

What is claimed is:

1. A variable reflectance vehicular electrochromic interior rearview mirror assembly, said vehicular electrochromic interior rearview mirror assembly comprising:

an interior rearview mirror casing;

an electrochromic interior rearview mirror reflective element, said electrochromic interior rearview mirror reflective element having a front substrate and a rear substrate and an electrochromic medium sandwiched between said front and rear substrates;

wherein said front substrate has a first surface and a second surface;

said second surface of said front substrate having a transparent electrically conductive coating disposed thereat;

wherein said rear substrate has a third surface and a fourth surface;

a mirror reflector disposed at said third surface of said rear substrate;

wherein said mirror reflector comprises at least one electrically conductive layer;

wherein said electrochromic medium is disposed in an interpane cavity established between said third surface of said rear substrate and said second surface of said front substrate and bounded by a perimeter seal;

wherein at least a portion of said front substrate extends beyond a corresponding portion of said rear substrate to establish a ledge at least partially along the periphery of said electrochromic interior rearview mirror reflective element;

wherein no part of said rear substrate extends beyond any part of said front substrate;

wherein a first electrical connection is made to said transparent electrically conductive coating and a second electrical connection is made to said at least one electrically conductive layer of said mirror reflector;

wherein said electrochromic interior rearview mirror reflective element comprises a concealing layer disposed along a perimeter border region of said second surface of said front substrate, wherein said concealing layer substantially conceals the presence of said perimeter seal and the electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly; and said interior rearview mirror casing comprising a bezel-less interior rearview mirror casing where no portion of said interior rearview mirror casing overlaps said first surface of said front substrate.

2. The vehicular electrochromic interior rearview mirror assembly of claim 1, comprising an element generally disposed at said ledge.

3. The vehicular electrochromic interior rearview mirror assembly of claim 2, wherein said element at least one of (a) contacts said portion of said front substrate at said ledge and (b) supports said portion of said front substrate at said ledge.

4. The vehicular electrochromic interior rearview mirror assembly of claim 3, wherein said element comprises a molding formed of a polymeric material.

5. The vehicular electrochromic interior rearview mirror assembly of claim 4, wherein said molding comprises a portion of said interior rearview mirror casing.

6. The vehicular electrochromic interior rearview mirror assembly of claim 1, wherein said interior rearview mirror casing at least partially receives said electrochromic interior rearview mirror reflective element therein.

7. The vehicular electrochromic interior rearview mirror assembly of claim 6, comprising an element generally disposed at said ledge when said electrochromic interior rearview mirror reflective element is received at said interior rearview mirror casing.

8. The vehicular electrochromic interior rearview mirror assembly of claim 7, wherein said element at least one of (a) contacts said portion of said front substrate at said ledge and (b) supports said portion of said front substrate at said ledge.

9. The vehicular electrochromic interior rearview mirror assembly of claim 1, wherein said mirror reflector comprises a transflective mirror reflector that is partially transmissive of visible light therethrough and partially reflective of visible light incident thereon.

10. The vehicular electrochromic interior rearview mirror assembly of claim 9, comprising a video display disposed behind said transflective mirror reflector of said electrochromic interior rearview mirror reflective element, wherein said video display is operable to display video information through said transflective mirror reflector of said electrochromic interior rearview mirror reflective element and wherein the video information is viewable through said transflective mirror reflector of said electrochromic interior rearview mirror reflective element by a driver of the vehicle when said video display is displaying video information, and is substantially non-viewable by the driver of the vehicle when said video display is not displaying video information.

11. The vehicular electrochromic interior rearview mirror assembly of claim 1, wherein said concealing layer comprises a reflecting concealing layer that at least partially reflects light incident thereon.

12. The vehicular electrochromic interior rearview mirror assembly of claim 1, wherein said concealing layer comprises a substantially non-reflecting concealing layer.

13. The vehicular electrochromic interior rearview mirror assembly of claim 12, wherein said concealing layer comprises a light absorbing concealing layer.

14. The vehicular electrochromic interior rearview mirror assembly of claim 13, wherein said concealing layer comprises a black chrome layer.

15. The vehicular electrochromic interior rearview mirror assembly of claim 1, wherein at least a portion of a perimeter border region at said third surface of said rear substrate is devoid of said mirror reflector.

16. The vehicular electrochromic interior rearview mirror assembly of claim 15, wherein said perimeter seal at least covers where a terminal outer edge of said mirror reflector meets said perimeter border region.

17. The vehicular electrochromic interior rearview mirror assembly of claim 1, wherein the electrical connections are established inboard of a perimeter edge of said front substrate between said first surface and said second surface and do not overlap at least one of (a) said first surface of said front substrate and (b) said perimeter edge of said front substrate.

18. The vehicular electrochromic interior rearview mirror assembly of claim 17, wherein a third surface electrical conductor extends over at least a portion of said at least one electrically conductive layer and over at least a portion of a perimeter edge of said rear substrate between said third surface and said fourth surface to provide electrical connection to said at least one electrically conductive layer at said perimeter edge of said rear substrate.

19. The vehicular electrochromic interior rearview mirror assembly of claim 18, wherein said mirror reflector comprises a vacuum deposited metal film.

20. The vehicular electrochromic interior rearview mirror assembly of claim 19, wherein said vacuum deposited metal film comprises at least one of silver and a silver alloy.

21. The vehicular electrochromic interior rearview mirror assembly of claim 18, wherein at least a portion of a perimeter border region of said third surface of said rear substrate is devoid of said mirror reflector.

22. The vehicular electrochromic interior rearview mirror assembly of claim 21, wherein at least one metal oxide layer is disposed between said at least one electrically conductive layer and said third surface of said rear substrate.

23. The vehicular electrochromic interior rearview mirror assembly of claim 1, wherein a third surface electrical conductor extends inboard from said perimeter seal towards at least a central region of said third surface of said rear substrate, and wherein said third surface electrical conductor is disposed between said mirror reflector and said third surface of said rear substrate so as to undercoat said mirror reflector where said mirror reflector is contacted by said electrochromic medium.

24. The vehicular electrochromic interior rearview mirror assembly of claim 18, wherein said third surface electrical conductor comprises a transparent electrically conductive layer.

25. The vehicular electrochromic interior rearview mirror assembly of claim 1, wherein said front and rear substrates are joined by said perimeter seal as uncut sheets of glass, and wherein said front and rear substrates are cut into mirror shapes after said perimeter seal is disposed therebetween.

26. A variable reflectance vehicular electrochromic interior rearview mirror assembly, said vehicular electrochromic interior rearview mirror assembly comprising:

a interior rearview mirror casing;

an electrochromic interior rearview mirror reflective element, said electrochromic interior rearview mirror reflective element having a front substrate and a rear substrate and an electrochromic medium sandwiched between said front and rear substrates;

wherein said front substrate has a first surface and a second surface;

said second surface of said front substrate having a transparent electrically conductive coating disposed thereat;

wherein said rear substrate has a third surface and a fourth surface;

a mirror reflector disposed at said third surface of said rear substrate;

wherein said mirror reflector comprises at least one electrically conductive layer;

wherein said electrochromic medium is disposed in an interpane cavity established between said third surface of said rear substrate and said second surface of said front substrate and bounded by a perimeter seal;

wherein at least a portion of said front substrate extends beyond a corresponding portion of said rear substrate to establish a ledge at least partially along the periphery of said electrochromic interior rearview mirror reflective element;

wherein no part of said rear substrate extends beyond any part of said front substrate;

wherein a first electrical connection is made to said transparent electrically conductive coating and a second electrical connection is made to said at least one electrically conductive layer of said mirror reflector;

wherein said electrochromic interior rearview mirror reflective element comprises a concealing layer disposed along a perimeter border region of said second surface of said front substrate, wherein said concealing layer substantially conceals the presence of said perimeter seal and the electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

said interior rearview mirror casing comprising a bezelless interior rearview mirror casing where no portion of said interior rearview mirror casing overlaps said first surface of said front substrate; and said electrochromic interior rearview mirror assembly comprising an element generally disposed at said ledge, wherein said element comprises a molding formed of a polymeric material.

27. The vehicular electrochromic interior rearview mirror assembly of claim 26, wherein said electrochromic interior rearview mirror reflective element is at least partially received at said interior rearview mirror casing.

28. The vehicular electrochromic interior rearview mirror assembly of claim 27, wherein said molding comprises a portion of said interior rearview mirror casing.

29. The vehicular electrochromic interior rearview mirror assembly of claim 27, wherein said element at least one of (a) contacts said portion of said front substrate at said ledge and (b) supports said portion of said front substrate at said ledge.

30. The vehicular electrochromic interior rearview mirror assembly of claim 26, wherein said mirror reflector comprises a transflective mirror reflector that is partially transmissive of visible light therethrough and partially reflective of visible light incident thereon, and wherein a video display is disposed behind said transflective mirror reflector of said electrochromic interior rearview mirror reflective element, and wherein said video display is operable to display video information through said transflective mirror reflector of said electrochromic interior rearview mirror reflective element and wherein the video information is viewable through said transflective mirror reflector of said electrochromic interior rearview mirror reflective element by a driver of the vehicle when said video display is displaying video information, and is substantially non-viewable by the driver of the vehicle when said video display is not displaying video information.

31. The vehicular electrochromic interior rearview mirror assembly of claim 26, wherein said concealing layer comprises a reflecting concealing layer that at least partially reflects light incident thereon.

32. The vehicular electrochromic interior rearview mirror assembly of claim 26, wherein said concealing layer comprises a substantially non-reflecting concealing layer.

33. The vehicular electrochromic interior rearview mirror assembly of claim 26, wherein at least a portion of a perimeter border region at said third surface of said rear substrate is devoid of said mirror reflector.

34. A variable reflectance vehicular electrochromic interior rearview mirror assembly, said vehicular electrochromic interior rearview mirror assembly comprising:

a interior rearview mirror casing;

an electrochromic interior rearview mirror reflective element, said electrochromic interior rearview mirror reflective element having a front substrate and a rear substrate and an electrochromic medium sandwiched between said front and rear substrates;

wherein said front substrate has a first surface and a second surface;

said second surface of said front substrate having a transparent electrically conductive coating disposed thereat;

wherein said rear substrate has a third surface and a fourth surface;

a mirror reflector disposed at said third surface of said rear substrate;

wherein said mirror reflector comprises at least one electrically conductive layer;

wherein said electrochromic medium is disposed in an interpane cavity established between said third surface of said rear substrate and said second surface of said front substrate and bounded by a perimeter seal;

wherein at least a portion of said front substrate extends beyond a corresponding portion of said rear substrate to establish a ledge at least partially along the periphery of said electrochromic interior rearview mirror reflective element;

wherein no part of said rear substrate extends beyond any part of said front substrate;

wherein a first electrical connection is made to said transparent electrically conductive coating and a second electrical connection is made to said at least one electrically conductive layer of said mirror reflector;

wherein said electrochromic interior rearview mirror reflective element comprises a concealing layer disposed along a perimeter border region of said second surface of said front substrate, wherein said concealing layer substantially conceals the presence of said perimeter seal and the electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

wherein said mirror reflector comprises a vacuum deposited metal film, and wherein said vacuum deposited metal film comprises at least one of a silver and a silver alloy; and an element generally disposed at said ledge, wherein said element comprises a molding formed of a polymeric material and wherein said molding comprises a portion of said interior rearview mirror casing.

35. The vehicular electrochromic interior rearview mirror assembly of claim 34, wherein said concealing layer comprises a reflecting concealing layer that at least partially reflects light incident thereon.

36. The vehicular electrochromic interior rearview mirror assembly of claim 34, wherein said concealing layer comprises a substantially non-reflecting concealing layer.

37. The vehicular electrochromic interior rearview minor assembly of claim 34, wherein said electrochromic interior rearview mirror reflective element is at least partially received at said interior rearview mirror casing.

38. The vehicular electrochromic interior rearview mirror assembly of claim 34, wherein said element at least one of (a) contacts said portion of said front substrate at said ledge and (b) supports said portion of said front substrate at said ledge, and wherein said interior rearview mirror casing comprises a bezel-less interior rearview mirror casing where no portion of said interior rearview mirror casing overlaps said first surface of said front substrate.

39. The vehicular electrochromic interior rearview mirror assembly of claim 34, wherein said mirror reflector comprises a transflective mirror reflector that is partially transmissive of visible light therethrough and partially reflective of visible light incident thereon, and wherein a video display is disposed behind said transflective mirror reflector of said electrochromic interior rearview mirror reflective element, and wherein said video display is operable to display video information through said transflective mirror reflector of said electrochromic interior rearview mirror reflective element and wherein the video information is viewable through said transflective mirror reflector of said electrochromic interior rearview mirror reflective element by a driver of the vehicle when said video display is displaying video information, and is substantially non-viewable by the driver of the vehicle when said video display is not displaying video information.

40. The vehicular electrochromic interior rearview mirror assembly of claim 34, wherein at least a portion of a perimeter border region at said third surface of said rear substrate is devoid of said mirror reflector.

41. A variable reflectance vehicular electrochromic interior rearview mirror assembly, said vehicular electrochromic interior rearview mirror assembly comprising:

an electrochromic interior rearview mirror reflective element, said electrochromic interior rearview mirror reflective element having a front substrate and a rear substrate;

wherein said front substrate has a first surface and a second surface;

said second surface of said front substrate having a transparent electrically conductive coating disposed thereat;

wherein said rear substrate has a third surface and a fourth surface;

a mirror reflector disposed at said rear substrate;

wherein said mirror reflector comprises at least one electrically conductive metal layer;

wherein said electrochromic interior rearview mirror reflective element comprises an electrochromically-active region;

said electrochromically-active region comprising an electrochromic medium disposed in an interpane cavity established between said third surface of said rear substrate and said second surface of said front substrate, and wherein said electrochromic medium is bounded by a perimeter seal;

wherein said electrochromic interior rearview mirror reflective element comprises a perimeter band disposed along and around a perimeter border region of said second surface of said front substrate, and wherein said perimeter band generally conceals the presence of said perimeter seal from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

a sensor region outboard of said electrochromically-active region and between said perimeter seal and a perimeter edge of said front substrate; and wherein at least one touch sensor is disposed behind said front substrate at said sensor region, and wherein said at least one touch sensor is operable to sense a touch or proximity of a user's finger at said first surface of said front substrate at said sensor region.

42. The vehicular electrochromic interior rearview mirror assembly of claim 41, wherein said perimeter band includes an enlarged portion at said sensor region, wherein said enlarged portion of said perimeter band has a greater width dimension than any width dimension of said perimeter band at portions other than at said enlarged portion.

43. The vehicular electrochromic interior rearview mirror assembly of claim 42, wherein, with said vehicular electrochromic interior rearview mirror assembly normally mounted in the equipped vehicle, said enlarged portion of said perimeter band is along a lower region of said second surface of said front substrate of said electrochromic interior rearview mirror reflective element.

44. The vehicular electrochromic interior rearview mirror assembly of claim 41, wherein said mirror reflector is disposed at said third surface of said rear substrate.

45. The vehicular electrochromic interior rearview mirror assembly of claim 41, wherein said at least one touch sensor comprises at least one capacitive touch sensor.

46. The vehicular electrochromic interior rearview mirror assembly of claim 45, wherein said capacitive touch sensor comprises a transparent electrically conductive coating.

47. The vehicular electrochromic interior rearview mirror assembly of claim 46, wherein said transparent electrically conductive coating comprises indium tin oxide.

48. The vehicular electrochromic interior rearview mirror assembly of claim 41, comprising an interior rearview mirror casing, wherein no portion of said interior rearview mirror casing overlaps said first surface of said front substrate.

49. The vehicular electrochromic interior rearview mirror assembly of claim 41, wherein said front substrate has an edge dimension between said first surface and said second surface and wherein said mirror casing extends across said edge dimension.

50. The vehicular electrochromic interior rearview mirror assembly of claim 41, wherein said mirror casing terminates substantially flush with a plane defined by said first surface of said front substrate.

51. The vehicular electrochromic interior rearview mirror assembly of claim 41, comprising an interior rearview mirror casing having a bezel portion.

52. The vehicular electrochromic interior rearview mirror assembly of claim 51, wherein said bezel portion comprises a metalicized bezel portion.

53. The vehicular electrochromic interior rearview mirror assembly of claim 41, wherein no part of said rear substrate extends beyond any part of said front substrate.

54. The vehicular electrochromic interior rearview mirror assembly of claim 41, wherein said vehicular electrochromic interior rearview mirror assembly comprises a bezelless vehicular electrochromic interior rearview mirror assembly.

55. The vehicular electrochromic interior rearview mirror assembly of claim 41, wherein said electrochromic interior rearview mirror reflective element comprises a first electrical connection, wherein said transparent electrically conductive coating is in electrical connection with said first electrical connection.

56. The vehicular electrochromic interior rearview mirror assembly of claim 55, wherein said electrochromic interior rearview mirror reflective element comprises a second electrical connection, wherein said at least one electrically conductive metal layer of said mirror reflector is in electrical connection with said second electrical connection.

57. The vehicular electrochromic interior rearview mirror assembly of claim 56, wherein said perimeter band generally conceals the presence of said first and second electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

58. The vehicular electrochromic interior rearview mirror assembly of claim 41, wherein said vehicular electrochromic interior rearview mirror assembly comprises a display element associated with a given one of said at least one touch sensor, and wherein, when said given touch sensor is activated, said associated display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

59. The vehicular electrochromic interior rearview mirror assembly of claim 58, wherein said display element is disposed behind said second substrate, and wherein said display element, when activated, is viewable through said electrochromic medium.

60. The vehicular electrochromic interior rearview mirror assembly of claim 59, wherein said mirror reflector comprises a transflective mirror reflector, and wherein said display element, when activated, is viewable through said transflective mirror reflector.

61. The vehicular electrochromic interior rearview mirror assembly of claim 60, wherein said transflective mirror reflector comprises a thin film of silver or silver alloy.

62. The vehicular electrochromic interior rearview mirror assembly of claim 41, wherein said front substrate comprises a glass substrate and wherein said front glass substrate comprises a first perimeter edge circumferentially at its first surface and a second perimeter edge circumferentially at its second surface, and wherein at least one of said first and second perimeter edges is rounded.

63. The vehicular electrochromic interior rearview mirror assembly of claim 62, wherein both of said first and second perimeter edges are rounded.

64. The vehicular electrochromic interior rearview mirror assembly of claim 62, wherein said first perimeter edge is rounded.

65. The vehicular electrochromic interior rearview mirror assembly of claim 62, wherein said second perimeter edge is rounded.

66. The vehicular electrochromic interior rearview mirror assembly of claim 41, wherein, at said sensor region, a perimeter edge of said rear substrate local said sensor region is recessed compared to a corresponding perimeter edge of said front substrate in order to establish an overhang region.

67. The vehicular electrochromic interior rearview mirror assembly of claim 66, wherein said at least one touch sensor comprises a first touch sensor and a second touch sensor, and wherein said first touch sensor and said second touch sensor are disposed at said overhang region and are rearward of said front substrate.

68. The vehicular electrochromic interior rearview mirror assembly of claim 67, wherein said first touch sensor and said second touch sensor are not rearward of said second substrate.

69. The vehicular electrochromic interior rearview mirror assembly of claim 68, wherein said first touch sensor comprises a first capacitive touch sensor and wherein said second touch sensor comprises a second capacitive touch sensor.

70. The vehicular electrochromic interior rearview mirror assembly of claim 69, wherein said first capacitive touch sensor is adjacent said second capacitive touch sensor.

71. The vehicular electrochromic interior rearview mirror assembly of claim 70, wherein said perimeter band includes an enlarged portion having a greater width dimension than any width dimension of said perimeter band at portions other than at said enlarged portion and wherein said enlarged portion of said perimeter band is at said overhang region.

72. The vehicular electrochromic interior rearview mirror assembly of claim 41, wherein said mirror reflector is disposed at said third surface of said rear substrate and wherein at least a portion of said perimeter seal is visible to a person viewing said electrochromic interior rearview mirror reflective element from said fourth surface and through said rear substrate.

73. The vehicular electrochromic interior rearview mirror assembly of claim 41, wherein said perimeter band comprises a reflective perimeter band.

74. The vehicular electrochromic interior rearview mirror assembly of claim 73, wherein said perimeter band comprises at least one metal thin film.

75. The vehicular electrochromic interior rearview mirror assembly of claim 74, wherein said perimeter band comprises chromium.

76. A variable reflectance vehicular electrochromic interior rearview mirror assembly, said vehicular electrochromic interior rearview mirror assembly comprising:

an electrochromic interior rearview mirror reflective element, said electrochromic interior rearview mirror reflective element having a front substrate and a rear substrate;

wherein said front substrate has a first surface and a second surface;

said second surface of said front substrate having a transparent electrically conductive coating disposed thereat;

wherein said rear substrate has a third surface and a fourth surface;

a mirror reflector disposed at said third surface of said rear substrate;

wherein said mirror reflector comprises at least one electrically conductive metal layer;

wherein said electrochromic interior rearview mirror reflective element comprises an electrochromically-active region;

said electrochromically-active region comprising an electrochromic medium disposed in an interpane cavity established between said third surface of said rear substrate and said second surface of said front substrate, and wherein said electrochromic medium is bounded by a perimeter seal;

wherein said electrochromic interior rearview mirror reflective element comprises a perimeter band disposed along and around a perimeter border region of said second surface of said front substrate, and wherein said perimeter band generally conceals the presence of said perimeter seal from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

a sensor region outboard of said electrochromically-active region and between said perimeter seal and a perimeter edge of said front substrate;

wherein a first touch sensor and a second touch sensor are disposed behind said front substrate at said sensor region, and wherein said first and second touch sensors are operable to sense a touch or proximity of a user's finger at said first surface of said front substrate at respective locations at said sensor region;

wherein said first touch sensor comprises a first capacitive touch sensor and wherein said second touch sensor comprises a second capacitive touch sensor, and wherein said first capacitive touch sensor is adjacent said second capacitive touch sensor;

wherein, at said sensor region, a perimeter edge of said rear substrate local said sensor region is recessed compared to a corresponding perimeter edge of said front substrate in order to establish an overhang region; and wherein said first capacitive touch sensor and said second capacitive touch sensor are disposed at said overhang region and are rearward of said front substrate.

77. The vehicular electrochromic interior rearview mirror assembly of claim 76, wherein said first capacitive touch sensor and said second capacitive touch sensor are not rearward of said second substrate.

78. The vehicular electrochromic interior rearview mirror assembly of claim 76, wherein said front substrate comprises a glass substrate and wherein said front glass substrate comprises a first perimeter edge circumferentially at its first surface and a second perimeter edge circumferentially at its second surface, and wherein at least one of said first and second perimeter edges is rounded.

79. The vehicular electrochromic interior rearview mirror assembly of claim 78, wherein both of said first and second perimeter edges are rounded.

80. The vehicular electrochromic interior rearview mirror assembly of claim 78, wherein said first perimeter edge is rounded.

81. The vehicular electrochromic interior rearview mirror assembly of claim 78, wherein said second perimeter edge is rounded.

82. The vehicular electrochromic interior rearview mirror assembly of claim 76, wherein said vehicular electrochromic interior rearview mirror assembly comprises a first display element associated with said first capacitive touch sensor and a second display element associated with said second capacitive touch sensor, and wherein, when said first capacitive touch sensor is activated, said first display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly, and wherein, when said second capacitive touch sensor is activated, said second display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

83. The vehicular electrochromic interior rearview mirror assembly of claim 82, wherein said first and second display elements are disposed behind said second substrate, and wherein said first and second display elements, when activated, are viewable through said electrochromic medium.

84. The vehicular electrochromic interior rearview mirror assembly of claim 83, wherein said mirror reflector comprises a transflective mirror reflector, and wherein said first and second display elements, when activated, are viewable through said transflective mirror reflector.

85. The vehicular electrochromic interior rearview mirror assembly of claim 84, wherein said transflective mirror reflector comprises a thin film of silver or silver alloy.

86. The vehicular electrochromic interior rearview mirror assembly of claim 76, comprising an interior rearview mirror casing, wherein no portion of said interior rearview mirror casing overlaps said first surface of said front substrate.

87. The vehicular electrochromic interior rearview mirror assembly of claim 76, wherein said first capacitive touch sensor comprises a first transparent electrically conductive coating, and wherein said second capacitive touch sensor comprises a second transparent electrically conductive coating.

88. The vehicular electrochromic interior rearview mirror assembly of claim 76, wherein said perimeter band includes an enlarged portion at said sensor region, and wherein said enlarged portion of said perimeter band has a greater width dimension than any width dimension of said perimeter band at portions other than at said enlarged portion, and wherein, with said vehicular electrochromic interior rearview mirror assembly normally mounted in the equipped vehicle, said enlarged portion of said perimeter band is along a lower region of said second surface of said front substrate of said electrochromic interior rearview mirror reflective element.

89. The vehicular electrochromic interior rearview mirror assembly of claim 76, wherein said perimeter band comprises a reflective perimeter band, and wherein said perimeter band comprises at least one metal thin film.

90. The vehicular electrochromic interior rearview mirror assembly of claim 76, wherein said front substrate comprises a glass substrate, and wherein said front glass substrate comprises a first perimeter edge circumferentially at its first surface and a second perimeter edge circumferentially at its second surface, and wherein at least said first perimeter edge is rounded.

91. The vehicular electrochromic interior rearview mirror assembly of claim 76, wherein no part of said rear substrate extends beyond any part of said front substrate.

92. The vehicular electrochromic interior rearview mirror assembly of claim 91, comprising an interior rearview mirror casing, wherein no portion of said interior rearview mirror casing overlaps said first surface of said front substrate.

93. The vehicular electrochromic interior rearview mirror assembly of claim 76, wherein said first capacitive touch sensor comprises a first transparent electrically conductive coating, and wherein said second capacitive touch sensor comprises a second transparent electrically conductive coating.

94. The vehicular electrochromic interior rearview mirror assembly of claim 76, wherein said electrochromic interior rearview mirror reflective element comprises a first electrical connection and a second electrical connection, and wherein said transparent electrically conductive coating is in electrical connection with said first electrical connection, and wherein said at least one electrically conductive metal layer of said mirror reflector is in electrical connection with said second electrical connection, and wherein said perimeter band generally conceals the presence of said first and second electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

95. A variable reflectance vehicular electrochromic interior rearview mirror assembly, said vehicular electrochromic interior rearview mirror assembly comprising:

an electrochromic interior rearview mirror reflective element, said electrochromic interior rearview mirror reflective element having a front substrate and a rear substrate;

wherein said front substrate has a first surface and a second surface;

said second surface of said front substrate having a transparent electrically conductive coating disposed thereat;

wherein said rear substrate has a third surface and a fourth surface;

a mirror reflector disposed at said rear substrate;

wherein said mirror reflector comprises at least one electrically conductive metal layer;

wherein said electrochromic interior rearview mirror reflective element comprises an electrochromically-active region;

said electrochromically-active region comprising an electrochromic medium disposed in an interpane cavity established between said third surface of said rear substrate and said second surface of said front substrate, and wherein said electrochromic medium is bounded by a perimeter seal;

wherein said electrochromic interior rearview mirror reflective element comprises a perimeter reflective band disposed along and around a perimeter border region of said second surface of said front substrate, and wherein said perimeter reflective band generally conceals the presence of said perimeter seal from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

a sensor region outboard of said electrochromically-active region and between said perimeter seal and a perimeter edge of said front substrate; and wherein a capacitive touch sensor is disposed at said sensor region, and wherein said capacitive touch sensor is operable to sense a touch or proximity of a user's finger at said sensor region.

96. The vehicular electrochromic interior rearview mirror assembly of claim 95, wherein said perimeter reflective band includes an enlarged portion at said sensor region, and wherein said enlarged portion of said perimeter reflective band has a greater width dimension than any width dimension of said perimeter reflective band at portions other than at said enlarged portion, and wherein, with said vehicular electrochromic interior rearview mirror assembly normally mounted in the equipped vehicle, said enlarged portion of said perimeter reflective band is along a lower region of said second surface of said front substrate of said electrochromic interior rearview mirror reflective element.

97. The vehicular electrochromic interior rearview mirror assembly of claim 95, wherein said mirror reflector is disposed at said third surface of said rear substrate, and wherein at least one of (a) said capacitive touch sensor comprises a transparent electrically conductive coating, said transparent electrically conductive coating comprising indium tin oxide, and (b) said capacitive touch sensor comprises a transparent electrically conductive coating.

98. The vehicular electrochromic interior rearview mirror assembly of claim 95, wherein said mirror reflector is disposed at said third surface of said rear substrate, and wherein said electrochromic interior rearview mirror reflective element comprises a first electrical connection and a second electrical connection, and wherein said transparent electrically conductive coating is in electrical connection with said first electrical connection, and wherein said at least one electrically conductive metal layer of said mirror reflector is in electrical connection with said second electrical connection, and wherein said perimeter reflective band generally conceals the presence of said first and second electrical connections from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

99. The vehicular electrochromic interior rearview mirror assembly of claim 95, wherein said front substrate comprises a glass substrate and wherein at least one of (i) said front glass substrate comprises a first perimeter edge circumferentially at its first surface and a second perimeter edge circumferentially at its second surface, and wherein at least one of said first and second perimeter edges is rounded, (ii) said front glass substrate comprises a first perimeter edge circumferentially at its first surface and a second perimeter edge circumferentially at its second surface, and wherein both of said first and second perimeter edges are rounded, (iii) said front glass substrate comprises a first perimeter edge circumferentially at its first surface and a second perimeter edge circumferentially at its second surface, and wherein said first perimeter edge is rounded, and (iv) said front, glass substrate comprises a first perimeter edge circumferentially at its first surface and a second perimeter edge circumferentially at its second surface and wherein said second perimeter edge is rounded.

100. The vehicular electrochromic interior rearview mirror assembly of claim 95, wherein said capacitive touch sensor is disposed behind said front substrate at said sensor region, and wherein said capacitive touch sensor is operable to sense a touch or proximity of a user's finger at said first surface of said front substrate at said sensor region.

101. The vehicular electrochromic interior rearview mirror assembly of claim 95, wherein said vehicular electrochromic interior rearview mirror assembly comprises a display element associated with said capacitive touch sensor, and wherein, when said capacitive touch sensor is activated, said display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly.

102. The vehicular electrochromic interior rearview mirror assembly of claim 101, wherein at least one of (a) said display element is disposed behind said second substrate, and wherein said display element, when activated, is viewable through said electrochromic medium, (b) said display element is disposed behind said second substrate, and wherein said display element, when activated, is viewable through said electrochromic medium, and wherein said mirror reflector comprises a transflective mirror reflector, and wherein said display element, when activated, is viewable through said transflective mirror reflector, (c) said display element is disposed behind said second substrate, and wherein said display element, when activated, is viewable through said electrochromic medium, and wherein said mirror reflector comprises a transflective mirror reflector, and wherein said display element, when activated, is viewable through said transflective mirror reflector, and wherein said transflective mirror reflector comprises a thin film of silver, and (d) said display element is disposed behind said second substrate, and wherein said display element, when activated, is viewable through said electrochromic medium, and wherein said mirror reflector comprises a transflective mirror reflector, and wherein said display element, when activated, is viewable through said transflective mirror reflector, and wherein said transflective mirror reflector comprises a thin film of silver alloy.

103. The vehicular electrochromic interior rearview mirror assembly of claim 95, wherein at least one of (i) said vehicular electrochromic interior rearview mirror assembly comprises an interior rearview mirror casing and wherein no portion of said interior rearview mirror casing overlaps said first surface of said front substrate, (ii) said vehicular electrochromic interior rearview mirror assembly comprises an interior rearview mirror casing and wherein said front substrate has an edge dimension between said first surface and said second surface, and wherein said mirror casing extends across said edge dimension, (iii) said vehicular electrochromic interior rearview mirror assembly comprises an interior rearview mirror casing and wherein said mirror casing terminates substantially flush with a plane defined by said first surface of said front substrate, and (iv) no part of said rear substrate extends beyond any part of said front substrate.

104. The vehicular electrochromic interior rearview mirror assembly of claim 95, wherein, at said sensor region, a perimeter edge of said rear substrate local said sensor region is recessed compared to a corresponding perimeter edge of said front substrate in order to establish an overhang region, and wherein said capacitive touch sensor is disposed at said overhang region and is rearward of said front substrate.

105. The vehicular electrochromic interior rearview mirror assembly of claim 104, wherein said capacitive touch sensor is not rearward of said second substrate, and wherein said perimeter reflective band includes an enlarged portion at said sensor region, and wherein said enlarged portion of said perimeter reflective band has a greater width dimension than any width dimension of said perimeter reflective band at portions other than at said enlarged portion, and wherein said enlarged portion of said perimeter reflective band is at said overhang region.

106. The vehicular electrochromic interior rearview mirror assembly of claim 95, wherein at least one of (a) said perimeter reflective band comprises at least one metal thin film and (b) said perimeter reflective band comprises at least one metal thin film and wherein said metal thin film comprises chromium.

107. A variable reflectance vehicular electrochromic interior rearview mirror assembly, said vehicular electrochromic interior rearview mirror assembly comprising:

an electrochromic interior rearview mirror reflective element, said electrochromic interior rearview mirror reflective element having a front substrate and a rear substrate;

wherein said front substrate has a first surface and a second surface;

said second surface of said front substrate having a transparent electrically conductive coating disposed thereat;

wherein said rear substrate has a third surface and a fourth surface;

a mirror reflector disposed at said rear substrate;

wherein said mirror reflector comprises at least one electrically conductive metal layer;

wherein said electrochromic interior rearview mirror reflective element comprises an electrochromically-active region;

said electrochromically-active region comprising an electrochromic medium disposed in an interpane cavity established between said third surface of said rear substrate and said second surface of said front substrate, and wherein said electrochromic medium is bounded by a perimeter seal;

wherein said electrochromic interior rearview mirror reflective element comprises a perimeter reflective band disposed along and around a perimeter border region of said second surface of said front substrate, and wherein said perimeter reflective band generally conceals the presence of said perimeter seal from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

wherein said front substrate comprises a glass substrate and wherein said front glass substrate comprises a first perimeter edge circumferentially at its first surface and a second perimeter edge circumferentially at its second surface, and wherein at least said first perimeter edge is rounded;

a sensor region outboard of said electrochromically-active region and between said perimeter seal and a perimeter edge of said front substrate; and wherein a touch sensor is disposed at said sensor region, and wherein said touch sensor is operable to sense a touch or proximity of a user's finger at said sensor region.

108. The vehicular electrochromic interior rearview mirror assembly of claim 107, wherein at least one of (i) said vehicular electrochromic interior rearview mirror assembly comprises an interior rearview mirror casing, and wherein no portion of said interior rearview mirror casing overlaps said first surface of said front substrate, (ii) said vehicular electrochromic interior rearview mirror assembly comprises an interior rearview mirror casing, and wherein said front substrate has an edge dimension between said first surface and said second surface, and wherein said minor casing extends across said edge dimension, (iii) said vehicular electrochromic interior rearview mirror assembly comprises an interior rearview mirror casing, and wherein said mirror casing terminates substantially flush with a plane defined by said first surface of said front substrate, and (iv) no part of said rear substrate extends beyond any part of said front substrate.

109. The vehicular electrochromic interior rearview mirror assembly of claim 108, wherein, at said sensor region, a perimeter edge of said rear substrate local said sensor region is recessed compared to a corresponding perimeter edge of said front substrate in order to establish an overhang region, and wherein said touch sensor is disposed at said overhang region and is rearward of said front substrate.

110. The vehicular electrochromic interior rearview mirror assembly of claim 109, wherein said perimeter reflective band includes an enlarged portion at said sensor region, and wherein said enlarged portion of said perimeter reflective band has a greater width dimension than any width dimension of said perimeter reflective band at portions other than at said enlarged portion, and wherein said enlarged portion of said perimeter reflective band is at said overhang region.

111. The vehicular electrochromic interior rearview mirror assembly of claim 108, wherein said touch sensor is disposed behind said front substrate at said sensor region, and wherein said touch sensor is operable to sense a touch or proximity of a user's finger at said first surface of said front substrate at said sensor region.

112. A variable reflectance vehicular electrochromic interior rearview mirror assembly, said vehicular electrochromic interior rearview mirror assembly comprising:

an electrochromic interior rearview mirror reflective element, said electrochromic interior rearview mirror reflective element having a front glass substrate and a rear substrate;

wherein said front substrate has a first surface and a second surface;

said second surface of said front substrate having a transparent electrically conductive coating disposed thereat;

wherein said rear substrate has a third surface and a fourth surface;

a mirror reflector disposed at said third surface of said rear substrate;

wherein said mirror reflector comprises at least one electrically conductive metal layer;

wherein said electrochromic interior rearview mirror reflective element comprises an electrochromically-active region;

said electrochromically-active region comprising an electrochromic medium disposed in an interpane cavity established between said third surface of said rear substrate and said second surface of said front substrate, and wherein said electrochromic medium is bounded by a perimeter seal;

wherein said electrochromic interior rearview mirror reflective element comprises a perimeter band disposed along and around a perimeter border region of said second surface of said front substrate, and wherein said perimeter band generally conceals the presence of said perimeter seal from view by a driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly;

a sensor region outboard of said electrochromically-active region and between said perimeter seal and a perimeter edge of said front substrate;

wherein at least a first touch sensor and a second touch sensor are disposed at said sensor region, and wherein said first touch sensor is operable to sense a touch or proximity of a user's finger at said sensor region and wherein said second touch sensor is operable to sense a touch or proximity of a user's finger at said sensor region; and wherein, with said vehicular electrochromic interior rearview mirror assembly normally mounted in the equipped vehicle, said sensor region is at a lower region of said electrochromic interior rearview mirror reflective element.

113. The vehicular electrochromic interior rearview mirror assembly of claim 112, wherein said first touch sensor comprises a first capacitive touch sensor, and wherein said second touch sensor comprises a second capacitive touch sensor.

114. The vehicular electrochromic interior rearview mirror assembly of claim 113, wherein said first capacitive touch sensor and said second capacitive touch sensor are disposed behind said front substrate at said sensor region and are operable to sense a touch or proximity of a user's finger at said first surface of said front substrate.

115. The vehicular electrochromic interior rearview mirror assembly of claim 113, wherein said electrochromic interior rearview mirror reflective element comprises a first display element associated with said first capacitive touch sensor and a second display element associated with said second capacitive touch sensor, and wherein, when said first capacitive touch sensor is activated, said first display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly, and wherein, when said second capacitive touch sensor is activated, said second display element is activated so as to be viewable to the driver of the equipped vehicle when said vehicular electrochromic interior rearview mirror assembly is normally mounted in the equipped vehicle and when the driver is normally operating the equipped vehicle and viewing said first surface of said front substrate of said electrochromic interior rearview mirror reflective element of said vehicular electrochromic interior rearview mirror assembly, and wherein said first and second display elements are disposed behind said second substrate, and wherein said first and second display elements, when activated, are viewable through said electrochromic medium, and wherein said mirror reflector comprises a transflective mirror reflector, and wherein said first and second display elements, when activated, are viewable through said transflective mirror reflector.

116. The vehicular electrochromic interior rearview mirror assembly of claim 113, wherein said first capacitive touch sensor comprises a first transparent electrically conductive coating, and wherein said second capacitive touch sensor comprises a second transparent electrically conductive coating.

117. The vehicular electrochromic interior rearview mirror assembly of claim 112, comprising an interior rearview mirror casing, wherein no portion of said interior rearview mirror casing overlaps said first surface of said front substrate.

118. The vehicular electrochromic interior rearview mirror assembly of claim 112, comprising an interior rearview mirror casing having a bezel portion.

119. The vehicular electrochromic interior rearview mirror assembly of claim 118, wherein said bezel portion comprises a metalicized bezel portion.

120. The vehicular electrochromic interior rearview mirror assembly of claim 112, wherein no part of said rear substrate extends beyond any part of said front substrate.

121. The vehicular electrochromic interior rearview mirror assembly of claim 112, wherein at least one of (i) said front glass substrate comprises a first perimeter edge circumferentially at its first surface and a second perimeter edge circumferentially at its second surface, and wherein at least one of said first and second perimeter edges is rounded, (ii) said front glass substrate comprises a first perimeter edge circumferentially at its first surface and a second perimeter edge circumferentially at its second surface, and wherein both of said first and second perimeter edges are rounded, (iii) said front glass substrate comprises a first perimeter edge circumferentially at its first surface and a second perimeter edge circumferentially at its second surface and wherein said first perimeter edge is rounded, and (iv) said front glass substrate comprises a first perimeter edge circumferentially at its first surface and a second perimeter edge circumferentially at its second surface and wherein said second perimeter edge is rounded.

122. The vehicular electrochromic interior rearview mirror assembly of claim 112, wherein said perimeter band comprises a perimeter reflective band, and wherein at least one of (a) said perimeter reflective band comprises at least one metal thin film and (b) said perimeter reflective band comprises at least one metal thin film and wherein said metal thin film comprises chromium.

123. The vehicular electrochromic interior rearview mirror assembly of claim 122, wherein said perimeter reflective band includes an enlarged portion at said sensor region, and wherein said enlarged portion of said perimeter reflective band has a greater width dimension than any width dimension of said perimeter reflective band at portions other than at said enlarged portion.

* * * * *

UNITED STATES PATENT AND TRADEMARK OFFICE
CERTIFICATE OF CORRECTION

PATENT NO.         : 8,277,059 B2
APPLICATION NO.    : 12/900063
DATED              : October 2, 2012
INVENTOR(S)        : Ian A. McCabe et al.

Page 1 of 2

It is certified that error appears in the above-identified patent and that said Letters Patent is hereby corrected as shown below:

Column 1
Line 27, "PCT/US03/297776" should be --PCT/US03/29776--

Column 15
Line 46, Delete "." after "and"

Column 71
Line 1, Delete "*" after "SCP"

Column 74
Line 27, Delete "V" after "4½"

Column 75
Line 42, "09/817,8'74" should be --09/817,874--

Column 78
Line 45, "810'" should be --810"--
Line 67, "device" should be --deice--

Column 79
Line 18, "device" should be --deice--

Column 80
Line 7, "minor" should be --mirror--
Line 38, Insert --,-- after "of"

Column 81
Line 63, "display;" should be --display,--

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,277,059 B2

Column 87
Line 59, Claim 37, "minor" should be --mirror--

Column 95
Line 39, Claim 99, Delete "," after "front"

Column 97
Line 56, Claim 108, "minor" should be --mirror--